US010191576B2

(12) United States Patent
Hotelling et al.

(10) Patent No.: US 10,191,576 B2
(45) Date of Patent: Jan. 29, 2019

(54) TOUCH SCREEN LIQUID CRYSTAL DISPLAY

(71) Applicant: Apple Inc., Cupertino, CA (US)

(72) Inventors: Steve Porter Hotelling, Los Gatos, CA (US); Wei Chen, Palo Alto, CA (US); Christoph H. Krah, Cupertino, CA (US); John Greer Elias, Townsend, DE (US); Wei Hsin Yao, Palo Alto, CA (US); John Z. Zhong, Saratoga, CA (US); Andrew Bert Hodge, Palo Alto, CA (US); Brian R. Land, Woodside, CA (US); Willem den Boer, Brighton, MI (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/424,712

(22) Filed: Feb. 3, 2017

(65) Prior Publication Data
US 2017/0147119 A1 May 25, 2017

Related U.S. Application Data

(62) Division of application No. 14/985,283, filed on Dec. 30, 2015, now Pat. No. 9,575,610, which is a division
(Continued)

(51) Int. Cl.
G06F 3/041 (2006.01)
G02F 1/1335 (2006.01)
(Continued)

(52) U.S. Cl.
CPC .......... G06F 3/0412 (2013.01); G02F 1/1362 (2013.01); G02F 1/13338 (2013.01);
(Continued)

(58) Field of Classification Search
CPC .......... G02F 1/13338; G02F 1/134363; G06F 3/0412; G06F 3/044; G06F 2203/04112;
(Continued)

(56) References Cited

U.S. PATENT DOCUMENTS 2,751,555 A 6/1956 Kirkpatrick
3,333,160 A 7/1967 Gorski
(Continued)

FOREIGN PATENT DOCUMENTS

AU 2005246219 A1 12/2005
CA 1243096 A 10/1988
(Continued)

OTHER PUBLICATIONS

"Gesture Recognition," (2006). Located at <http://www.fingerworks.com/gesture_recognition.html>, last visited Jul. 25, 2006, two pages.
(Continued)

Primary Examiner — Patrick F Marinelli
(74) Attorney, Agent, or Firm — Morrison & Foerster LLP

(57) ABSTRACT

Disclosed herein are liquid-crystal display (LCD) touch screens that integrate the touch sensing elements with the display circuitry. The integration may take a variety of forms. Touch sensing elements can be completely implemented within the LCD stackup but outside the not between the color filter plate and the array plate. Alternatively, some touch sensing elements can be between the color filter and array plates with other touch sensing elements not between the plates. In another alternative, all touch sensing elements can be between the color filter and array plates. The latter alternative can include both conventional and in-plane-switching (IPS) LCDs. In some forms, one or more display structures can also have a touch sensing function. Techniques for manufacturing and operating such displays, as
(Continued)

well as various devices embodying such displays are also disclosed.

20 Claims, 78 Drawing Sheets

Related U.S. Application Data of application No. 14/174,760, filed on Feb. 6, 2014, now Pat. No. 9,244,561, which is a division of application No. 11/760,080, filed on Jun. 8, 2007, now Pat. No. 8,654,083.

(60) Provisional application No. 60/883,979, filed on Jan. 8, 2007, provisional application No. 60/804,361, filed on Jun. 9, 2006.

(51) Int. Cl.
    *G02F 1/1362*     (2006.01)
    *G02F 1/1343*     (2006.01)
    *G09G 3/36*     (2006.01)
    *G02F 1/1333*     (2006.01)
    *G06F 3/044*     (2006.01)

(52) U.S. Cl.
    CPC .. *G02F 1/133514* (2013.01); *G02F 1/133528* (2013.01); *G02F 1/134309* (2013.01); *G02F 1/134363* (2013.01); *G06F 3/044* (2013.01); *G06F 3/0416* (2013.01); *G09G 3/3648* (2013.01); *G02F 2201/124* (2013.01); *G06F 2203/04103* (2013.01); *G06F 2203/04104* (2013.01); *G06F 2203/04111* (2013.01); *G06F 2203/04112* (2013.01); *G09G 2300/0426* (2013.01); *G09G 2300/0439* (2013.01); *G09G 2300/0456* (2013.01); *G09G 2300/0478* (2013.01)

(58) Field of Classification Search
    CPC ... G06F 2203/04103; G09G 3/36–3/38; G09G 2300/0439–2300/0495; G09G 2310/0264–2310/0297
    USPC ..................... 345/156–184; 178/18.01–20.04
    See application file for complete search history.

(56) References Cited

U.S. PATENT DOCUMENTS

| | | |
|---|---|---|
| 3,541,541 A | 11/1970 | Englebart |
| 3,644,835 A | 2/1972 | Thompson |
| 3,662,105 A | 5/1972 | Hurst et al. |
| 3,798,370 A | 3/1974 | Hurst |
| 3,875,472 A | 4/1975 | Schermerhorn |
| 3,974,332 A | 8/1976 | Abe et al. |
| 4,194,083 A | 3/1980 | Abe et al. |
| 4,233,522 A | 11/1980 | Grummer et al. |
| 4,246,452 A | 1/1981 | Chandler |
| 4,250,495 A | 2/1981 | Beckerman et al. |
| 4,266,144 A | 5/1981 | Bristol |
| 4,268,815 A | 5/1981 | Eventoff et al. |
| 4,277,517 A | 7/1981 | Smith, Jr. |
| 4,290,052 A | 9/1981 | Eichelberger et al. |
| 4,307,383 A | 12/1981 | Brienza |
| 4,313,108 A | 1/1982 | Yoshida |
| 4,342,460 A | 8/1982 | Eng |
| 4,345,000 A | 8/1982 | Kawazoe et al. |
| 4,363,027 A | 12/1982 | Brienza |
| 4,370,697 A | 1/1983 | Haberl et al. |
| 4,394,643 A | 7/1983 | Williams |
| 4,516,112 A | 5/1985 | Chen |
| 4,526,043 A | 7/1985 | Boie |
| 4,550,221 A | 10/1985 | Mabusth |
| 4,587,378 A | 5/1986 | Moore |
| 4,618,989 A | 10/1986 | Tsukune et al. |
| 4,623,757 A | 11/1986 | Marino |
| 4,639,720 A | 1/1987 | Rympalski et al. |
| 4,672,364 A | 6/1987 | Lucas |
| 4,672,558 A | 6/1987 | Beckes et al. |
| 4,675,569 A | 6/1987 | Bowman et al. |
| 4,686,332 A | 8/1987 | Greanias et al. |
| 4,692,809 A | 9/1987 | Beining et al. |
| 4,695,827 A | 9/1987 | Beining et al. |
| 4,707,845 A | 11/1987 | Krein et al. |
| 4,723,056 A | 2/1988 | Tamaru et al. |
| 4,733,222 A | 3/1988 | Evans |
| 4,734,685 A | 3/1988 | Watanabe |
| 4,740,781 A | 4/1988 | Brown |
| 4,746,770 A | 5/1988 | McAvinney |
| 4,771,276 A | 9/1988 | Parks |
| 4,772,885 A | 9/1988 | Uehara et al. |
| 4,788,384 A | 11/1988 | Bruere-Dawson et al. |
| 4,806,709 A | 2/1989 | Evans |
| 4,806,846 A | 2/1989 | Kerber |
| 4,839,634 A * | 6/1989 | More ...................... G06K 9/24 178/18.09 |
| 4,853,493 A | 8/1989 | Schlosser et al. |
| 4,898,555 A | 2/1990 | Sampson |
| 4,908,710 A * | 3/1990 | Wakai .................. G09G 3/3611 345/103 |
| 4,910,504 A | 3/1990 | Eriksson |
| 4,914,624 A | 4/1990 | Dunthorn et al. |
| 4,916,308 A | 4/1990 | Meadows |
| 4,954,823 A | 9/1990 | Binstead |
| 4,964,302 A | 10/1990 | Grahn et al. |
| 4,968,877 A | 11/1990 | McAvinney et al. |
| 5,003,519 A | 3/1991 | Noirjean |
| 5,010,772 A | 4/1991 | Bourland et al. |
| 5,017,030 A | 5/1991 | Crews |
| 5,062,198 A | 11/1991 | Sun |
| 5,073,950 A | 12/1991 | Colbert et al. |
| 5,105,186 A | 4/1992 | May |
| 5,105,288 A | 4/1992 | Senda et al. |
| 5,113,041 A | 5/1992 | Blonder et al. |
| 5,117,071 A | 5/1992 | Greanias et al. |
| 5,142,912 A | 9/1992 | Frische |
| 5,159,323 A | 10/1992 | Akira et al. |
| 5,178,477 A | 1/1993 | Gambaro |
| 5,189,403 A | 2/1993 | Franz et al. |
| 5,194,862 A | 3/1993 | Edwards |
| 5,209,126 A | 5/1993 | Grahn |
| 5,224,861 A | 7/1993 | Glass et al. |
| 5,239,152 A | 8/1993 | Caldwell et al. |
| 5,241,308 A | 8/1993 | Young |
| 5,252,951 A | 10/1993 | Tannenbaum et al. |
| 5,281,966 A | 1/1994 | Walsh |
| 5,293,430 A | 3/1994 | Shiau et al. |
| 5,305,017 A | 4/1994 | Gerpheide |
| 5,343,064 A | 8/1994 | Spangler et al. |
| 5,345,543 A | 9/1994 | Capps et al. |
| 5,345,807 A | 9/1994 | Butts et al. |
| 5,353,135 A | 10/1994 | Edwards |
| 5,374,787 A | 12/1994 | Miller et al. |
| 5,376,948 A | 12/1994 | Roberts |
| 5,381,160 A | 1/1995 | Landmeier |
| 5,386,219 A | 1/1995 | Greanias et al. |
| 5,392,058 A | 2/1995 | Tagawa |
| 5,398,310 A | 3/1995 | Tchao et al. |
| 5,432,671 A | 7/1995 | Allavena |
| 5,442,742 A | 8/1995 | Greyson et al. |
| 5,447,074 A | 9/1995 | Polaert et al. |
| 5,457,289 A | 10/1995 | Huang et al. |
| 5,459,463 A | 10/1995 | Gruaz et al. |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,499,026 A | 3/1996 | Liao et al. |
| 5,510,813 A | 4/1996 | Makinwa et al. |
| 5,513,309 A | 4/1996 | Meier et al. |
| 5,523,775 A | 6/1996 | Capps |

(56) References Cited

U.S. PATENT DOCUMENTS

| | | |
|---|---|---|
| 5,530,455 A | 6/1996 | Gillick et al. |
| 5,534,892 A | 7/1996 | Tagawa |
| 5,543,588 A | 8/1996 | Bisset et al. |
| 5,543,589 A | 8/1996 | Buchana et al. |
| 5,543,590 A | 8/1996 | Gillespie et al. |
| 5,543,591 A | 8/1996 | Gillespie et al. |
| 5,550,659 A | 8/1996 | Fujieda et al. |
| 5,552,787 A | 9/1996 | Schuler et al. |
| 5,553,500 A | 9/1996 | Grahn et al. |
| 5,563,632 A | 10/1996 | Roberts |
| 5,563,727 A | 10/1996 | Larson et al. |
| 5,563,996 A | 10/1996 | Tchao |
| 5,565,658 A | 10/1996 | Gerpheide et al. |
| 5,572,205 A | 11/1996 | Caldwell et al. |
| 5,576,070 A | 11/1996 | Yaniv |
| 5,579,036 A | 11/1996 | Yates, IV |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,806 A | 1/1997 | Colbert |
| 5,594,810 A | 1/1997 | Gourdol |
| 5,596,694 A | 1/1997 | Capps |
| 5,612,719 A | 3/1997 | Beernink et al. |
| 5,623,280 A | 4/1997 | Akins et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,638,093 A | 6/1997 | Takahashi et al. |
| 5,642,108 A | 6/1997 | Gopher et al. |
| 5,644,657 A | 7/1997 | Capps et al. |
| 5,648,642 A | 7/1997 | Miller et al. |
| 5,650,597 A | 7/1997 | Redmayne |
| 5,666,113 A | 9/1997 | Logan |
| 5,666,502 A | 9/1997 | Capps |
| 5,666,552 A | 9/1997 | Greyson et al. |
| 5,673,041 A | 9/1997 | Chatigny et al. |
| 5,675,361 A | 10/1997 | Santilli |
| 5,677,710 A | 10/1997 | Thompson-Rohrlich |
| 5,677,744 A | 10/1997 | Yoneda et al. |
| 5,680,160 A | 10/1997 | LaPointe |
| 5,686,973 A | 11/1997 | Lee |
| 5,689,253 A | 11/1997 | Hargreaves et al. |
| 5,710,844 A | 1/1998 | Capps et al. |
| 5,729,250 A | 3/1998 | Bishop et al. |
| 5,730,165 A | 3/1998 | Philipp |
| 5,734,742 A | 3/1998 | Asaeda et al. |
| 5,734,751 A | 3/1998 | Saito |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,748,269 A | 5/1998 | Harris et al. |
| 5,760,857 A * | 6/1998 | Yanagawa ......... G02F 1/134363 349/109 |
| 5,764,218 A | 6/1998 | Bona et al. |
| 5,764,818 A | 6/1998 | Capps et al. |
| 5,767,457 A | 6/1998 | Gerpheide et al. |
| 5,767,842 A | 6/1998 | Korth |
| 5,777,596 A | 7/1998 | Herbert |
| 5,790,104 A | 8/1998 | Shieh |
| 5,790,106 A | 8/1998 | Hirano et al. |
| 5,790,107 A | 8/1998 | Kasser et al. |
| 5,801,340 A | 9/1998 | Peter |
| 5,802,516 A | 9/1998 | Shwarts et al. |
| 5,805,144 A | 9/1998 | Scholder et al. |
| 5,808,567 A | 9/1998 | McCloud |
| 5,809,166 A | 9/1998 | Huang et al. |
| 5,809,267 A | 9/1998 | Moran et al. |
| 5,815,141 A | 9/1998 | Phares |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,831,170 A | 11/1998 | Sokn |
| 5,835,079 A | 11/1998 | Shieh |
| 5,838,308 A | 11/1998 | Knapp et al. |
| 5,841,078 A | 11/1998 | Miller et al. |
| 5,841,415 A | 11/1998 | Kwon et al. |
| 5,844,506 A | 12/1998 | Binstead |
| 5,847,690 A | 12/1998 | Boie et al. |
| 5,852,487 A | 12/1998 | Fujimori et al. |
| 5,854,450 A | 12/1998 | Kent |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |
| 5,867,151 A | 2/1999 | Nakai |
| 5,869,790 A | 2/1999 | Shigetaka et al. |
| 5,869,791 A | 2/1999 | Young |
| 5,880,411 A | 3/1999 | Gillespie et al. |
| 5,889,236 A | 3/1999 | Gillespie et al. |
| 5,898,434 A | 4/1999 | Small et al. |
| 5,914,465 A | 6/1999 | Allen et al. |
| 5,915,285 A | 6/1999 | Sommer |
| 5,917,165 A | 6/1999 | Platt et al. |
| 5,920,298 A | 7/1999 | McKnight |
| 5,920,309 A | 7/1999 | Bisset et al. |
| 5,923,319 A | 7/1999 | Bishop et al. |
| 5,926,161 A * | 7/1999 | Furuhashi ............ G09G 3/3648 345/100 |
| 5,929,834 A | 7/1999 | Inoue et al. |
| 5,933,134 A | 8/1999 | Shieh |
| 5,940,055 A | 8/1999 | Lee |
| 5,940,064 A | 8/1999 | Kai et al. |
| 5,942,733 A | 8/1999 | Allen et al. |
| 5,943,043 A | 8/1999 | Furuhata et al. |
| 5,943,044 A | 8/1999 | Martinelli et al. |
| 5,945,980 A | 8/1999 | Moissev et al. |
| 5,952,998 A | 9/1999 | Clancy et al. |
| 5,955,198 A | 9/1999 | Hashimoto et al. |
| 5,977,562 A * | 11/1999 | Hirakata ............ G02F 1/134363 257/59 |
| 5,977,957 A * | 11/1999 | Miller ...................... G06F 1/32 178/18.01 |
| 5,982,352 A | 11/1999 | Pryor |
| 5,986,723 A | 11/1999 | Nakamura et al. |
| 6,002,389 A | 12/1999 | Kasser |
| 6,002,808 A | 12/1999 | Freeman |
| 6,008,800 A | 12/1999 | Pryor |
| 6,020,881 A | 2/2000 | Naughton et al. |
| 6,020,945 A | 2/2000 | Sawai et al. |
| 6,023,265 A | 2/2000 | Lee |
| 6,028,581 A | 2/2000 | Umeya |
| 6,029,214 A | 2/2000 | Dorfman et al. |
| 6,031,524 A | 2/2000 | Kunert |
| 6,037,882 A | 3/2000 | Levy |
| 6,050,825 A | 4/2000 | Nichol et al. |
| 6,052,339 A | 4/2000 | Frenkel et al. |
| 6,057,903 A | 5/2000 | Colgan et al. |
| 6,061,177 A | 5/2000 | Fujimoto |
| 6,072,494 A | 6/2000 | Nguyen |
| 6,079,282 A | 6/2000 | Lanter |
| 6,081,259 A | 6/2000 | Teterwak |
| 6,084,576 A | 7/2000 | Leu et al. |
| 6,107,654 A | 8/2000 | Yamazaki |
| 6,107,997 A | 8/2000 | Ure |
| 6,124,848 A * | 9/2000 | Ballare ................. G06F 3/0412 178/18.02 |
| 6,128,003 A | 10/2000 | Smith et al. |
| 6,131,299 A | 10/2000 | Raab et al. |
| 6,133,906 A * | 10/2000 | Geaghan ............... G06F 3/0412 178/18.01 |
| 6,135,958 A | 10/2000 | Mikula-Curtis et al. |
| 6,137,427 A | 10/2000 | Binstead |
| 6,144,380 A | 11/2000 | Shwarts et al. |
| 6,163,313 A | 12/2000 | Aroyan et al. |
| 6,172,667 B1 | 1/2001 | Sayag |
| 6,177,918 B1 | 1/2001 | Colgan et al. |
| 6,188,391 B1 | 2/2001 | Seely et al. |
| 6,191,828 B1 | 2/2001 | Kim et al. |

(56) References Cited

U.S. PATENT DOCUMENTS

| | | |
|---|---|---|
| 6,198,515 B1 | 3/2001 | Cole |
| 6,204,897 B1 | 3/2001 | Colgan et al. |
| 6,208,329 B1 | 3/2001 | Ballare |
| 6,211,585 B1 | 4/2001 | Sato et al. |
| 6,222,465 B1 | 4/2001 | Kumar et al. |
| 6,222,528 B1 * | 4/2001 | Gerpheide ............ G06F 3/044 345/173 |
| 6,239,389 B1 | 5/2001 | Allen et al. |
| 6,239,788 B1 * | 5/2001 | Nohno ................ G06F 3/0412 178/18.03 |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,250,863 B1 | 6/2001 | Kamentser et al. |
| 6,259,490 B1 | 7/2001 | Colgan et al. |
| 6,271,835 B1 | 8/2001 | Hoeksma |
| 6,285,428 B1 * | 9/2001 | Kim .................. G02F 1/134363 349/123 |
| 6,288,707 B1 | 9/2001 | Philipp |
| 6,289,326 B1 | 9/2001 | LaFleur |
| 6,292,178 B1 | 9/2001 | Bernstein et al. |
| 6,297,811 B1 | 10/2001 | Kent |
| 6,310,610 B1 | 10/2001 | Beaton et al. |
| 6,317,248 B1 | 11/2001 | Agrawal et al. |
| 6,323,846 B1 | 11/2001 | Westerman et al. |
| 6,323,849 B1 | 11/2001 | He et al. |
| 6,333,768 B1 | 12/2001 | Kawashima et al. |
| 6,337,678 B1 | 1/2002 | Fish |
| 6,342,938 B1 | 1/2002 | Song et al. |
| 6,347,290 B1 | 2/2002 | Bartlett |
| 6,377,009 B1 | 4/2002 | Philipp |
| 6,380,931 B1 | 4/2002 | Gillespie et al. |
| 6,395,863 B2 | 5/2002 | Geaghan |
| 6,411,287 B1 | 6/2002 | Scharff et al. |
| 6,414,671 B1 | 7/2002 | Gillespie et al. |
| 6,417,846 B1 | 7/2002 | Lee |
| 6,421,039 B1 * | 7/2002 | Moon ............... G02F 1/134363 345/100 |
| 6,421,234 B1 | 7/2002 | Ricks et al. |
| 6,425,289 B1 | 7/2002 | Igel et al. |
| 6,452,514 B1 | 9/2002 | Philipp |
| 6,456,350 B1 * | 9/2002 | Ashizawa ......... G02F 1/134363 349/141 |
| 6,457,355 B1 | 10/2002 | Philipp |
| 6,459,424 B1 | 10/2002 | Resman |
| 6,466,036 B1 | 10/2002 | Philipp |
| 6,483,498 B1 | 11/2002 | Colgan et al. |
| 6,489,952 B1 * | 12/2002 | Tanaka ................ G09G 3/3233 345/205 |
| 6,492,599 B1 | 12/2002 | Sugihara |
| 6,501,528 B1 | 12/2002 | Hamada |
| 6,501,529 B1 | 12/2002 | Kurihara et al. |
| 6,504,530 B1 | 1/2003 | Wilson et al. |
| 6,504,713 B1 | 1/2003 | Pandolfi et al. |
| 6,515,669 B1 | 2/2003 | Mohri |
| 6,522,772 B1 | 2/2003 | Morrison et al. |
| 6,525,547 B2 | 2/2003 | Hayes |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,495 B2 | 4/2003 | Warmack et al. |
| 6,549,193 B1 | 4/2003 | Huang et al. |
| 6,568,275 B2 | 5/2003 | Scholz et al. |
| 6,570,557 B1 | 5/2003 | Westerman et al. |
| 6,593,916 B1 | 7/2003 | Aroyan |
| 6,602,790 B2 | 8/2003 | Kian et al. |
| 6,610,936 B2 | 8/2003 | Gillespie et al. |
| 6,624,833 B1 | 9/2003 | Kumar et al. |
| 6,624,835 B2 | 9/2003 | Willig |
| 6,627,918 B2 | 9/2003 | Getz et al. |
| 6,628,268 B1 | 9/2003 | Harada et al. |
| 6,639,577 B2 | 10/2003 | Eberhard |
| D482,368 S | 11/2003 | DenToonder et al. |
| 6,650,319 B1 | 11/2003 | Hurst et al. |
| 6,658,994 B1 | 12/2003 | McMillan |
| 6,670,894 B2 | 12/2003 | Mehring |
| 6,670,951 B2 | 12/2003 | Clough et al. |
| 6,677,932 B1 | 1/2004 | Westerman |
| 6,677,934 B1 | 1/2004 | Blanchard |
| 6,680,448 B2 | 1/2004 | Kawashima et al. |
| 6,690,032 B1 | 2/2004 | Umetsu |
| 6,690,387 B2 | 2/2004 | Zimmerman et al. |
| 6,721,375 B1 | 4/2004 | Hammel |
| 6,723,929 B2 | 4/2004 | Kent |
| 6,724,366 B2 | 4/2004 | Crawford |
| 6,757,002 B1 | 6/2004 | Oross et al. |
| 6,762,752 B2 | 7/2004 | Perski et al. |
| 6,774,971 B2 | 8/2004 | Shirato et al. |
| 6,784,948 B2 | 8/2004 | Kawashima et al. |
| 6,785,578 B2 | 8/2004 | Johnson et al. |
| 6,803,906 B1 | 10/2004 | Morrison et al. |
| 6,825,833 B2 | 11/2004 | Mulligan et al. |
| 6,842,672 B1 | 1/2005 | Straub et al. |
| 6,846,579 B2 | 1/2005 | Anderson et al. |
| 6,856,259 B1 | 2/2005 | Sharp |
| 6,876,355 B1 | 4/2005 | Ahn et al. |
| 6,888,536 B2 | 5/2005 | Westerman et al. |
| 6,900,795 B1 | 5/2005 | Knight, III et al. |
| 6,906,692 B2 | 6/2005 | Ishiyama |
| 6,924,789 B2 | 8/2005 | Bick |
| 6,927,761 B2 | 8/2005 | Badaye et al. |
| 6,927,763 B2 | 8/2005 | LaMonica |
| 6,942,571 B1 | 9/2005 | McAllister et al. |
| 6,943,779 B2 | 9/2005 | Satoh |
| 6,947,102 B2 * | 9/2005 | den Boer ............ G02F 1/13338 345/104 |
| 6,961,049 B2 | 11/2005 | Mulligan et al. |
| 6,963,335 B2 * | 11/2005 | Tanaka ............. G02F 1/134336 345/204 |
| 6,965,375 B1 | 11/2005 | Gettemy et al. |
| 6,970,160 B2 | 11/2005 | Mulligan et al. |
| 6,972,401 B2 | 12/2005 | Akitt et al. |
| 6,977,666 B1 | 12/2005 | Hedrick |
| 6,982,432 B2 * | 1/2006 | Umemoto ........... G02F 1/13338 257/112 |
| 6,985,801 B1 | 1/2006 | Straub et al. |
| 6,992,659 B2 | 1/2006 | Gettemy |
| 6,995,752 B2 | 2/2006 | Lu |
| 7,006,064 B2 * | 2/2006 | Enomoto ............. G09G 3/3655 345/104 |
| 7,009,663 B2 * | 3/2006 | Abileah ............. G02F 1/13338 345/175 |
| 7,015,894 B2 | 3/2006 | Morohoshi |
| 7,023,427 B2 | 4/2006 | Kraus et al. |
| 7,030,860 B1 | 4/2006 | Hsu et al. |
| 7,031,228 B2 | 4/2006 | Born et al. |
| 7,038,659 B2 | 5/2006 | Rajkowski |
| 7,042,444 B2 | 5/2006 | Cok |
| 7,046,235 B2 | 5/2006 | Katoh |
| 7,068,330 B2 * | 6/2006 | Song .................... G09G 3/3655 345/87 |
| 7,088,342 B2 | 8/2006 | Rekimoto |
| 7,088,343 B2 | 8/2006 | Smith |
| 7,098,127 B2 | 8/2006 | Ito |
| 7,098,897 B2 | 8/2006 | Vakil et al. |
| 7,109,978 B2 | 9/2006 | Gillespie et al. |
| 7,129,935 B2 | 10/2006 | Mackey |
| 7,133,032 B2 | 11/2006 | Cok |
| 7,138,984 B1 | 11/2006 | Miles |
| 7,151,528 B2 | 12/2006 | Taylor et al. |
| 7,154,481 B2 | 12/2006 | Cross et al. |
| 7,177,001 B2 | 2/2007 | Lee |
| 7,184,064 B2 | 2/2007 | Zimmerman et al. |
| 7,190,416 B2 | 3/2007 | Paukshto et al. |
| 7,202,856 B2 | 4/2007 | Cok |
| 7,205,969 B2 * | 4/2007 | Song .................... G09G 3/3655 345/87 |
| 7,230,608 B2 | 6/2007 | Cok |
| 7,254,775 B2 | 8/2007 | Geaghan et al. |
| 7,268,770 B1 | 9/2007 | Takahata et al. |
| 7,274,353 B2 | 9/2007 | Chiu et al. |

(56) References Cited

U.S. PATENT DOCUMENTS

| | | | |
|---|---|---|---|
| 7,280,167 B2 * | 10/2007 | Choi | G06F 3/0412 345/174 |
| 7,292,229 B2 | 11/2007 | Morag et al. | |
| 7,307,231 B2 | 12/2007 | Matsumoto et al. | |
| 7,319,448 B2 * | 1/2008 | Kim | G02F 1/134363 345/87 |
| RE40,153 E | 3/2008 | Westerman et al. | |
| 7,339,579 B2 | 3/2008 | Richter et al. | |
| 7,355,592 B2 | 4/2008 | Jong et al. | |
| 7,362,313 B2 | 4/2008 | Geaghan et al. | |
| 7,372,455 B2 | 5/2008 | Perski et al. | |
| 7,379,054 B2 * | 5/2008 | Lee | G06F 3/041 178/18.06 |
| 7,453,444 B2 | 11/2008 | Geaghan | |
| 7,463,246 B2 | 12/2008 | Mackey | |
| 7,483,016 B1 | 1/2009 | Gettemy et al. | |
| 7,511,702 B2 | 3/2009 | Hotelling | |
| 7,538,760 B2 | 5/2009 | Hotelling et al. | |
| 7,554,624 B2 | 6/2009 | Kusuda et al. | |
| 7,633,484 B2 | 12/2009 | Ito | |
| 7,663,583 B2 * | 2/2010 | Lee | G02F 1/134363 257/72 |
| 7,663,607 B2 | 2/2010 | Hotelling et al. | |
| 7,683,888 B1 | 3/2010 | Kennedy | |
| 7,688,315 B1 | 3/2010 | Gettemy et al. | |
| 7,692,729 B2 * | 4/2010 | Pak | G02F 1/13338 345/173 |
| 7,705,813 B2 * | 4/2010 | Hong | G02F 1/1368 345/204 |
| 7,705,834 B2 | 4/2010 | Swedin | |
| 7,730,401 B2 | 6/2010 | Gillespie et al. | |
| 7,737,957 B2 * | 6/2010 | Lee | G06F 3/3203 178/18.01 |
| 7,742,041 B2 * | 6/2010 | Lee | G02F 1/13338 178/18.06 |
| 7,746,326 B2 | 6/2010 | Sato | |
| 7,755,683 B2 | 7/2010 | Sergio et al. | |
| 7,800,589 B2 | 9/2010 | Hurst et al. | |
| 7,812,828 B2 | 10/2010 | Westerman et al. | |
| 7,843,439 B2 | 11/2010 | Perski et al. | |
| 7,868,875 B2 * | 1/2011 | Park | G06F 3/0421 345/104 |
| 7,920,129 B2 | 4/2011 | Hotelling et al. | |
| 7,924,253 B2 * | 4/2011 | Huang | G09G 3/3659 345/690 |
| 8,031,180 B2 | 10/2011 | Miyamoto et al. | |
| 8,040,326 B2 * | 10/2011 | Hotelling | G02F 1/134363 345/104 |
| 8,125,463 B2 | 2/2012 | Hotelling et al. | |
| 8,130,209 B2 | 3/2012 | Chang | |
| 8,228,274 B2 * | 7/2012 | Chung | G09G 3/3648 345/87 |
| 8,243,027 B2 * | 8/2012 | Hotelling | G02F 1/13338 345/104 |
| 8,259,078 B2 * | 9/2012 | Hotelling | G02F 1/13338 345/156 |
| 8,274,492 B2 * | 9/2012 | Hotelling | G02F 1/134363 345/173 |
| 8,310,427 B2 * | 11/2012 | Sheu | G09G 3/3655 345/92 |
| 8,368,630 B2 * | 2/2013 | Lee | G02F 1/134309 345/104 |
| 8,400,406 B1 * | 3/2013 | Kurtz | G06F 3/0428 345/104 |
| 8,416,209 B2 | 4/2013 | Hotelling et al. | |
| 8,421,760 B2 | 4/2013 | Liu et al. | |
| 8,432,371 B2 * | 4/2013 | Hotelling | G06F 3/0412 345/104 |
| 8,451,244 B2 * | 5/2013 | Hotelling | G06F 3/0412 345/104 |
| 8,479,122 B2 | 7/2013 | Hotelling et al. | |
| 8,487,890 B2 | 7/2013 | Juan et al. | |
| 8,493,330 B2 | 7/2013 | Krah | |
| 8,502,799 B2 | 8/2013 | Hotelling et al. | |
| 8,508,244 B2 * | 8/2013 | Seguine | G01D 5/24 324/658 |
| 8,552,989 B2 * | 10/2013 | Hotelling | G02F 1/13338 345/104 |
| 8,553,013 B2 * | 10/2013 | Kim | G06F 3/0412 178/18.06 |
| 8,605,051 B2 | 12/2013 | Hotelling et al. | |
| 8,654,083 B2 * | 2/2014 | Hotelling | G09G 3/3648 345/173 |
| 8,698,777 B2 | 4/2014 | Endo et al. | |
| 8,743,300 B2 | 6/2014 | Chang et al. | |
| 8,804,056 B2 | 8/2014 | Chang et al. | |
| 8,866,787 B2 * | 10/2014 | Chang | G02F 1/13338 345/104 |
| 8,872,785 B2 | 10/2014 | Hotelling et al. | |
| 8,872,985 B2 | 10/2014 | Hotelling et al. | |
| 8,922,520 B2 | 12/2014 | Chen | |
| 8,928,618 B2 | 1/2015 | Hotelling et al. | |
| 8,933,351 B2 * | 1/2015 | Noguchi | G06F 3/0416 178/18.06 |
| 8,982,087 B2 | 3/2015 | Hotelling et al. | |
| 9,025,090 B2 | 5/2015 | Chang et al. | |
| 9,030,452 B2 * | 5/2015 | Jang | G09G 3/3614 257/59 |
| 9,035,202 B2 * | 5/2015 | Mizuhashi | G06F 3/0412 178/18.06 |
| 9,035,907 B2 | 5/2015 | Hotelling et al. | |
| 9,146,414 B2 | 9/2015 | Chang et al. | |
| 9,244,561 B2 | 1/2016 | Hotelling et al. | |
| 9,268,429 B2 | 2/2016 | Hotelling et al. | |
| 9,454,277 B2 | 9/2016 | Hotelling et al. | |
| 9,575,610 B2 * | 2/2017 | Hotelling | G09G 3/3648 |
| 9,710,095 B2 | 7/2017 | Hotelling et al. | |
| 9,727,193 B2 | 8/2017 | Chang et al. | |
| 2001/0000961 A1 | 5/2001 | Hikida et al. | |
| 2001/0020578 A1 | 9/2001 | Baier | |
| 2001/0020986 A1 | 9/2001 | Ikeda et al. | |
| 2001/0020987 A1 | 9/2001 | Ahn et al. | |
| 2001/0023204 A1 | 9/2001 | Komata | |
| 2002/0015024 A1 | 2/2002 | Westerman et al. | |
| 2002/0018035 A1 * | 2/2002 | Song | G09G 3/3655 345/87 |
| 2002/0021398 A1 * | 2/2002 | Matsumoto | G02F 1/1345 349/149 |
| 2002/0033919 A1 | 3/2002 | Sanelle et al. | |
| 2002/0041356 A1 | 4/2002 | Tanada et al. | |
| 2002/0049070 A1 | 4/2002 | Bick | |
| 2002/0063674 A1 * | 5/2002 | Chiang | G09G 3/2011 345/98 |
| 2002/0084922 A1 | 7/2002 | Agnew | |
| 2002/0089496 A1 | 7/2002 | Numao | |
| 2002/0101410 A1 | 8/2002 | Sakata et al. | |
| 2002/0118848 A1 | 8/2002 | Karpenstein | |
| 2002/0121146 A1 | 9/2002 | Manaresi et al. | |
| 2002/0140649 A1 * | 10/2002 | Aoyama | G02F 1/134363 345/87 |
| 2002/0149571 A1 | 10/2002 | Roberts | |
| 2002/0150336 A1 | 10/2002 | Davis et al. | |
| 2002/0158637 A1 | 10/2002 | Warmack et al. | |
| 2002/0159015 A1 | 10/2002 | Seo et al. | |
| 2002/0167489 A1 | 11/2002 | Davis | |
| 2002/0185981 A1 | 12/2002 | Dietz et al. | |
| 2002/0185999 A1 | 12/2002 | Tajima et al. | |
| 2002/0186210 A1 | 12/2002 | Itoh | |
| 2002/0190964 A1 | 12/2002 | Van Berkel | |
| 2002/0191029 A1 | 12/2002 | Gillespie et al. | |
| 2002/0192445 A1 | 12/2002 | Ezzell et al. | |
| 2002/0196237 A1 | 12/2002 | Fernando et al. | |
| 2003/0006974 A1 | 1/2003 | Clough et al. | |
| 2003/0026513 A1 | 2/2003 | Deliwala | |
| 2003/0035479 A1 | 2/2003 | Kan et al. | |
| 2003/0052867 A1 | 3/2003 | Shigetaka et al. | |
| 2003/0067451 A1 | 4/2003 | Tagg et al. | |
| 2003/0069653 A1 | 4/2003 | Johnson et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |

(56) References Cited

U.S. PATENT DOCUMENTS

| | | |
|---|---|---|
| 2003/0085882 A1 | 5/2003 | Lu |
| 2003/0095091 A1* | 5/2003 | Enomoto ............... G09G 3/3655 345/87 |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0132950 A1 | 7/2003 | Surucu et al. |
| 2003/0151600 A1 | 8/2003 | Takeuchi et al. |
| 2003/0174128 A1 | 9/2003 | Matsufusa |
| 2003/0174272 A1 | 9/2003 | Shirato et al. |
| 2003/0179323 A1 | 9/2003 | Abileah et al. |
| 2003/0201984 A1 | 10/2003 | Falvo |
| 2003/0206162 A1 | 11/2003 | Roberts |
| 2003/0206202 A1 | 11/2003 | Moriya |
| 2003/0214485 A1 | 11/2003 | Roberts |
| 2003/0214486 A1 | 11/2003 | Roberts |
| 2003/0222857 A1 | 12/2003 | Abileah |
| 2003/0234768 A1 | 12/2003 | Rekimoto et al. |
| 2003/0234769 A1 | 12/2003 | Cross et al. |
| 2003/0234770 A1 | 12/2003 | Mackey |
| 2004/0021663 A1 | 2/2004 | Suzuki et al. |
| 2004/0022010 A1 | 2/2004 | Shigetaka |
| 2004/0056839 A1 | 3/2004 | Yoshihara |
| 2004/0080501 A1 | 4/2004 | Koyama |
| 2004/0090429 A1 | 5/2004 | Geaghan et al. |
| 2004/0095335 A1 | 5/2004 | Oh et al. |
| 2004/0109097 A1 | 6/2004 | Mai |
| 2004/0119701 A1 | 6/2004 | Mulligan et al. |
| 2004/0141096 A1 | 7/2004 | Mai |
| 2004/0150629 A1 | 8/2004 | Lee |
| 2004/0155871 A1 | 8/2004 | Perski et al. |
| 2004/0155991 A1 | 8/2004 | Lowles et al. |
| 2004/0165005 A1 | 8/2004 | Yoshikawa et al. |
| 2004/0183076 A1 | 9/2004 | Yamazaki et al. |
| 2004/0183484 A1 | 9/2004 | Ide et al. |
| 2004/0188150 A1 | 9/2004 | Richard et al. |
| 2004/0189587 A1* | 9/2004 | Jung ................... G02F 1/13338 345/102 |
| 2004/0189612 A1 | 9/2004 | Bottari et al. |
| 2004/0206190 A1 | 10/2004 | Kawahata |
| 2004/0217945 A1 | 11/2004 | Miyamoto et al. |
| 2004/0227736 A1 | 11/2004 | Kamrath et al. |
| 2004/0239650 A1 | 12/2004 | Mackey |
| 2004/0243747 A1 | 12/2004 | Rekimoto |
| 2004/0263484 A1 | 12/2004 | Mantysalo et al. |
| 2004/0263743 A1* | 12/2004 | Kim .................. G02F 1/134363 349/139 |
| 2005/0005703 A1 | 1/2005 | Saito et al. |
| 2005/0007349 A1 | 1/2005 | Vakil et al. |
| 2005/0012723 A1 | 1/2005 | Pallakoff |
| 2005/0017737 A1 | 1/2005 | Yakabe et al. |
| 2005/0046621 A1 | 3/2005 | Kakikuranta |
| 2005/0052425 A1 | 3/2005 | Zadesky et al. |
| 2005/0052427 A1 | 3/2005 | Wu et al. |
| 2005/0052582 A1 | 3/2005 | Mai |
| 2005/0062620 A1 | 3/2005 | Schaefer |
| 2005/0073507 A1 | 4/2005 | Richter et al. |
| 2005/0083307 A1 | 4/2005 | Aufderheide et al. |
| 2005/0094038 A1* | 5/2005 | Choi ................... G06F 3/0412 349/12 |
| 2005/0099402 A1 | 5/2005 | Nakanishi et al. |
| 2005/0104867 A1 | 5/2005 | Westerman et al. |
| 2005/0110768 A1 | 5/2005 | Marriott et al. |
| 2005/0139837 A1* | 6/2005 | Lee ................... G02F 1/134363 257/72 |
| 2005/0140620 A1* | 6/2005 | Aoyama ............ G02F 1/134363 345/87 |
| 2005/0140634 A1 | 6/2005 | Takatori |
| 2005/0146511 A1 | 7/2005 | Hill et al. |
| 2005/0162402 A1 | 7/2005 | Watanachote |
| 2005/0170668 A1 | 8/2005 | Park et al. |
| 2005/0231487 A1 | 10/2005 | Ming |
| 2005/0237439 A1 | 10/2005 | Mai |
| 2005/0243023 A1 | 11/2005 | Reddy et al. |
| 2006/0007087 A1 | 1/2006 | Choi et al. |
| 2006/0007165 A1 | 1/2006 | Yang et al. |
| 2006/0012575 A1* | 1/2006 | Knapp ................ G02F 1/13338 345/173 |
| 2006/0017710 A1 | 1/2006 | Lee et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0087482 A1* | 4/2006 | Utsumi ............. G02F 1/133514 345/87 |
| 2006/0109222 A1 | 5/2006 | Lee et al. |
| 2006/0114247 A1 | 6/2006 | Brown |
| 2006/0132462 A1 | 6/2006 | Geaghan |
| 2006/0145365 A1 | 7/2006 | Halls et al. |
| 2006/0145983 A1 | 7/2006 | Lee et al. |
| 2006/0145987 A1* | 7/2006 | Hong ................... G02F 1/1368 345/92 |
| 2006/0146033 A1 | 7/2006 | Chen et al. |
| 2006/0146034 A1 | 7/2006 | Chen et al. |
| 2006/0146038 A1* | 7/2006 | Park ..................... G06F 3/042 345/173 |
| 2006/0192745 A1* | 8/2006 | Yamazaki ........... G02F 1/13624 345/100 |
| 2006/0197753 A1 | 9/2006 | Hotelling |
| 2006/0208985 A1* | 9/2006 | Hwang ................ G09G 3/3655 345/92 |
| 2006/0227114 A1 | 10/2006 | Geaghan et al. |
| 2006/0232564 A1 | 10/2006 | Nishimura et al. |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0244736 A1 | 11/2006 | Tseng |
| 2006/0262100 A1* | 11/2006 | Van Berkel .......... G06F 3/0412 345/173 |
| 2006/0278444 A1 | 12/2006 | Binstead |
| 2006/0279679 A1 | 12/2006 | Fujisawa et al. |
| 2006/0284857 A1* | 12/2006 | Oh ........................ G06F 1/3203 345/173 |
| 2006/0290863 A1* | 12/2006 | HoeSup .............. G02F 1/134363 349/141 |
| 2007/0013678 A1 | 1/2007 | Nakajima et al. |
| 2007/0018969 A1 | 1/2007 | Chen et al. |
| 2007/0027932 A1 | 2/2007 | Thibeault |
| 2007/0062739 A1 | 3/2007 | Philipp et al. |
| 2007/0075977 A1 | 4/2007 | Chen et al. |
| 2007/0085838 A1 | 4/2007 | Ricks et al. |
| 2007/0109274 A1 | 5/2007 | Reynolds |
| 2007/0152976 A1 | 7/2007 | Townsend et al. |
| 2007/0159561 A1 | 7/2007 | Chien |
| 2007/0176905 A1 | 8/2007 | Shih et al. |
| 2007/0182706 A1 | 8/2007 | Cassidy et al. |
| 2007/0216657 A1 | 9/2007 | Konieck |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1* | 11/2007 | Hotelling ............. G06F 3/0418 345/173 |
| 2007/0262967 A1 | 11/2007 | Rho |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0055270 A1 | 3/2008 | Cho et al. |
| 2008/0062139 A1* | 3/2008 | Hotelling ............ G02F 1/13338 345/173 |
| 2008/0062140 A1* | 3/2008 | Hotelling ............ G09G 3/3648 345/173 |

(56) References Cited

U.S. PATENT DOCUMENTS

| | | |
|---|---|---|
| 2008/0062147 A1* | 3/2008 | Hotelling ............ G02F 1/13338 345/174 |
| 2008/0062148 A1* | 3/2008 | Hotelling ............ G02F 1/13338 345/174 |
| 2008/0067528 A1 | 3/2008 | Choi et al. |
| 2008/0074401 A1 | 3/2008 | Chung et al. |
| 2008/0079697 A1 | 4/2008 | Lee et al. |
| 2008/0129317 A1 | 6/2008 | Oba |
| 2008/0129898 A1 | 6/2008 | Moon |
| 2008/0131624 A1 | 6/2008 | Egami et al. |
| 2008/0136980 A1 | 6/2008 | Rho et al. |
| 2008/0150901 A1 | 6/2008 | Lowles et al. |
| 2008/0157867 A1 | 7/2008 | Krah |
| 2008/0158167 A1 | 7/2008 | Hotelling et al. |
| 2008/0158181 A1 | 7/2008 | Hamblin et al. |
| 2008/0165158 A1 | 7/2008 | Hotelling et al. |
| 2008/0165299 A1* | 7/2008 | Huang ................. G09G 3/3659 349/38 |
| 2008/0186288 A1 | 8/2008 | Chang |
| 2008/0273014 A1* | 11/2008 | Lowles ................... G06F 3/041 345/173 |
| 2008/0284927 A1* | 11/2008 | Sakamoto ......... G02F 1/133555 349/37 |
| 2008/0284928 A1* | 11/2008 | Sakamoto ......... G02F 1/133555 349/37 |
| 2008/0297476 A1 | 12/2008 | Hotelling et al. |
| 2008/0309627 A1* | 12/2008 | Hotelling .......... G02F 1/134363 345/173 |
| 2009/0058785 A1* | 3/2009 | Kim ..................... G09G 3/3611 345/96 |
| 2009/0066670 A1 | 3/2009 | Hotelling et al. |
| 2009/0090694 A1 | 4/2009 | Hotelling et al. |
| 2009/0096757 A1 | 4/2009 | Hotelling et al. |
| 2009/0102991 A1* | 4/2009 | Chen .................... G09G 3/3614 349/33 |
| 2009/0115743 A1 | 5/2009 | Oowaki |
| 2009/0160816 A1 | 6/2009 | Westerman et al. |
| 2009/0179875 A1* | 7/2009 | Li ........................ G09G 3/3648 345/204 |
| 2009/0262061 A1* | 10/2009 | Chung ............... G02F 1/134363 345/100 |
| 2009/0273581 A1 | 11/2009 | Kim et al. |
| 2009/0279006 A1* | 11/2009 | Chien ................. G09G 3/3648 349/37 |
| 2009/0303193 A1 | 12/2009 | Lim et al. |
| 2009/0322660 A1* | 12/2009 | Chung ................. G09G 3/3648 345/87 |
| 2010/0033448 A1 | 2/2010 | Takeo et al. |
| 2010/0066650 A1 | 3/2010 | Lee et al. |
| 2010/0103121 A1 | 4/2010 | Kim et al. |
| 2010/0110057 A1* | 5/2010 | Lee ................... G02F 1/134309 345/211 |
| 2010/0182273 A1 | 7/2010 | Noguchi et al. |
| 2010/0188347 A1 | 7/2010 | Mizuhashi et al. |
| 2010/0194698 A1 | 8/2010 | Hotelling et al. |
| 2010/0194699 A1 | 8/2010 | Chang |
| 2010/0238134 A1 | 9/2010 | Day et al. |
| 2010/0289770 A1 | 11/2010 | Lee et al. |
| 2011/0032241 A1* | 2/2011 | Jeong ................. G09G 3/3614 345/212 |
| 2011/0139516 A1 | 6/2011 | Nirmal |
| 2011/0187677 A1* | 8/2011 | Hotelling ............ G06F 3/0412 345/174 |
| 2012/0026132 A1* | 2/2012 | Hotelling .......... G02F 1/134363 345/174 |
| 2012/0038585 A1* | 2/2012 | Kim .................... G06F 3/0412 345/174 |
| 2012/0133858 A1 | 5/2012 | Shin et al. |
| 2012/0268423 A1* | 10/2012 | Hotelling ............ G06F 3/0412 345/174 |
| 2013/0082964 A1 | 4/2013 | Agari et al. |
| 2013/0176276 A1 | 7/2013 | Shepelev |
| 2013/0293484 A1* | 11/2013 | Singh ................... G06F 3/0416 345/173 |
| 2014/0139457 A1* | 5/2014 | Hotelling ............ G06F 3/0412 345/173 |
| 2014/0152619 A1* | 6/2014 | Hotelling ............ G09G 3/3648 345/174 |
| 2014/0240286 A1* | 8/2014 | Chang ................ G02F 1/13338 345/174 |
| 2014/0300578 A1 | 10/2014 | Hotelling |
| 2015/0192815 A1* | 7/2015 | Chang ................. G06F 3/0412 349/12 |
| 2015/0309627 A1* | 10/2015 | Xu ....................... G09G 3/3611 345/174 |
| 2015/0370378 A1 | 12/2015 | Chang et al. |
| 2016/0117023 A1* | 4/2016 | Hotelling ............ G09G 3/3648 345/174 |
| 2017/0010746 A1 | 1/2017 | Hotelling et al. |
| 2017/0010750 A1 | 1/2017 | Hotelling et al. |
| 2017/0147119 A1* | 5/2017 | Hotelling ............ G06F 3/0412 |
| 2017/0269738 A1 | 9/2017 | Chang et al. |

FOREIGN PATENT DOCUMENTS

| | | |
|---|---|---|
| CA | 2 318 815 A1 | 7/1999 |
| CA | 2 494 353 A1 | 2/2004 |
| CN | 1867882 A | 11/2006 |
| CN | 101241277 A | 8/2008 |
| DE | 197 06 168 A1 | 8/1998 |
| DE | 102 51 296 A1 | 5/2004 |
| EP | 0 156 593 A2 | 10/1985 |
| EP | 0 156 593 A3 | 10/1985 |
| EP | 0 178 590 A2 | 4/1986 |
| EP | 0 250 931 A2 | 1/1988 |
| EP | 0 250 931 A3 | 1/1988 |
| EP | 0 332 365 A1 | 9/1989 |
| EP | 0 464 908 A2 | 1/1992 |
| EP | 0 464 908 A3 | 1/1992 |
| EP | 0 464 908 B1 | 1/1992 |
| EP | 0 467 562 A2 | 1/1992 |
| EP | 0 483 519 A1 | 5/1992 |
| EP | 0 288 692 A2 | 7/1993 |
| EP | 0 288 692 A3 | 7/1993 |
| EP | 0 288 692 B1 | 7/1993 |
| EP | 0 664 504 A2 | 7/1995 |
| EP | 0 770 971 A2 | 5/1997 |
| EP | 0 786 745 A2 | 7/1997 |
| EP | 0 786 745 A3 | 7/1997 |
| EP | 0 786 745 B1 | 7/1997 |
| EP | 0 932 117 A2 | 7/1999 |
| EP | 0 932 117 A3 | 7/1999 |
| EP | 0 932 117 B1 | 7/1999 |
| EP | 0 973 123 A1 | 1/2000 |
| EP | 1 014 295 A2 | 1/2002 |
| EP | 1 014 295 A3 | 1/2002 |
| EP | 1 211 633 A1 | 6/2002 |
| EP | 1 211 633 B1 | 6/2002 |
| EP | 1 322 104 A1 | 6/2003 |
| EP | 1 391 807 A1 | 2/2004 |
| EP | 1 396 812 A2 | 3/2004 |
| EP | 1 396 812 A3 | 3/2004 |
| EP | 1 418 491 A2 | 5/2004 |
| EP | 1 418 491 A3 | 5/2004 |
| EP | 1 422 601 A1 | 5/2004 |
| EP | 1 455 264 A2 | 9/2004 |
| EP | 1 455 264 A3 | 9/2004 |
| EP | 1 469 415 A2 | 10/2004 |
| EP | 2 214 084 A1 | 4/2010 |
| EP | 2 267 584 A1 | 12/2010 |
| GB | 1 486 988 A | 9/1977 |
| GB | 2 168 816 A | 6/1986 |
| GB | 2 313 195 A | 11/1997 |
| GB | 2 330 670 A | 4/1999 |
| GB | 2 345 140 A | 6/2000 |
| GB | 2 368 483 A | 7/2004 |
| JP | 53-147626 A | 11/1978 |
| JP | 58-166430 A | 10/1983 |
| JP | 59-214941 A | 12/1984 |
| JP | 60-123927 A | 7/1985 |

(56) References Cited

FOREIGN PATENT DOCUMENTS

| | | |
|---|---|---|
| JP | 60-211529 A | 10/1985 |
| JP | 61-131314 A | 6/1986 |
| JP | 63-279316 A | 11/1988 |
| JP | 02-030024 A | 1/1990 |
| JP | 03-180922 A | 8/1991 |
| JP | 03-294918 A | 12/1991 |
| JP | H-03-289715 A | 12/1991 |
| JP | 04-127314 A | 4/1992 |
| JP | 05-053726 A | 3/1993 |
| JP | 05-063914 A | 3/1993 |
| JP | 05-080923 A | 4/1993 |
| JP | 05-224818 A | 9/1993 |
| JP | 06-161661 A | 6/1994 |
| JP | 07-036017 A | 2/1995 |
| JP | 07-044305 A | 2/1995 |
| JP | 07-110741 A | 4/1995 |
| JP | 07-141086 A | 6/1995 |
| JP | 07-261932 A | 10/1995 |
| JP | 08-016307 A | 1/1996 |
| JP | 08-147092 A | 6/1996 |
| JP | 08-242458 A | 9/1996 |
| JP | H-08-249106 A | 9/1996 |
| JP | 08-297267 A | 11/1996 |
| JP | 09-054650 A | 2/1997 |
| JP | 09-091079 A | 4/1997 |
| JP | 09-096792 A | 4/1997 |
| JP | 09-212302 A | 8/1997 |
| JP | 09-292950 A | 11/1997 |
| JP | 09-325852 A | 12/1997 |
| JP | 10-003349 A | 1/1998 |
| JP | 10-269020 A | 10/1998 |
| JP | 11-145141 A | 5/1999 |
| JP | 11-505641 A | 5/1999 |
| JP | 11-249813 A | 9/1999 |
| JP | 2000-105670 A | 4/2000 |
| JP | 2000-112642 A | 4/2000 |
| JP | 2000-163031 A | 6/2000 |
| JP | 2000-172437 A | 6/2000 |
| JP | 2000-172447 A | 6/2000 |
| JP | 2000-221932 A | 8/2000 |
| JP | 2001-075079 A | 3/2001 |
| JP | 2001-283228 A | 10/2001 |
| JP | 2002-501271 A | 1/2002 |
| JP | 2002-116017 A | 4/2002 |
| JP | 2002-259052 A | 9/2002 |
| JP | 2002-287660 A | 10/2002 |
| JP | 2002-342014 A | 11/2002 |
| JP | 2002-342033 A | 11/2002 |
| JP | 2002-366304 A | 12/2002 |
| JP | 2003-029899 A | 1/2003 |
| JP | 2003-066417 A | 3/2003 |
| JP | 2003-099192 A | 4/2003 |
| JP | 2003-516015 | 5/2003 |
| JP | 2003-173237 A | 6/2003 |
| JP | 2003-185688 A | 7/2003 |
| JP | 2003-196023 A | 7/2003 |
| JP | 2003-249738 A | 9/2003 |
| JP | 2003-255855 A | 9/2003 |
| JP | 2004-038919 A | 2/2004 |
| JP | 2004-102985 A | 4/2004 |
| JP | 2004-186333 A | 7/2004 |
| JP | 2004-526990 A | 9/2004 |
| JP | 2005-346047 A | 12/2005 |
| JP | 2006-134915 A | 5/2006 |
| JP | 2007-533044 | 11/2007 |
| JP | 2008-032756 A | 2/2008 |
| JP | 2009-244958 A | 10/2009 |
| JP | 2010-231773 A | 10/2010 |
| KR | 10-0226812 B1 | 7/1999 |
| KR | 10-2003-0028973 A | 4/2003 |
| KR | 10-2004-0002310 | 1/2004 |
| KR | 10-2004-0013029 A | 2/2004 |
| KR | 10-2005-0019799 A | 3/2005 |
| KR | 10-0493921 B | 6/2005 |
| KR | 10-2006-0089645 A | 8/2006 |
| KR | 10-0887775 B1 | 3/2009 |
| TW | 200302778 A | 8/2003 |
| TW | 2004-21156 A | 10/2004 |
| TW | 200529441 A | 9/2005 |
| TW | 201009662 A | 3/2010 |
| TW | 201030588 A | 8/2010 |
| TW | 201042315 A | 12/2010 |
| WO | WO-87/04553 A1 | 7/1987 |
| WO | WO-92/13328 A1 | 8/1992 |
| WO | WO-96/15464 A1 | 5/1996 |
| WO | WO-96/18179 A1 | 6/1996 |
| WO | WO-1996/038833 A1 | 12/1996 |
| WO | WO-97/018547 A1 | 5/1997 |
| WO | WO-1997/018528 A1 | 5/1997 |
| WO | WO-97/023738 A1 | 7/1997 |
| WO | WO-1997/023738 A1 | 7/1997 |
| WO | WO-98/14863 A1 | 4/1998 |
| WO | WO-1998/014863 A2 | 4/1998 |
| WO | WO-99/038149 A1 | 7/1999 |
| WO | WO-01/27868 A1 | 4/2001 |
| WO | WO-01/39371 A1 | 5/2001 |
| WO | WO-2002/035461 A1 | 5/2002 |
| WO | WO-02/061721 A2 | 8/2002 |
| WO | WO-02/103621 A2 | 12/2002 |
| WO | WO-03/079176 A2 | 9/2003 |
| WO | WO-2003/088176 A1 | 10/2003 |
| WO | WO-2004/013833 A2 | 2/2004 |
| WO | WO-2004/013833 A3 | 2/2004 |
| WO | WO-2004/023376 A2 | 3/2004 |
| WO | WO-2004/023376 A3 | 3/2004 |
| WO | WO-2004/053576 A1 | 6/2004 |
| WO | WO-2004/061808 A2 | 7/2004 |
| WO | WO-2004/061808 A3 | 7/2004 |
| WO | WO-2004/114265 A2 | 12/2004 |
| WO | WO-2005/064451 A1 | 7/2005 |
| WO | WO-2005/114369 A2 | 12/2005 |
| WO | WO-2006/023569 A1 | 3/2006 |
| WO | WO-2006/054585 A1 | 5/2006 |
| WO | WO-2007/115032 A2 | 10/2007 |
| WO | WO-2007/115032 A3 | 10/2007 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2007/146785 A2 | 12/2007 |
| WO | WO-2007/146785 A3 | 12/2007 |
| WO | WO-2008/085457 A2 | 7/2008 |
| WO | WO-2008/085457 A3 | 7/2008 |
| WO | WO-2009/035471 A1 | 3/2009 |
| WO | WO-2010/137727 A1 | 2/2010 |
| WO | WO-2012/087639 A2 | 6/2012 |

OTHER PUBLICATIONS 3M (2002). MicroTouch Capacitive Touch Screens Datasheets, 3M Innovation, six pages.
Agrawal, R. et al. (Jul. 1986). "An Overview of Tactile Sensing," Center for Research on Integrated Manufacturing: Robot Systems Division, The University of Michigan, 47 pages.
Anonymous. (May 8, 1992). "The Sensor Frame Graphic Manipulator," *NASA Phase II Final Report,* 28 pages.
Anonymous. (Oct. 30, 2001). "Radiotelephone with Rotating Symbol Keypad and Multi-Directional Symbol Input," located at www.vitgn.com/mobile_terminal.com, 12 pages.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCA_COPIES/COHEN/gesture_ overview.Html, generated Apr. 20, 2004.
Anonymous. "Capacitive Position Sensing" obtained from http://www.synaptics.com/technology/cps.cfin generated Aug. 5, 2005.

(56) References Cited

OTHER PUBLICATIONS

Anonymous. "Capacitive Touchscreens" obtained from http://www.touchscreens.com/intro-touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—The MultiFinger USB TouchPad with Whole-Hand Gestures," obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.

Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touch Technologies Overview" 2001, 3M Touch Systems, Massachusetts.
Anonymous. "Touchscreen Technology Choices," <http://www.elotouch.com/products/detech2.asp>, downloaded Aug. 5, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Anonymous. "The Op-amp Integrator Amplifier," Electronics tutorial, retrieved from http://diodetech.blogspot.nl/2013/07/op-amp-integrator.html, on Feb. 10, 2016, eight pages.
Bantz, et al. (Feb. 1979). "Keyboard Device for Upper and Lower Case Keying Without Shifting," IBM Technical Disclosure Bulletin, vol. 21, No. 9, two pages.
Baxter, L.K. (1996). *Capacitive Sensors: Design and Applications,* vol. 1 of IEEE Press Series on Electronics Technology, John Wiley & Sons: New York, NY, (Table of Contents Only) three pages.
Bennion, S.I. et al. (Dec. 1981). "Touch Sensitive Graphics Terminal Applied to Process Control," *Computer Graphics* 15(4):342-350.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Boie, R.A. (Mar. 1984). "Capacitive Impedance Readout Tactile Image Sensor," *Proceedings of 1984 IEEE International Conference on Robotics and Automation,* pp. 370-378.
Buxton, W.A.S. (Mar./Apr. 1994). "Combined Keyboard/Touch Tablet Input Device," *XEROX Disclosure Journal* 19 (2):109-111.
Chinese Search Report dated Feb. 2, 2015, for CN Application No. 201210568727.0, filed Jun. 8, 2007, two pages.
Chun, K. et al. (Jul. 1985). "A High-Performance Silicon Tactile Imager Based on a Capacitive Cell," *IEEE Transactions on Electron Devices* 32(7):1196-1201.
Cliff (Jul. 24, 2002). "Building a Pressure-Sensitive, Multi-Point TouchScreen?" Posted from the D-I-Y-Baby Department, one page.
Collberg, C. et al. (2002). "TetraTetris: A Study of Multi-User Touch-Based Interaction Using DiamondTouch," located at cs.arizona.edu, eight pages. (located information via Google).
Dannenberg, R.B. et al. (1989). "A Gesture Based User Interface Prototyping System," *ACM,* pp. 127-132.
Davies, E.R. (1990). *Machine Vision: Theory, Algorithms, Practicalities,* Academic Press, Inc..: San Diego, CA, pp. xi-xxi (Table of Contents Only.).
Davies, E.R. (Aug. 1987). "Lateral Histograms for Efficient Object Location: Speed versus Ambiguity," *Pattern Recognition Letters* 6(3):189-198.
Davies, E.R. (1997). "Boundary Pattern Analysis," Chapter 7 in *Machine Vision: Theory, Algorithms, Practicalities,* 2nd Edition, Academic Press, Inc.: San Diego, CA, pp. 171-191.
Davies, E.R. (1997). "Ellipse Detection," Chapter 11 in *Machine Vision: Theory, Algorithms, Practicalities,* 2nd Edition, Academic Press, Inc.: San Diego, CA, pp. 271-290.
Davies, E.R. (1997). "Image Acquisition," Chapter 23 in *Machine Vision: Theory, Algorithms, Practicalities,* 2nd Edition, Academic Press, Inc.: San Diego, CA, pp. 583-601.
Diaz-Marino, R.A. et al. (2003). "Programming for Multiple Touches and Multiple Users: A Toolkit for the DiamondTouch Hardware," *Proceedings of ACM UIST'03 User Interface Software and Technology,* two pages.
Dietz, P. et al. (2001). "DiamondTouch: A Multi-User Touch Technology," *Proceedings of the 14th Annual ACM Symposium on User Interface Software and Technology,* Nov. 11-14, 2001, Orlando, FL, pp. 219-226.
Douglas et al., *The Ergonomics of Computer Pointing Devices* (1997).

(56) References Cited

OTHER PUBLICATIONS

Esenther, A. et al. (Nov. 2002). "DiamondTouch SDK: Support for Multi-User, Multi-Touch Applications," *Mitsubishi Electric Research Laboratories, Inc.,* five pages.
European Search Report dated Jul. 28, 2011, for EP Application No. 11159164.0, filed Jun. 8, 2007, eight pages.
European Search Report dated Oct. 21, 2011, for EP Application No. 11159166.5, filed Jun. 8, 2007, seven pages.
European Search Report dated Feb. 16, 2012, for EP Application No. 11183531.0, 11 pages.
European Search Report dated Mar. 27, 2012, for EP Application No. 10178558.2, nine pages.
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Ex Parte Quayle Action dated Apr. 20, 2016, for U.S. Appl. No. 11/818,395, filed Jun. 13, 2007, four pages.
Fearing, R.S. (Jun. 1990). "Tactile Sensing Mechanisms," *The International Journal of Robotics Research* 9(3):3-23.
Final Office Action dated Jul. 6, 2010, for U.S. Appl. No. 11/760,036, filed Jun. 8, 2007, 51 pages.
Final Office Action dated Jul. 6, 2010, for U.S. Appl. No. 11/760,080, filed Jun. 8, 2007, 66 pages.
Final Office Action dated Jul. 22, 2010, for U.S. Appl. No. 11/760,049, filed Jun. 8, 2007, 52 pages.
Final Office Action dated Aug. 2, 2010, for U.S. Appl. No. 11/760,060, filed Jun. 8, 2007, 78 pages.
Final Office Action dated Sep. 1, 2011, for U.S. Appl. No. 11/650,203, filed Jan. 3, 2007, nine pages.
Final Office Action dated Oct. 17, 2011, for U.S. Appl. No. 11/818,395, filed Jun. 13, 2007, 16 pages.
Final Office Action dated Dec. 16, 2011, for U.S. Appl. No. 11/760,036, filed Jun. 8, 2007, 53 pages.
Final Office Action dated Jan. 30, 2012, for U.S. Appl. No. 11/760,049, filed Jun. 8, 2007, 64 pages.
Final Office Action dated Feb. 27, 2012, for U.S. Appl. No. 11/760,080, filed Jun. 8, 2007, 62 pages.
Final Office Action dated May 9, 2013, for U.S. Appl. No. 12/976,997, filed Dec. 22, 2010, 7 pages.
Final Office Action dated Oct. 27, 2014, for U.S. Appl. No. 11/818,395, filed Jun. 13, 2007, 17 pages.
Final Office Action dated Feb. 8, 2016, for U.S. Appl. No. 14/670,306, filed Mar. 26, 2015, five pages.
Fisher et al., "Repetitive Motion Disorders: The Design of Optimal Rate—Rest Profiles," Human Factors, 35(2):283-304 (Jun. 1993).
Fukumoto and Yoshinobu Tonomura, "Body Coupled Fingering: Wireless Wearable Keyboard," *CHI97,* pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World On Line.
Hector, J. et al. (May 2002). "Low Power Driving Options for an AMLCD Mobile Display Chipset," Chapter 16.3 *in SID 02 Digest* (2002 SID International Symposium, Digest of Technical Papers), XXXIII(II):694-697.
Hillier and Gerald J. Lieberman, *Introduction to Operations Research* (1986).
Hinckley et al., "Touch-Sensing Input Devices," in CHI '99 Proceedings, pp. 223-230, 1999.
Hinckley, K. et al. (1998). "Interaction and Modeling Techniques for Desktop Two-Handed Input," *Proceedings of ACM USIT'98 Symposium on User Interface Software and Technology,* pp. 49-58.
Hinckley, K. et al. (May 1999). "Touch-Sensing Input Devices," *CHI 99* pp. 223-230.
Hinckley, K. et al. (2000). "Sensing Techniques for Mobile Interaction," *CHI Letters* 2(2):91-100.
Hlady, A.M. (1969). "A Touch Sensitive X-Y Position Encoder for Computer Input," *Fall Joint Computer Conference,* pp. 545-551.
Hotelling et al., Office action for U.S. Appl. No. 10/840,862 dated May 14, 2008.

International Search Report dated Mar. 3, 2006 (PCT/US 05/03325).
International search report for International Application No. PCT/US2005/014364 dated Jan. 12, 2005.
International Search Report dated Mar. 6, 2008, for PCT Application No. PCT/2007/70733, filed Jun. 8, 2007, five pages.
International Search Report dated Mar. 7, 2008, for PCT Application No. PCT/2007/70722, filed Jun. 8, 2007, three pages.
International Search Report dated Jun. 24, 2008, for PCT Application No. PCT/US2007/026298, filed Dec. 21, 2007, two pages.
International Search Report dated Jul. 18, 2008, for PCT Application No. PCT/2007/70725, filed Jun. 8, 2007, six pages.
International Search Report dated Jul. 18, 2008, for PCT Application No. PCT/2007/70729, filed Jun. 8, 2007, five pages.
International Search Report dated Oct. 16, 2008, for PCT Application No. PCT/US2007/088749, filed Dec. 21, 2007, four pages.
International Search Report dated Jun. 15, 2012, for PCT/US2011/064455, filed Dec. 12, 2011, four pages.
International Search Report received in corresponding PCT application No. PCT/US2006/008349 dated Oct. 6, 2006.
Jacob et al., "Integrality and Separability of Input Devices," *ACM Transactions on Computer-Human Interaction,* 1:3-26 (Mar. 1994).
Kanda, E. et al. (2008). "55.2: Integrated Active Matrix Capacitive Sensors for Touch Panel LTPS-TFT LCDs," *SID 08 Digest,* pp. 834-837.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Kirk, D.E. (1970). "Numerical Determination of Optimal Trajectories," Chapter 6 in *Optimal Control Theory: An Introduction,* Prentice Hall, Inc.: Englewood Cliffs, NY. pp. 329-413, with Table of Contents, pp. vii-ix. (90 pages total).
Kling, M. et al. (Sep. 2003). "Interface Design: LCD Touch Interface for ETRAX 100LX," Thesis Submitted in Partial Fulfillment of the Requirements for the Degree of Master of Science, Umea University, Umea, Sweden, 79 pages.
Ko, H. (Jul. 2000). "Open Systems Advanced Workstation Transition Report," Technical Report 1822, *U.S. Navy,* SSC San Diego, CA, 82 pages.
Krein, P. et al. (May/Jun. 1990). "The Electroquasistatics of the Capacitive Touch Panel," *IEEE Transactions on Industry Applications* 26(3):529-534.
Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.
Lee, "A Fast Multiple-Touch-Sensitive Input Device," Master's Thesis, University of Toronto. (1984).
Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.
Leeper (Synaptics Inc.) "Integration of a clear capacitive touch screen with a 1/8-VGA FSTN-LCD to form and LCD based touchpad," Society for information Display (May 21, 2002).
Leigh, J. et al. (2002). "Amplified Collaboration Environments," *VizGrid Symposium,* Nov. 2002, Tokyo, Japan, nine pages.
Ljungstrand, P. et al. eds. (2002). UBICOMP2002, Adjunct Proceedings, $4^{th}$ *International Conference on Ubiquitous Computing,* Sep. 29-Oct. 1, 2002, Goteborg, Sweden, 90 pages.
Magerkurth, C. et al. (2004). "Towards the Next Generation of Tabletop Gaming Experiences," *Graphics Interface 2004 (GI'04),* May 17-19, 2004, Ontario, Canada, pp. 1-8.
Malik, S. et al. (2004). "Visual Touchpad: A Two-Handed Gestural Input Device," *ICMI'04 Proceedings of the $6^{th}$ International Conference on Multimodal Intercases, ACM,* 8 pages.
Matsushita et al., "HoloWall: Designing a Finger, Hand, Body and Object Sensitive Wall," In Proceedings of UIST '97, Oct. 1997.
Matsushita, N. et al. (2000). "Dual Touch: A Two-Handed Interface for Pen-Based PDAs," *CHI Letters* 2(2):211-212.
McMillan, G.R. (Oct. 1998). "The Technology and Applications of Gesture-Based Control," *presented at the RTO Lecture Series on Alternative Control Technologies: Human Factor Issues,* Oct. 14-15, 1998, Ohio, USA, pp. 4-1-4-11.

(56) References Cited

OTHER PUBLICATIONS

Mehta, N. et al. (May 1982). "Feature Extraction as a Tool for Computer Input," *Proceedings of ICASSP '82,* May 3-5, 1982, Paris, France, pp. 818-820.

Mitchell, G. D. (Oct. 2003). "Orientation on Tabletop Displays," Thesis Submitted in Partial Fulfillment of the Requirements for the Degree of Master of Science, Simon Fraser University, 119 pages.

Netherlands Search Report dated Jul. 2, 2013, for Dutch Patent Application No. 2008003, ten pages.

Noda, K. et al. (2001). "Production of Transparent Conductive Films with Inserted $SiO_2$ Anchor Layer, and Application to a Resistive Touch Panel," *Electronics and Communications in Japan* Part 2 84(7):39-45.

Non-Final Office Action dated May 14, 2008, for U.S. Appl. No. 10/840,862, filed May 6, 2004, six pages.

Non-Final Office Action dated Dec. 24, 2008, for U.S. Appl. No. 10/840,862, filed May 6, 2004, nine pages.

Non-Final Office Action dated Jun. 2, 2009, for U.S. Appl. No. 10/840,862, filed May 6, 2004, seven pages.

Non-Final Office Action dated Nov. 12, 2009, for U.S. Appl. No. 10/840,862, filed May 6, 2004, eight pages.

Non-Final Office Action dated Mar. 12, 2010, for U.S. Appl. No. 11/760,080, filed Jun. 8, 2007, 31 pages.

Non-Final Office Action dated Apr. 22, 2010, for U.S. Appl. No. 11/760,036, filed Jun. 8, 2007, 37 pages.

Non-Final Office Action dated Apr. 23, 2010, for U.S. Appl. No. 11/760,060, filed Jun. 8, 2007, 66 pages.

Non-Final Office Action dated May 5, 2010, for U.S. Appl. No. 11/760,049, filed Jun. 8, 2007, 65 pages.

Non-Final Office Action dated Jun. 21, 2010, for U.S. Appl. No. 11/650,203, filed Jan. 3, 2007, eight pages.

Non-Final Office Action dated Jan. 25, 2011, for U.S. Appl. No. 11/818,395, filed Jun. 13, 2007, 31 pages.

Non-Final Office Action dated Mar. 14, 2011, for U.S. Appl. No. 11/650,203, filed Jan. 3, 2007, nine pages.

Non-Final Office Action dated May 13, 2011, for U.S. Appl. No. 12/267,540, filed Nov. 7, 2008, seven pages.

Non-Final Office Action dated Jul. 8, 2011, for U.S. Appl. No. 12/267,532, filed Nov. 7, 2008, five pages.

Non-Final Office Action dated Jul. 14, 2011, for U.S. Appl. No. 12/267,522, filed Nov. 7, 2008, six pages.

Non-Final Office Action dated Aug. 4, 2011, for U.S. Appl. No. 11/760,036, filed Jun. 8, 2007, 45 pages.

Non-Final Office Action dated Aug. 11, 2011, for U.S. Appl. No. 11/760,049, filed Jun. 8, 2007, 60 pages.

Non-Final Office Action dated Sep. 1, 2011, for U.S. Appl. No. 11/760,060, filed Jun. 8, 2007, 76 pages.

Non-Final Office Action dated Nov. 14, 2011, for U.S. Appl. No. 11/760,080, filed Jun. 8, 2007, 60 pages.

Non-Final Office Action dated Feb. 17, 2012, for U.S. Appl. No. 13/251,099, filed Sep. 30, 2011, seven pages.

Non-Final Office Action dated Jun. 20, 2012, for U.S. Appl. No. 13/345,347, filed Jan. 6, 2012, five pages.

Non-Final Office Action dated Sep. 12, 2012, for U.S. Appl. No. 11/650,203, filed Jan. 3, 2007, nine pages.

Non-Final Office Action dated Oct. 5, 2012, for U.S. Appl. No. 12/976,997, filed Dec. 22, 2010, 6 pages.

Non-Final Office Action dated Oct. 11, 2012, for U.S. Appl. No. 13/538,498, filed Jun. 29, 2012, 17 pages.

Non-Final Office Action dated Mar. 29, 2013, for U.S. Appl. No. 13/717,573, filed Dec. 17, 2012, five pages.

Non-Final Office Action dated May 30, 2013, for U.S. Appl. No. 13/251,099, filed Sep. 30, 2011, seven pages.

Non-Final Office Action dated Jun. 27, 2013, for U.S. Appl. No. 11/760,080, filed Jun. 8, 2007, 48 pages.

Non-Final Office Action dated Dec. 24, 2013, for Ex Parte Reexamination of U.S. Pat. No. 7,663,607, 52 pages.

Non-Final Office Action dated Dec. 30, 2013, for U.S. Appl. No. 12/976,997, filed Dec. 22, 2010, six pages.

Non-Final Office Action dated Mar. 25, 2014, for U.S. Appl. No. 14/073,818, filed Nov. 6, 2013, six pages.

Non-Final Office Action dated Apr. 18, 2014, for U.S. Appl. No. 11/818,395, filed Jun. 13, 2007, 17 pages.

Non-Final Office Action for Ex Parte Reexamination dated Dec. 24, 2013, of U.S. Pat. No. 7,663,607, 52 pages.

Non-Final Office Action for Ex Parte Reexamination dated May 16, 2014, of U.S. Pat. No. 7,663,607, 34 pages.

Non-Final Office Action dated Jul. 14, 2014, for U.S. Appl. No. 14/308,595, filed Jun. 18, 2014, five pages.

Non-Final Office Action dated Aug. 4, 2014, for U.S. Appl. No. 14/086,877, filed Nov. 21, 2013, 8 pages.

Non-Final Office Action dated Sep. 26, 2014, for U.S. Appl. No. 14/308,646, filed Jun. 18, 2013, five pages.

Non-Final Office Action dated Jan. 30, 2015, for U.S. Appl. No. 14/047,960, filed Oct. 7, 2013, 18 pages.

Non-Final Office Action dated May 7, 2015, for U.S. Appl. No. 14/174,760, filed Feb. 6, 2014, 27 pages.

Non-Final Office Action dated May 12, 2015, for U.S. Appl. No. 14/670,306, filed Mar. 26, 2015, five pages.

Non-Final Office Action dated Sep. 10, 2015, for U.S. Appl. No. 11/818,395, filed Jun. 13, 2007, 17 pages.

Non-Final Office Action dated Oct. 8, 2015, for U.S. Appl. No. 14/670,306, filed Mar. 26, 2015, four pages.

Notice of Allowability (Corrected) dated Jun. 27, 2014, for U.S. Appl. No. 12/976,997, filed Dec. 22, 2010, five pages.

Notice of Allowance dated Oct. 25, 2011, for U.S. Appl. No. 12/267,540, filed Nov. 7, 2008, seven pages.

Notice of Allowance dated Mar. 27, 2012, for U.S. Appl. No. 11/760,060, filed Jun. 8, 2007, 17 pages.

Notice of Allowance dated Apr. 27, 2012, for U.S. Appl. No. 11/760,036, filed Jun. 8, 2007, eight pages.

Notice of Allowance dated Jul. 12, 2012, for U.S. Appl. No. 13/251,099, filed Sep. 30, 2011, seven pages.

Notice of Allowance dated Sep. 19, 2012, for U.S. Appl. No. 13/345,347, filed Jan. 6, 2012, seven pages.

Notice of Allowance dated Oct. 29, 2012, for U.S. Appl. No. 13/345,347, filed Jan. 6, 2012, eight pages.

Notice of Allowance dated Feb. 6, 2013, for U.S. Appl. No. 13/084,402, filed Apr. 11, 2011, 12 pages.

Notice of Allowance dated Feb. 19, 2013, for U.S. Appl. No. 13/538,498, filed Jun. 29, 2012, 16 pages.

Notice of Allowance dated Apr. 26, 2013, for U.S. Appl. No. 11/650,203, filed Jan. 3, 2007, 8 pages.

Notice of Allowance dated May 28, 2013, for U.S. Appl. No. 11/760,049, filed Jun. 8, 2007, 10 pages.

Notice of Allowance dated Jul. 19, 2013, for U.S. Appl. No. 13/717,573, filed Dec. 17, 2012, eight pages.

Notice of Allowance dated Oct. 10, 2013, for U.S. Appl. No. 11/760,080, filed Jun. 8, 2007, ten pages.

Notice of Allowance dated Mar. 3, 2014, for U.S. Appl. No. 13/251,099, filed Sep. 30, 2011, eight pages.

Notice of Allowance dated Apr. 14, 2014, for U.S. Appl. No. 12/976,997, filed Dec. 22, 2010, 8 pages.

Notice of Allowance dated Jul. 14, 2014, for U.S. Appl. No. 14/073,818, filed Nov. 6, 2013, seven pages.

Notice of Allowance dated Oct. 31, 2014, for U.S. Appl. No. 14/308,595, filed Jun. 18, 2014, eight pages.

Notice of Allowance dated Nov. 6, 2014, for U.S. Appl. No. 14/308,646, filed Jun. 18, 2014, eight pages.

Notice of Allowance dated Dec. 23, 2014, for U.S. Appl. No. 14/456,831, filed Aug. 11, 2014, eight pages.

Notice of Allowability (Corrected) dated Jan. 21, 2015, for U.S. Appl. No. 14/308,646, filed Jun. 18, 2014, five pages.

Notice of Allowance dated Jan. 14, 2015, for U.S. Appl. No. 14/086,877, filed Nov. 21, 2013, eight pages.

Notice of Allowance dated May 28, 2015, for U.S. Appl. No. 14/666,174, filed Mar. 23, 2015, eight pages.

Notice of Allowance dated Jun. 29, 2015, for U.S. Appl. No. 14/047,960, filed Oct. 7, 2013, 11 pages.

Notice of Allowance (corrected) dated Jul. 2, 2015, for U.S. Appl. No. 14/666,174, filed Mar. 23, 2015, five pages.

(56) References Cited

OTHER PUBLICATIONS

Notice of Allowance dated Sep. 14, 2015, for U.S. Appl. No. 14/174,760, filed Feb. 6, 2014, 12 pages.
Notice of Allowance dated Oct. 19, 2015, for U.S. Appl. No. 14/047,960, filed Oct. 7, 2013, eight pages.
Notice of Allowance dated May 25, 2016, for U.S. Appl. No. 14/670,306, filed Mar. 26, 2015, eight pages.
Notice of Allowance dated Sep. 28, 2016, for U.S. Appl. No. 14/985,283, filed Dec. 30, 2015, ten pages.
Notice of Allowance dated Nov. 17, 2016, for U.S. Appl. No. 15/273,487, filed Sep. 22, 2016, eight pages.
Ogawa, H. et al. (1979). "Preprocessing for Chinese Character Recognition and Global Classification of Handwritten Chinese Characters," *Pattern Recognition* 11:1-7.
Notice of Prior and Concurrent Proceeedings under 37 C.F.R. § 1.565(a) for U.S. Ex Parte Reexamination Control No. 90/012,935, filed Jul. 30, 2013 (Reexamination of U.S. Pat. No. 7,663,607), 279 pages. (for reexam—28042.00) (Submitted in four parts).
Partial European Search Report dated Mar. 15, 2011, for EP Application No. 10178661.4, filed Jun. 8, 2007, six pages.
Partial European Search Report dated Oct. 21, 2011, for EP Application No. 11159165.7 filed Jun. 8, 2007, seven pages.
Partial European Search Report dated Oct. 24, 2011, for EP Application No. 11159167.3 filed Jun. 8, 2007, eight pages.
Phipps, C.A. (Spring 2003). "A Metric to Measure Whole Keyboard Index of Difficulty Based on Fitts' Law," A Dissertation Submitted in Partial Fulfillment of the Requirements for the Degree of Ph.D., 103 pages.
Quantum Research Group "QT510 / Qwheel™ Touch Slider IC" copyright 2004-2005, 14-pgs.
Quantum Research Group Ltd. (1997). QT9701B2 Datasheet, 30 pages.
Quantum Research Group Ltd. (1999). QProx™ QT60320 32-Key Qmatrix™ Charge-Transfer IC Datasheet, pp. 1-14.
Quantum Research Group Ltd. (2001). QT60325, QT60485, QT60645 32, 48, 64 Key QMatrix™ Keypanel Sensor Ics Datasheet, 42 pages.
Quantum Research Group Ltd. (2002). QMatrix™ QT60040 4-Key Charge-Transfer IC Datasheet, pp. 1-9.
Quantum Research Group Ltd. (Oct. 10, 2002). Quantum Research Application Note AN-KD01: Qmatrix™ Panel Design Guidelines, four pages.
Quek, "Unencumbered Gestural Interaction," *IEEE Multimedia*, 3:36-47 (Winter 1996).
Rabuffetti, M. (2002). "Touch-screen System for Assessing Visuomotor Exploratory Skills in Neuropsychological Disorders of Spatial Cognition," *Medical & Biological Engineering & Computing* 40:675-686.
Radwin, "Activation Force and Travel Effects on Overexertion in Repetitive Key Tapping," *Human Factors*, 39(1):130-140 (Mar. 1997).
Raisamo, R. (Dec. 7, 1999). "Multimodal Human-Computer Interaction: A Constructive and Empirical Study," Dissertation, University of Tampere, Finland, 86 pages.
Rekimoto et al., "ToolStone: Effective Use of the Physical Manipulation Vocabularies of Input Devices," In Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rekimoto, J. et al. (2003). "Pre-Sense: Interaction Techniques for Finger Sensing Input Devices," *CHI Letters* 5(2):203-212.
Request for Ex Parte Reexamination of U.S. Pat. No. 7,663,607, 106 pages.
Response to Non-Final Office Action in Ex Parte Reexamination dated Mar. 24, 2014, of U.S. Pat. No. 7,663,607, 392 pages. (Submitted in two parts).
Rong, J. et al. (2002). "AIAA 2002-4553: Hierarchical Agent Based System for General Aviation CD&R Under Free Flight," *AIAA Guidance, Navigation, and Control Conference and Exhibit*, Aug. 5-8, 2002, Monterey, CA, pp. 1-11.

Rubine et al., "Programmable Finger-Tracking Instrument Controllers," *Computer Music Journal*, vol. 14, No. 1 (Spring 1990).
Rubine, D. (Jul. 1991). "Specifying Gestures by Example," *Computer Graphics* 25(4):329-337.
Rubine, D. et al. (1988). "The VideoHarp," *Proceedings of the 14th International Computer Music Conference*, Cologne, W. Germany, Sep. 20-25, 1988, pp. 49-55.
Rubine, D. et al. (1991). "The Videoharp: An Optical Scanning MIDI Controller," *Contemporary Music Review* 6(1):31-46.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Russell, D.M. et al. (2004). "The Use Patterns of Large, Interactive Display Surfaces: Case Studies of Media Design and use for BlueBoard and MERBoard," *Proceedings of the 37th Hawaii International Conference on System Sciences 2004*, IEEE, pp. 1-10.
Rutledge et al., "Force-To-Motion Functions for Pointing," Human-Computer Interaction—INTERACT (1990).
Sears, A. (Mar. 11, 1991). "Improving Touchscreen Keyboards: Design Issues and a Comparison with Other Devices," *Human-Computer Interaction Laboratory*, pp. 1-19.
Sears, A. et al. (Jun. 1990). "A New Era for High-Precision Touchscreens," *Advances in Human-Computer Interaction*, vol. 3, Tech Report HCIL-90-01, one page only.
Segen, J. et al. (1998). "Human-Computer Interaction Using Gesture Recognition and 3D Hand Tracking," *IEEE*, pp. 188-192.
Shen, C. et al. (Jan. 2004). "DiamondSpin: An Extensible Toolkit for Around-the-Table Interaction," *CHI 2004*, Apr. 24-29, 2004, Vienna, Austria, 10 pgs.
Siegel, D.M. et al. (1987). "Performance Analysis of a Tactile Sensor," *IEEE*, pp. 1493-1499.
Singapore Examination Report dated Jan. 11, 2010, for SG Patent Application No. 0607116-1, five pages.
Son, J.S. et al. (1996). "Comparison of Contact Sensor Localization Abilities During Manipulation," *Robotics and Autonomous System* 17 pp. 217-233.
Stansfield, S.A. (Mar. 1990). "Haptic Perception With an Articulated, Sensate Robot Hand," *SANDIA Report*: SAND90-085-UC-406, 37 pages.
Stauffer, R.N. ed. (Jun. 1983). "Progress in Tactile Sensor Development," *Robotics Today* pp. 43-49.
Stumpe, B. (Mar. 16, 1977). "A New Principle for an X-Y Touch Screen," *CERN*, 19 pages.
Stumpe, B. (Feb. 6, 1978). "Experiments to Find a Manufacturing Process for an X-Y Touch Screen: Report on a Visit to Polymer-Physik GmbH," *CERN*, five pages.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sugiyama, S. et al. (Mar. 1990). "Tactile Image Detection Using a 1k-element Silicon Pressure Sensor Array," *Sensors and Actuators* A21-A23(1-3):397-400.
Suzuki, K. et al. (Aug. 1990). "A 1024-Element High-Performance Silicon Tactile Imager," *IEEE Transactions on Electron Devices* 37(8):1852-1860.
Texas Instruments "TSC2003 / I2C Touch Screen Controller" Data Sheet SBAS 162, dated Oct. 2001, 20-pgs.
TW Search Report dated Jun. 27, 2011, for TW Patent Application No. 097100481, one page.
TW Search Report dated Feb. 11, 2014, for TW Patent Application No. 100145112, with English translation, two pages.
TW Search Report dated Dec. 17, 2015, for TW Patent Application No. 103130159, one page.
U.S. Appl. No. 10/789,676, filed Feb. 27, 2004 entitled "Shape Detecting Input Device."
U.S. Appl. No. 11/015,978, filed Dec. 17, 2004.
U.S. Appl. No. 60/072,509, filed Jan. 26, 1998, by Westerman et al.
U.S. Appl. No. 60/333,770, filed Nov. 29, 2001, by Perski et al.
U.S. Appl. No. 60/406,662, filed Aug. 29, 2002, by Morag et al.
U.S. Appl. No. 60/501,484, filed Sep. 5, 2003, by Perski et al.

(56) References Cited

OTHER PUBLICATIONS

Van Kleek, M. (Feb. 2003). "Intelligent Environments for Informal Public Spaces: The Ki/o Kiosk Platform," Thesis Submitted in Partial Fulfillment of the Requirements for the Degree of Master of Engineering, MIT, 108 pages.
Van Oversteegen, B.G.F.A.W. (Apr. 10, 1998). "Touch Screen Based Measuring Equipment: Design and Implementation," Master's Thesis, Submitted to Technische Universiteit, Eindhoven, The Nederlands, 103 pages.
Vazquez, A.A. (Sep. 1990). "Touch Screen Use on Flight Simulator Instructor/Operator Stations," Thesis Submitted in Partial Fulfillment of the Requirements for the Degree of Master of Science in Information Systems, 78 pages.
Vernier, F. et al. (2002). "Multi-User, Multi-Finger Drag & Drop of Multiple Documents," located at http://www.edgelab.ca/CSCW/Workshop2002/fred_vernier, three pages.
Wacom Company Limited. (Nov. 12, 2003). Wacom intuos® 2 User's Manual for Windows®, English V4.1, 165 pages.
Wallergard, M. (2003). "Designing Virtual Environments for Brain Injury Rehabilitation," Thesis, Lund University, Sweden, 98 pages.
Wellner, "The Digital Desk Calculators: Tangible Manipulation on a Desk Top Display" In ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Westerman, W. et al. (2001). "Multi-Touch: A New Tactile 2-D Gesture Interface for Human-Computer Interaction," *Proceedings of the Human Factors and Ergonomics Societ $45^{th}$ Annual Meeting*, pp. 632-636.
Williams, "Applications for a Switched-Capacitor Instrumentation Building Block" Linear Technology Application Note 3, Jul. 1985, pp. 1-16.
Wu, M. et al. (2003). "Multi-Finger and Whole Hand Gestural Interaction Techniques for Multi-User Tabletop Displays," *ACM* pp. 193-202.
Yamada et al., "A Switched-Capacitor Interface for Capacitive Pressure Sensors" IEEE Transactions on Instrumentation and Measurement, vol. 41, No. 1, Feb. 1992, pp. 81-86.
Yee, K-P. (2004). "Two-Handed Interaction on a Tablet Display," CHI'04, pp. 1493-1496.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
Non-Final Office Action dated Mar. 31, 2017, for U.S. Appl. No. 15/273,487, filed Sep. 22, 2016, 24 pages.
Notice of Allowance dated May 3, 2017, for U.S. Appl. No. 14/838,234, filed Aug. 27, 2015, ten pages.
European Partial Search Report dated Mar. 13, 2017, for EP Application No. 11194616.6, filed Dec. 20, 2011, 6 pages.
Notice of Allowance dated Mar. 13, 2017, for U.S. Appl. No. 11/818,395, filed Jun. 13, 2007, 13 pages.
Final Office Action dated Aug. 23, 2017, for U.S. Appl. No. 15/273,487, filed Sep. 22, 2016, 36 pages.
European Search Report dated Nov. 7, 2017, for EP Application No. 17182184.6, eight pages.
Non-Final Office Action dated Nov. 7, 2017, for U.S. Appl. No. 15/593,182, filed May 11, 2017, 15 pages.
Final Office Action dated Aug. 8, 2018, for U.S. Appl. No. 15/593,182, filed May 11, 2017, 17 pages.
Non-Final Office Action dated Jul. 26, 2018, for U.S. Appl. No. 15/273,487, filed Sep. 22, 2016, 23 pages.
Notice of Allowance dated Mar. 21, 2018, for U.S. Appl. No. 15/273,487, filed Sep. 22, 2016, eight pages.

* cited by examiner

TOUCH SCREEN LIQUID CRYSTAL DISPLAY

CROSS-REFERENCES TO RELATED APPLICATIONS

This application is a divisional of U.S. patent application Ser. No 14/985,283, filed Dec. 30, 2015 and published on Apr. 28, 2016 as U.S. Patent Publication No. 2016-0117023, which is a divisional of U.S. patent application Ser. No. 14/174,760, filed Feb. 6, 2014 and issued on Jan. 26, 2016 as U.S. Pat. No. 9,244,561, which is a divisional of U.S. patent application Ser. No. 11/760,080, filed Jun. 8, 2007 and issued on Feb. 18, 2014 as U.S. Pat. No. 8,654,083, which claims the benefit of U.S. Provisional Patent Application No. 60/883,979, filed Jan. 8, 2007, and also claims the benefit of U.S. Provisional Patent Application No. 60/804,361, filed Jun. 9, 2006, the contents of which are hereby incorporated by reference in their entirety for all intended purposes.

This application is related to the following publications incorporated by reference herein:

U.S. Patent Publication No.: 2006/197753, titled "Multi-Functional Hand-Held Device," published Sep. 7, 2006.

U.S. Patent Publication No.: 2006/0097991, titled "Multipoint Touchscreen," published May 11, 2006, now U.S. Pat. No. 7,663,607, issued on Feb. 16, 2010.

U.S. Patent Publication No.: 2007/0257890, titled "Multipoint Touch Surface Controller," published on Nov. 8, 2007, now U.S. Pat. No. 8,279,180, issued on Oct. 2, 2012.

U.S. Patent Publication No.: 2008/0158181, entitled "Double-Sided Touch Sensitive Panel and Flex Circuit Bonding," published Jul. 3, 2008, now U.S. Pat. No. 8,026,903, issued on Sep. 27, 2011.

U.S. Patent Publication No.: 2008/0062147, entitled "Touch Screen Liquid Crystal Display," published Mar. 13, 2008, now U.S. Pat. No. 8,259,078, issued on Sep. 4, 2012.

U.S. Patent Publication No.: 2008/0062139, entitled "Integrated Display and Touch Screen," published Mar. 13, 2008, now U.S. Pat. No. 8,552,989, issued on Oct. 8, 2013.

U.S. Patent Publication No.: 2008/0062148, entitled "Touch Screen Liquid Crystal Display," published Mar. 13, 2008, now U.S. Pat. No. 8,243,027, issued on Aug. 14, 2012.

BACKGROUND

There exist today many types of hand-held electronic devices, each of which utilizes some sort of user interface. The user interface can include an output device in the form of a display, such as a Liquid Crystal Display (LCD), and one or more input devices, which can be mechanically actuated (e.g., switches, buttons, keys, dials, joysticks, joy pads) or electrically activated (e.g., touch pads or touch screens). The display can be configured to present visual information such as text, multi-media data, and graphics, and the input devices can be configured to perform operations such as issuing commands, making selections, or moving a cursor or selector in the electronic device.

Recently work has been progressing on integrating various devices into a single hand-held device. This has further led to attempts to integrate many user interface models and devices into a single unit. A touch screen can be used in such systems for both practical and aesthetic reasons. Additionally, multi-touch capable touch screens can provide a variety of advantages for such a device.

Heretofore, it has been assumed that touch screens, whether single touch or multi-touch, could be produced by fabricating a traditional LCD screen, and disposing a substantially transparent touch sensing device in front of this screen. However, this presents a number of disadvantages, including substantial manufacturing costs.

SUMMARY

According to one embodiment of the invention, an integrated liquid crystal display touch screen is provided. The liquid crystal display can be based on in-plane-switching (IPS). The touch screen can include a plurality of layers including a first substrate having display control circuitry formed thereon (e.g., a TFT plate or array plate) and a second substrate (e.g., a color filter plate) adjacent the first substrate. The display control circuitry can include a pair of electrodes for each display sub-pixel. The touch screen can further include one or more touch sensing elements, wherein all touch sensing elements can be located between the substrates.

The touch sensing elements between the substrates can include a touch drive electrode and a touch sense electrode. These electrodes can also be the display sub-pixel electrodes. The touch sensing elements between the substrates can also include one or more switches configured to switch the electrodes between their display function and their touch function. The switches can comprise thin film transistors. The display VCOM can be used as a touch drive signal. The display data line can be used as a touch sense line. Alternatively, a plurality of metal sense lines can be disposed on the first substrate. Depending on the particular implementation, the display can be oriented with either the second substrate or the first substrate nearer to the user.

In another embodiment, an electronic device incorporating an integrated LCD touch screen according to the embodiments described above is provided. The electronic device can take the form of a desktop computer, a tablet computer, and a notebook computer. The electronic device can also take the form of a handheld computer, a personal digital assistant, a media player, and a mobile telephone. In some embodiments, a device may include one or more of the foregoing, e.g., a mobile telephone and media player.

BRIEF DESCRIPTION OF THE FIGURES

The invention may best be understood by reference to the following description taken in conjunction with the accompanying drawings in which.

DETAILED DESCRIPTION

Figure 1:
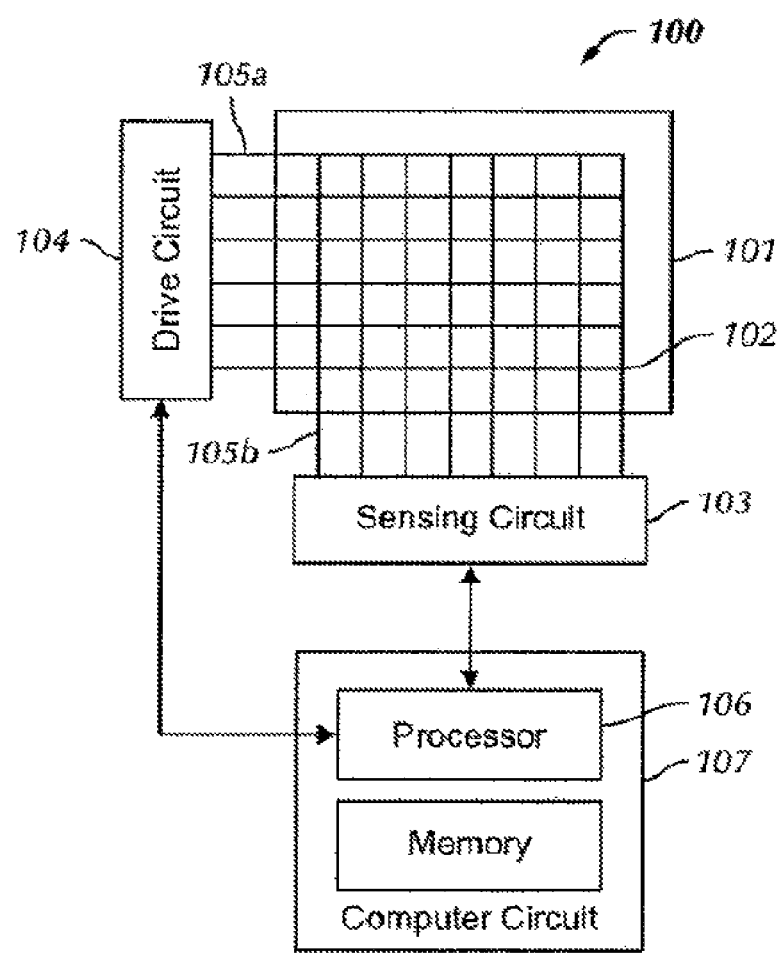
FIG. 1 illustrates a multipoint sensing arrangement.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

1. LCD and Touch Sensing Background

Disclosed herein are techniques to integrate touch sensing technology into liquid crystal displays.

As known to those skilled in the art, an LCD includes a plurality of layers, most basically, a top glass, a liquid crystal, and a bottom glass. The top and bottom glass can be patterned to provide the boundaries of the cells that contain the liquid crystal for a particular display pixel. The top and bottom glass can also be patterned with various layers of conducting materials and thin film transistors that allow the voltage across the liquid crystal cells to be varied to manipulate the orientation of the liquid crystal, thereby controlling the color and brightness of the pixel.

As described in the applications incorporated by reference, a touch surface, and specifically, a multi-touch capable transparent touch surface can be formed from a series of layers. The series of layers can include at least one substrate, e.g., glass, which can have disposed thereon a plurality of touch sensitive electrodes. For example, a mutual capacitance arrangement can include a plurality of drive electrodes and a plurality of sense electrodes separated by a non-conducting layer, i.e., the glass. Capacitive coupling between the drive and sense electrodes can be affected by proximity of a conductive object (e.g., a user's finger). This change in capacitive coupling can be used to determine the location, shape, size, motion, identity, etc. of a particular touch. These parameters can then be interpreted to control operation of a computer or other electronic device. Self-capacitance arrangements, as described below, are also known to those skilled in the art.

By integrating the layered structure of an LCD and a touch sensor, a variety of benefits can be achieved. This integration can include combining or interleaving the layered structures described above. Integration can further include eliminating redundant structures and/or finding dual purposes (e.g., one purpose for the touch function and another for the display function) for particular layers or structures. This can permit some layers to be eliminated, which can reduce cost and thickness of the touch screen LCD, as well as simplify manufacturing. A variety of different arrangements are possible, some of which are discussed in greater detail herein.

Specifically, various embodiments of an integrated touch screen LCD are discussed below. However, those skilled in the art will appreciate that the detailed description given herein with respect to these figures is exemplary and not exhaustive and that many variations on these embodiments are possible. Additionally, although many of the disclosed embodiments relate to multi-touch capable arrangements, many of the teachings can be applied to single-touch displays as well.

1.1 Multi-Touch Sensing

Recognizing multiple simultaneous or near-simultaneous touch events may be accomplished with a multi-touch sensing arrangement as illustrated in FIG. 1. Multi-touch sensing arrangement 100 can detect and monitor multiple touch attributes (including, for example, identification, position, velocity, size, shape, and magnitude) across touch sensitive surface 101, at the same time, nearly the same time, at different times, or over a period of time. Touch-sensitive surface 101 can provide a plurality of sensor points, coordinates, or nodes 102 that function substantially independently of one another and that represent different points on a touch sensitive surface. Sensing points 102 may be positioned in a grid or a pixel array, with each sensing point capable of generating a signal at the same time. Sensing points 102 may be considered as mapping touch sensitive surface 101 into a coordinate system, for example, a Cartesian or polar coordinate system.

A touch-sensitive surface may, for example, be in the form of a tablet or a touch screen. To produce a touch screen, the capacitance sensing points and other associated electrical structures can be formed with a substantially transparent conductive medium, such as indium tin oxide (ITO). The number and configuration of sensing points 102 may be varied. The number of sensing points 102 generally depends on the desired resolution and sensitivity. In touch-screen applications, the number of sensing points 102 may also depend on the desired transparency of the touch screen.

Figure 2:
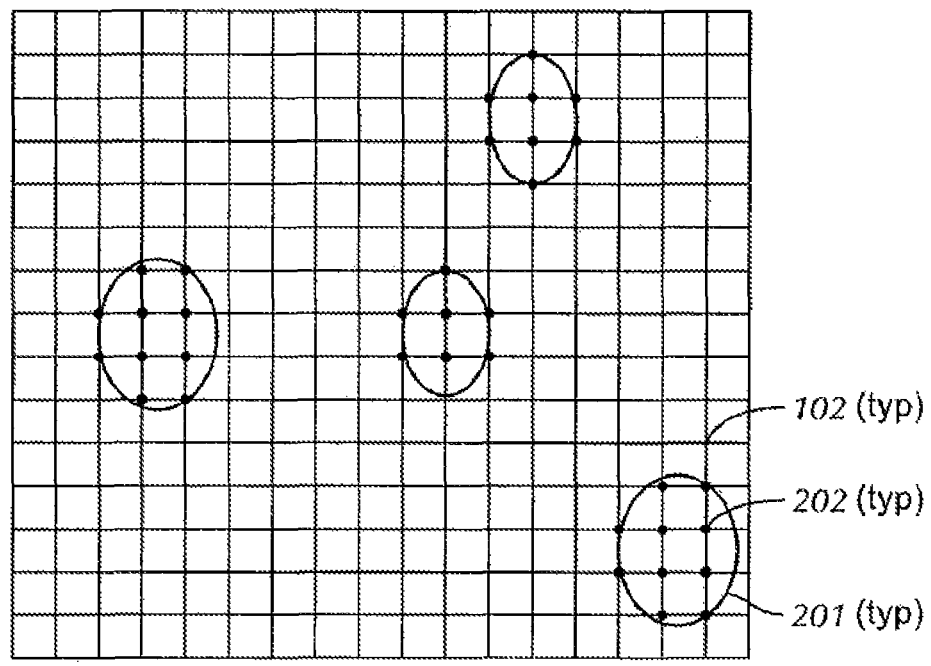
FIG. 2 illustrates a number of contact patches on a multipoint sensing system.

Using a multi-touch sensing arrangement, like that described in greater detail below, signals generated at nodes 102 of multi-touch sensor 101 may be used to produce an image of the touches at a particular point in time. For example, each object (e.g., finger, stylus, etc.) in contact with or in proximity to touch-sensitive surface 101 can produce contact patch area 201, as illustrated in FIG. 2. Each contact patch area 201 may cover several nodes 102. Covered nodes 202 may detect the object, while remaining nodes 102 do not. As a result, a pixilated image of the touch surface plane (which may be referred to as a touch image, a multi-touch image, or a proximity image) can be formed. The signals for each contact patch area 201 may be grouped together. Each contact patch area 201 may include high and low points based on the amount of touch at each point. The shape of contact patch area 201, as well as the high and low points within the image, may be used to differentiate contact patch areas 201 that are in close proximity to one another. Furthermore, the current image can be compared to previous images to determine how the objects may be moving over time, and what corresponding action should be performed in a host device as a result thereof.

Many different sensing technologies can be used in conjunction with these sensing arrangements, including resistive, capacitive, optical, etc. In capacitance-based sensing arrangements, as an object approaches touch-sensitive surface 101, a small capacitance forms between the object and sensing points 102 in proximity to the object. By detecting changes in capacitance at each of the sensing points 102 caused by this small capacitance, and by noting the position of the sensing points, a sensing circuit 103 can detect and monitor multiple touches. The capacitive sensing nodes may be based on self-capacitance or mutual-capacitance.

In self-capacitance systems, the "self" capacitance of a sensing point is measured relative to some reference, e.g., ground. Sensing points 102 may be spatially separated electrodes. These electrodes can be coupled to driving circuitry 104 and sensing circuitry 103 by conductive traces 105a (drive lines) and 105b (sense lines). In some self-capacitance embodiments, a single conductive trace to each electrode may be used as both a drive and sense line.

In mutual capacitance systems, the "mutual" capacitance between a first electrode and a second electrode can be measured. In mutual capacitance sensing arrangements, the sensing points may be formed by the crossings of patterned conductors forming spatially separated lines. For example, driving lines 105a may be formed on a first layer and sensing lines 105b may be formed on a second layer 105b such that the drive and sense lines cross or "intersect" one another at sensing points 102. The different layers may be different substrates, different sides of the same substrate, or the same side of a substrate with some dielectric separation. Because of separation between the drive and sense lines, there can be a capacitive coupling node at each "intersection."

The arrangement of drive and sense lines can vary. For example, in a Cartesian coordinate system (as illustrated), the drive lines may be formed as horizontal rows, while the sense lines may be formed as vertical columns (or vice versa), thus forming a plurality of nodes that may be considered as having distinct x and y coordinates. Alternatively, in a polar coordinate system, the sense lines may be a plurality of concentric circles with the drive lines being radially extending lines (or vice versa), thus forming a plurality of nodes that may be considered as having distinct radius and angle coordinates. In either case, drive lines 105a may be connected to drive circuit 104, and sensing lines 105b may be connected to sensing circuit 103.

During operation, a drive signal (e.g., a periodic voltage) can be applied to each drive line 105a. When driven, the charge impressed on drive line 105a can capacitively couple to the intersecting sense lines 105b through nodes 102. This can cause a detectable, measurable current and/or voltage in sense lines 105b. The relationship between the drive signal and the signal appearing on sense lines 105b can be a function of the capacitance coupling the drive and sense lines, which, as noted above, may be affected by an object in proximity to node 102. Capacitance sensing circuit (or circuits) 103 may sense sensing lines 105b and may determine the capacitance at each node as described in greater detail below.

As discussed above, drive lines 105a can be driven one at a time, while the other drive lines are grounded. This process can be repeated for each drive line 105a until all the drive lines have been driven, and a touch image (based on capacitance) can be built from the sensed results. Once all the lines 105a have been driven, the sequence can repeat to build a series of touch images. However, in some embodiments of the present invention, multiple drive lines may be driven substantially simultaneously or nearly simultaneously, as described in U.S. patent application Ser. No. 11/619,466, titled "Simultaneous Sensing Arrangement," filed Jan. 3, 2007.

Figure 3:
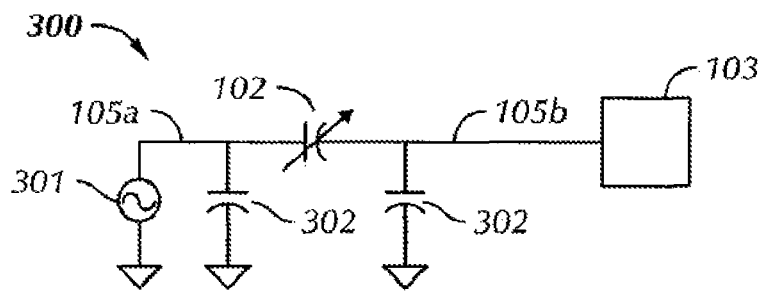
FIG. 3 illustrates a simplified schematic diagram of a mutual capacitance circuit.

FIG. 3 illustrates a simplified schematic diagram of mutual capacitance circuit 300 corresponding to the arrangement described above. Mutual capacitance circuit 300 may include drive line 105a and sense line 105b, which can be spatially separated thereby forming capacitive coupling node 102. Drive line 105a may be electrically (i.e., conductively) coupled to drive circuit 104 represented by voltage source 301. Sense line 105b may be electrically coupled to capacitive sensing circuit 103. Both drive line 105a and sense line 105b may, in some cases, include some parasitic capacitance 302.

As noted above, in the absence of a conductive object proximate the intersection of drive line 105a and sense line 105b, the capacitive coupling at node 102 can stay fairly constant. However, if an electrically conductive object (e.g., a user's finger, stylus, etc.) comes in proximity to node 102, the capacitive coupling (i.e., the capacitance of the local system) changes. The change in capacitive coupling changes the current (and/or voltage) carried by sense line 105b. Capacitance sensing circuit 103 may note the capacitance change and the position of node 102 and report this information in some form to processor 106 (FIG. 1).

With reference to FIG. 1, sensing circuit 103 may acquire data from touch surface 101 and supply the acquired data to processor 106. In some embodiments, sensing circuit 103 may be configured to send raw data (e.g., an array of capacitance values corresponding to each sense point 102) to processor 106. In other embodiments, sensing circuit 103 may be configured to process the raw data itself and deliver processed touch data to processor 106. In either case, the processor may then use the data it receives to control operation of computer system 107 and/or one or more applications running thereon. Various implementations along these lines are described in the applications referenced above, and include a variety of computer systems having touch pads and touch screens.

In some embodiments, sensing circuit 103 may include one or more microcontrollers, each of which may monitor one or more sensing points 102. The microcontrollers may be application specific integrated circuits (ASICs) that work with firmware to monitor the signals from touch sensitive surface 101, process the monitored signals, and report this information to processor 106. The microcontrollers may also be digital signal processors (DSPs). In some embodiments, sensing circuit 103 may include one or more sensor ICs that measure the capacitance in each sensing line 105b and report measured values to processor 106 or to a host controller (not shown) in computer system 107. Any number of sensor ICs may be used. For example, a sensor IC may be used for all lines, or multiple sensor ICs may be used for a single line or group of lines.

Figure 4:
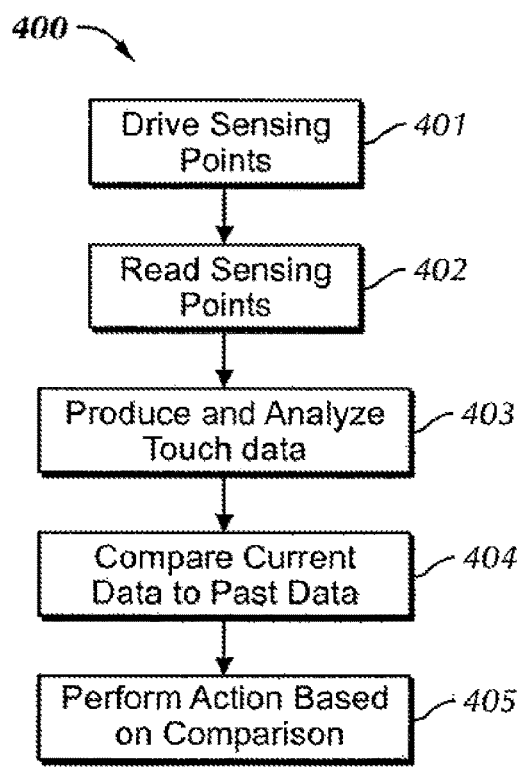
FIG. 4 illustrates a process for operating a multipoint sensing arrangement.

FIG. 4 illustrates at a high level process 400 for operating a multi-touch sensing arrangement, like that described above. The process may begin at block 401 where plurality of sensing points 102 can be driven. Following block 401, the process flow can proceed to block 402, where the outputs from sensing points 102 can be read. For example, a capacitance value for each sensing point 102 can be obtained. Following block 402, the process can proceed to block 403 where an image or other form of data (signal or signals) of the touch at one moment in time can be produced and thereafter analyzed to determine where objects touching or in proximity to the touch sensor may be located. Following block 403, the process can proceed to block 404, where the current image or signal may be compared to one or more past images or signals to determine a change in one or more of the shape, size, location, direction, speed, acceleration, pressure, etc. for each object. This information can be subsequently used (in step 405) to perform an action in computer system 107, ranging from moving a pointer or cursor to complex gesture-based interactions.

1.2 Transflective LCDs

To better understand integration of touch-sensing technology with transflective LCDs, a brief introduction to transflective LCDs may be helpful. The following is an overview of a typical subpixel cell found in low temperature poly silicon (LTPS) transflective LCDs.

1.2.1 Circuit Basics

Figure 5:
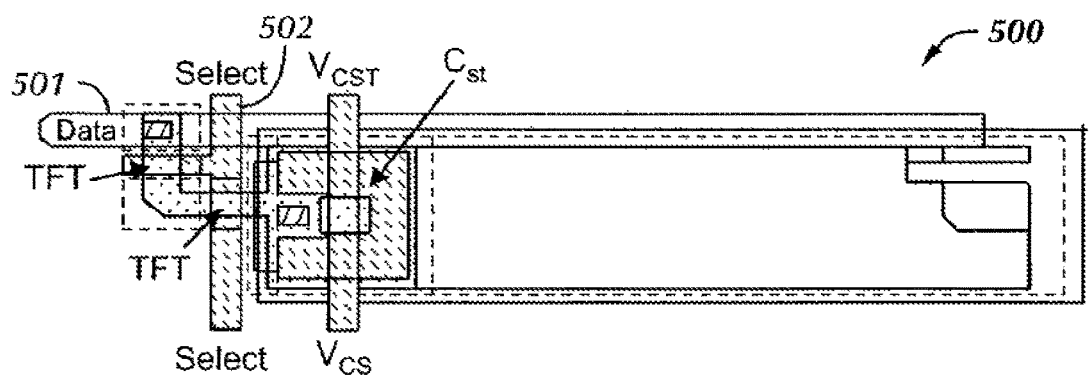
FIG. 5 illustrates a representative layout for an LTPS transflective subpixel.

FIG. 5 shows a representative layout for an LTPS transflective subpixel 500. Display information can be transferred to the subpixel's capacitors $C_{ST}$ and $C_{LC}$ (not shown) when a voltage representing the desired grey level is applied to the data bus 501 and the select line 502 is asserted. The select line 502 assertion level can be near the gate drive positive supply voltage. During the time when select line 502 is asserted, the voltage on $V_{CST}$ (and $V_{COM}$, which is not shown) can be constant. All the circuit elements shown in FIG. 5, which includes metal, poly, active, oxide, and ITO, can be fabricated on the LCD's bottom glass.

Figure 6:
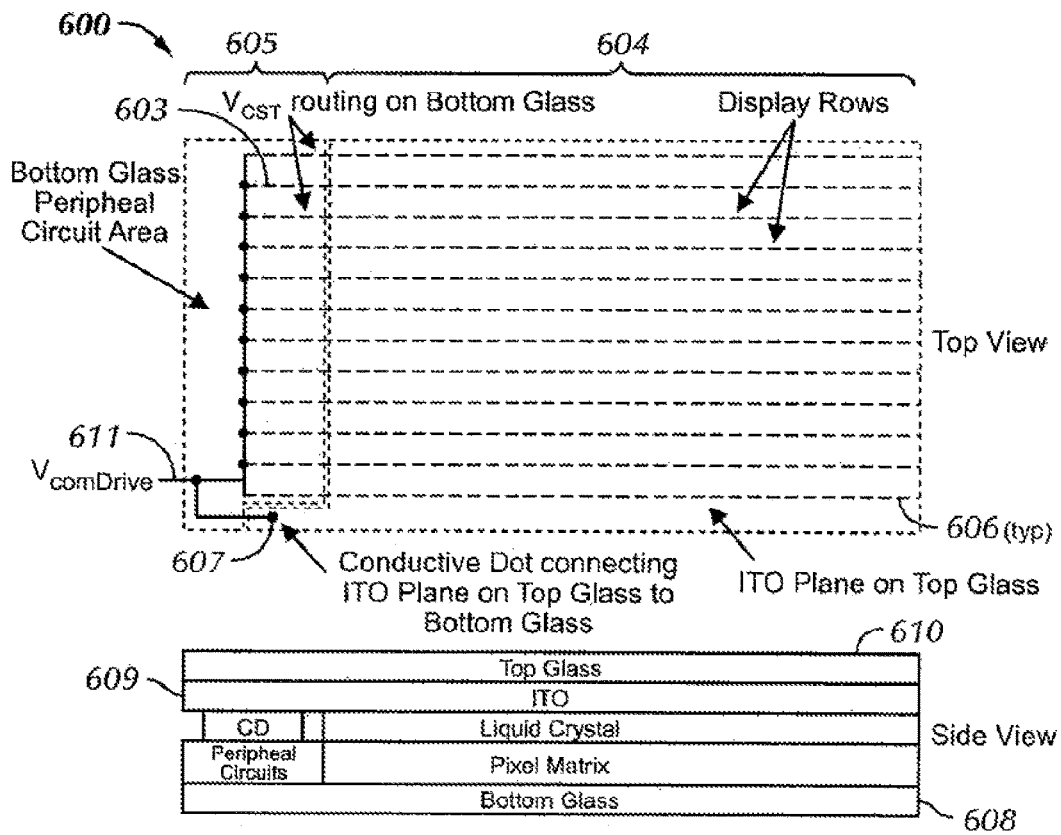
FIG. 6 illustrates a simplified model of an LTPS as viewed from the top and side.

FIG. 6 shows a simplified model of a low temperature poly-silicon (LTPS) LCD 600, including a top view 601 and a side view 602. Top view 601 shows a see-through view of the $V_{CST}$ routing 603 on the bottom glass 608 in both the display area 604 and the non-display area 605. Side view 602 shows a cross section of the display.

Each display row can include horizontal traces for $V_{CST}$ 606 and select (not shown). The select traces connect to gate drive circuitry made up of poly-silicon thin film transistors (p-Si TFTs), also not shown. The $V_{CST}$ traces 606 can run from display edge to display edge and can connect together, e.g., as shown on the left. The $V_{CST}$ traces can also connect, through a conductive dot 607, to an ITO plane 609 on the top glass 610. Typically, four conductive dots, one in each corner, can be used to connect the $V_{COM}$ plane to $V_{COM}$ Drive 611. FIG. 6 shows only one dot 607 for simplicity. The voltage of $V_{CST}$ and top glass ITO 609 can be set by $V_{COM}$Drive, which can be provided by the LCD driver IC (not shown). $V_{CST}$ can also be connected to another drive source other than $V_{COM}$Drive 611.

Figure 7:
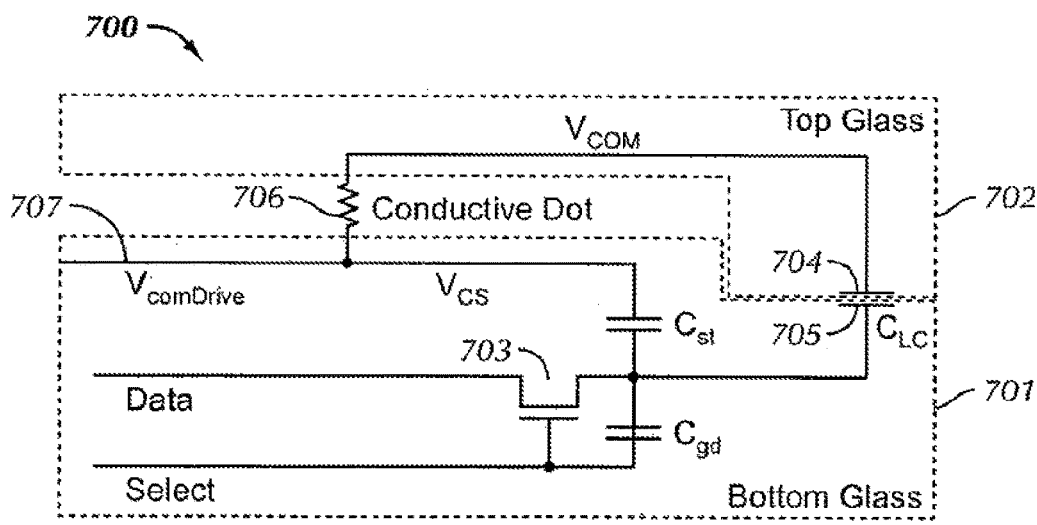
FIG. 7 illustrates a circuit diagram for a subpixel and shows on which glass substrate the components are fabricated.

FIG. 7 illustrates a circuit diagram 700 for a subpixel and shows on which glass substrate various components can be fabricated. The bottom glass 701 can be the substrate for the integration of all the TFT pixel circuitry 703. This can include the select line drivers and control logic. The bottom glass can also serve as the substrate for chip on glass (COG) components, such as the LCD driver (not shown). The upper electrode 704 of capacitor $C_{LC}$ can be on the top glass 702. Electrode 704 can be an ITO plane that covers the entire display area and forms the counter electrode to the bottom electrode 705 making $C_{LC}$. Upper electrode 704 can also connect, e.g., through four corner-located conductive dots 706 (only one shown), to $V_{COM}$Drive 707 on bottom glass 701.

1.2.2 $V_{COM}$

Minimizing or eliminating the DC component of the voltage across the liquid crystal (LC) can reduce or eliminate some undesirable image artifacts. Therefore, the electric field across the LC can be periodically flipped while maintaining overall balance between the two field directions. Obtaining perfect electric field balance can be difficult, which can lead to small DC offsets that can produce unwanted image artifacts. To mask flicker due to DC offsets one of several inversion schemes known to those skilled in the art, such as dot inversion, can be employed.

1.2.3 Modulating $V_{COM}$

In some embodiments, it may be desirable to reduce the voltage range of data drivers. Therefore, the $V_{COM}$ ITO plane and the $V_{CST}$ traces can be modulated from ground to the supply rail to produce an AC voltage across the LC. However, this can restrict the available inversion methods to only the frame and line types.

$V_{COM}$Drive requirements can be fairly simple: its voltage can remain constant until the charge transfer has completed for a row of pixels, thus setting their grey levels. Once the display pixels are set, $V_{COM}$Drive can change without significantly affecting the LC state provided that parasitic pathways into and out of the subpixel remain small.

1.2.4 Constant $V_{COM}$ $V_{COM}$ modulation can complicate the integration of touch sensing with LCDs. Various techniques for overcoming these complications are discussed below. An alternative method of minimizing the DC component of the voltage across the liquid crystal can be employed. One such alternative method is disclosed in J. Hector and P. Buchschacher, "Low Power Driving Options for an AMLCD Mobile Display Chipset", SID 02 Digest, pp. 695-697, which is incorporated by reference herein. This alternative method can allow $V_{COM}$ to remain at a constant voltage, does not require large-voltage range data drivers, and can consume low power. Various advantages of using a constant $V_{COM}$ are described below.

1.3 LCD Manufacturing

The manufacturing of LCD panels can be done using a batch process on large pieces of glass called mother-glass. Two pieces of mother-glass can be used: a top mother-glass, which can provide the substrate for the color filter, black matrix, and the upper electrode for $C_{LC}$; and a bottom mother-glass, which can provide the substrate for the active matrix TFT array and drive circuitry.

Figure 8:
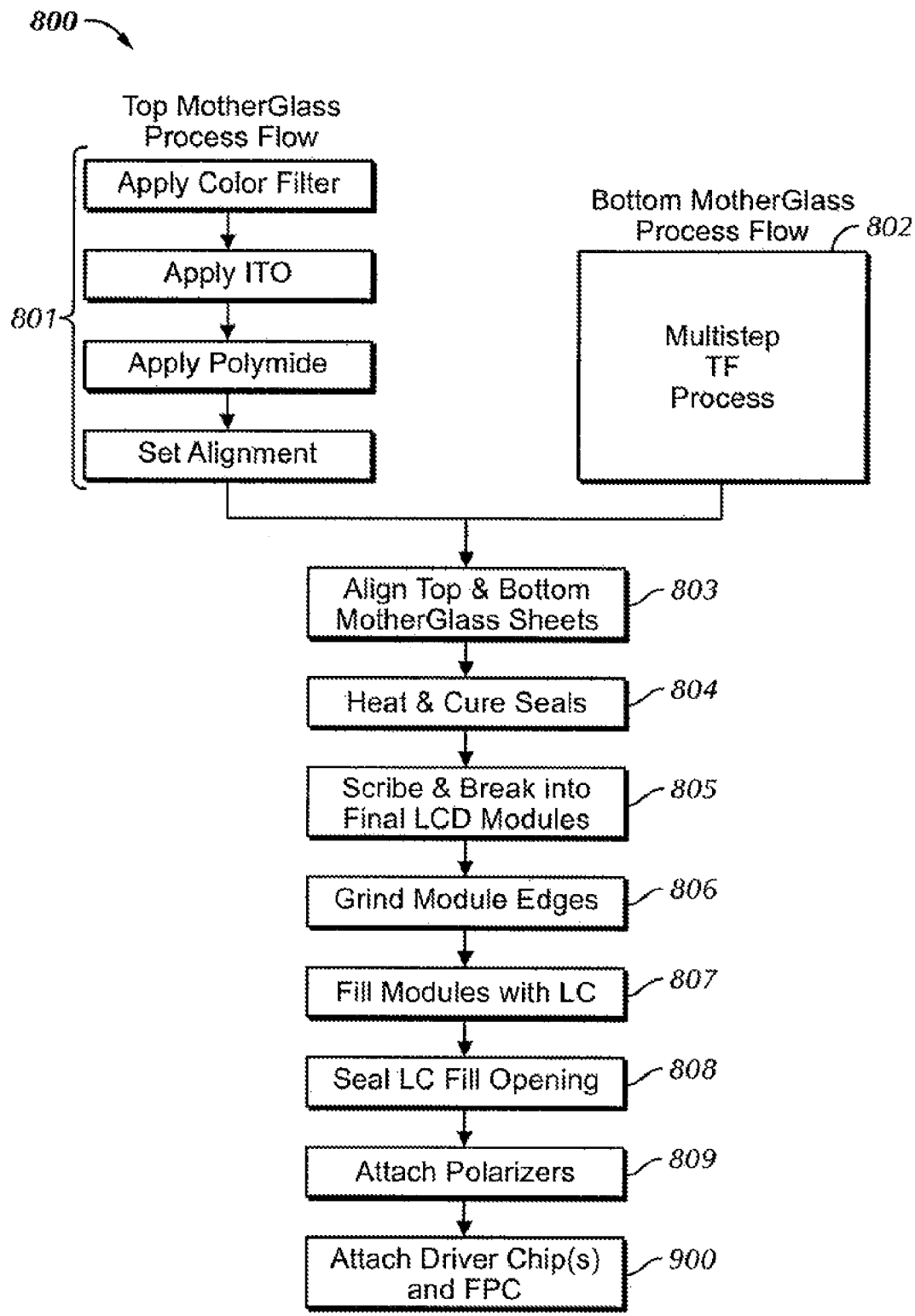
FIG. 8 illustrates a basic process flow for manufacturing LCDs.

A basic process flow 800 for manufacturing LCDs is shown in FIG. 8. Two large sheets of mother-glass, one for the top portion of the LCD and one for the bottom portion, can go through separate processing steps 801 and 802 before being aligned (block 803), pressed together, and heated (block 804) to cure seals between the top and bottom glass thereby producing a stable panel structure. The large panel can then be scribed and broken into smaller modules of the desired dimensions (block 805). The individual modules can have their edges ground (block 806) before being filled with liquid crystals (block 807). After filling, the modules can be sealed (block 808). Polarizers and electrical components can be attached (block 809). Flexible printed circuits (FPCs) can be attached to their substrates at or near the end of the process (block 810).

Figure 9:
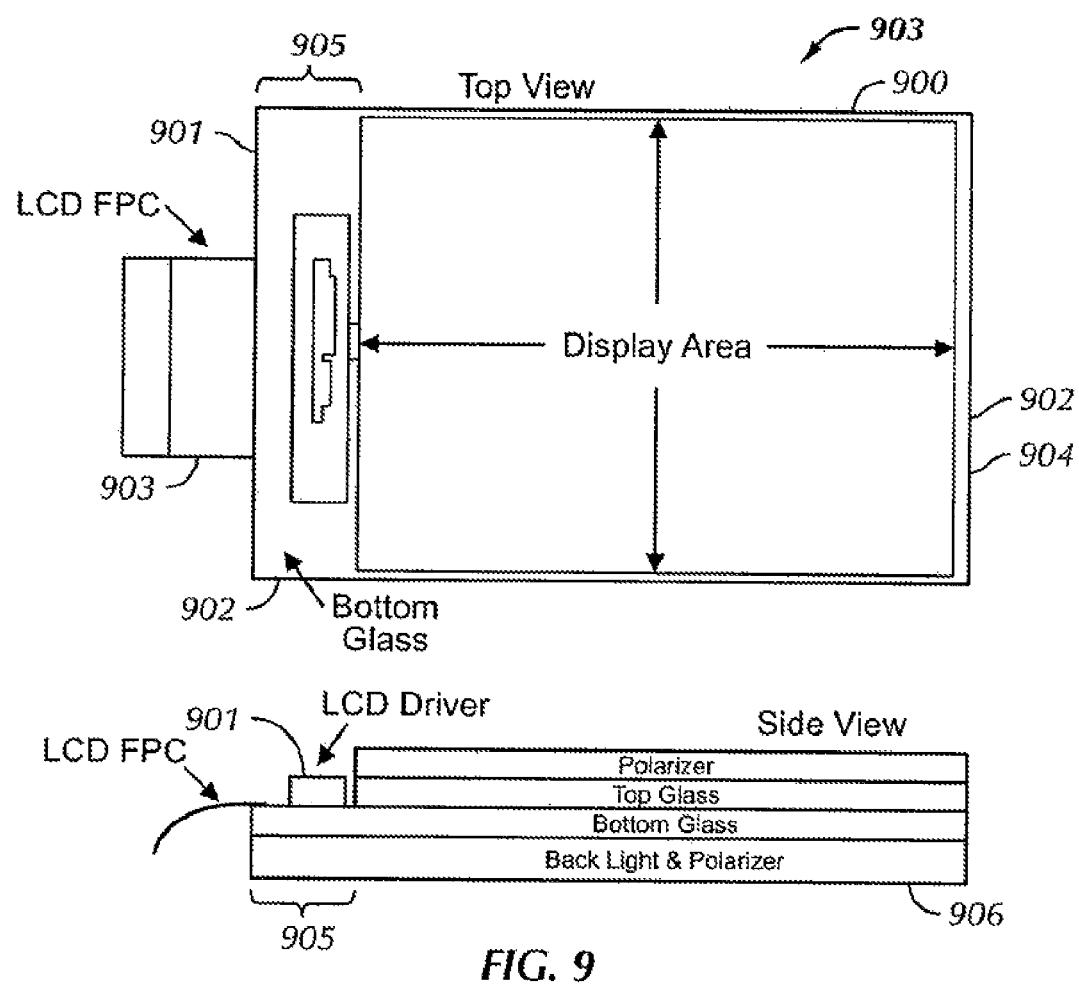
FIG. 9 illustrates a finished small size LCD module.

A finished LCD module 900 is shown in FIG. 9. The illustrated LCD module includes a chip on glass (COG) LCD driver 901 attached to the bottom glass 902 and also includes a flex on glass (FOG) flexible printed circuit (FPC) 903 attached to the bottom glass 902. Both components can be electrically connected to bottom glass pads and held in place using an anisotropic conductive adhesive (ACA). Bottom glass 902 can extend beyond top glass 904 to provide a shelf 905 to mount the COG LCD driver 901, the FPC 903, and other supporting components. For handheld devices, the system processor board that manages the data and controls for the LCD can be placed under the backlight 906.

Additional components used to support touch sensing (e.g., FPCs) can also attach to shelf 905. Other attachment points are also possible. Details are discussed in conjunction with relevant embodiments described below.

1.4 Combining LCDs and Touch Sensing

Figure 10:
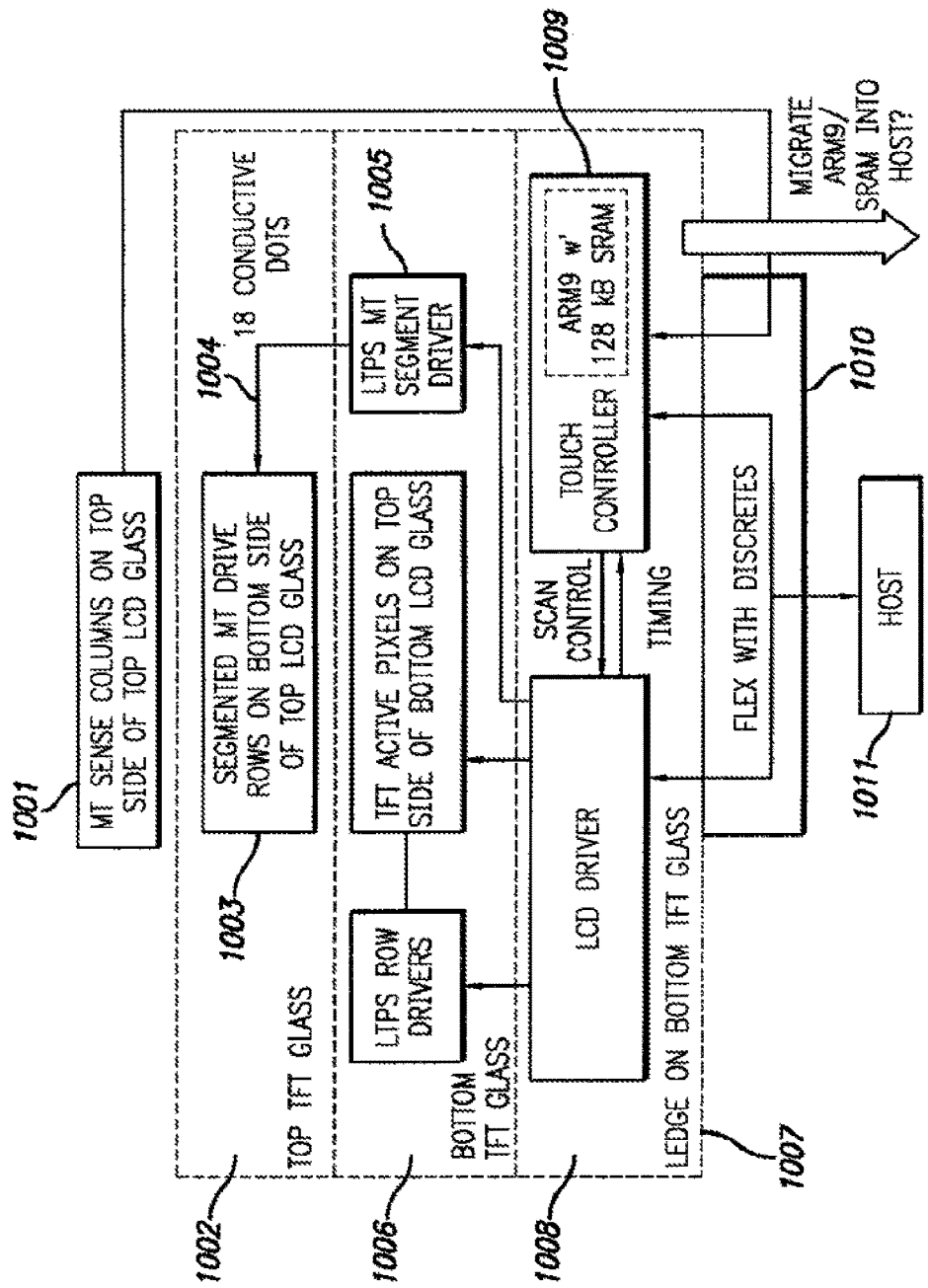
FIG. 10 illustrates a block diagram of a touch screen LCD with separate touch driver and LCD driver chips.
Figure 11:
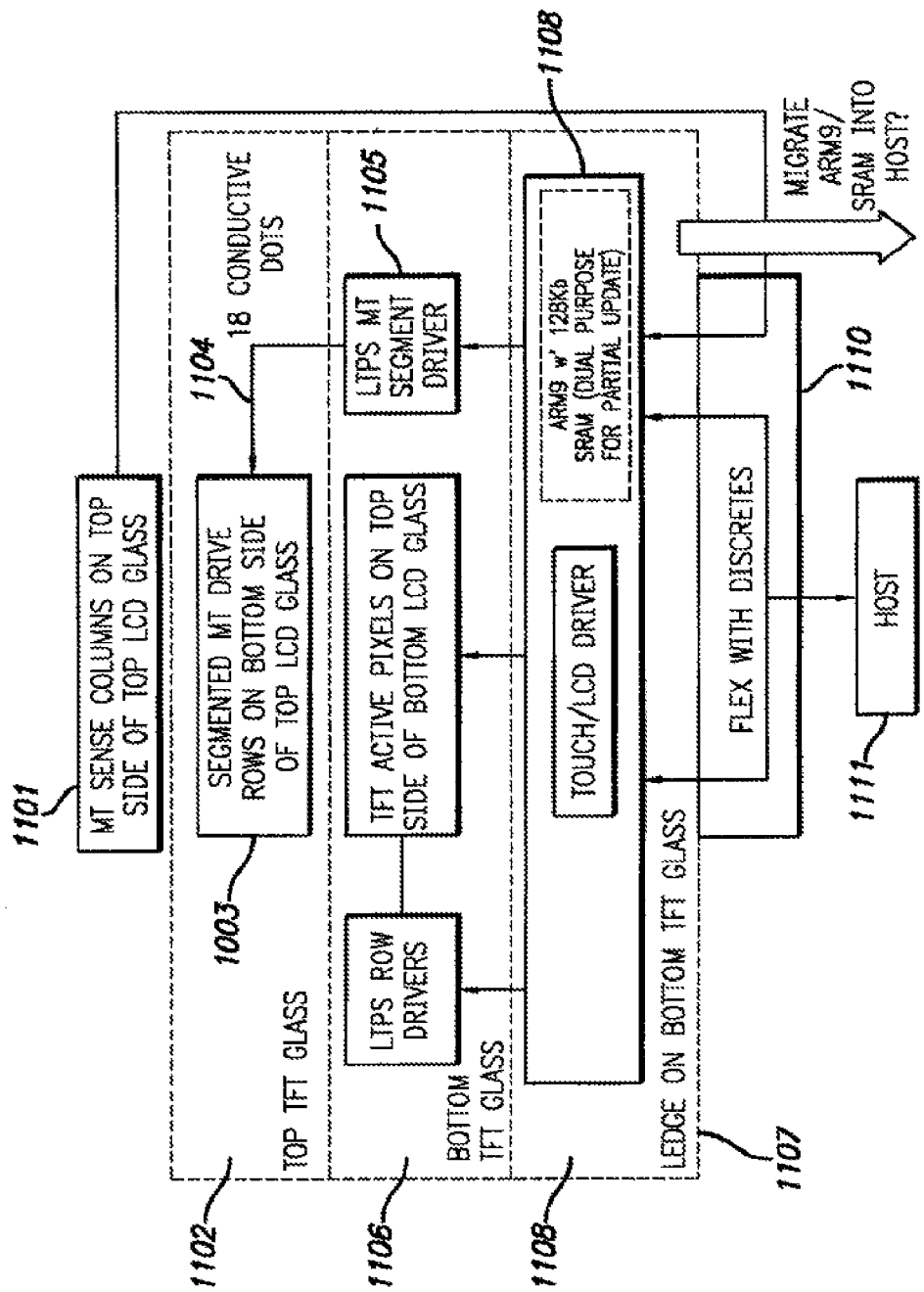
FIG. 11 illustrates a block diagram of a touch screen LCD with an integrated LCD and touch driver chip.

The stack up diagrams discussed herein may be better understood in conjunction with the block diagrams of FIGS. 10 and 11. Starting at the top, touch sense electrodes 1001, 1101 can be deposited on the top (user side) of LCD top glass 1002, 1102. Touch drive electrodes 1003, 1103 can be patterned on the bottom side of top glass 1002, 1102. Conductive dots 1004, 1104 can connect drive electrodes 1003, 1103 to driver 1005, 1105, which can also be located on bottom glass 1006, 1106. A shelf 1007, 1107 on bottom glass 1006, 1106 can house LCD driver chip 1008, 1108 and the touch sensor driver chip 1009, which can interface with each other (FIG. 10) or be integrated into a single component (FIG. 11). Finally, a FPC 1010, 1110, also bonded to the shelf can connect host device 1011, 1111.

1.5 Integration Options

Some embodiments of an LCD with integral touch sensing can include a top glass and a bottom glass. Display control circuitry can be formed on one and/or both of these glass layers to affect the amount of light that passes through a layer of liquid crystal between the two glass layers. The space between the external edges of the top and bottom glass is referred to herein as the liquid crystal module (LCM).

Figure 12:
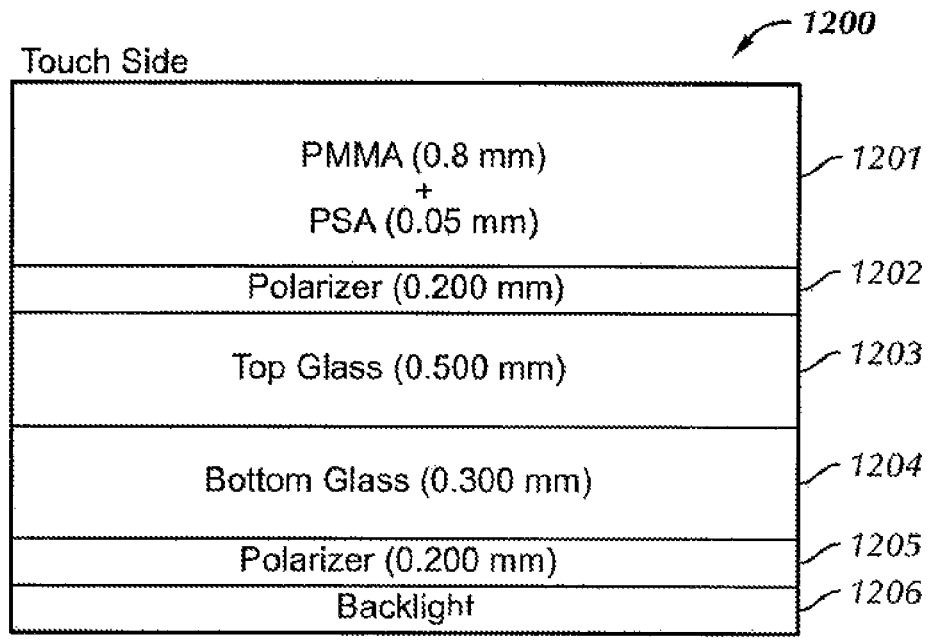
FIG. 12 illustrates a basic stackup of a touch screen LCD.

A typical LCD stackup 1200 typically includes additional layers, as illustrated in FIG. 12. In FIG. 12, a hard-coated PMMA layer 1201 can protect a LCD polarizer 1202 and the top glass 1203, and a second polarizer 1205 can be included between bottom glass 1204 and a backlight 1206.

Integrating touch-sensing technology into an LCD can be achieved using a variety of techniques. For instance, different touch-sensing elements and/or layers may be incorporated in a LCD display, with different embodiments varying in factors such as display and/or manufacturing cost, display size, display complexity, display durability, display functionality, and image display quality. In some embodiments, touch-sensing capability can be included into an LCD by integrating touch-sensing elements on the LCD display outside of the LCM. In other embodiments, touch-sensing elements can be added both inside the LCM (e.g., between the two glass layers) as well as outside of the LCM. In still other embodiments, a set of touch-sensing elements can be added only inside the LCM (e.g., between the two glass layers). The following sections describe a number of concepts for each of the above-mentioned embodiments.

1.6 Touch-Sensing Outside of the Liquid Crystal Module

Adding touch-sensing elements outside of the LCM allows touch sensing capabilities to be added to an LCD display with little to no impact on typical LCD manufacturing practices. For instance, a touch sensing system and LCD display system might be fabricated separately and integrated in a final step to form an LCD with touch sensing capabilities. Including the touch-sensing elements outside of the LCM can also allow the touch-sensing elements to be placed close to the area touched by the user, potentially reducing electrical interference between the display and touch components.

The following two embodiments, identified as Concept C and Concept N, can incorporate such external touch-sensing elements.

1.6.1 Concept C

Figure 13:
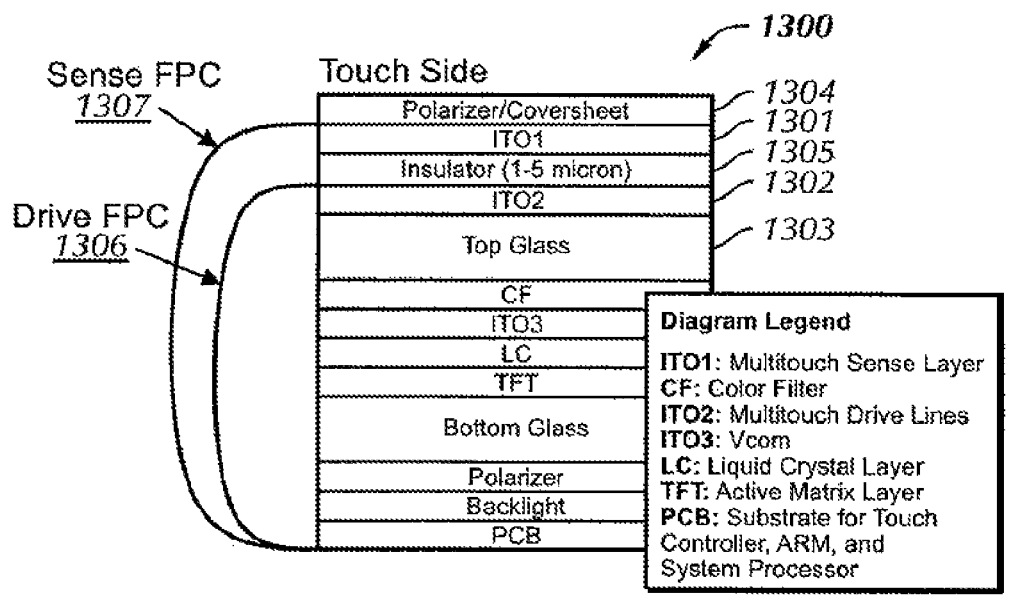
FIG. 13 illustrates an alternative embodiment of a touch screen LCD.

One embodiment of the present invention, Concept C, uses the stackup illustrated in FIG. 13, which allows the touch function to be separate from the LCD. In Concept C, two additional indium-tin oxide (ITO) layers (ITO1 1301 and ITO2 302) can be patterned on top of the color filter (CF) plate (e.g., the top glass layer). These layers can be used for touch sense and touch drive elements of a touch sensor, e.g., a mutual-capacitance touch sensor. These ITO layers can be patterned into columns and/or rows (as shown in FIGS. 1 and 2, and described in the preceding multi-touch sensing description), and can be separated by a dielectric 1305, such as a glass substrate or a thin (e.g., 5-12 mm) $SiO_2$ layer.

Figure 14:
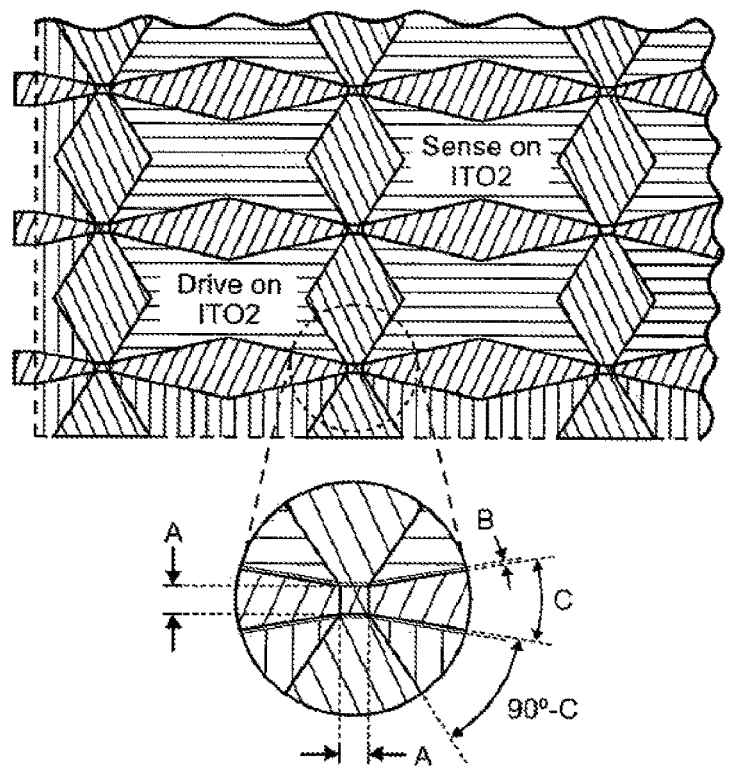
FIG. 14 illustrates an electrode pattern.

In some embodiments, the electrode pattern used in the touch elements may be optimized to reduce visual artifacts. For instance, FIG. 14 illustrates a diamond electrode pattern, which can reduce visual artifacts.

In Concept C, the FPCs that carry touch sensing data can attach to the top surface of the top glass 1303.

1.6.2 Concept N

Figure 15:
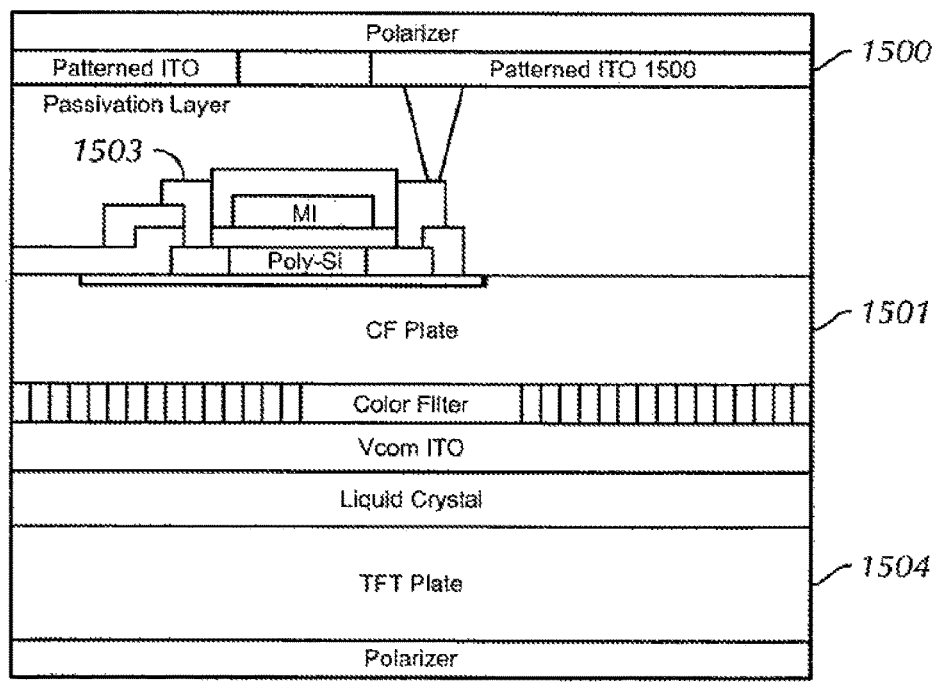
FIG. 15 illustrates a stackup diagram embodiment of a touch-screen LCD.
Figure 16:
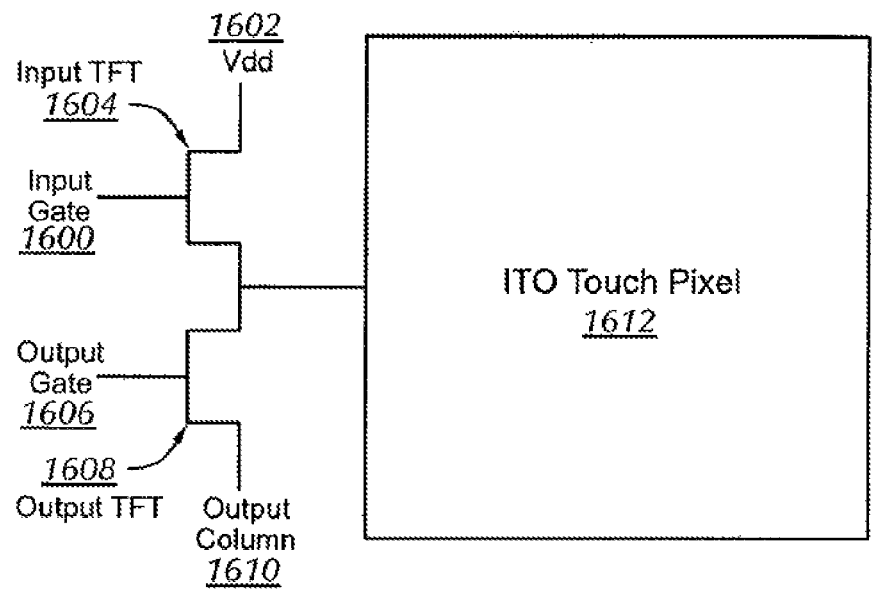
FIG. 16 illustrates a touch pixel circuit for the touch-screen LCD illustrated in FIG. 15.
Figure 17:
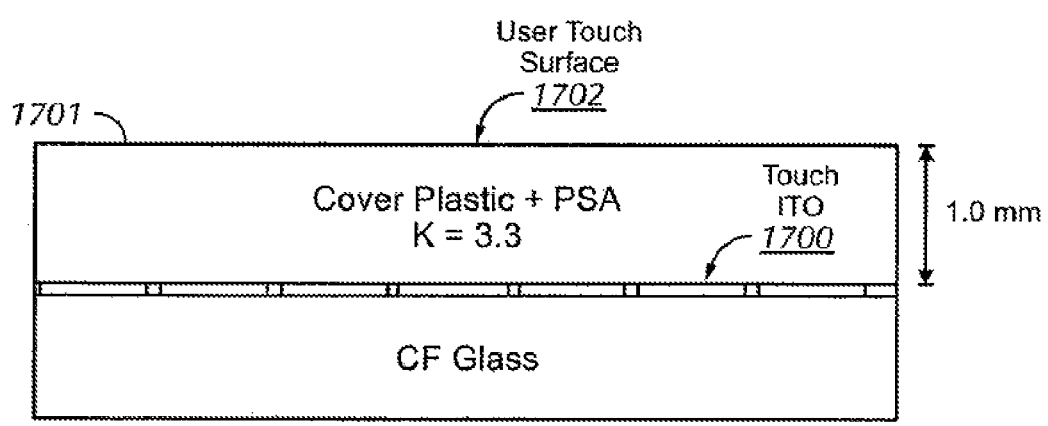
FIG. 17 illustrates a touch-sensing layer protected by a plastic cover.

One embodiment of the present invention, Concept N, can implement capacitive sensing on the outside surface of the color filter (CF) plate using self-capacitance sensing. Concept N can use the stackup illustrated in FIG. 15, in which the touch sensing components can be located on top of CF plate 1501 (top glass). LCDs based on Concept N can be built without altering standard LCD processing by forming TFTs 1503 with two metal layers and patterned ITO 1500 on CF plate 1501 using, for example, the same LTPS process used for conventional TFT plate 1504. Touch ITO layer 1500 can be patterned into a plurality of touch pixels 1612 (FIG. 16). Touch ITO layer 1500 can be protected by a plastic cover 1702 (shown in FIG. 17) that can also serve as the surface touched by a user.

FIG. 16 illustrates a self-capacitance touch pixel circuit for Concept N. Each ITO touch pixel 1612 can be connected to two TFTs, e.g., an input TFT 1604 and an output TFT 1608. The input TFT 1604 can charge ITO touch pixel 1612, while output TFT 1608 can discharge ITO touch pixel 1612. The amount of charge moved can depend on the ITO touch pixel's 1612 capacitance, which can be altered by the proximity of a finger. Further details of self-capacitance touch-sensing are described above and in U.S. Pat. No. 6,323,846, titled "Method and Apparatus for Integrating Manual Input," issued Nov. 27, 2001, which is hereby incorporated by reference in its entirety.

Figure 18:
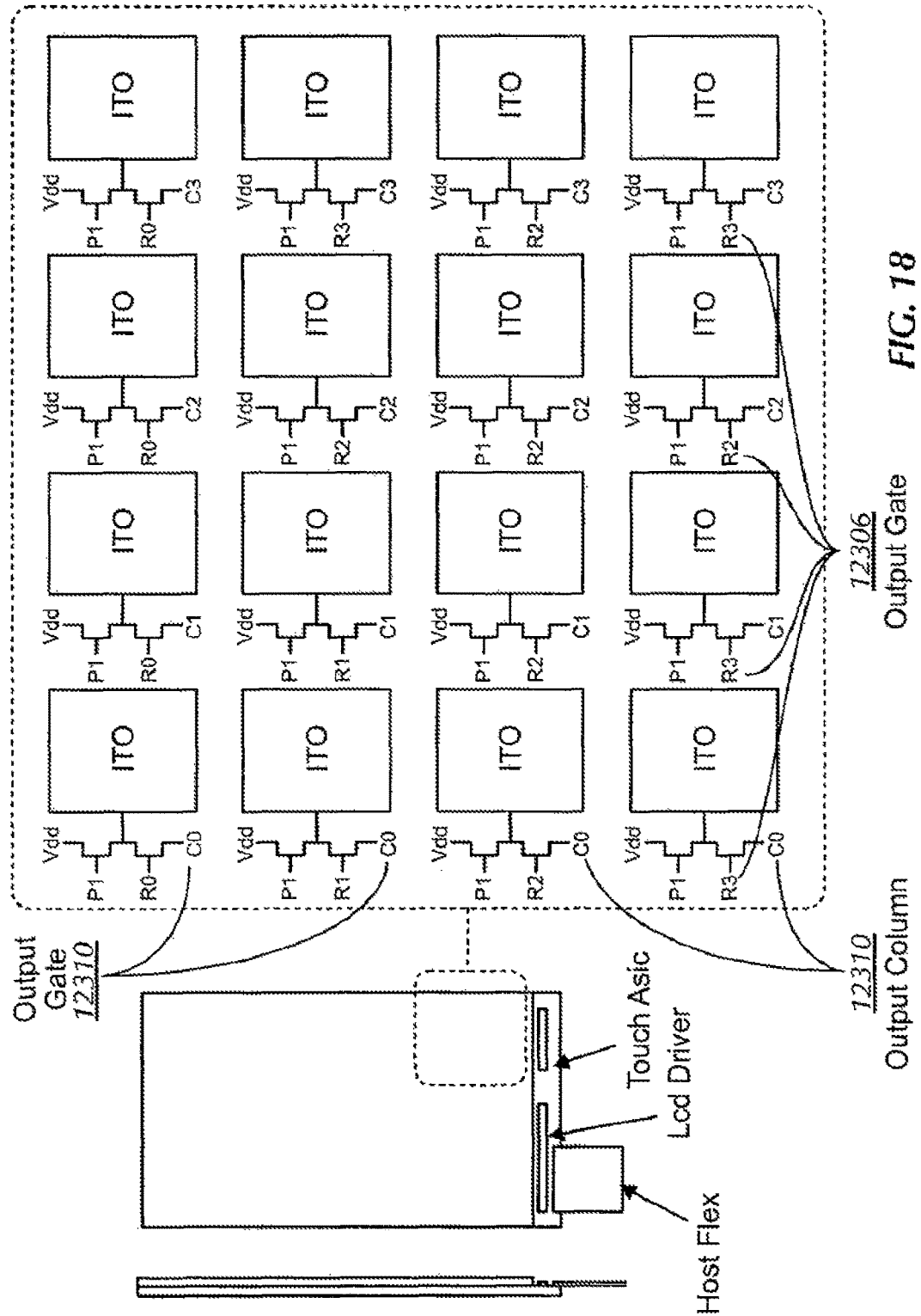
FIG. 18 illustrates an output column and a linked set of output gates for a region of a touch-screen.
Figure 19:
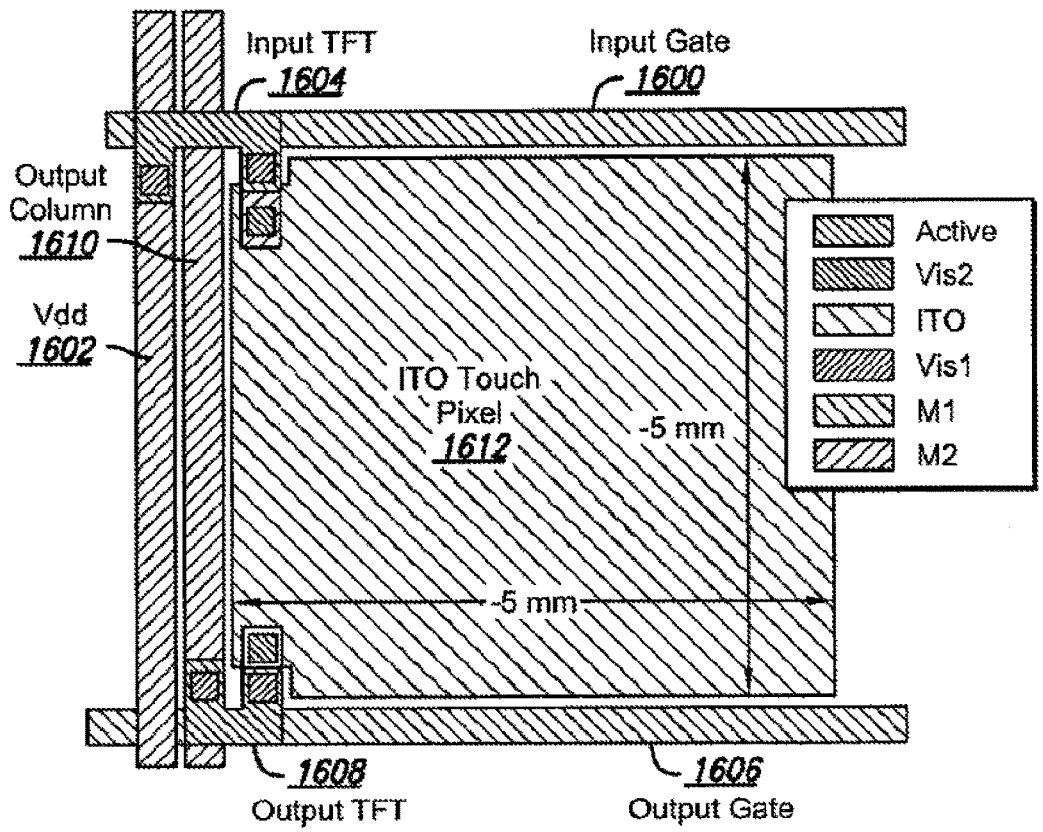
FIG. 19 illustrates a layout of a touch pixel for a touch-screen LCD.

In one embodiment, an output column 1610 can be shared by touch pixels vertically, and output gates 1606 can be shared by touch pixels horizontally, as shown in FIGS. 16 and 18 for output column 1610 'C0' and output gates 1606 'R3'. FIG. 19 shows a detailed layout of a touch pixel.

1.7 Partially-Integrated Touch-Sensing

Integrating touch-sensing elements inside the LCM can provide a variety of advantages. For example, touch-sensing elements added inside the LCM could "reuse" ITO layers or other structures that would otherwise be used only for display functions to also provide touch-sensing functionality. Incorporating touch-sensing features into existing display layers can also reduce the total number of layers, which can reduce the thickness of the display and simplify the manufacturing process.

The following embodiments can include touch-sensing elements inside and outside the LCM. Because integrating touch-sensing elements within the LCM may result in noise and interference between the two functions, the following designs can also include techniques that allow elements to be shared while reducing or eliminating any negative effects on the display and/or touch-sensing outputs caused by electrical interference between the two.

1.7.1 Concept A

Figure 20:
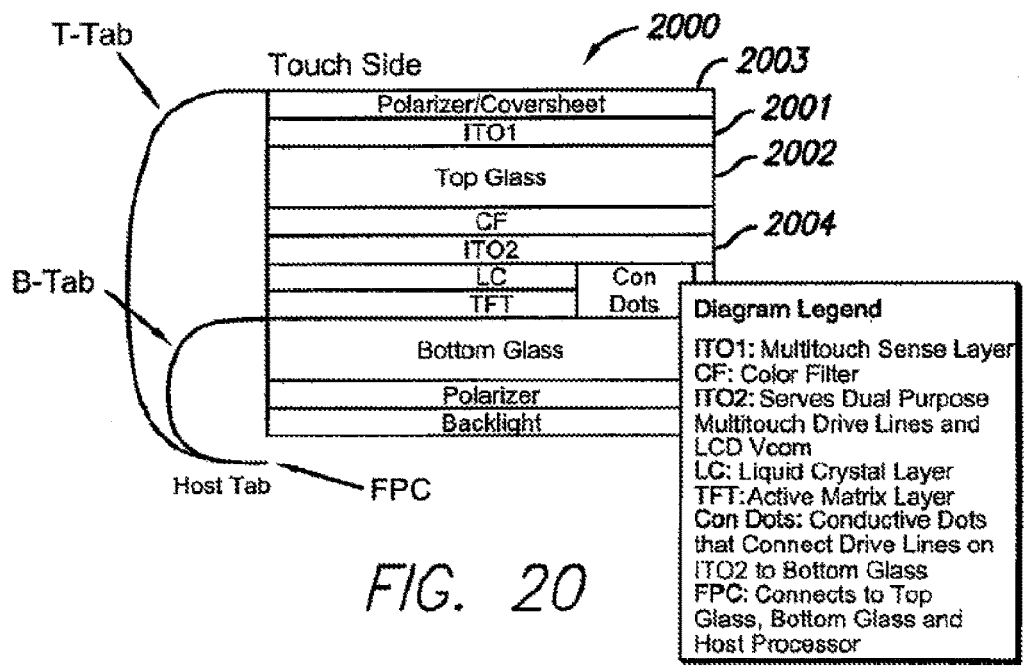
FIG. 20 illustrates a stackup diagram for one embodiment of a touch screen LCD.

Concept A can use the basic stackup 2000 illustrated in FIG. 20, with a multi-touch capable ("MT") ITO sense layer (ITO1) 2001 positioned on the user side of top glass 2002, between top glass and polarizer 2003. Starting from the top, the touch sensing layers can include: ITO1 2001 (an ITO layer that can be patterned into N sense (or drive) lines) and ITO2 2004 (an ITO layer that can be patterned into M drive (or sense) lines). ITO2 layer 2004 can also serve as the $V_{COM}$ electrode for the LCD.

1.7.1.1 Concept A: Touch Sensor Electrodes

Figure 21:
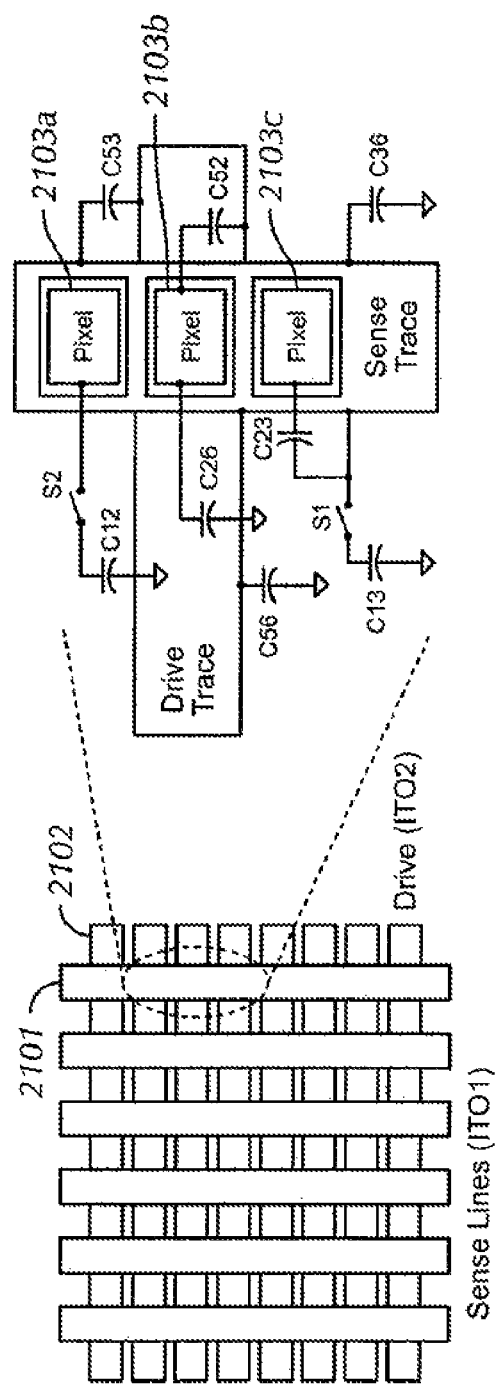
FIG. 21 illustrates a touch sensor array.

The touch sensor electrode array can include two layers of patterned ITO as illustrated in FIG. 21 (left side). FIG. 21 is a simplified view of one possible implementation of touch sensor electrodes. The layer closer to the viewer, ITO1 2101, can be the touch output layer also called the sense layer or the sense lines. The touch drive layer 2102 can be located on layer ITO2. ITO2 can also form the upper electrode of the capacitor $C_{LC}$ (see FIG. 7). FIG. 21 (right side) also shows a detail of three sense pixels 2103a, 2103b, and 2103c along with associated capacitors. Both the sense and drive lines can have a 5 mm pitch with a 10 to 30 micron gap. The gap can be just small enough to be invisible to the naked eye, but still large enough to be easy to etch with a simple proximity mask. (Gaps in the figure are greatly exaggerated.)

Figure 22:
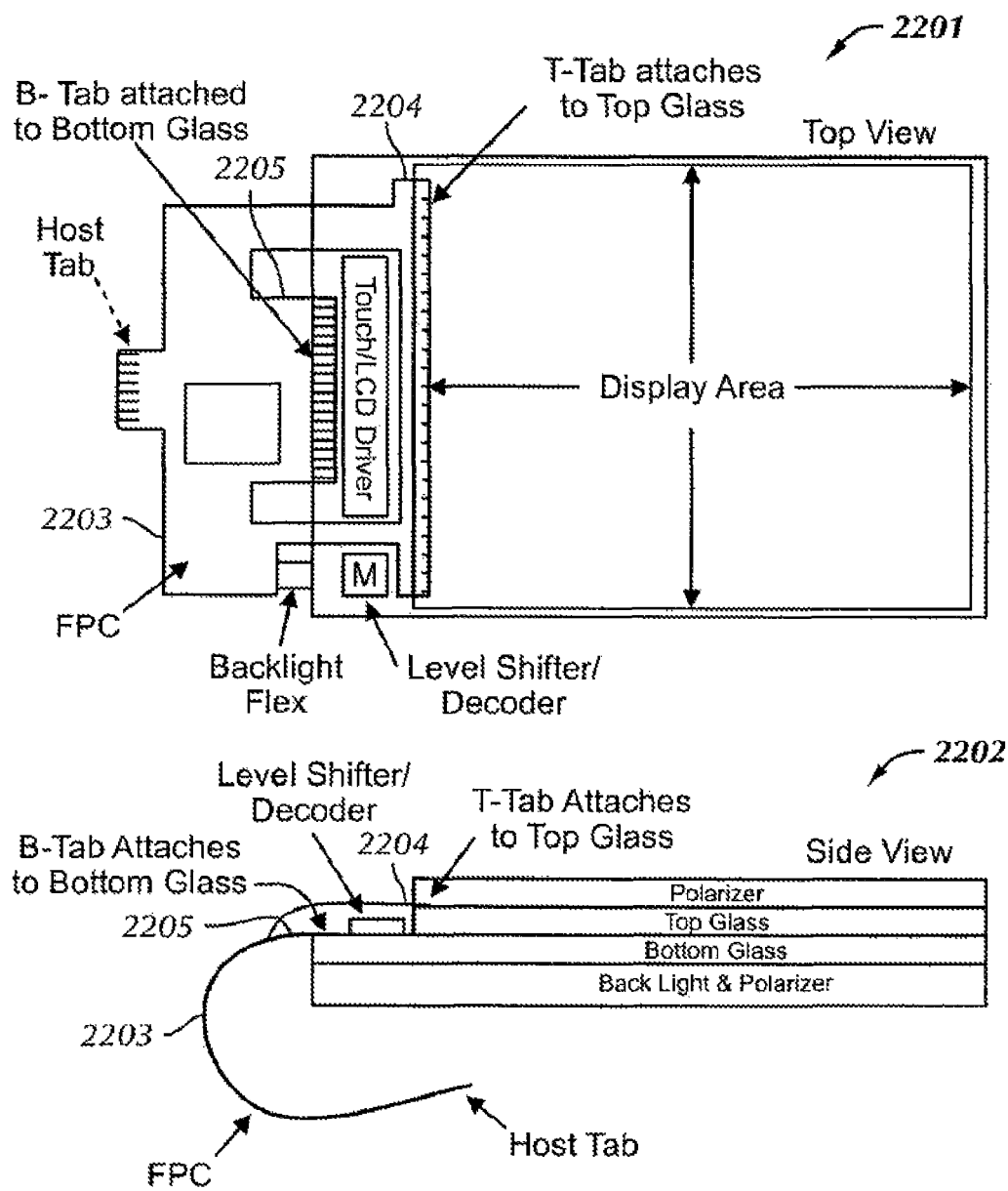
FIG. 22 illustrates a physical implementation for Concepts A and B, with top and side views of cabling and subsystem placement.
Figure 23:
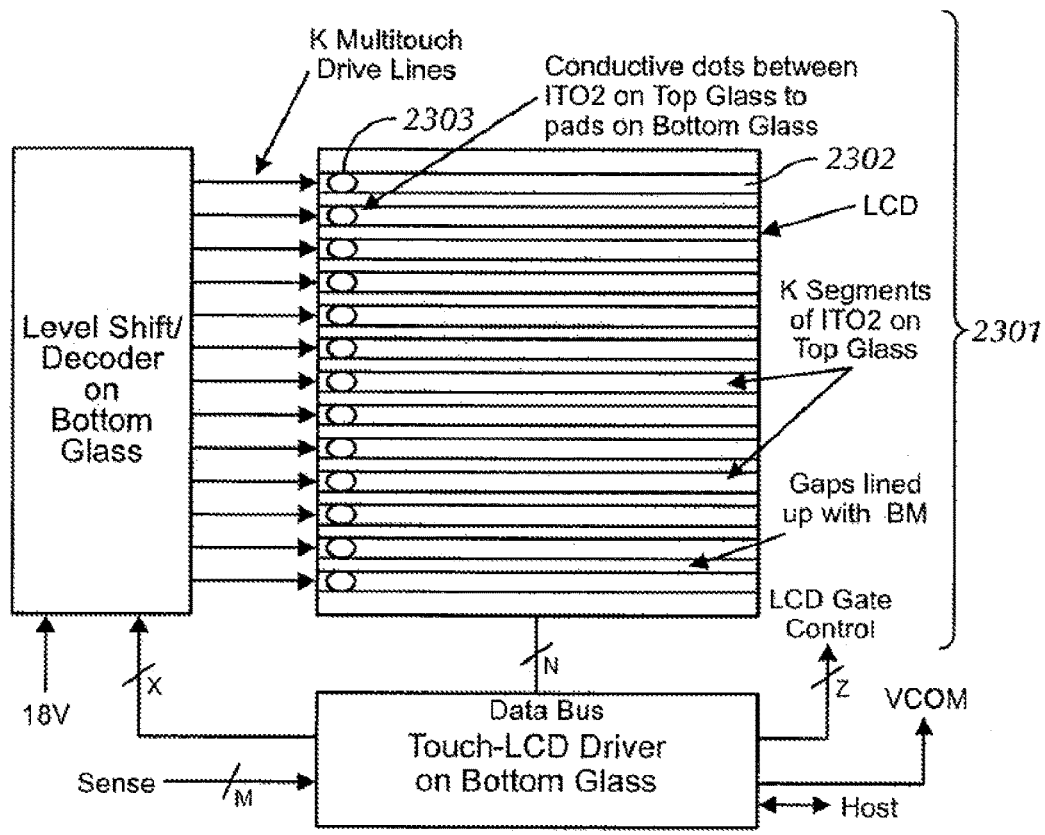
FIG. 23 illustrates a high-level block diagram showing one possible architecture of bottom glass components.

FIG. 22 shows one possible physical implementation for Concept A, with top view 2201 and side view 2202 of cabling and subsystem placement. Top view 2201 shows the approximate positions of FPC 2203 (discussed in greater detail below) in an unfolded state. FIG. 22 represents just one physical implementation where a discrete touch level shifter/decoder COG can be used. Alternative architectures that minimize the number of discrete touch components are discussed below. For mechanical stability, the FPC can be bent, as shown in side view 2202, so that stress on the T-tab 2204 and B-tab 2205 bonds are minimized. FIG. 23 is a high-level block diagram showing one possible architecture 2300 of the main bottom glass components, and the segmented ITO2 layer 2301 on the top glass used for touch sensing. The segments 2302 of ITO2 on the top glass each connect through a conductive dot 2303 to a corresponding pad on the bottom glass. The pads on the bottom glass can each connect to the touch driver, discussed below.

1.7.1.2 Concept A: Conductive Dots

Conductive dots located in the corners of the LCD can be used to connect the $V_{COM}$ electrode to drive circuits. Additional conductive dots can be used to connect the touch drive lines to touch-drive circuitry. The dots can have sufficiently low resistance so as to not add significantly to the phase delay of the touch drive signals (discussed in greater detail below). This can include limiting the resistance of a conductive dot to 10 ohms or less. The size of the conductive dot can also be limited to reduce the real estate needed.

Figure 24:
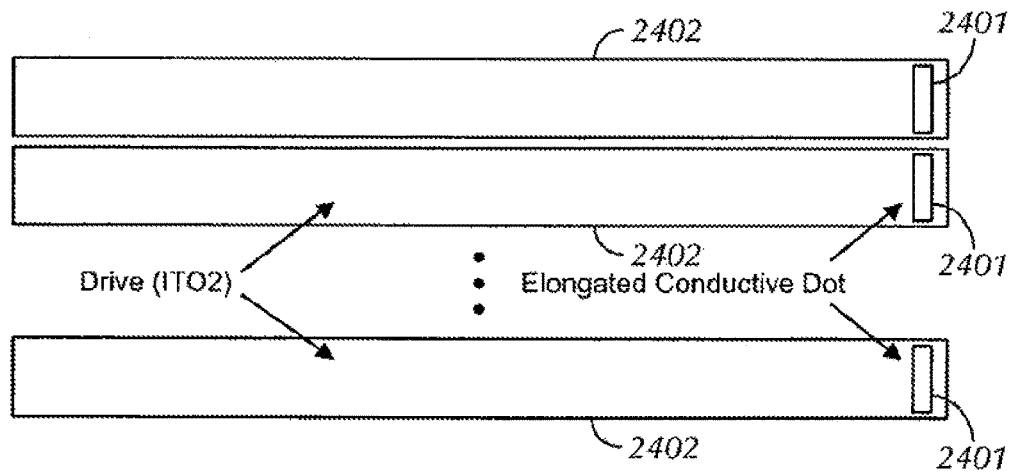
FIG. 24 illustrates elongated conductive dots.

As shown in FIG. 24, elongated conductive dots 2401 can be used to reduce both dot resistance and real estate requirements. Touch drive segments 2402 can be about 5 mm wide, which can provide a large area to reduce dot resistance.

1.7.1.3 Concept A: Flex Circuit and Touch/LCD Driver IC

A conventional display (e.g., FIG. 9) can have an LCD Driver integrated circuit (IC) 901, that can control low-level operation of the display. A system host processor can exercise high-level control over the display by sending commands and display data to LCD Driver 901. Multi-touch systems can also have one or more driver ICs. One exemplary multi-touch capable system, described in the incorporated references includes three ICs: a multi-touch controller, an external level-shifter/decoder, and controller, such as an ARM processor. The ARM processor can exercise low-level control over the multi-touch controller, which can subsequently control the level-shifter/decoder. A system host processor can exercise high-level control over and receive touch data from the ARM processor. In some embodiments, these drivers can be integrated into a single IC.

Figure 25:
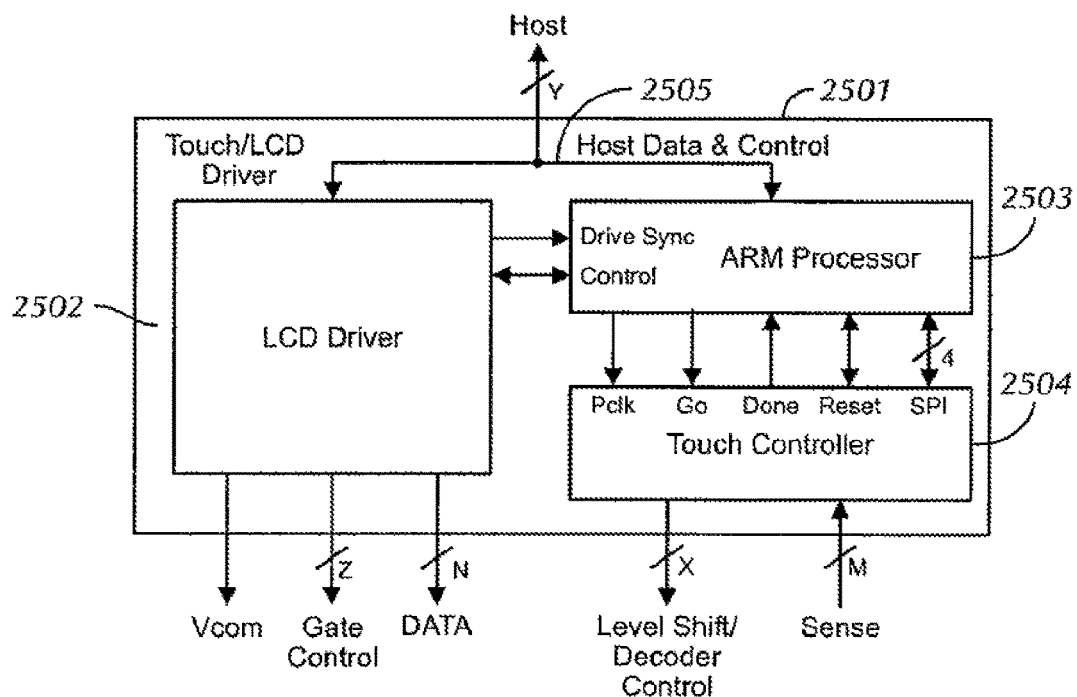
FIG. 25 illustrates a high-level block diagram for a Touch/LCD Driver integrated circuit.

FIG. 25 shows an example high-level block diagram for a Touch/LCD Driver integrated circuit 2501. The IC has two main functions: 1) LCD control and update, and 2) touch scanning and data processing. These two functions can be integrated by an LCD driver portion 2502 for LCD control and an ARM processor 2503 and multi-touch controller 2504 for touch scanning and processing. The touch circuits can be synchronized with LCD scanning to prevent one from interfering with the other. Communication between the host and either the LCD Driver or the ARM processor can be through the host data and control bus 2505. A more fully integrated Touch/LCD Driver is discussed below.

Figure 26:
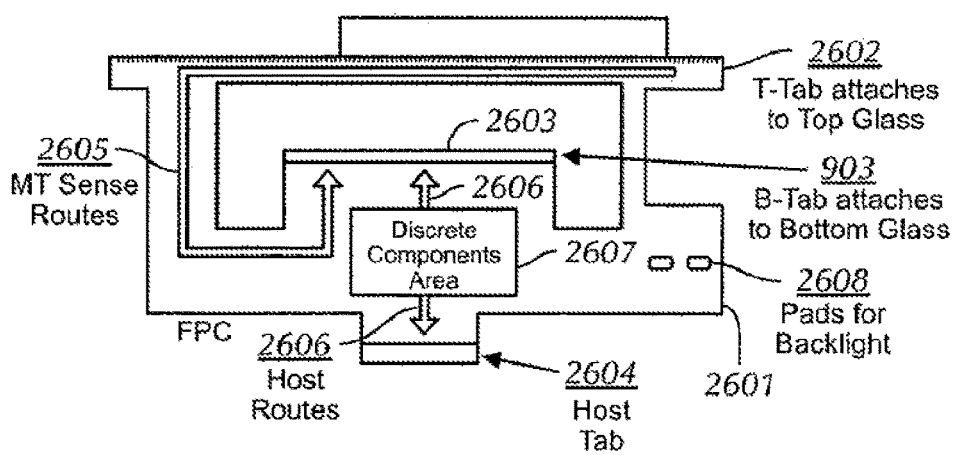
FIG. 26 illustrates a flexible printed circuit for use with various LCD embodiments described herein.

As shown in FIG. 26, an FPC 2601 that brings together the signals for the various touch and display layers can have three connector tabs, a T-tab 2602, a B-tab 2603, and a host tab 2604. The T-tab can connect to sense line pads on the top glass. The T-tab traces 2605 can connect to corresponding pads on B-tab 2603, which can also attach to the bottom glass. B-tab 2603 can also provide pass-through routes 2606 from Host tab 2604 that can enable the host to connect to the Touch/LCD Driver IC. FPC 2601 can also provide the substrate for various components 2607 supporting touch and LCD operation, and can also connect to the backlight FPC through two pads 2608.

The FPC 2601 can be TAB bonded to both the top and bottom glass. Alternatively, other bonding methods can be employed.

1.7.1.4 Concept A: Touch Drive Integrated on Bottom Glass

A level shifter/decoder chip, along with a separate voltage booster (e.g., a 3V to 18V booster), can provide high voltage drive circuitry for touch sensing. In one embodiment, the Touch/LCD Driver IC can control the level shifter/decoder chip. Alternatively, the voltage booster and/or the level shifter/decoder can be integrated into the Touch/LCD Driver IC. For example, such integration can be realized using a high voltage (18V) LTPS process. This can allow integrating the level shifter/decoder chip and the voltage booster into the periphery of the bottom glass. The level shifter/decoder can also provide the voltages for $V_{COM}$ modulation and touch drive as discussed below.

1.7.1.5 Concept A: Sharing Touch Drive with LCD $V_{COM}$

As discussed above, Concept A can add one layer of ITO to a standard LCD stackup, which can function as the touch sense lines. The touch drive layer can be shared with the LCD's $V_{COM}$ plane, also denoted ITO2. For display operation, a standard video refresh rate (e.g., 60 fps) can be used. For touch sensing, a rate of at least 120 times per second can be used. However, the touch scanning rate can also be reduced to a slower rate, such as 60 scans per second, which can match the display refresh rate. In some embodiments, it may be desirable to not interrupt either display refresh or touch scanning. Therefore, a scheme that can allow the sharing of the ITO2 layer without slowing down or interrupting display refresh or touch scanning (which can be taking place at the same or different rates) will now be described.

Figure 27:
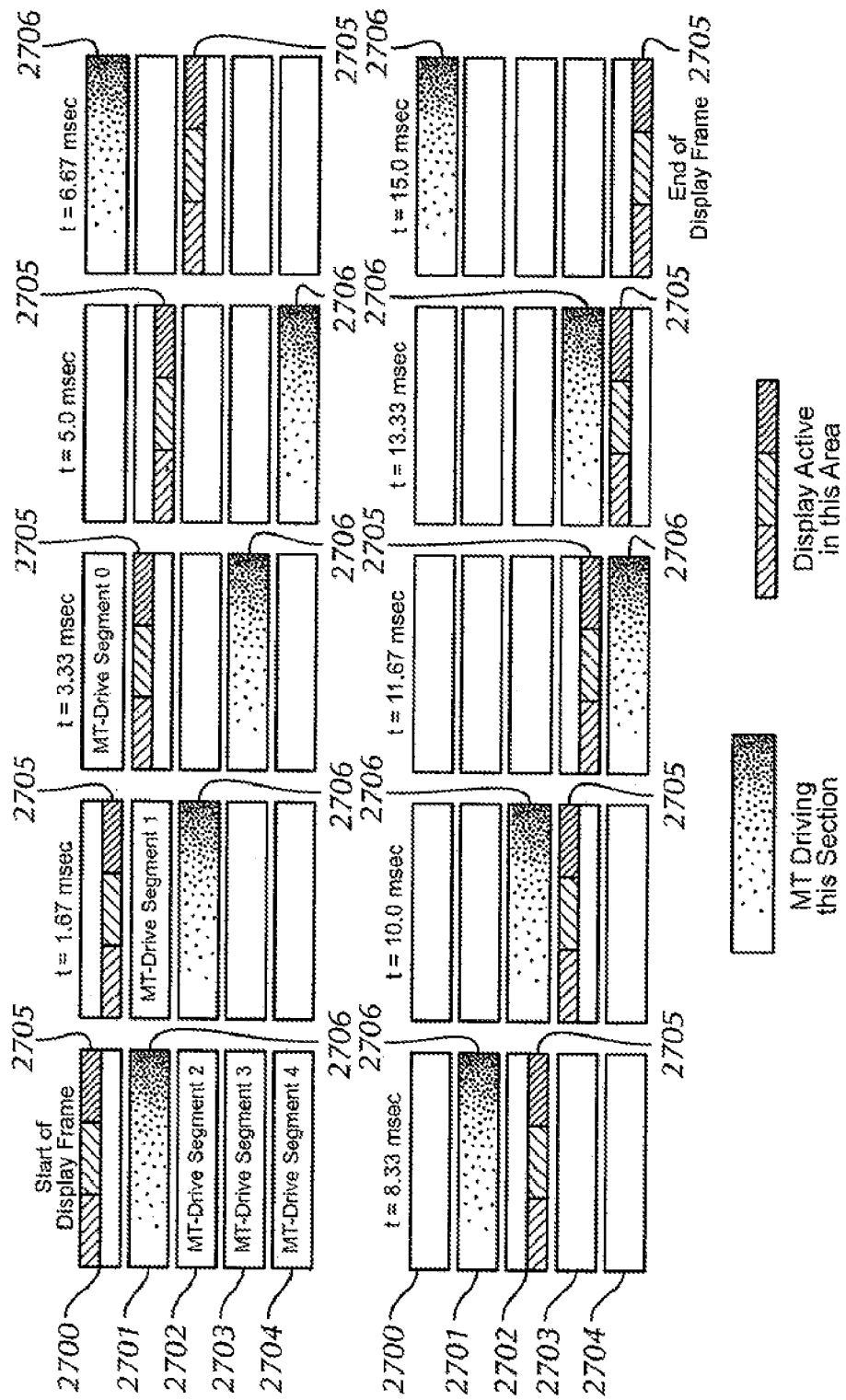
FIG. 27 illustrates a process for simultaneous display updating and touch scanning.

Simultaneous display update and touch scanning is illustrated in FIG. 27. In this example, five multi-touch drive segments 2700, 2701, 2702, 2703, 2704 are shown. Each touch drive segment can overlap M display rows. The display can be scanned at 60 frames per second while the multi-touch sensor array can be scanned at 120 times per second. The illustration shows the time evolution of one display frame lasting 16.67 msec. The area of the display currently being updated preferably should not overlap an active touch drive segment.

Patch 2705 indicates where the display rows are being updated. Patch 2706 indicates an active touch drive segment. In the upper left corner of FIG. 27, at the start of the display frame the first M/2 display lines can be refreshed. At the same time, touch drive segment 1 2701 can be driven for the purpose of touch sensing. Moving to the right in the figure, at time t=1.67 ms, the next picture shows the next M/2 display rows being refreshed, while simultaneously touch drive segment 2 2702 can be driven. After about 8.3 msec of this pattern, (start of second row) each touch drive segment can have been driven once, and half the display will have been refreshed. In the next 8.3 msec, the entire touch array can be scanned again, thus providing a scanning rate of 120 fps, while the other half of the display is updated.

Because display scanning typically proceeds in line order, touch drive segments can be driven out of sequential order to prevent an overlap of display and touch activity. In the example shown in FIG. 27, the touch drive order was 1,2,3,4,0 during the first 8.3 msec and 1,2,4,3,0 in the second 8.3 msec period. The actual ordering can vary depending on the number of touch drive segments and the number of display rows. Therefore, in general, the ability to program the order of touch drive usage may be desirable. However, for certain special cases, a fixed sequence ordering may be sufficient.

It may also be desirable (for image quality reasons) to separate the active touch drive segment farther away from the area of the display being updated. This is not illustrated in FIG. 27, but can easily be done given a sufficient number of touch drive segments (e.g., 6 or more segments).

Such techniques can effectively allow different refresh rates for the display and touch-sense elements without requiring multiplex circuitry to support a high-frequency display drive element.

1.7.1.6 Concept A: $V_{CST}$ Drive Options

As illustrated in FIG. 7, $V_{CST}$ and $V_{COM}$ can be connected together and can thus be modulated together to achieve the desired AC waveform across the LC. This can help achieve proper display refresh when using $V_{COM}$ modulation. When $V_{COM}$ is used for touch drive, it is not necessary to also modulate $V_{CST}$. This can be considered as the Open Circuit $V_{CST}$ Option, described below. However, if $V_{CST}$ is modulated with $V_{STM}$, the capacitive load on the touch drive signal, $V_{CST}$, can be reduced, which can lead to a smaller phase delay in the touch signal. This can be considered as the Drive $V_{CST}$ Option, described below.

Figure 28:
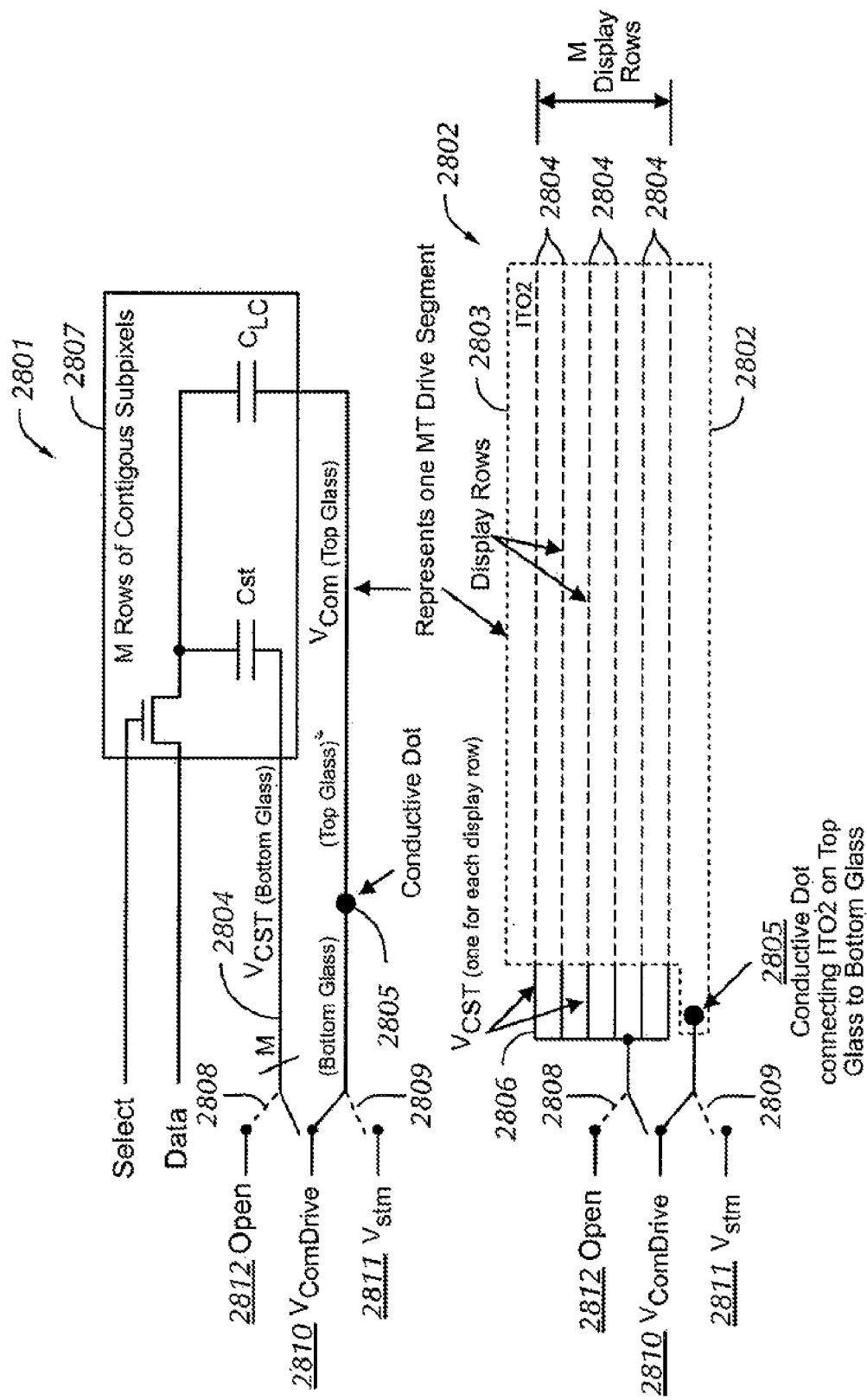
FIG. 28 illustrates an Open Circuit $V_{CST}$ touch drive option.

FIG. 28 illustrates the Open Circuit $V_{CST}$ Option. Bottom drawing 2802 illustrates how one touch drive segment 2803 can overlap M display rows 2804. Touch drive segments 2803 located on the top glass can connect electrically to circuits on the bottom glass through a conductive dot 2805. The M $V_{CST}$ lines of the M rows under the touch drive segment can connect together on the edge of the display 2806. Top drawing 2801 shows the basic circuit for a subpixel with its separate storage capacitor $C_{ST}$. Area 2807 in the upper drawing can represent M contiguous rows of subpixels covered by a single touch drive segment. Display operation and touch sensing for a particular touch drive/display group can occur at different times, as discussed above. When the display driver is ready to set the state of the subpixels in the M rows, switches 2808, 2809 can connect $V_{COM}$ Drive 2810 to the M $V_{CST}$ lines 2804 and to the touch drive segment ($V_{COM}$). The $V_{COM}$ Drive voltage can be set by the LCD driver to either ground or the supply rail, depending on the phase of the inversion. Later, when this touch drive/display group is available for touch usage, switches 2808, 2809 can connect the touch drive segment to $V_{STM}$ 2811 and disconnect $V_{CST}$ from $V_{COM}$ Drive 2810, thus leaving it in the open state 2812.

Figure 29:
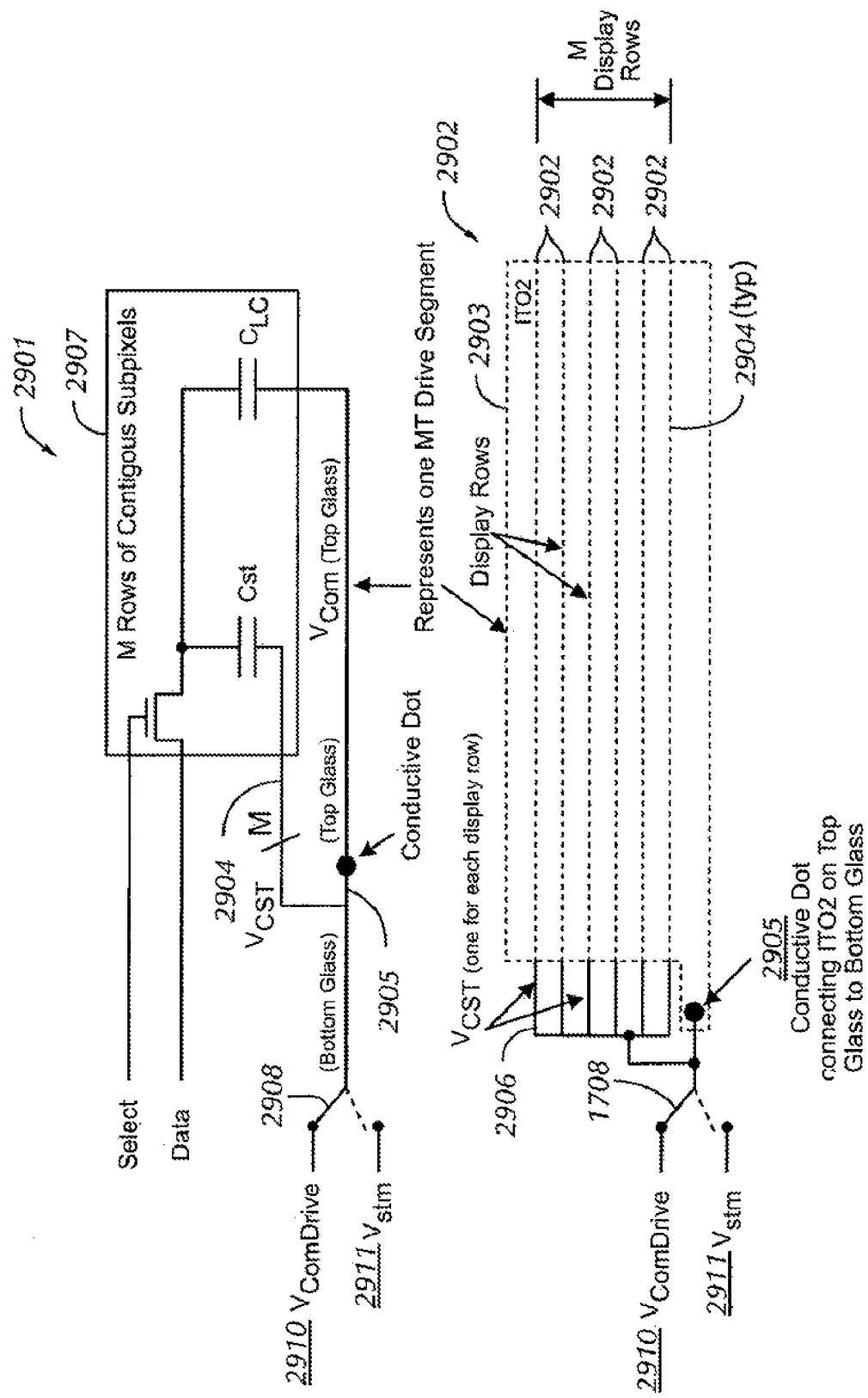
FIG. 29 illustrates a Drive-$V_{CST}$ touch drive option.

FIG. 29 illustrates the Drive-$V_{CST}$ option. Bottom drawing 2902 illustrates how one touch drive segment 2903 can overlap M display rows 2904. The touch drive segments 2903 located on the top glass can connect electrically to circuits on the bottom glass through conductive dot 2905. The M $V_{CST}$ lines of the rows under a particular touch drive segment can connect together on the edge of the display 2906. Top drawing 2901 shows the basic circuit for a subpixel having a separate storage capacitor $C_{ST}$. Area 2907 in the upper drawing can represent M contiguous rows of subpixels covered by a single touch drive segment. Display operation and touch sensing can occur at different times. When the display driver is ready to set the state of the subpixels in the M rows, switch 2908 can connect $V_{COM}$ Drive 2910 to the M $V_{CST}$ lines 2904 and to the touch drive segment ($V_{COM}$). The $V_{COM}$ Drive 2910 voltage can be set by the LCD driver to typically either ground or a supply rail depending on the phase of the inversion. Later, when this touch drive/display group is available for touch usage, switch 2908 can connect the $V_{CST}$ and the touch drive segment ($V_{COM}$) to $V_{STM}$ 2911.

1.7.1.7 Concept A: MT-Drive Capacitive Loading

The capacitive load on Concept A's touch drive line can be high, for example, because of the thin (e.g., ~4 µm) gap between the touch drive layer and the bottom glass, which can be covered by a mesh of metal routes and pixel ITO. The liquid crystals can have a rather high maximum dielectric constant (e.g., around 10).

The capacitance of the touch drive segment can affect the phase delay of the stimulating touch pulse, $V_{STM}$. If the capacitance is too high, and thus there is too much phase delay, the resulting touch signal can be negatively impacted. Analysis performed by the inventors indicates that keeping ITO2 sheet resistance to about 30 ohms/sq or less can keep phase delay within optimal limits.

1.7.1.8 Concept A: Electrical Model and $V_{COM}$-Induced Noise

Because ITO2 can be used simultaneously for both touch drive and LCD $V_{COM}$, modulating $V_{COM}$ can add noise to the touch signal.

For example, a noise component may be added to the touch signal when one touch drive segment is being modulated with $V_{COM}$ at the same time another touch drive segment is being used for touch sensing. The amount of added noise depends on the phase, amplitude, and frequency of the $V_{COM}$ modulation with respect to $V_{STM}$. The amplitude and frequency of $V_{COM}$ depend on the inversion method used for the LCD.

Figure 30:
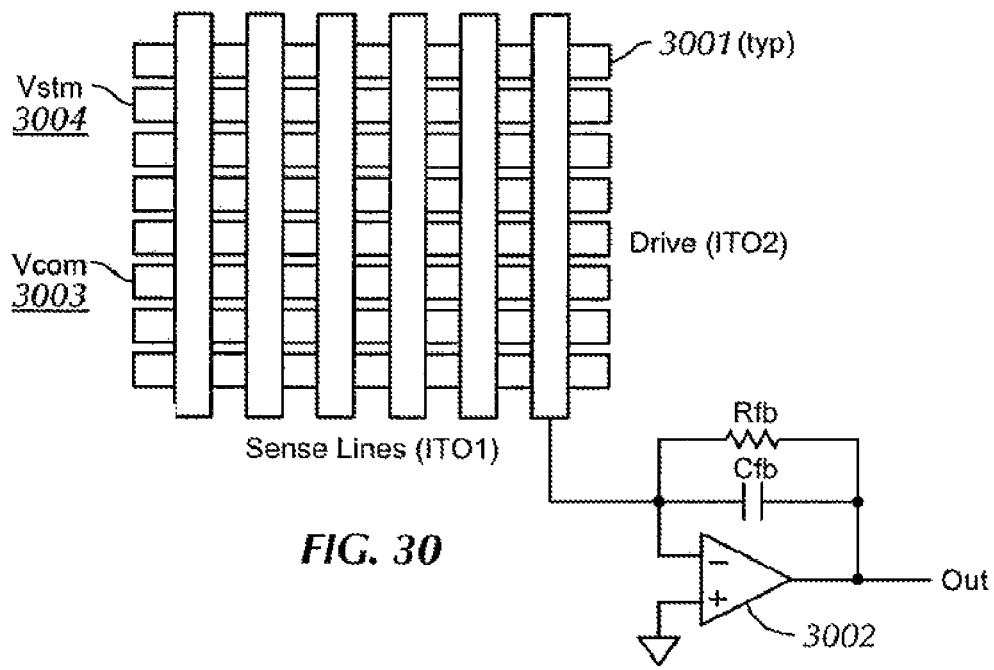
FIG. 30 illustrates an electrical model for the situation where touch drive is used for both touch sensing and LCD $V_{COM}$ modulation.

FIG. 30 shows an electrical model for the situation where touch drive 3001 is used for both touch sensing and LCD $V_{COM}$ modulation. The model shows the input path through which $V_{COM}$ modulation can add noise to the input of charge amplifier 3002.

In some embodiments, charge amplifier 3002 may need additional headroom to accommodate noise induced by $V_{COM}$ 3003. Additionally, subsequent filtering circuits (e.g., synchronous demodulators, not shown) may need to remove the noise signal due to the $V_{COM}$ modulation.

1.7.1.9 Concept A: $V_{STM}$ Effects $V_{STM}$ modulation, under certain conditions, can have a negative impact on the voltages of the subpixels underneath the touch drive segment being modulated. If the subpixel RMS voltage changes appreciably, display artifacts may be produced. One or more of the following techniques may be employed to minimize display distortion that may result.

Figure 31:
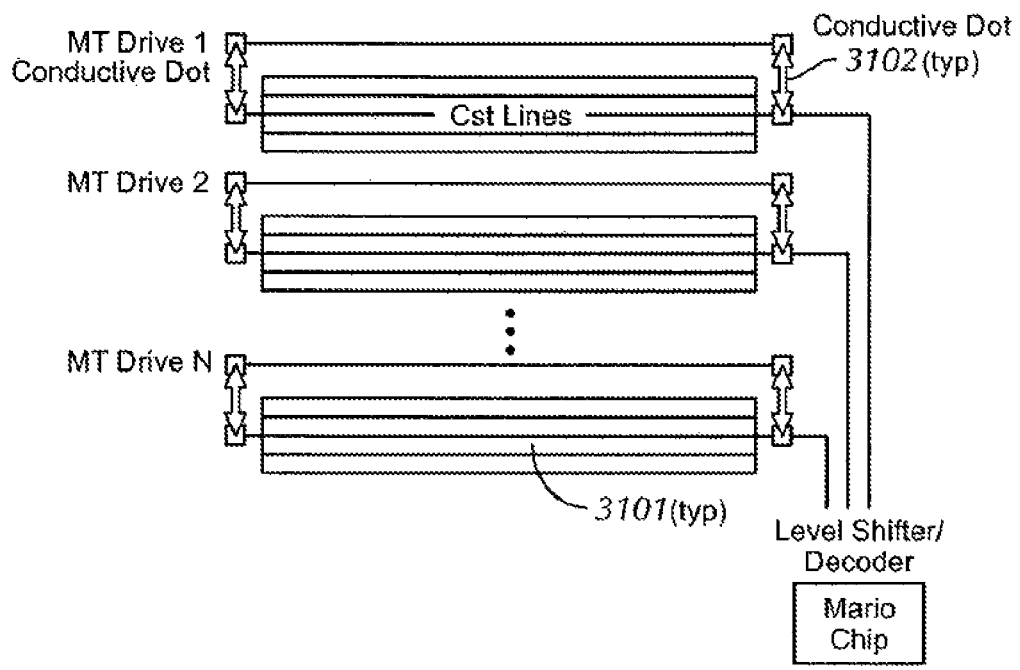
FIG. 31 illustrates connecting $V_{STM}$ to Cst lines on both sides through conductive dots.

Touch drive from two sides can reduce the distortion of the LC pixel voltage. As shown in FIG. 31, touch drive from both sides can be achieved by employing the existing low resistance $C_{ST}$ routes 3101 on the bottom glass by connecting $V_{STM}$ to $C_{ST}$ lines on both sides through conductive dots 3102. Alternatively, single-ended touch drive can produce a pixel offset voltage that is uniform for all pixels, which can be reduced or eliminated by adjusting the data drive levels. Also, reducing the ITO sheet resistance can help reduce display artifacts. Finally, the phase and frequency of $V_{STM}$ can also be tied to the phase and frequency of $V_{COM}$ to reduce the amount of noise in the touch signal.

1.7.1.10 Concept A: Impact on Manufacturing

Figure 32:
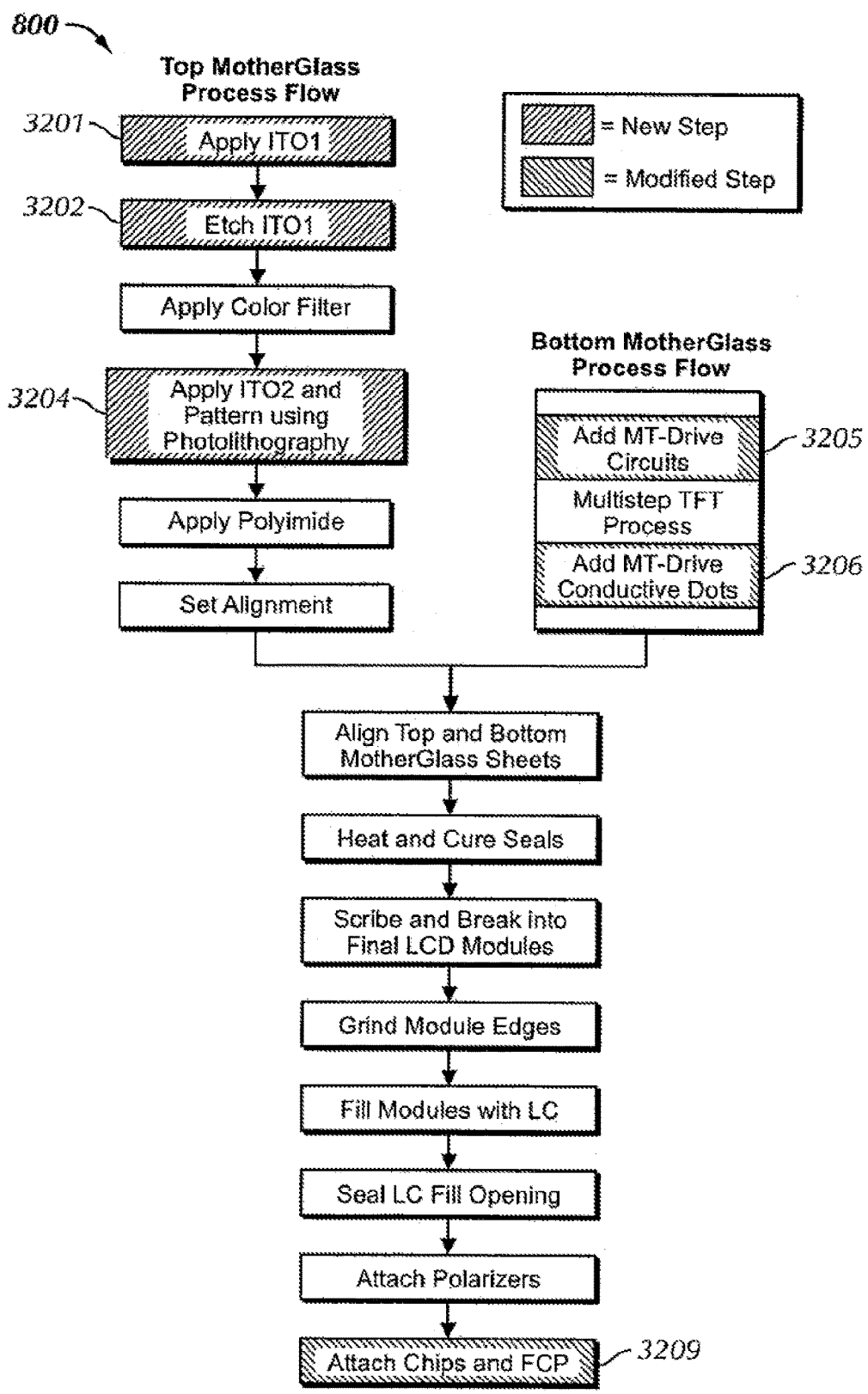
FIG. 32 illustrates a manufacturing process flow for a touch screen LCD.

The manufacturing process for Concept A can include additional steps relative to a typical LCD manufacturing process. Some may be new steps entirely and some may be modifications to existing steps. FIG. 32 shows a manufacturing process flow for Concept A. Blocks 3201, 3202, and 3204 represent new steps, and blocks 3205, 3206, and 3207 represent a modified step, both relative to a conventional LCD manufacturing processes (e.g., that of FIG. 8).

Applying and patterning ITO1 (blocks 3201, 3202) can be done using known methods. The ITO can be protected during the remainder of the LCD processing. Photoresist can be used to provide a removable protective coating. Alternatively, silicon dioxide can provide a permanent protective covering. ITO2 can be applied and patterned (block 3204) to form the touch drive segments in similar fashion.

An analysis of phase delay indicates that the sheet resistance of ITO1 and ITO2 can be as high as 400 ohms/square for small displays (<=4" diagonal), provided that the capacitive loading on either plane is small. As discussed above, the capacitive loading with Concept A can be of such magnitude that it may be desired to limit the maximum sheet resistance for ITO2 to around 30 ohms/square or less.

1.7.2 Concept A60

Figure 33:
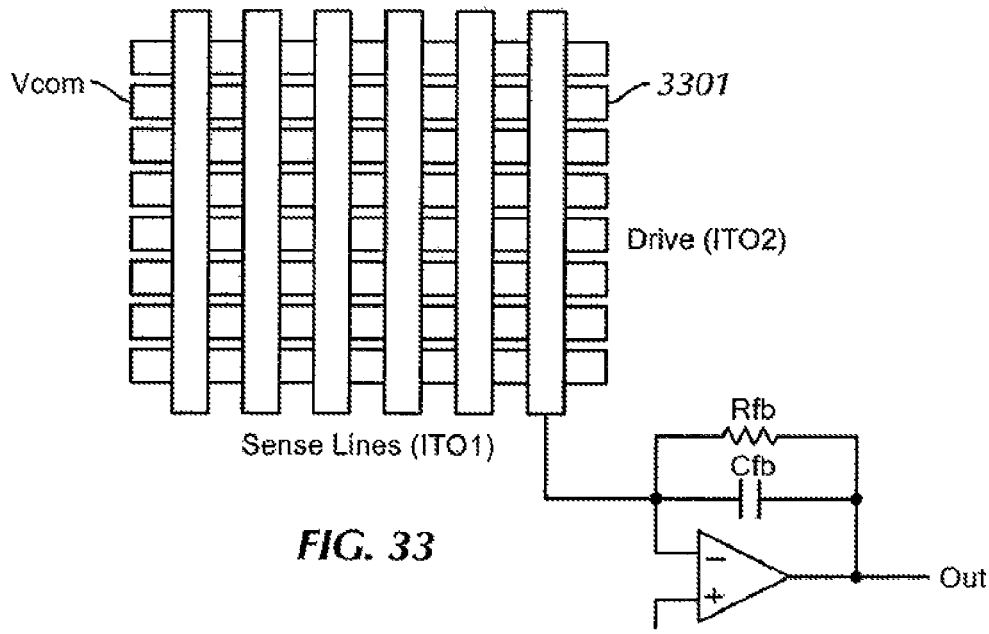
FIG. 33 illustrates using one-line inversion of $V_{COM}$ as a touch stimulus signal.

Concept A60 can be physically similar to Concept A and can provide a different approach to the problem of synchronizing display updates and touch scanning. This can be accomplished by using the 1-line inversion of $V_{COM}$ as the stimulus for the touch signal (i.e., $V_{STM}$). This is illustrated in FIG. 33, which shows how a single touch drive segment 3301 can be modulated while other touch drive segments can be held at a constant voltage. With this approach, the problem of removing the unwanted $V_{COM}$-induced noise from the touch signal can be eliminated. Furthermore, it is not necessary to spatially separate display updating and touch sensor scanning. However, using this approach, demodulation can be done at a single frequency (i.e., the $V_{COM}$ modulation frequency, e.g., ~14.4 kHz) as opposed to the multi-frequency demodulation described in U.S. patent application Ser. No. 11/381,313, titled "Multipoint Touch Screen Controller," filed May 2, 2006, incorporated by reference herein. Furthermore, using this approach, the touch sensor scan rate can be fixed at the video refresh rate (e.g., 60 per second).

1.7.3 Concept B

Figure 34:
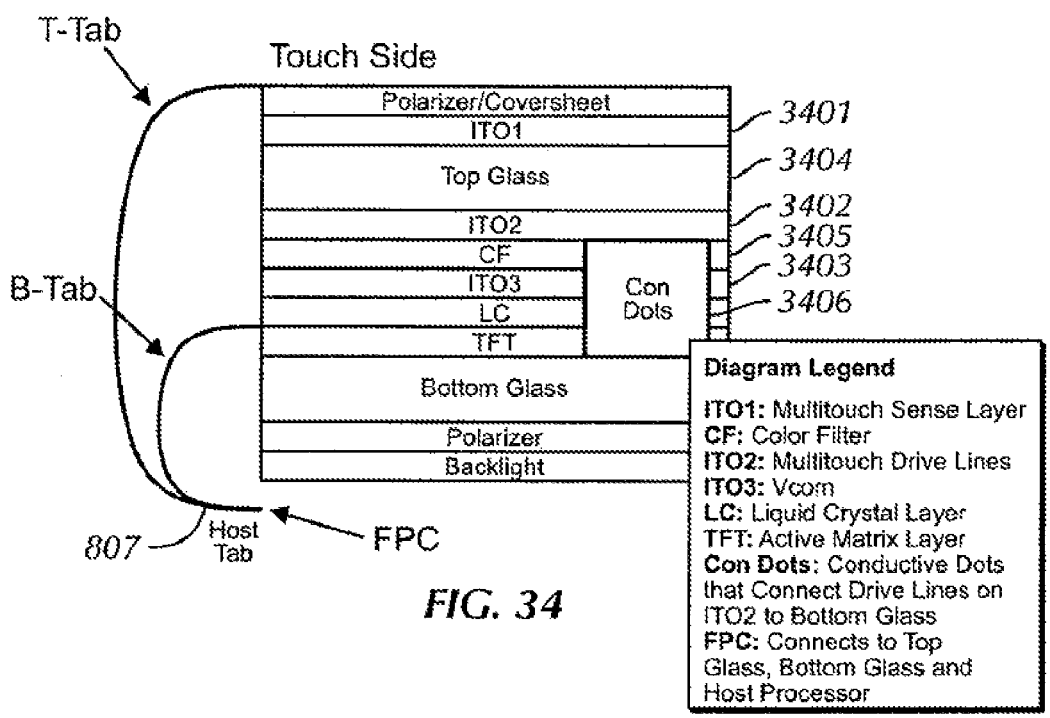
FIG. 34 illustrates a stackup diagram for an alternative embodiment of a touch screen LCD.

Concept B, illustrated in FIG. 34, can be similar to Concept A, sharing many of the same electrical, cabling, and structural aspects. However, Concept B can integrate the touch drive layer into the $V_{COM}$ layer. Concept B can therefore differ in the number and stack position of ITO layers used for LCD and touch sensing. Because of the similarities, Concept B will now be described by highlighting differences between Concepts A and B.

Concept B can split the shared ITO2 layer of Concept A into two ITO layers, using one layer for touch sensing (ITO2) 3402 and one layer for the LCD $V_{COM}$ (ITO3) 3403. Starting from the top, layers used for touch sensing can include: ITO1 3401, an ITO layer that can be patterned into N touch sense lines; ITO2 3402, an ITO layer that can be patterned into M touch drive lines; and ITO3 3403, an ITO layer that can serve as the $V_{COM}$ electrode for the LCD. Touch drive layer (ITO2) 3402 can be deposited on the lower surface of top glass 3404, above the color filter 3405.

Separating $V_{COM}$ from touch drive elements can reduce interference.

1.7.3.1 Concept B: Touch Sensor Electrodes

Concept B can include touch sensor electrodes substantially similar to those described above for Concept A.

1.7.3.2 Concept B: Conductive Dots

As in Concept A, Concept B can use additional conductive dots 3406, which can be located in the corners of the LCD, to connect the touch drive segments to dedicated circuitry. Because $V_{COM}$ need not be shared with touch sensing, Concept B can retain the corner dots that connect $V_{COM}$ to its drive circuitry. Additionally (as discussed below), Concept B may add even more conductive dots for $V_{COM}$.

1.7.3.3 Concept B: Flex Circuit and Touch/LCD Driver IC

Concept B can use a FPC and Touch/LCD Driver IC substantially similar to those described for Concept A.

1.7.3.4 Concept B: Synchronization with LCD Scanning

For Concept B, although the $V_{COM}$ layer can be separate from the touch drive layer, it still may be desired to synchronize touch scanning with LCD updating to physically separate the active touch drive from the display area being updated. The synchronization schemes previously described for Concept A can also be used for Concept B.

1.7.3.5 Concept B: MT-Drive Capacitive Loading

As with Concept A, the capacitive load on Concept B's touch drive line can be high. The large capacitance can be due to the thin (e.g., ~5 μm) dielectric between touch drive (ITO2) 3402 and $V_{COM}$ plane (ITO3) 3403. One way to reduce undesirable phase delay in the touch stimulus signal can be to lower the ITO drive line resistance through the addition of parallel metal traces. Phase delay can also be reduced by decreasing the output resistance of the level shifter/decoder.

1.7.3.6 Concept B: Electrical Model and $V_{COM}$-Induced Noise

Because the entire $V_{COM}$ plane can be coupled to the touch drive layer, multi-touch charge amplifier operation may be disrupted by noise induced by $V_{COM}$ modulation. To mitigate these effects Concept B can have a constant $V_{COM}$ voltage.

Conversely, the coupling between ITO2 3402 and ITO3 3403 ($V_{COM}$ and touch drive) can cause interference with the $V_{COM}$ voltage that can cause the wrong data voltage can be stored on the LC pixel. To reduce the modulation of $V_{COM}$ by $V_{STM}$, the number of conductive dots connecting $V_{COM}$ to the bottom glass can be increased. For example, in addition to $V_{COM}$ dots at each corner of the viewing area, conductive dots can be placed at the middle of each edge.

Distortion resulting from $V_{COM}$-$V_{STM}$ coupling can be further reduced by synchronizing $V_{STM}$ with $V_{COM}$ and turning off the pixel TFT at just the right time. For example, if the line frequency is 28.8 kHz, and the touch drive frequency is a multiple of this (e.g., 172.8, 230.4 and 288 kHz) then the $V_{COM}$ distortion can have the same phase relationship for all pixels, which can reduce or eliminate visibility of the $V_{COM}$ distortion. Additionally, if the gates of the pixel TFTs are turned off when the distortion has mostly decayed, the LC pixel voltage error can be reduced. As with Concept A, the phase and frequency of $V_{STM}$ can be tied to the phase and frequency of $V_{COM}$ to reduce the amount of noise in the touch signal.

1.7.3.7 Concept B: Impact on Manufacturing

Figure 35:
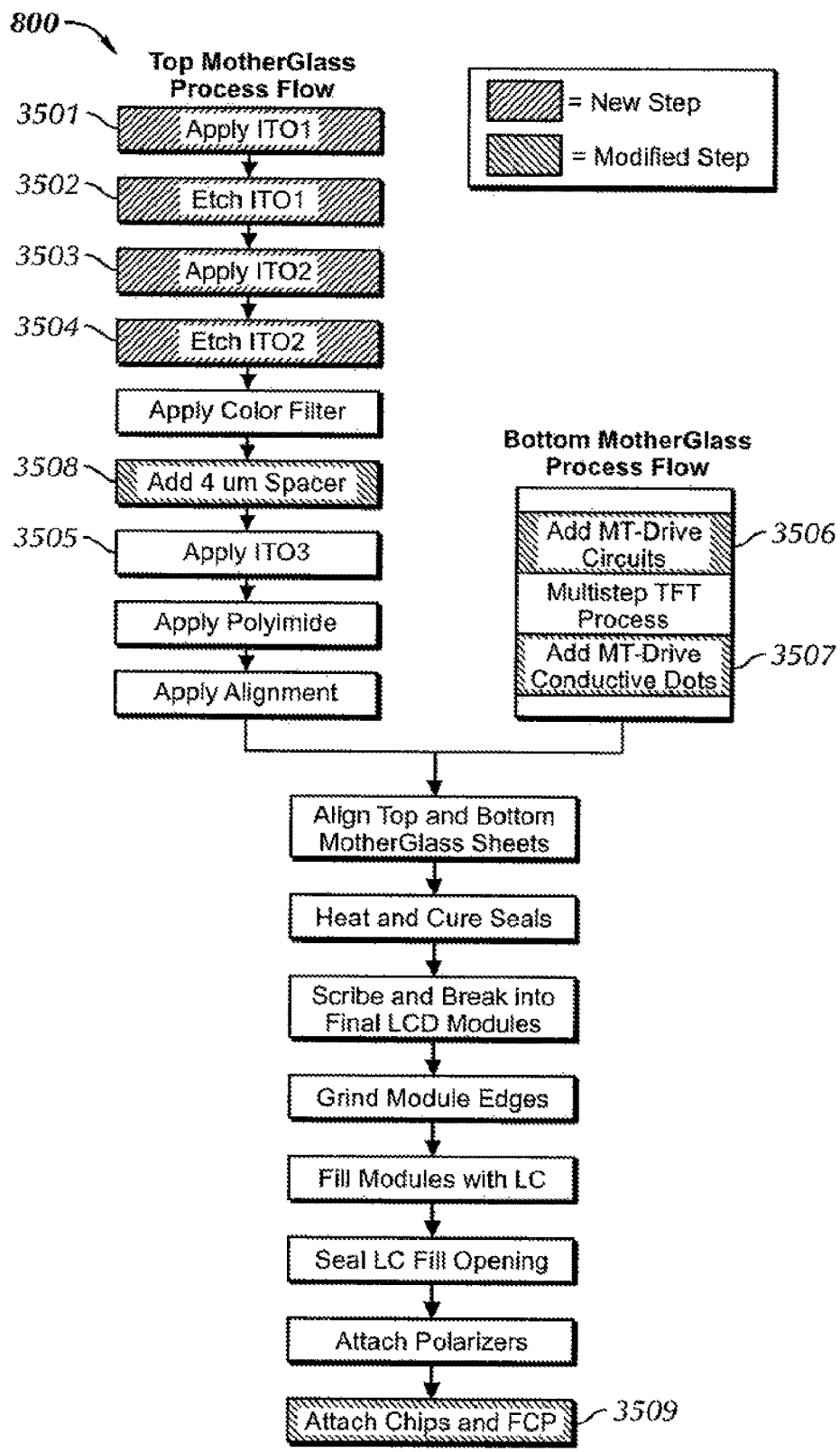
FIG. 35 illustrates a manufacturing process flow for a touch screen LCD.

As with Concept A, Concept B can also add steps to the LCD manufacturing process. FIG. 35 shows a manufacturing process flow for Concept B, in which blocks 3501, 3502, 3503, and 3504 represent new steps relative to a conventional LCD manufacturing process (e.g., that depicted in FIG. 8), and blocks 3506, 3507, 3508, and 3509 represent a modification to an existing step (e.g., also relative to FIG. 8).

ITO1 can be applied (block 3501) and patterned (block 3502) using known methods, as with Concept A. The sheet resistance of ITO1 and ITO2 can also be substantially similar to that described for Concept A. For Concept B, the ITO2 layer deposition (block 3503) can be routine because it can be directly applied to glass. Electrical access between the ITO2 layer and the bottom glass for the conductive dots that connect to the touch drive segments can be easily accomplished by etching using a shadow mask (block 3504).

ITO3 (e.g., the LCD's $V_{COM}$ layer), which can have a sheet resistance between 30 and 100 ohms/square, can also be applied (block 3505) using conventional methods. However, as discussed above, $V_{COM}$ voltage distortion can be reduced by reducing the resistance of the ITO3 layer. If necessary, lower effective resistance for ITO3 can be achieved by adding metal traces that run parallel to the touch drive segments. The metal traces can be aligned with the black matrix so as to not interfere with the pixel openings. The density of metal traces can be adjusted (between one per display row to about every 32 display rows) to provide the desired resistance of the $V_{COM}$ layer.

1.7.4 Concept B'

Concept B' can be understood as a variation of Concept B that eliminates the ITO2 drive layer and instead uses a conductive black matrix (e.g., a layer of $CrO_2$ below the top glass) as the touch drive layer. Alternatively, metal drive lines can be hidden behind a black matrix, which can be a polymer black matrix. This can provide several benefits, including: (1) eliminating an ITO layer; (2) reducing the effect of $V_{STM}$ on the $V_{COM}$ layer; and (3) simplifying the manufacturing process. The manufacturing process can be simplified because using the black matrix for touch drive can eliminate the need to pattern an ITO layer above the color filter.

Figure 36:
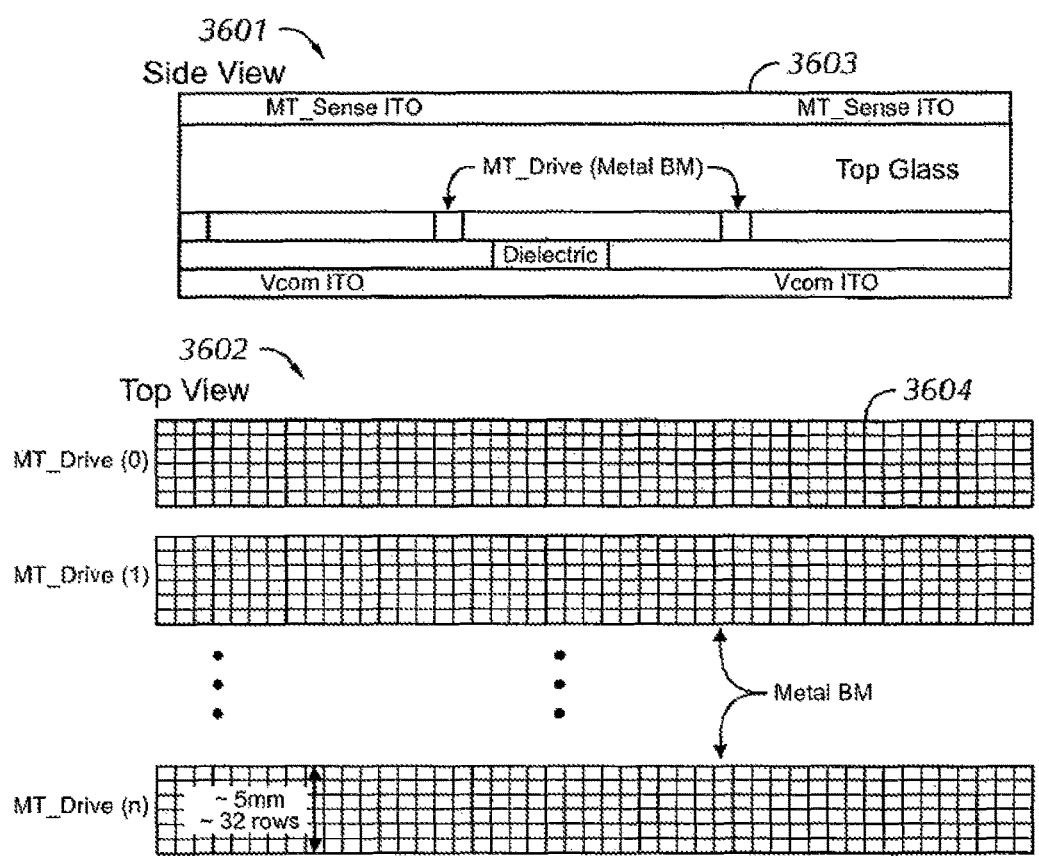
FIG. 36 illustrates an embodiment substituting a conductive black matrix for a touch drive layer.

FIG. 36 shows a side view 3601 and top view 3602 of Concept B'. As can be seen, side view 3601 looks very much like a standard LCD stack-up, except for the top layer of ITO 3603 used for touch sensing. The bottom diagram of FIG. 36 shows how the black matrix 3604 can be partitioned into separate touch drive segments. The mesh pattern can follow the pattern of a conventional black matrix, except that each drive segment can be electrically isolated from the other segments. To compensate for reduced touch signal strength that can be caused by using the black matrix mesh for touch drive, the charge amp gain can be increased (e.g., about 4×).

Because the touch sensing layer may not be shielded from the $V_{COM}$ layer, $V_{COM}$ modulation may interfere with the touch signal. Furthermore, touch drive may still interfere with the $V_{COM}$ voltage. Both of these issues can be addressed by segmenting the $V_{COM}$ layer as described with Concept A and/or spatially separating display updating and touch sensing as described above. A constant $V_{COM}$ voltage can also be used to address these issues.

1.7.5 Concept K

Figure 37:
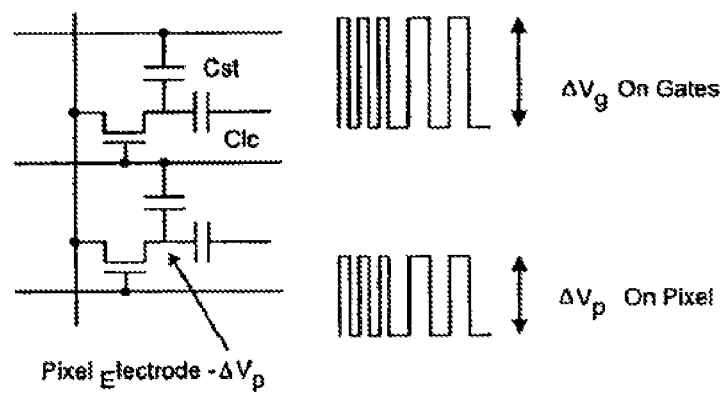
FIG. 37 illustrates a circuit diagram for an embodiment of a touch screen LCD.

Concept K is illustrated in FIGS. 37 (circuit diagram) and 38 (stackup diagram). Concept K utilizes the fact that select pulses in the TFT LCD can be partially transferred to the pixel ITO when the $C_{ST}$-on-gate configuration is used.

Figure 38:
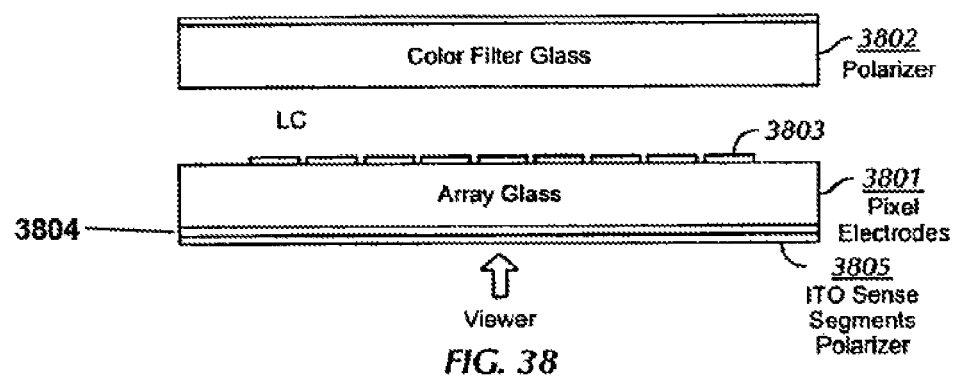
FIG. 38 illustrates a stackup diagram for a touch screen LCD.

As shown in the display stackup of FIG. 38, the viewer can face active array plate 3801 rather than CF plate 3802. ITO pixels 3803 on the active array can provide the $V_{STM}$ pulses for the touch sensor, with the display rows alternatively being used for $V_{STM}$ pulses and for display addressing. ITO sense layer 3804 on plastic polarizer 3805 can be laminated to the back of array plate 3801 to provide the touch-sensing layer. A thin glass layer (e.g., 0.2 mm) can help improve the signal-to-noise ratio.

Figure 39:
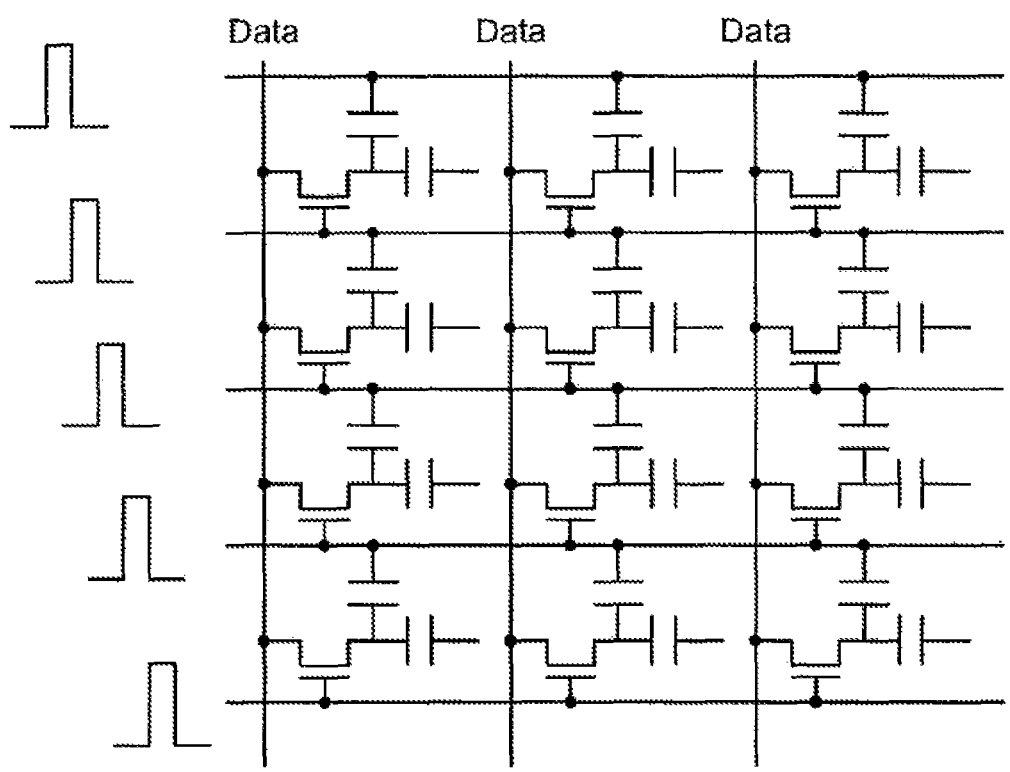
FIG. 39 illustrates a row-by-row update of display pixels for a touch screen LCD.
Figure 40:
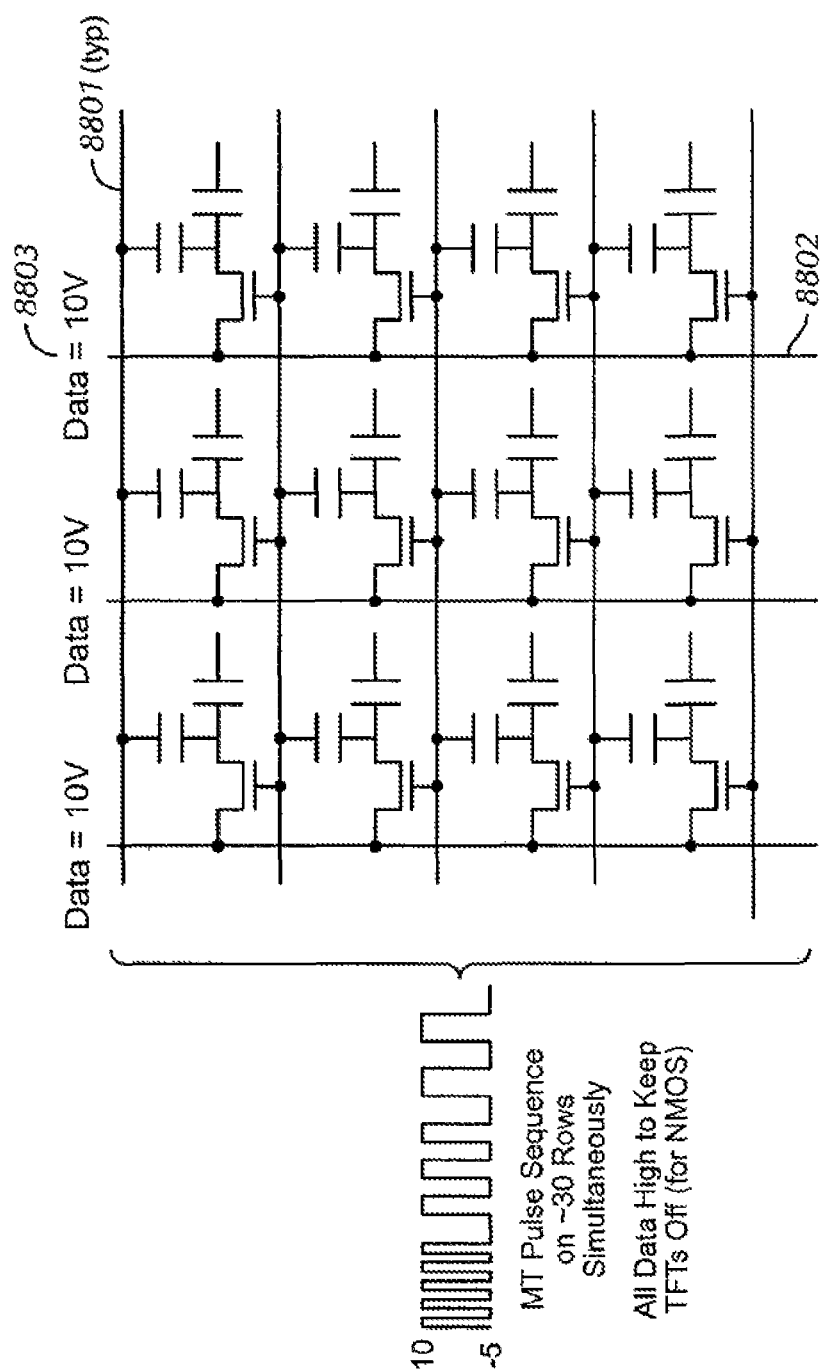
FIG. 40 illustrates a touch sensing process for a set of touch-sensitive display rows in a touch screen LCD.

During display updates, rows can be selected individually to update the pixel data (as shown in FIG. 39). To generate $V_{STM}$ for touch sensing, multiple rows 4001 can be selected simultaneously, while high data voltage 4003 can be applied to the column lines 4002 to keep the TFTs off (as shown in FIG. 40). The column driver can adjust the timing of data signals from a display memory to accommodate the touch drive intervals.

Figure 41:
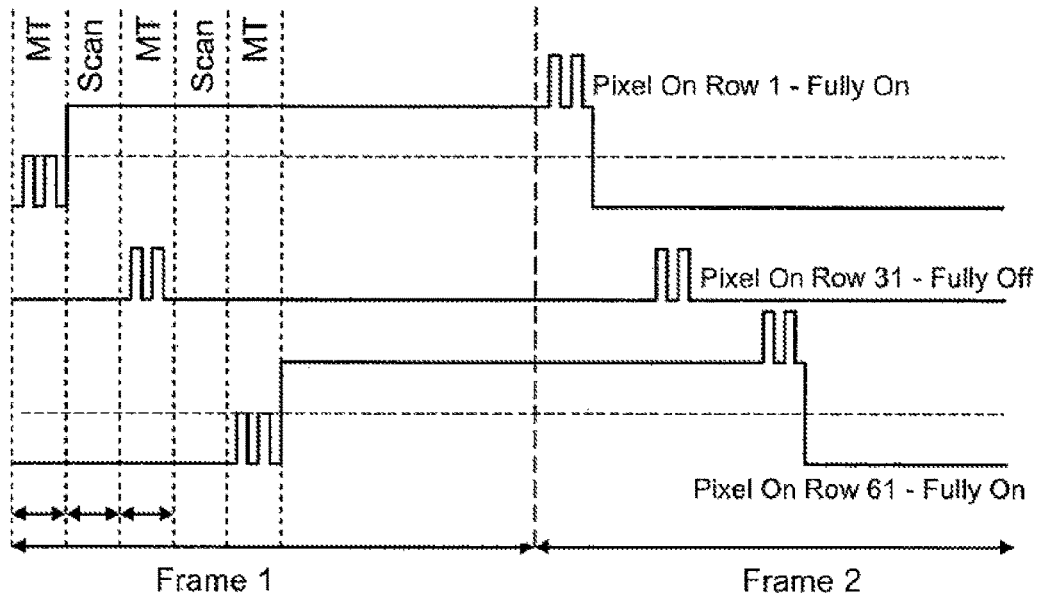
FIG. 41 illustrates a process of detecting touches for three pixels located in different regions of a touch screen LCD.

In one embodiment, a touch pulse sequence can simultaneously pulse about 30 rows 4001 during a touch scan interval. FIG. 41 shows the effect of a touch drive pulse ($V_{STM}$) on the subpixel voltages of the LCD. The added voltage from the $V_{STM}$ pulses can be compensated by a DC offset of $V_{COM}$ and/or gamma correction of the display data grey levels.

Concept K can allow a number of advantages. Because the display pixels and touch sensors share drive circuitry, the level shifter/decoder may be eliminated. Additionally, a conventional CF plate can be used. Furthermore, no extra conductive dots between the top and bottom glass are needed. Busline reflections may increase the reflectance (R) for portions of the display, and hence call for the use of an extra film under the buslines (such as CrO under Cr) that can reduce R.

1.7.6 Concept X'

Figure 42:
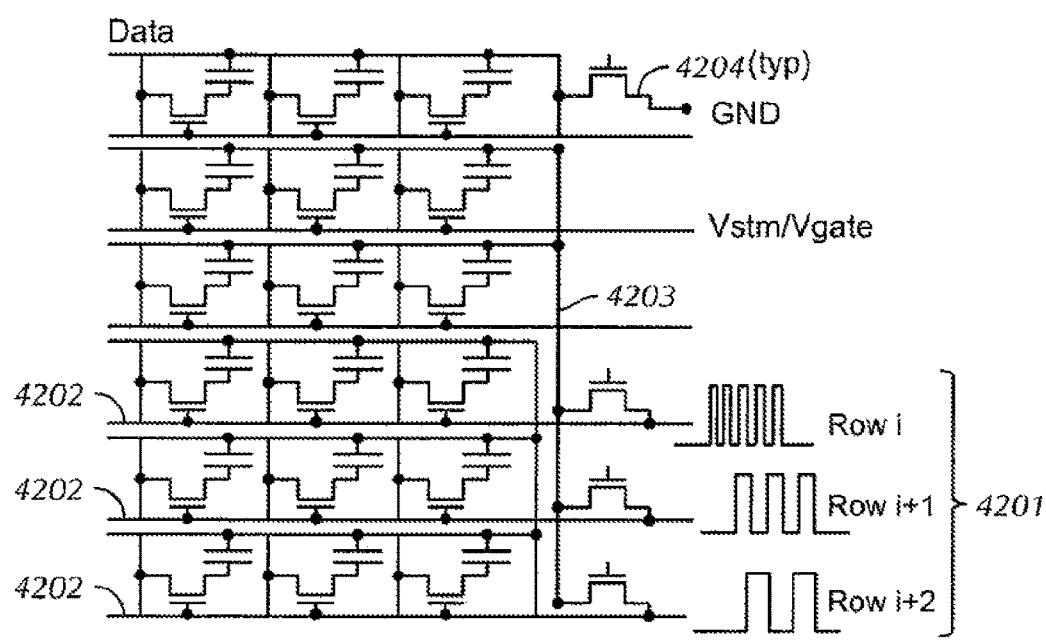
FIG. 42 illustrates a circuit diagram of another embodiment of a touch screen LCD.
Figure 43:
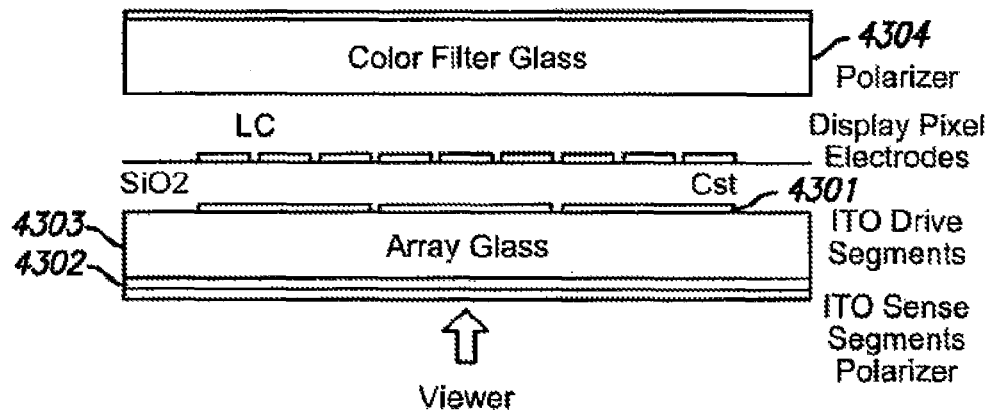
FIG. 43 illustrates a stack up diagram of the embodiment illustrated in FIG. 42.

Concept X' is illustrated in FIG. 42 (circuit diagram) and FIG. 43 (stackup diagram). Concept X' utilizes the fact that $V_{STM}$ pulses can be similar to gate pulses for the TFT pixel switches (e.g., a 15 to 18 V swing). In Concept X', the touch drive segments 4301 can be part of the LTPS active array and can form the counter electrode for the pixel storage capacitors $C_{ST}$. $C_{ST}$ can be formed between two ITO layers 4301, 4302. In this embodiment, the active array plate 4303, rather than the color filter plate 4304 can be on the user side of the display.

As shown in FIG. 42, a pulse sequence with three different frequencies 4201 for $V_{STM}$ can be shared by three rows of pixels 4202 to select those rows. The ITO touch drive segments 4203 can be patterned under a set of rows adjacent to addressed rows. Touch drive segments 4203 can be connected to GND by TFTs 4204 when not connected to $V_{STM}$.

Changes that can be made to the processing steps to construct Concept X' can include the following. First, a patterned sense ITO can be added on the outside of the array substrate. Second, $SiO_2$ protection can be added on the sense ITO during LTPS processing. Protective resist could also be used. Third, touch drive ITO can be deposited and patterned under the $SiO_2$ barrier layer (which can be found in typical LTPS processes) for the LTPS array. Finally, vias can be patterned in the barrier $SiO_2$ to contact the touch drive ITO layer. This step can be combined with a subsequent process step.

Concept X' can allow a number of advantages. For example, because the display and touch sensors share drive circuitry, the level shifter/decoder chip can be eliminated. Additionally, no change to the CF plate is required, so conventional color filter processing can be used. Further, because the storage capacitor $C_{ST}$ can be located between two ITO layers, high transmittance can be achieved. Another advantage can be that extra conductive dots between the array plate 4303 and CF plate 4304 may be eliminated.

1.8 Fully-Integrated Touch-Sensing

A third set of embodiments of the present invention fully integrate the touch-sensing elements inside the LCM. As with partially-integrated touch-sensing, existing layers in the LCM can serve double duty to also provide touch-sensing functionality, thereby reducing display thickness and simplifying manufacturing. The fully-integrated touch-sensing layers can also be protected between the glass layers.

In some embodiments, the fully-integrated LCD can include a $V_{COM}$ layer similar to those described in previous embodiments. In other embodiments, the fully-integrated touch-sensing LCD can include in-plane-switching (IPS) LCD constructions, which are described in further detail in the following sections.

1.8.1 Fully-Integrated $V_{COM}$-Based LCDs 1.8.1.1 Concept A'

Concept A' can be considered as a variation of Concept A that eliminates the ITO sense layer (ITO1 2001 in FIG. 20) in favor of a conductive black matrix layer (below the top glass) used as the touch sense layer. Alternatively, metal sense lines can be hidden behind a black matrix, which can be a polymer black matrix. As a result, Concept A' can also eliminate the T-tab on the FPC and the corresponding bonding to the top glass. Touch sense lines can be routed through conductive dots to the bottom glass and can directly connect to the Touch/LCD Driver chip. Furthermore, the FPC can be a standard LCD FPC. Elimination of manufacturing steps and components can lead to a reduction in cost compared to Concepts A and B.

Figure 44:
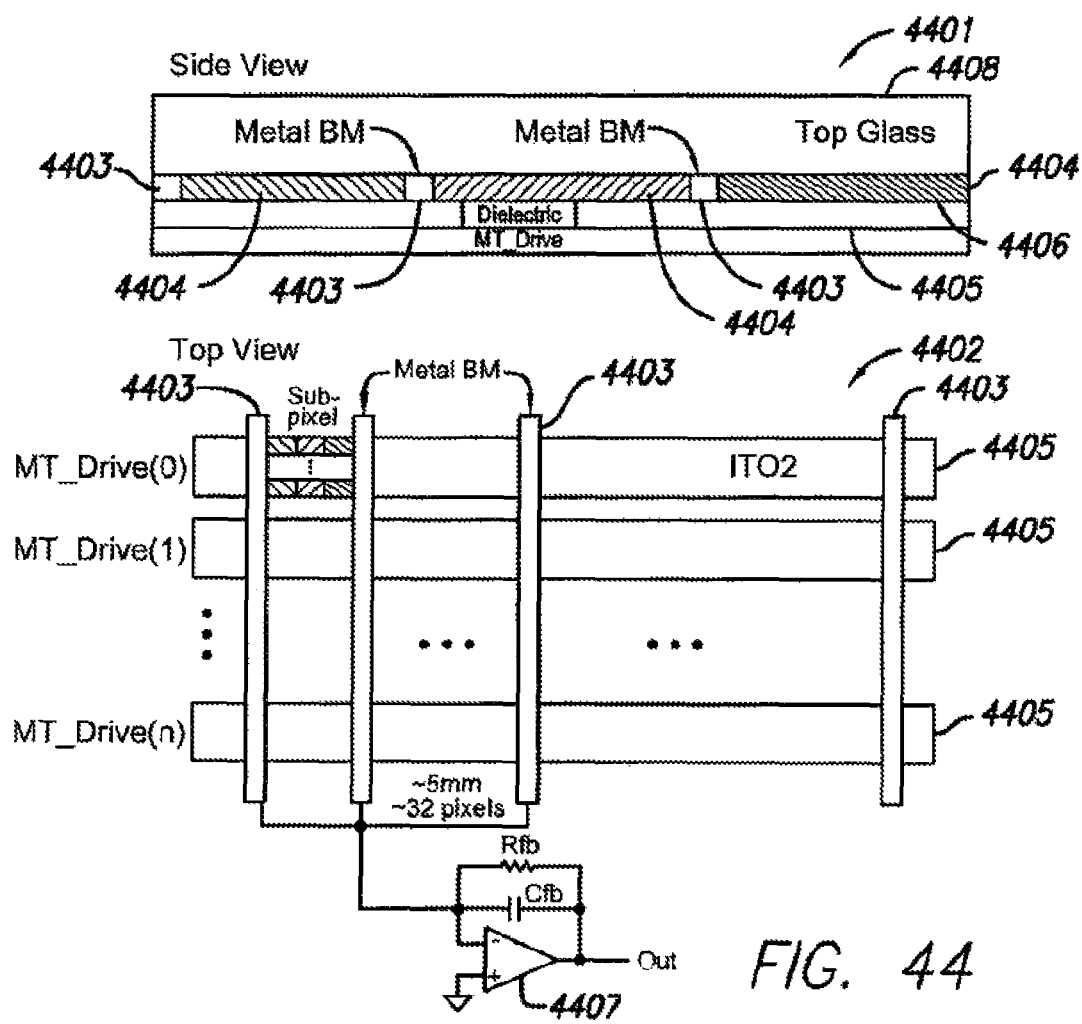
FIG. 44 illustrates an embodiment substituting a conductive black matrix for a touch sense layer.

FIG. 44 shows one way substitution of a conductive black matrix for the touch sense layer can be accomplished. FIG. 44 includes a side view 4401 of the upper portion of a single pixel with its black matrix 4403 running between primary color sections 4404. Touch drive segment 4405 can be separated from black matrix lines 4403 by planarizing dielectric layer 4406. FIG. 44 also shows top view 4402 of the display with black matrix lines 4403 running vertically. Approximately 96 black matrix lines (e.g., 32 pixels worth) can connect together into the negative terminal of charge amplifier 4907. Touch drive segments 4405 can be driven as described above. A finger approaching top glass 4408 can perturb the electric field between vertical black matrix lines 4403 and touch drive segment 4405. The perturbation can be amplified by charge amplifier 4407 and further processed as described elsewhere herein.

Because of the depth of touch sense lines 4403 in the display, the minimum distance between a finger or touch object and sense lines 4403 may be limited. This can decrease the strength of the touch signal. This can be addressed by reducing the thickness of layers above the touch sense layer, thereby allowing a closer approach of the finger or other touch object to the sense lines.

1.8.1.2 Concept X

Figure 45:
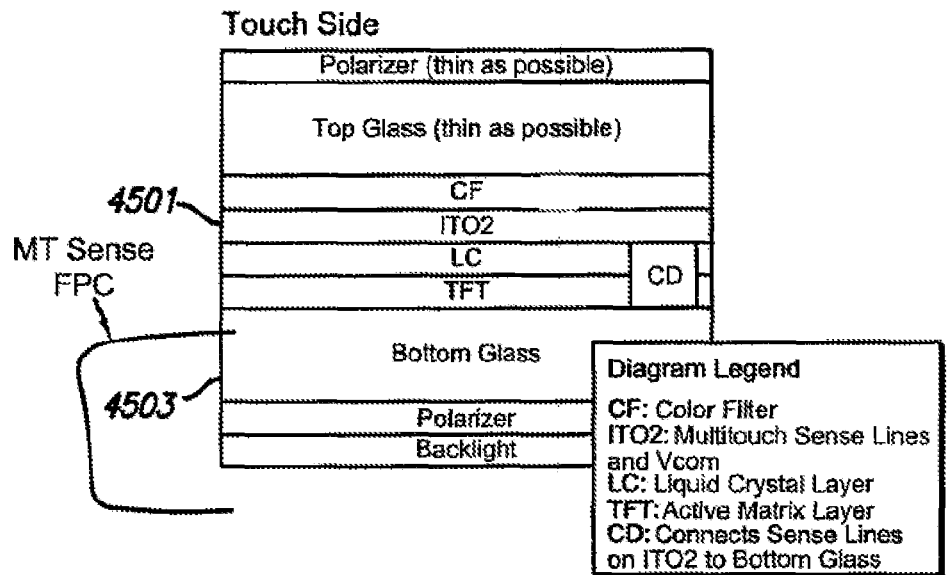
FIG. 45 illustrates a stackup diagram of another embodiment of a touch screen LCD.
Figure 46:
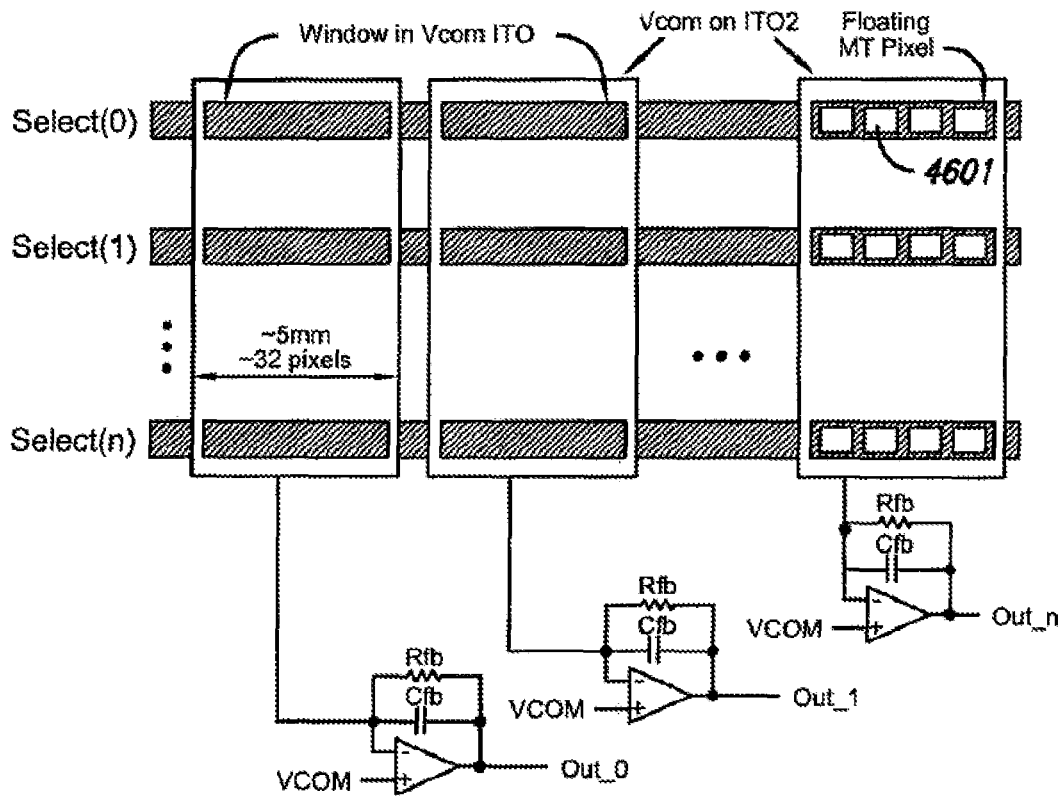
FIG. 46 illustrates a top view of the embodiment illustrated in FIG. 55.

Concept X is illustrated in FIGS. 45 and 46. The stack-up for Concept X, shown in FIG. 45, can be basically identical to that of a standard LCD. Touch sense layer 4501 can be embedded within the $V_{COM}$ layer (ITO2), which can serve the dual purpose of providing the $V_{COM}$ voltage plane and acting as the output of the touch sensor. The touch drive layer can also be embedded within an existing LCD layer. For example, touch drive can be located on bottom glass 4503 and can be part of the LCD select line circuitry (see FIG. 5). The select circuit can thus serve a dual purpose of providing gate signals for the subpixel TFTs and the touch drive signal $V_{STM}$ FIG. 46 is a top view of Concept X showing one possible arrangement of the touch sense layer with its floating pixels 4601 embedded in the $V_{COM}$ layer.

1.8.1.3 Concept H

Concept H is illustrated in FIGS. 47-50. Concept H need not include any ITO outside the top glass or plastic layer of the display. As a result, the manufacturing processes can be very similar to existing display manufacturing processes.

Figure 47:
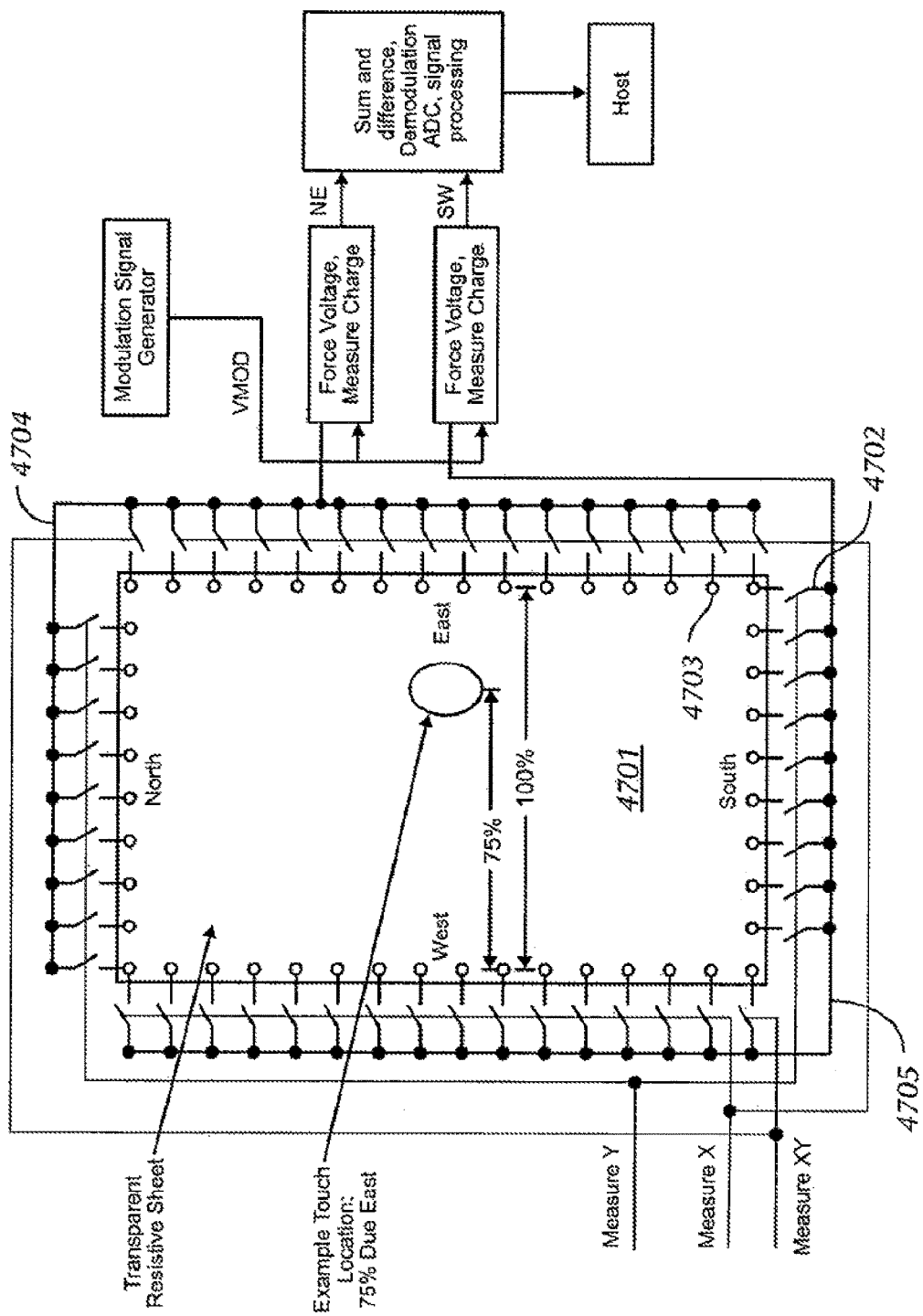
FIG. 47 illustrates another embodiment of a touch screen LCD.

As shown in FIG. 47, the touch-sensing part of the screen can be a transparent resistive sheet 4701, for example, a glass or plastic substrate having an unpatterned layer of ITO deposited thereon. The $V_{COM}$ layer of the display may be used for this touch-sensing part. Because this layer need not be patterned, a photolithography step can be eliminated from the manufacturing process as compared to some embodiments discussed above. For purposes of reference herein, the sides will be referred to as north, south, east, and west as indicated in the drawing.

A plurality of switches 4702 can be arranged about the perimeter of the resistive sheet. These switches can be implemented as TFTs on glass. Also shown are a plurality of conductive dots 4703, at each switch location, that can connect $V_{COM}$ (on the top glass) to the TFT layer on the bottom glass, in the border region of the display. Switches 4702 can be connected together into two busses, for example, with the north and east switches connected to one bus 4704 and the south and west switches connected to a second bus 4705.

For touch sensing, switch 4702 can be operated as follows. The north and south switches can be used to measure the Y-direction capacitance. The left and right side switches can be used to measure the X-direction capacitance. The switches at the northeast and southwest corners can be used for both X and Y measurement. Capacitance can be measured by stimulating resistive sheet 4701 with a modulation waveform $V_{MOD}$, illustrated in FIG. 49. The current (i.e., charge) required to drive the sheet to the desired voltage can be measured and used to determine the location of the touch.

Figure 49:
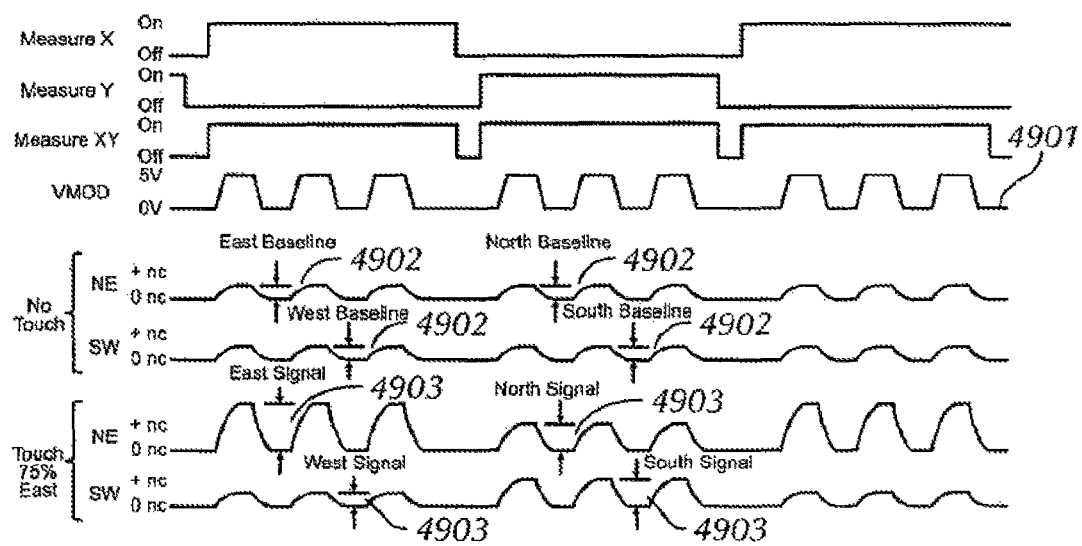
FIG. 49 illustrates the waveforms that can be used for touch sensing in the embodiment of FIGS. 47-48.

Specifically, as illustrated in the waveforms for FIG. 49, in the absence of touch, the baseline capacitances 4902 can indicate the current (charge) required to stimulate the sheet 4701 to the $V_{MOD}$ voltage. In the presence of touch, greater current 4903 (charge) may be required because of the capacitance of the finger. This greater current is illustrated in the lower group of waveforms. The position of the touch can then be determined by simple mathematical combination of the baseline and signal waveforms as illustrated in FIG. 49.

Figure 48:
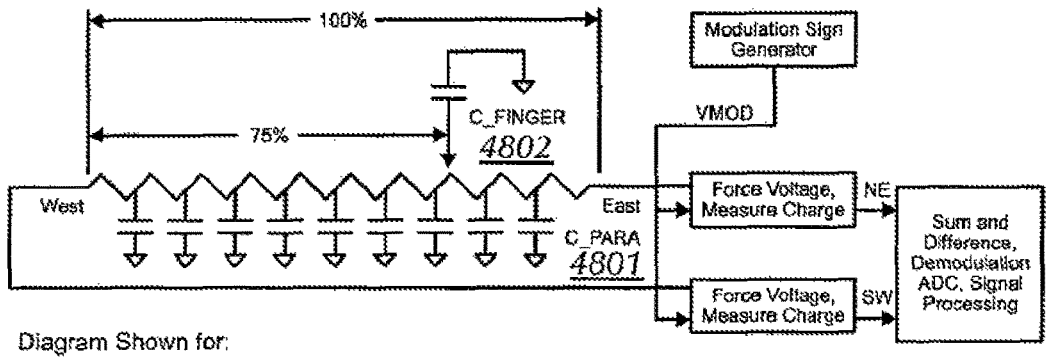
FIG. 48 illustrates an equivalent circuit of the embodiment of FIG. 47.

An equivalent circuit for the touch screen during the X-direction (i.e., east-west) measurement is illustrated in FIG. 48. C_PARA 4801 can be the distributed parasitic resistance of the sheet, and C_FINGER 4802 can be the capacitance of a touch, e.g., located approximately 75% of the way to the east side. The block diagrams indicate how the plate can be driven to $V_{MOD}$ and how the charge can be measured, combined, processed, and sent to the host.

Figure 50:
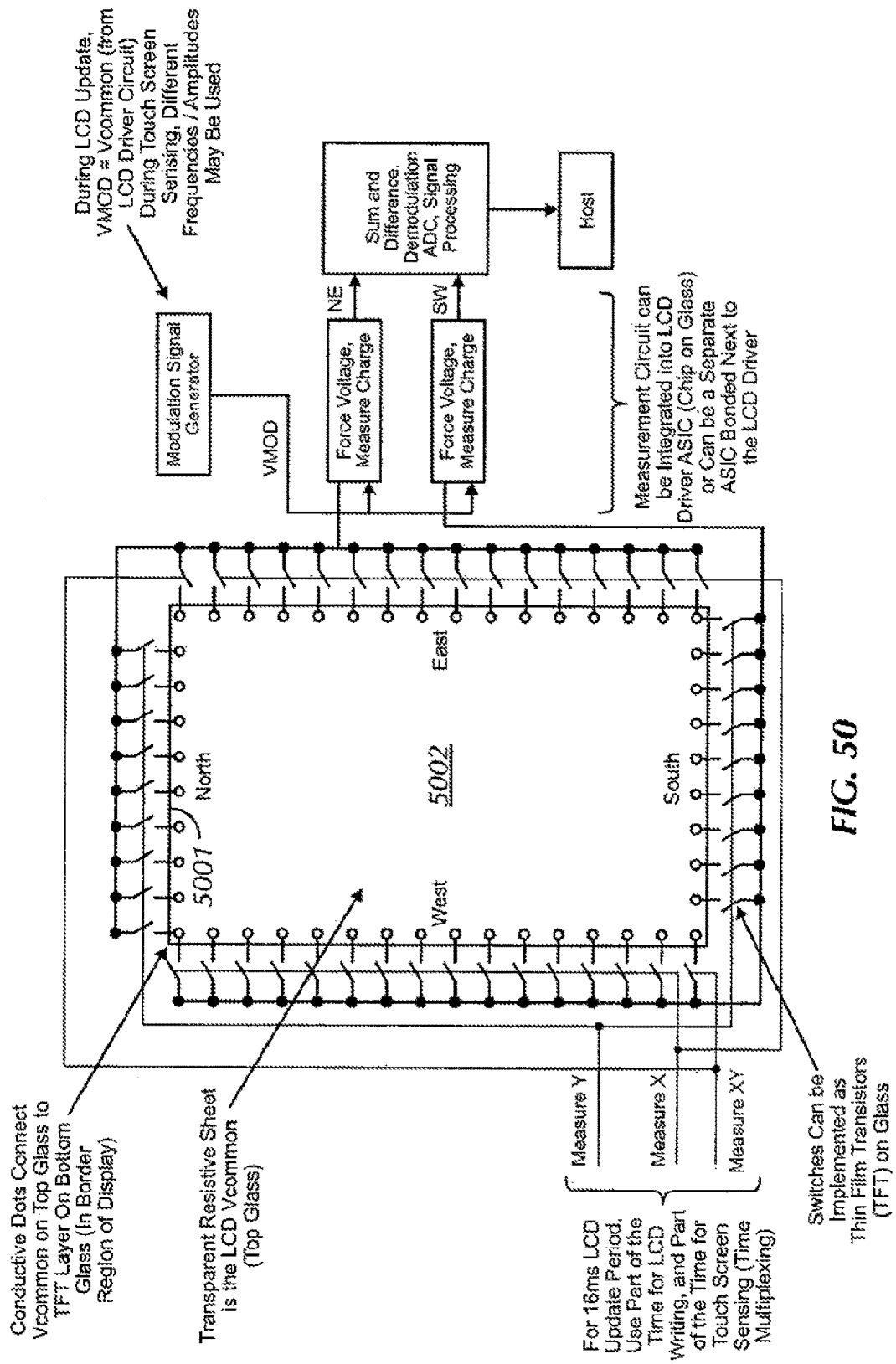
FIG. 50 illustrates further aspects of touch screen integration for the embodiment of FIG. 47.

FIG. 50 illustrates how Concept H can be integrated with an LCD. Specifically, conductive dots 5001 can connect to the TFT layer, which can allow resistive sheet 5002 ($V_{COM}$) to be modulated for display operation. Touch sensing operation and display operation can be time multiplexed. For example, assuming a 60 Hz screen refresh rate, corresponding to a 16 ms LCD update period, part of this time can be used for writing information to the LCD, and another part can be used for touch sensing. During LCD updating, $V_{MOD}$ can be $V_{COM}$ from the LCD driver circuit. During touch sensing, waveforms having different frequencies and amplitudes may be used depending on the exact details of the touch system, such as desired SNR, parasitic capacitances, etc. It should also be noted that the touch-sensing circuitry in this embodiment, illustrated in block diagram form, can either be integrated into the LCD driver or can be a separate circuit.

1.8.1.4 Concept J

Figure 51:
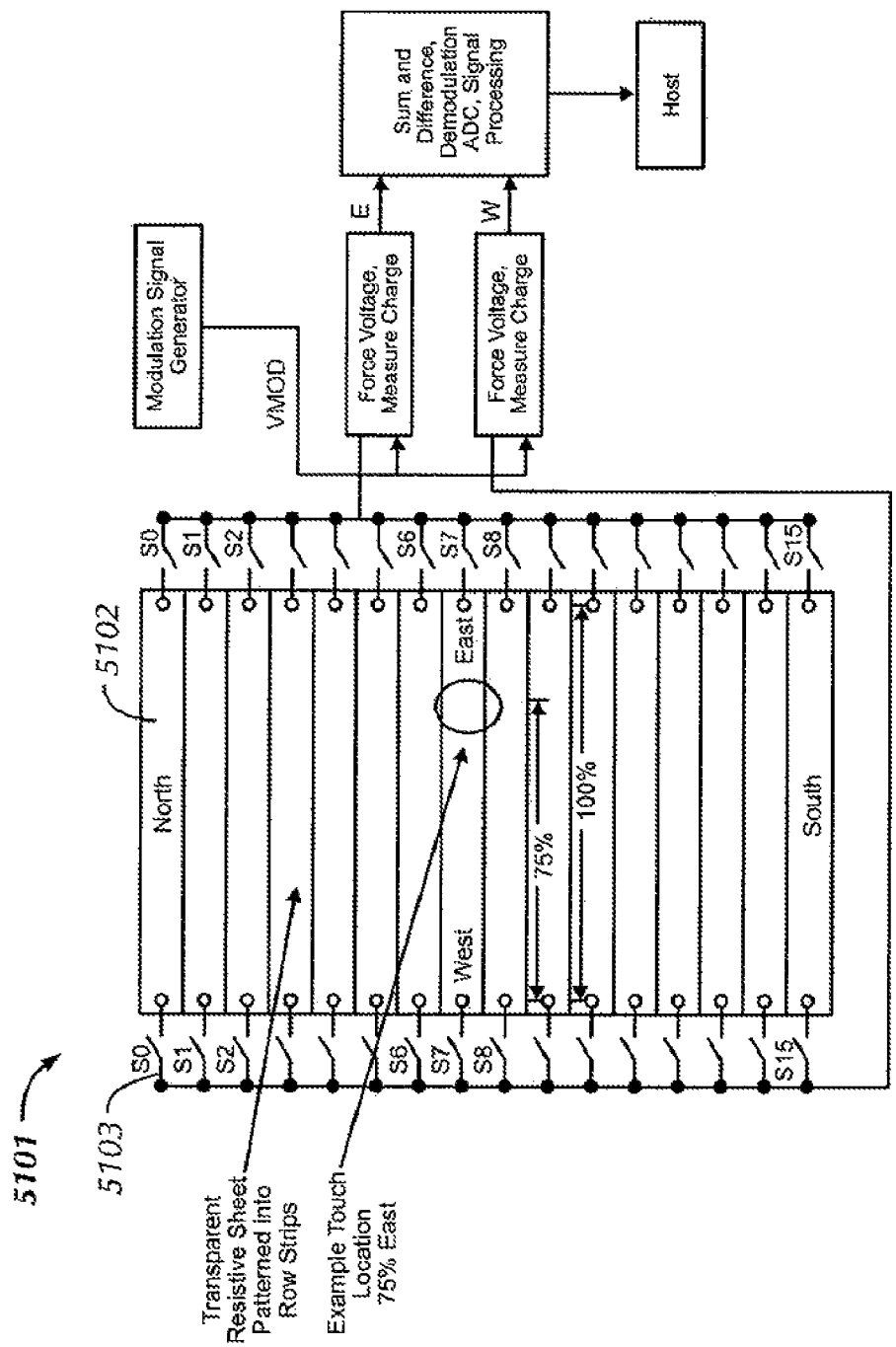
FIG. 51 illustrates another embodiment of a touch screen LCD.

Concept J, like Concept H, need not include any ITO outside the top glass or plastic layer of the display. Physical construction of Concept J is illustrated in FIG. 51. The touch-sensing surface can be a resistive sheet 5101 like Concept H, but patterned into a number of row strips 5102. Patterning may be accomplished by photolithography, laser deletion, or other known patterning techniques. By patterning resistive sheet 5101 into a plurality of strips 5102, the switches along the top and bottom (north and south) can be eliminated, leaving east and west switches 5103 connected to the row strips. Each row 5102 can be stimulated in sequence, using, for example, the $V_{MOD}$ waveform 5201 illustrated in FIG. 52. The current (charge) required to drive each row 5102 to the modulation voltage can be a function of the capacitance of the row, which can be a combination of the parasitic capacitance (C_PARA 5301, FIG. 53) for a given row and the capacitance of the finger or other touch object (C_FINGER 5302, FIG. 53).

Figure 52:
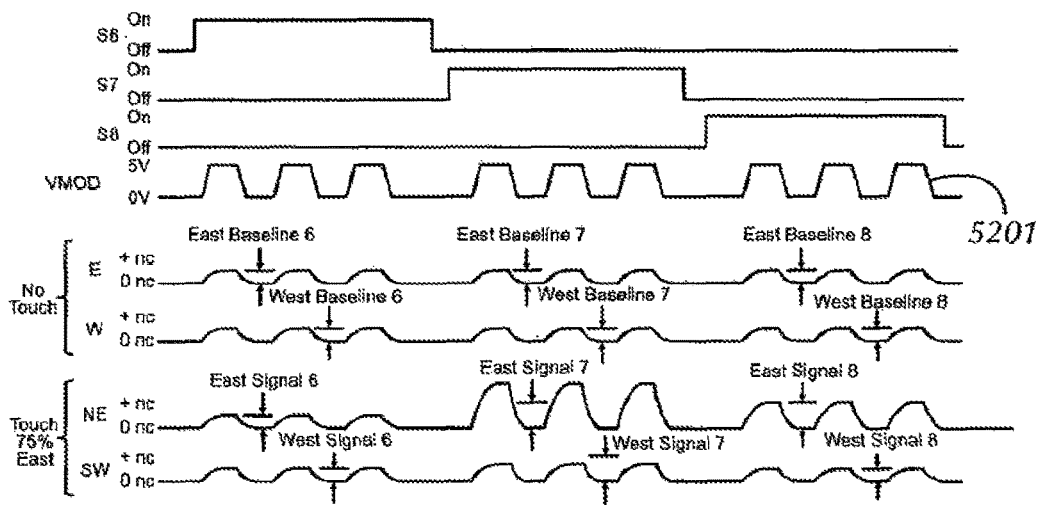
FIG. 52 illustrates the waveforms that can be used for touch sensing in the embodiment of FIGS. 51 and 53.
Figure 53:
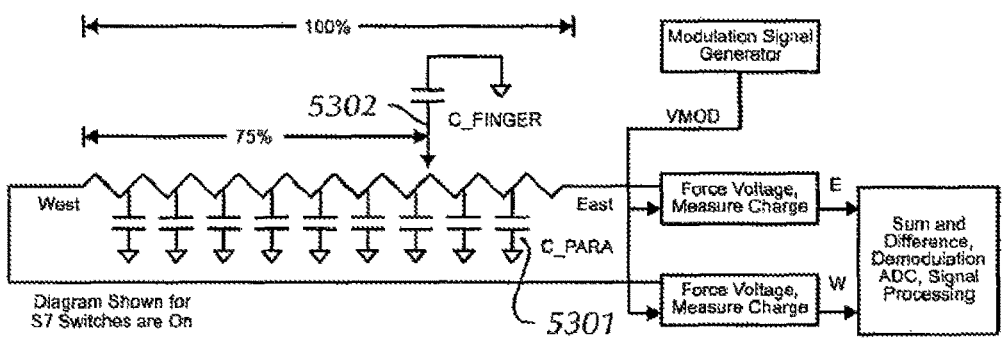
FIG. 53 illustrates an equivalent circuit of the embodiment of FIG. 51.

As shown in FIG. 52, the signal in the presence of touch 5202 can be mathematically combined with the baseline signal 5203 to compute the coordinates of the touch. The Y outputs can be determined by the centroids of Z outputs for each row. The X outputs can be determined by a weighted average of the X outputs for each row.

Figure 54:
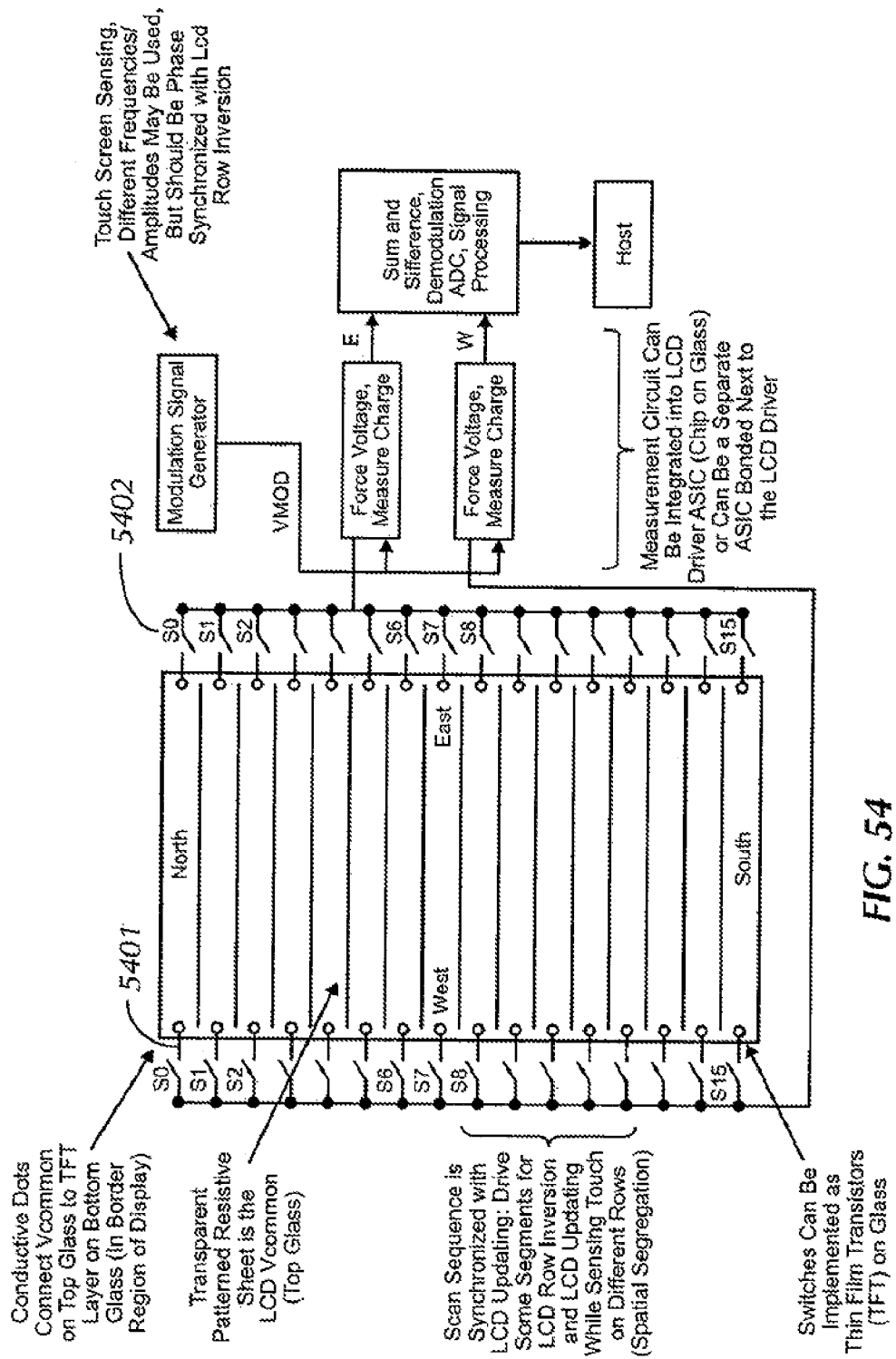
FIG. 54 illustrates further aspects of touch screen integration for the embodiment of FIG. 51.

FIG. 54 shows how the Concept J touch sensor can be integrated with an LCD. Conductive dots 5401 can connect $V_{COM}$ on the top glass to the TFT layer on the bottom glass. Touch and display operations need not be time division multiplexed. Rather, while a portion of the display is being updated, another portion may be scanned for touch. Various techniques for so doing are discussed above with respect to other embodiments. The touch sensing may use different frequencies and amplitudes, but may be phase synchronized with the LCD row inversion. Switches 5402 can be implemented as TFTs on glass. The measurement circuitry can either be integrated with the LCD controller or a separate component.

1.8.1.5 Concept L

Figure 55:
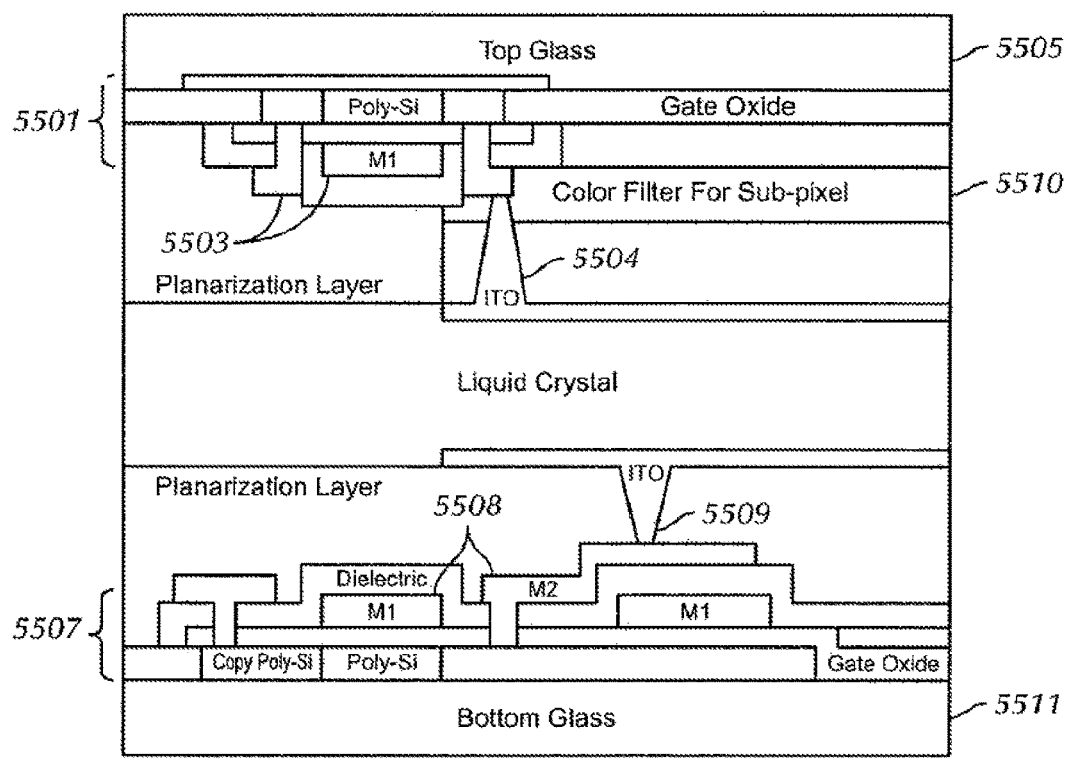
FIG. 55 illustrates a stackup diagram for a touch-screen LCD.

In Concept L, active TFT layers can be added to the color filter glass to allow a segmented ITO layer to provide multiple functions simultaneously across different regions of an LCD display. A stackup diagram for Concept L is illustrated in FIG. 55. Concept L can contain the same number of ITO layers as a standard LCD display. However, while ITO1 5509 and other structures 5507, 5508 on bottom glass 5511 can remain standard, an active TFT layer 5501 on the color filter glass 5505 can allow a region (e.g., a horizontal row) of ITO2 5504 to be switched between the role of $V_{COM}$, touch drive, or touch sense.

Figure 56:
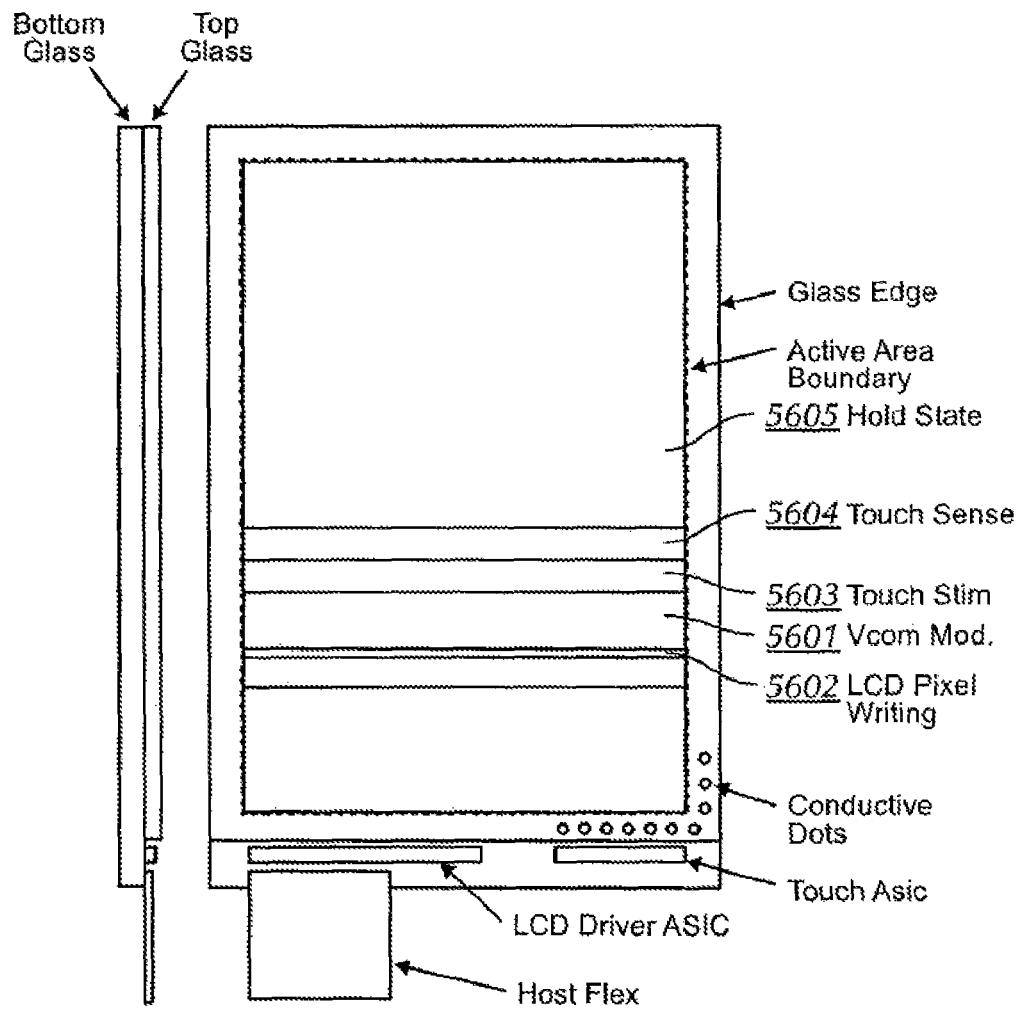
FIG. 56 illustrates a process of updating a touch-screen LCD.

FIG. 56 illustrates a Concept L display with a horizontally-segmented ITO2 layer 5504. Different regions of the display are concurrently: undergoing $V_{COM}$ modulation (region 5601) and/or being written (region 5602); providing touch stimulus (region 5603); being measured to provide touch sense (region 5604); and maintaining a hold state (region 5605). The transistors in the active TFT layer 5501 can switch the signals for each horizontal row to the desired function for a specified time interval. Each region can have equal exposure to each state, in the same sequence, to substantially eliminate non-uniformity. Because providing touch stimulus may disturb the voltage across the LC, LCD pixel writing can take place just after the touch stimulus phase to reduce the time duration of any disturbance. LCD pixel writing for a region can occur during $V_{COM}$ modulation, while adjacent segments can be undergoing $V_{COM}$ modulation to maintain uniform boundary conditions during pixel writing.

The color filter plate can be formed using a process similar to the process used for the active array. Forming the additional TFT layers may involve additional steps, but the back-end processing of the two substrates can remain substantially similar to that of a standard LCD. These techniques can allow such displays to scale to larger-sized panels without using low-resistivity ITO.

1.8.1.6 Concepts M1 and M2

Figure 57:
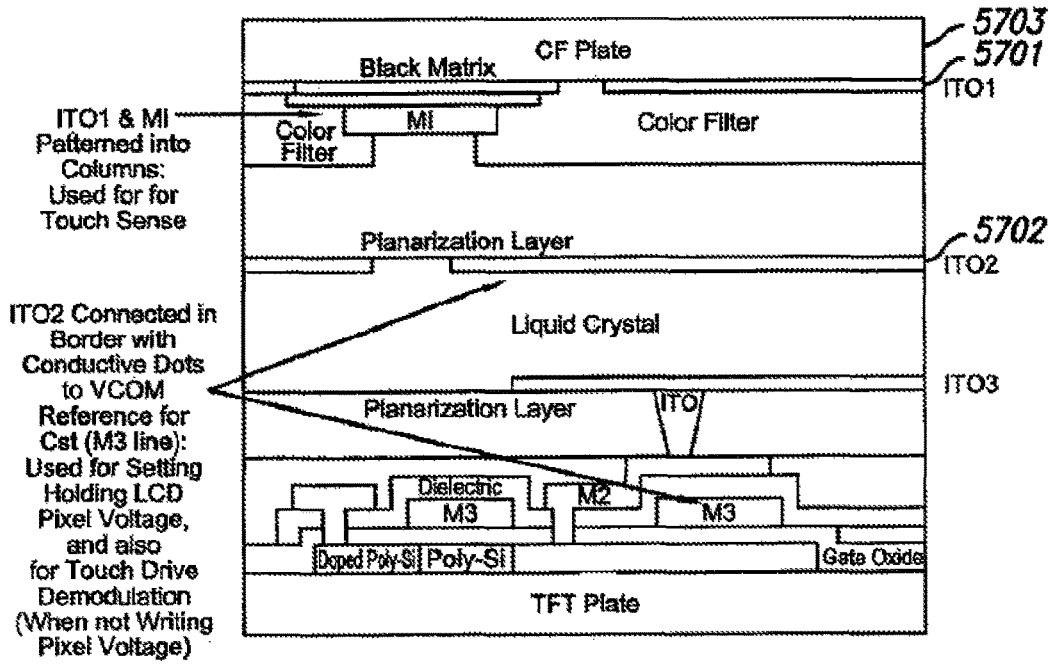
FIG. 57 illustrates a stackup diagram for an embodiment of a touch-screen LCD.
Figure 58:
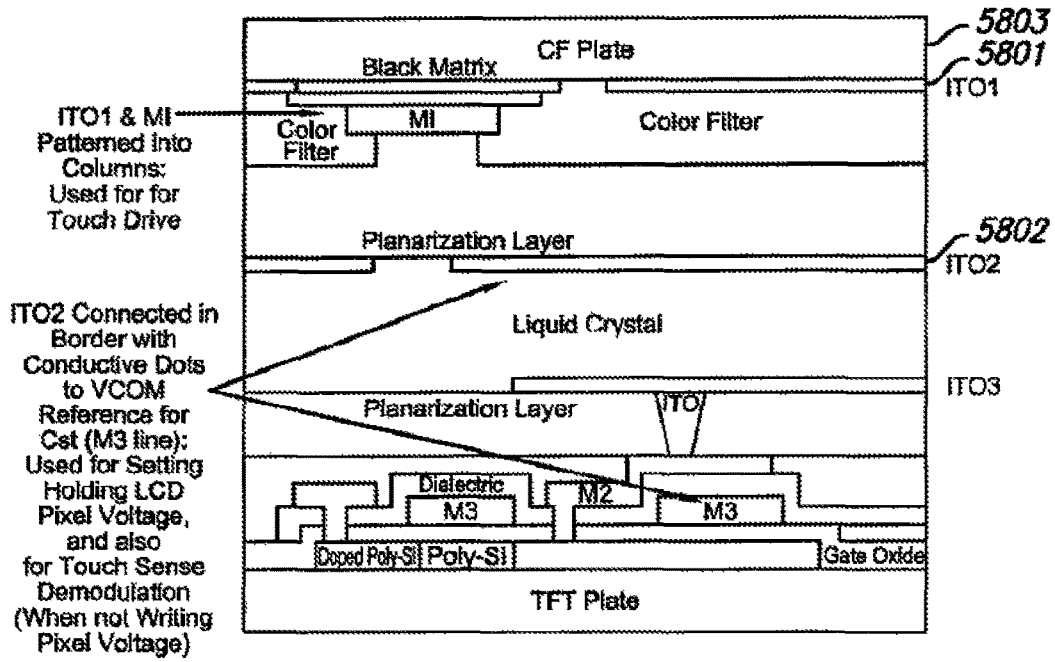
FIG. 58 illustrates a stackup diagram for an embodiment of a touch-screen LCD.

FIGS. 57 and 58 show stackup diagrams for Concepts M1 and M2, respectively. Concepts M1 and M2 can add layers of patterned ITO and metal to the color filter glass for touch sensing. While concepts M1 and M2 are similar, one difference relates to different uses of the ITO1 and ITO2 layers. Concept M1 can use ITO1 5701 for touch sense and can use ITO2 5702 for both $V_{COM}$ (when setting/holding LCD pixel voltages) and touch drive (when not writing pixel voltages). Concept M2 can use ITO1 5801 for touch drive, and can use ITO2 5802 for $V_{COM}$ and touch sense. For both Concepts M1 and M2, top glass 5703, 5803 need not include any transistors or other active components.

In either concept M1 or M2, $V_{COM}$ can be segmented to allow one region of the display to keep a constant $V_{COM}$ during display updating while another region can be independently scanned for touches. This can reduce interference between the touch-sensing and display functions.

Figure 59:
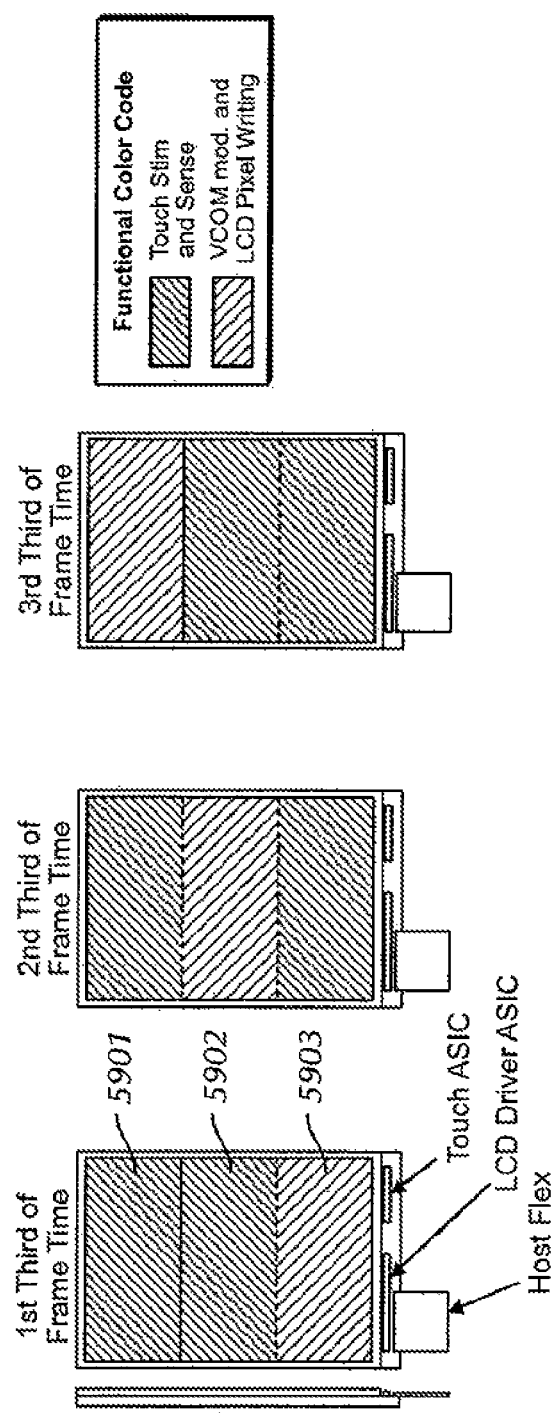
FIG. 59 illustrates an exemplary LCD display divided into three regions that can be updated or touch-scanned independently.

FIGS. 59, 60A, 60B, 61A and 61B show an exemplary display (corresponding to Concept M2) that has been segmented into three regions (5901, 5902, 5903; FIG. 59), and wherein two regions can be simultaneously touch-scanned (e.g., regions 5901, 5902) while a third region's display pixels can be updated (e.g., region 5903). On the left side of FIGS. 61A and 61B, twenty seven vertical drive lines 6101 in the ITO1 and M1 (metal 1) layers can provide three different regions with nine touch columns each. Each drive line (3 per touch column) can have a conductive dot (not shown) down to the array glass, and can be routed to a driver ASIC.

Figure 61A:
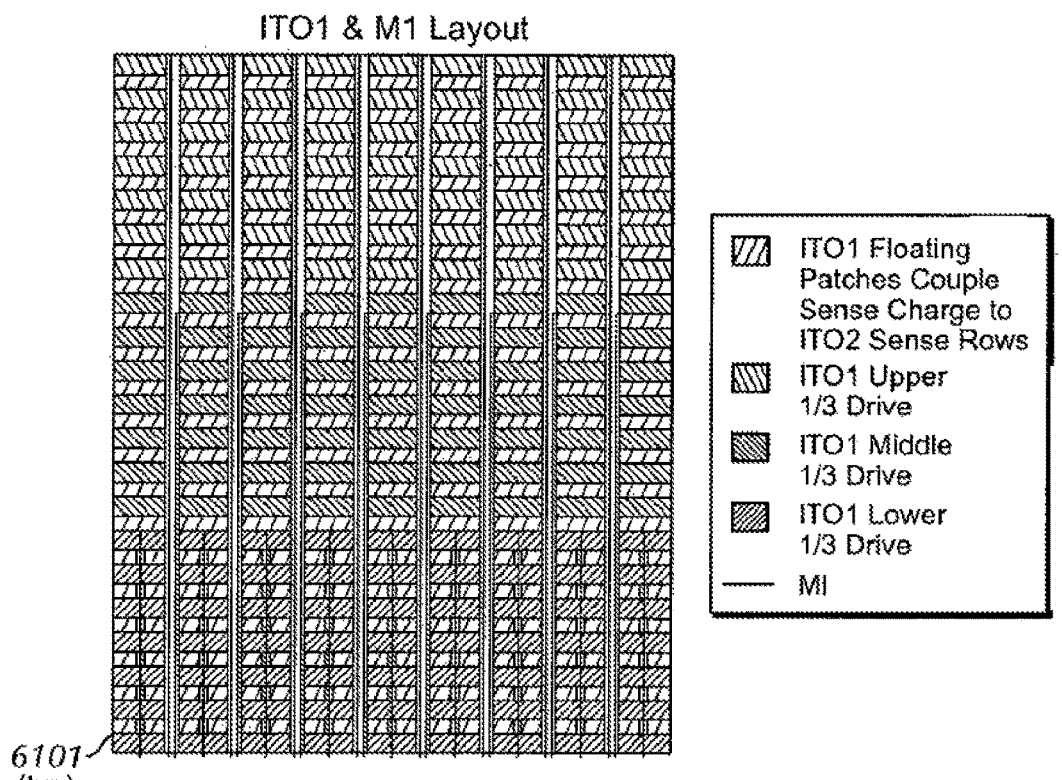
FIGS. 61A and 61B illustrate an electrode layout for a touch-screen LCD.
Figure 61B:
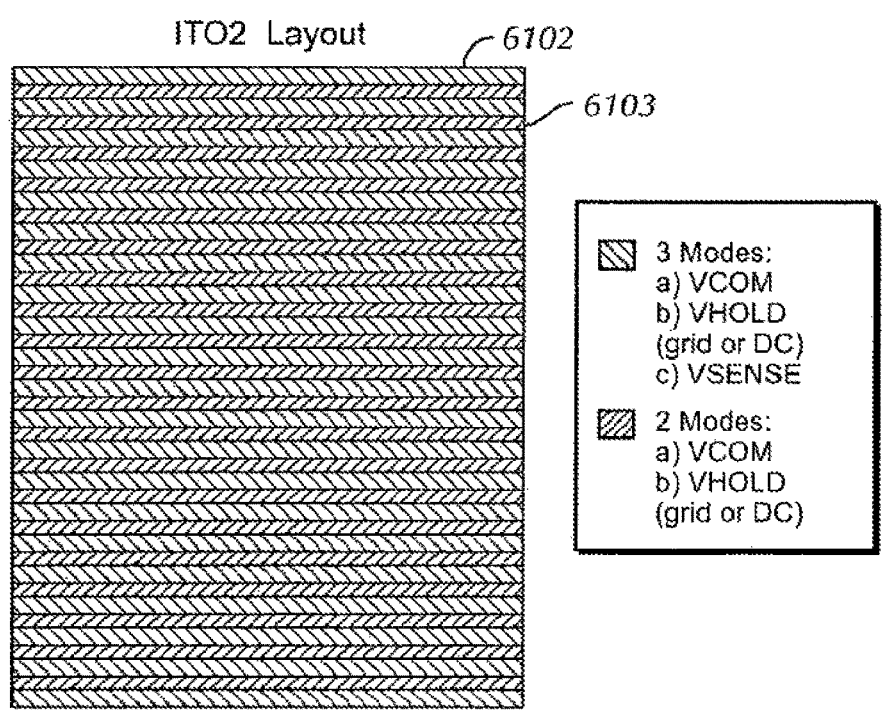

The right side of FIGS. 61A and 61B show the possible modes for the segmented horizontal rows of the ITO2 layer, which include $V_{COM}$ and $V_{HOLD}$ for a first set of alternating rows 6102 and $V_{COM}$, $V_{HOLD}$, and $V_{SENSE}$ for a second set of alternating rows 6103. Each ITO2 row can connect via a conductive dot (not shown) down to the array glass, from which the mode of the row can be switched using LTPS TFT switches. The right side of FIGS. 61A and 61B show twenty-one sense rows, of which fourteen can be sensed at any time (although other numbers of rows could also be more).

Figure 62:
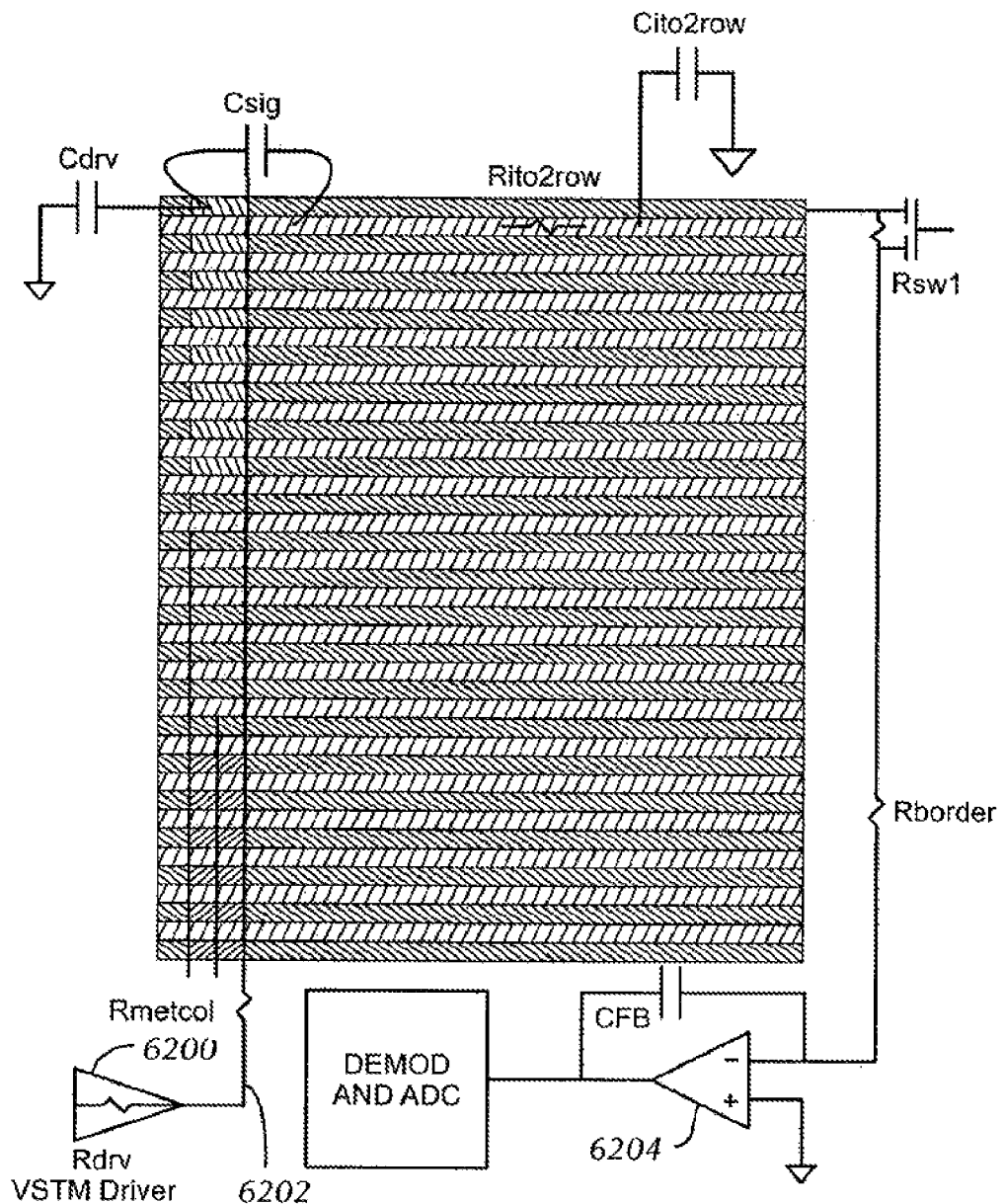
FIG. 62 illustrates circuit components for a touch-screen LCD.

FIG. 62 shows the circuit diagram for touch sensing in the exemplary display illustrated in FIGS. 59, 60A, 60B, 61A and 61B. $V_{STM}$ driver 6200 sends a signal through metal drive column 6202, which can have a resistance of $R_{metcol}$ and a parasitic capacitance of $C_{drv}$. Touch capacitance $C_{sig}$ can be measured across the ITO row, which can have a resistance of $R_{ito2row}$ and a parasitic capacitance of $C_{ito2row}$. The touch-sensing charge can also be affected by two additional resistances, $R_{sw}1$ and $R_{border}$, before reaching charge amplifier 6204.

A display frame update rate of 60 fps can correspond to a touch scan rate of 120 fps. If desired (e.g., in small multi-touch displays) designers may choose to reduce the touch scan rate (e.g., to 60 fps), thereby saving power and possibly reducing complexity. As a result, some regions of the display can be left in a "hold state" when neither display updating nor touch scanning is occurring in that region.

Figure 60A:
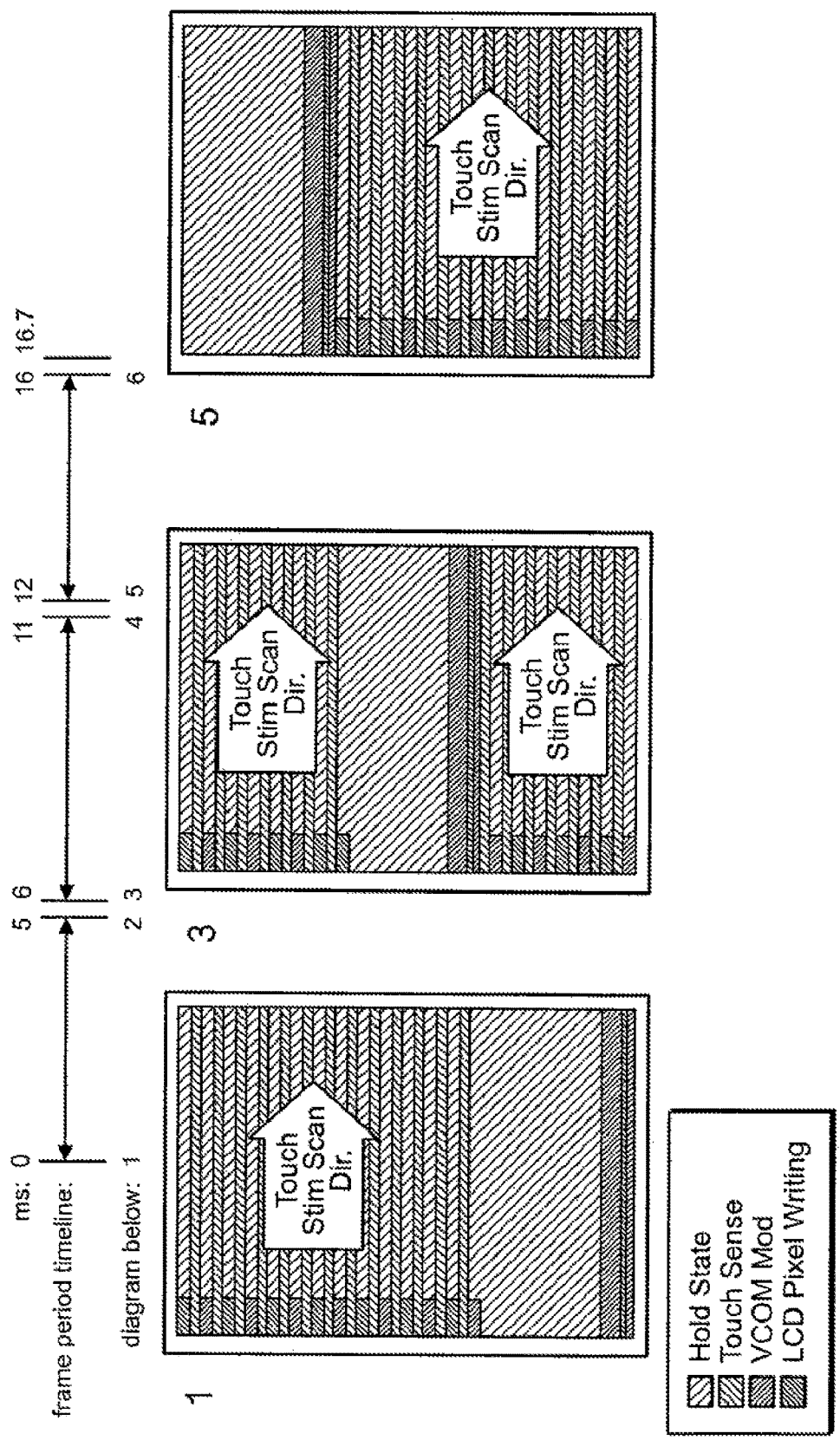
FIGS. 60A and 60B illustrate updates and touch-scanning of a touch-screen LCD with three regions.
Figure 60B:
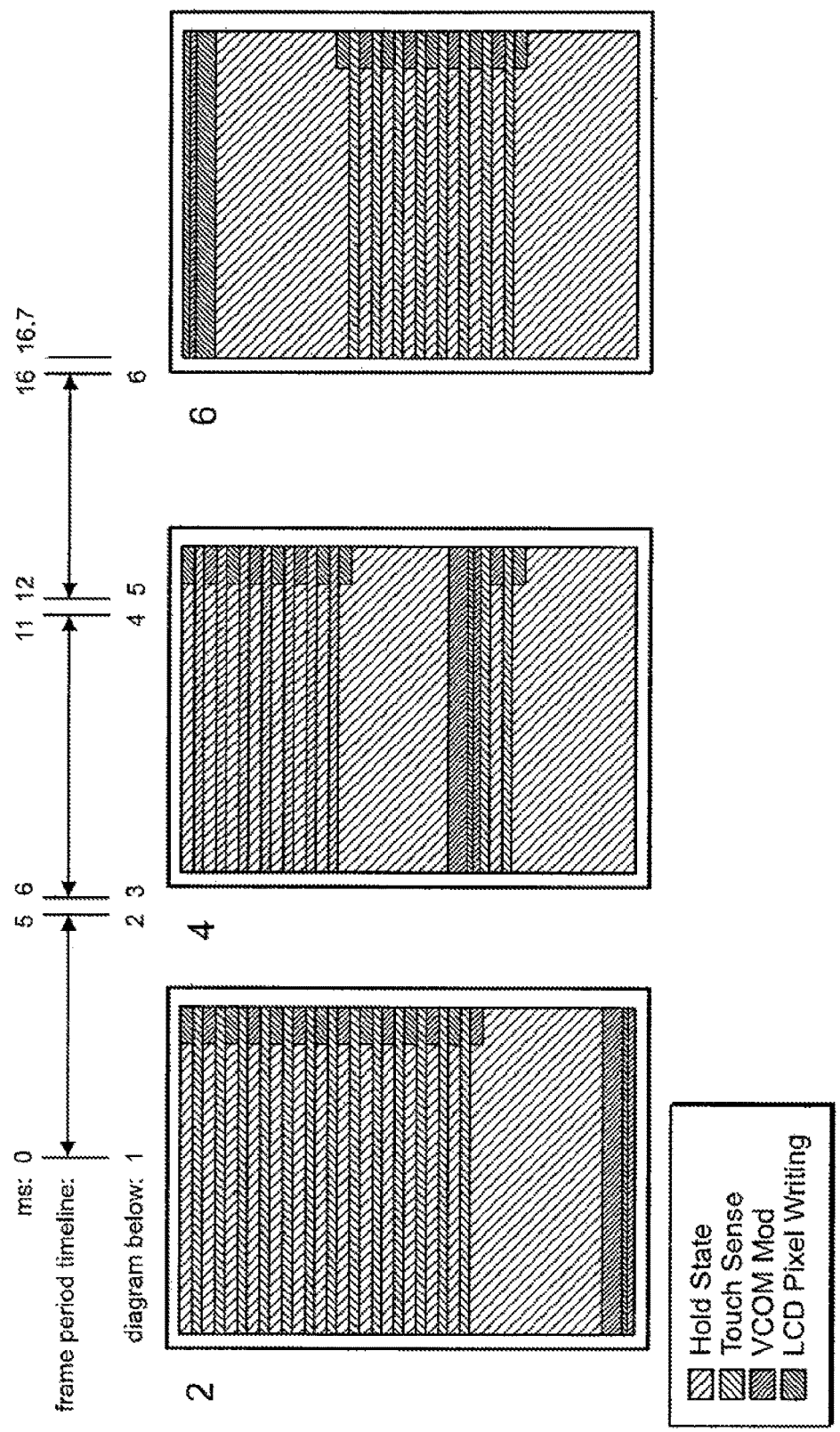
Figure 63:
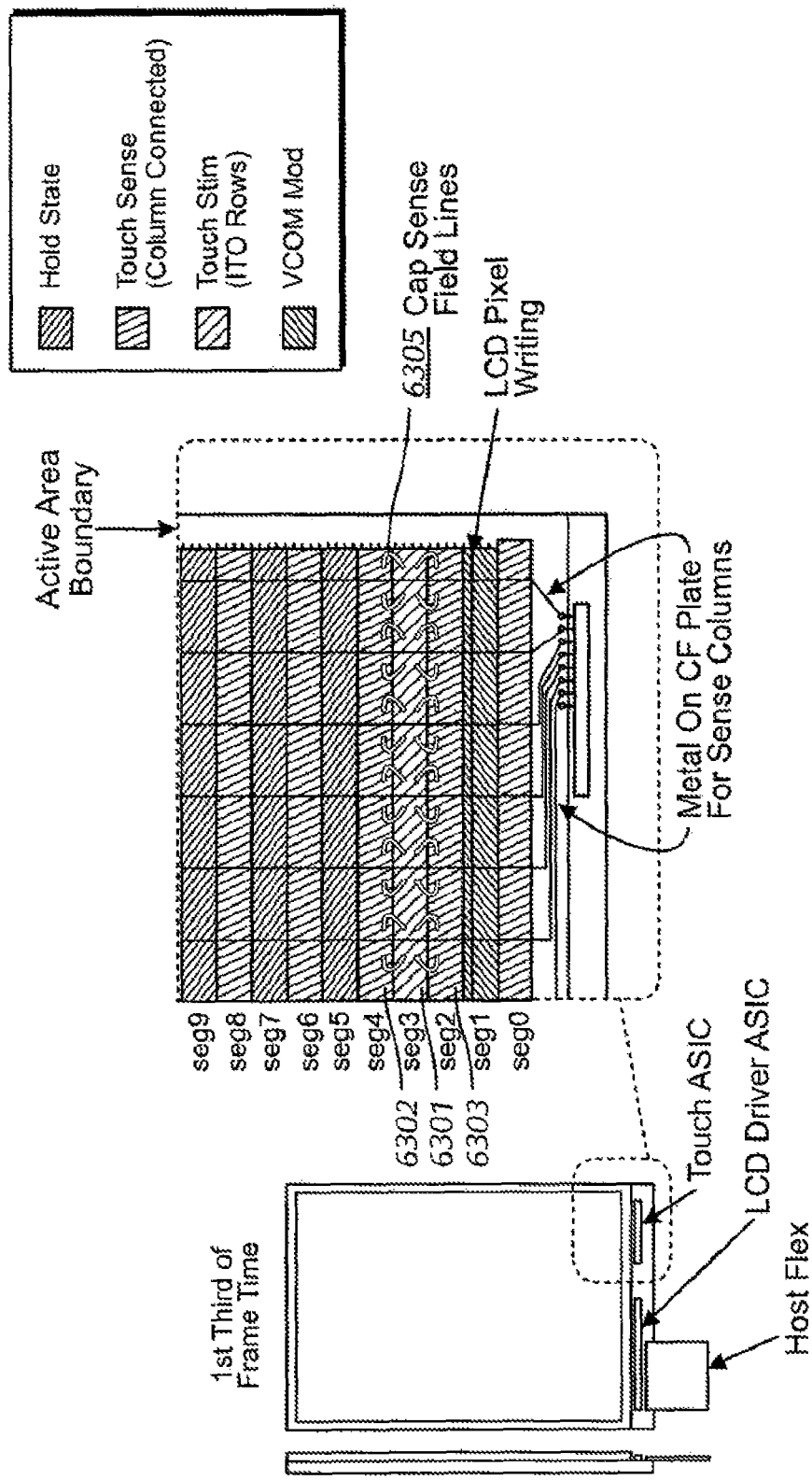
FIG. 63 illustrates a snapshot of an update arrangement for a touch-screen LCD.

FIG. 63 shows a display in which the display regions can be scanned and updated horizontally instead of vertically (as in FIGS. 60A and 60B). The touch drive and touch sense regions can be interleaved so that a stimulus applied to touch drive row 6301 can be simultaneously sensed from two sense rows 6302 and 6303, as indicated by sense field lines 6305.

Figure 64:
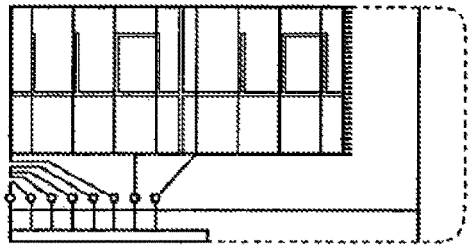
FIG. 64 illustrates how metal lines and gaps in ITO that can be fully or partially hidden behind a black matrix.
Figure 64:
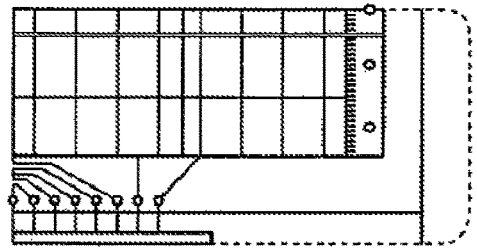
Figure 64:
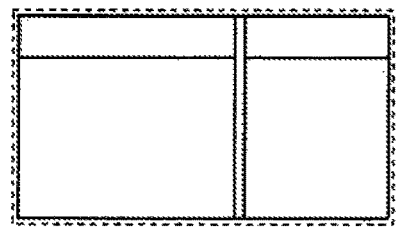

The black mask layer can be used to hide metal wires and/or gaps in ITO layers. For example, the metal drive lines, etched gaps in ITO2, and etched gaps in ITO1 can be fully or partially hidden behind the black mask (as shown in FIG. 64). This can reduce or eliminate the visual impact these items may have on the display's user.

1.8.1.7 Concept M3

Figure 65:
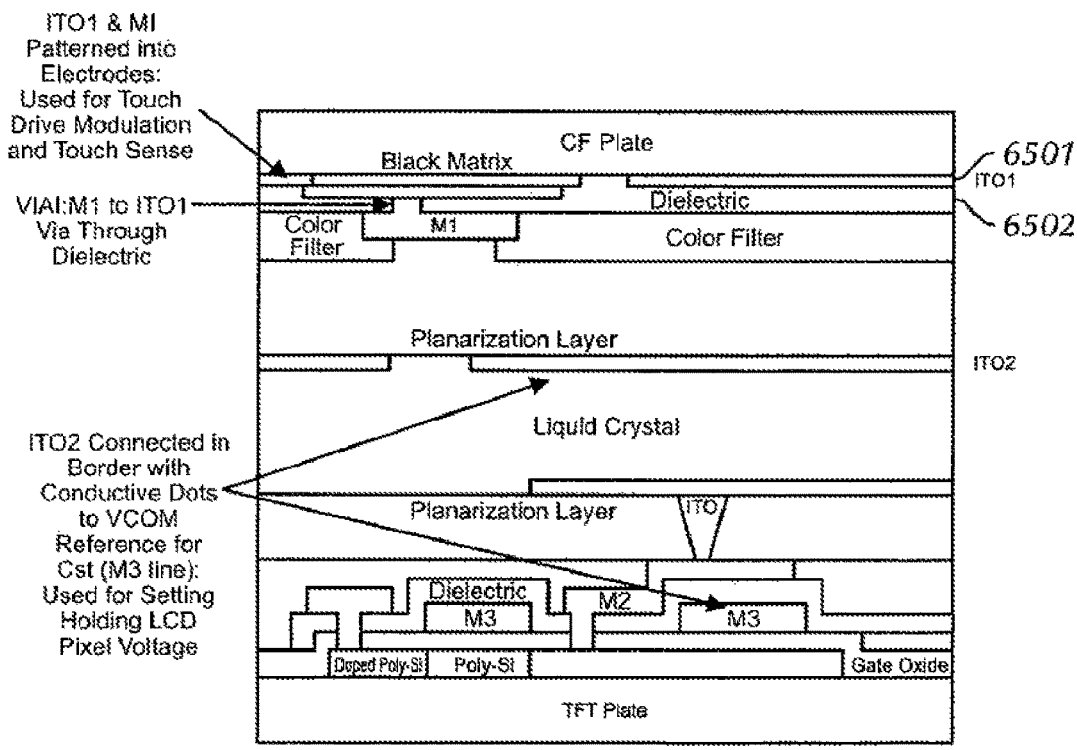
FIG. 65 illustrates a stackup diagram for a touch-screen LCD.

As shown in FIG. 65, Concept M3 can be similar to Concepts M1 and M2, but with touch drive and touch sense integrated into a single, segmented ITO layer 6501. While various embodiments described above included drive and sense electrodes on separate layers, Concept M3 can include drive and sense electrodes in the same plane. A dielectric layer 6502 can be added to shield the touch-sensing elements from other electrical fields and/or effects.

Figure 66:
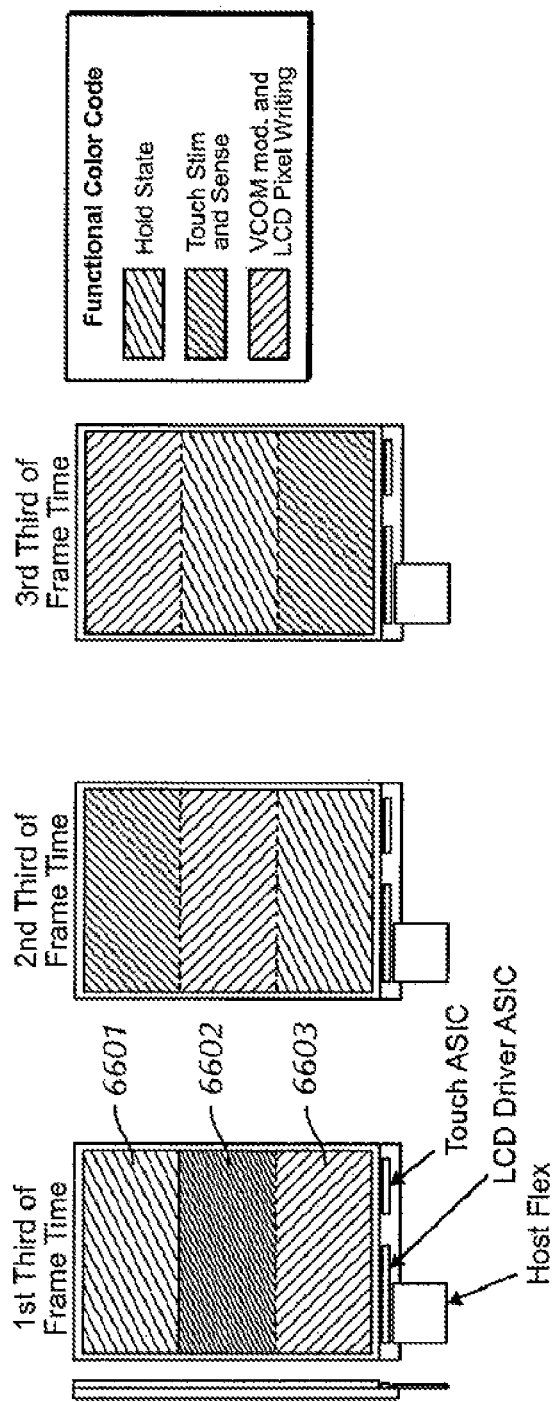
FIG. 66 illustrates a touch-screen LCD segmented into three regions.
Figure 67:
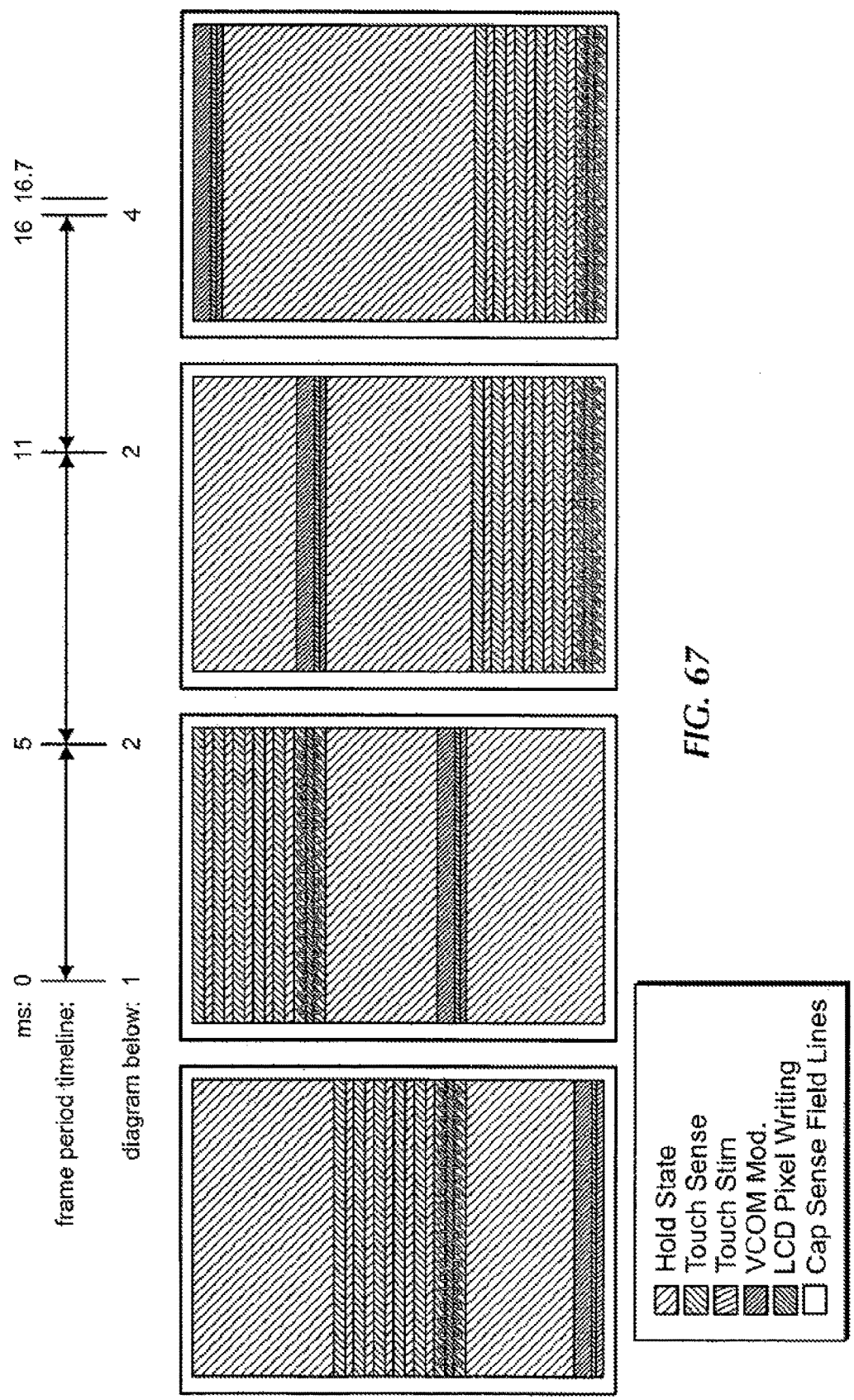
FIG. 67 illustrates a process of performing display updates and touch-scanning in a touch-screen LCD.
Figure 68:
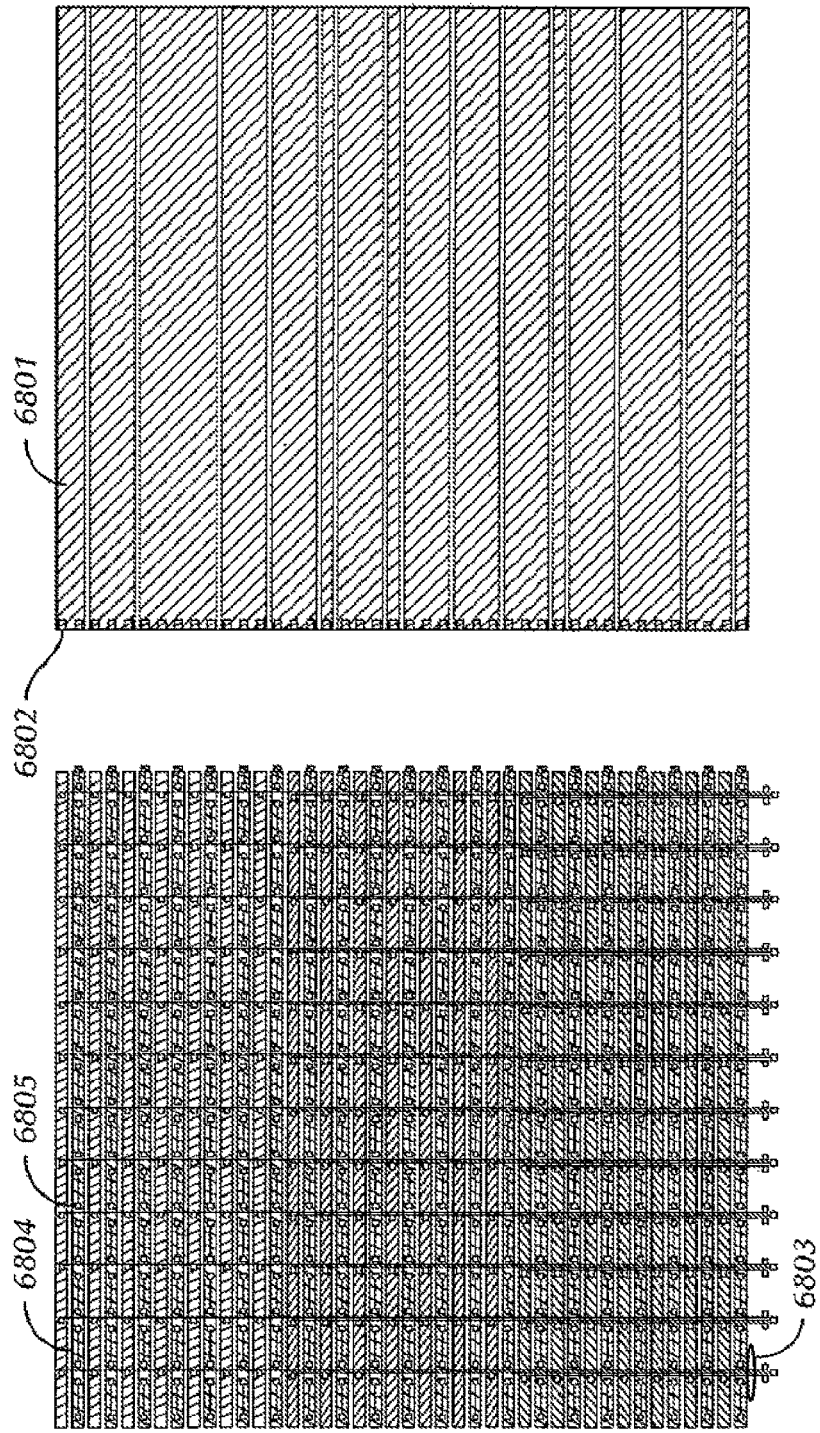
FIG. 68 illustrates wiring and ITO layout to segment a touch screen LCD into three regions.

FIGS. 66 and 67 illustrate a Concept M3 display segmented into three regions 6601, 6602, 6603, each of which can alternate through a touch stim/sense phase, a LCD pixel writing phase, and a hold phase during every cycle update of the display frame. FIG. 68 illustrates a wiring detail and layout arrangement that enables partitioning the display. ITO1 rows 6801 can connect via conductive dots 6802 to LTPS switches on the TFT glass that switch the voltage for the row between $V_{COM}$ and $V_{HOLD}$. Three sense lines 6803 can be used for each column (one sense line for each region), with the lines multiplexed so that the signal for the active region can be measured in the corresponding timeframe. During touch scanning for a region, the touch drive elements corresponding to a row in the region can be activated, and all of the columns for that row can be simultaneously sensed. During the time that one region of the display is scanned for touches, another region can be modulating $V_{COM}$ and/or updating the display pixels.

Metal segments (6805 in FIG. 68) can be added to regions of the ITO to reduce the resistance of the ITO. For example, short metal segments can be added to the ITO1 drive electrodes 6804 to reduce phase delay of the touch signal. These metal lines may be hidden behind a black mask layer.

Figure 69:
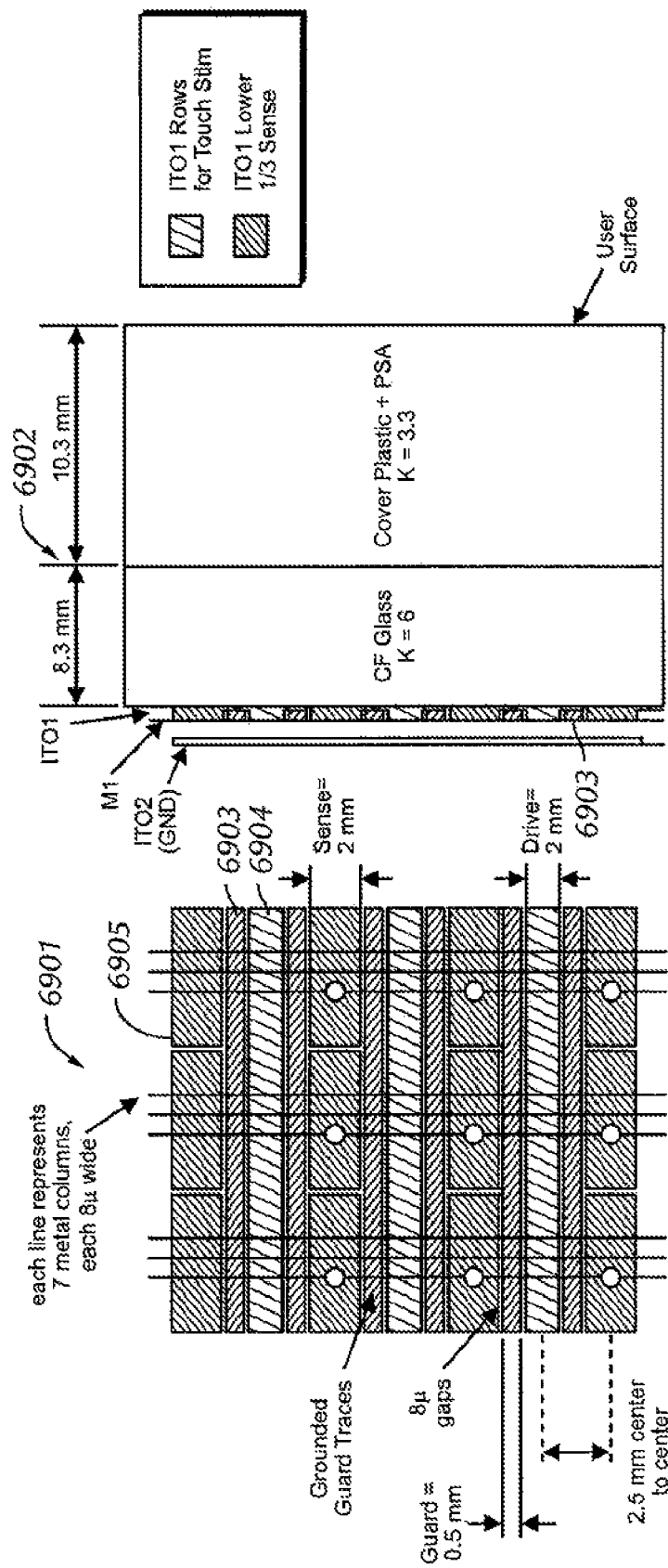
FIG. 69 illustrates a top view and cross-section of a region of a touch-screen LCD that includes guard traces.
Figure 70:
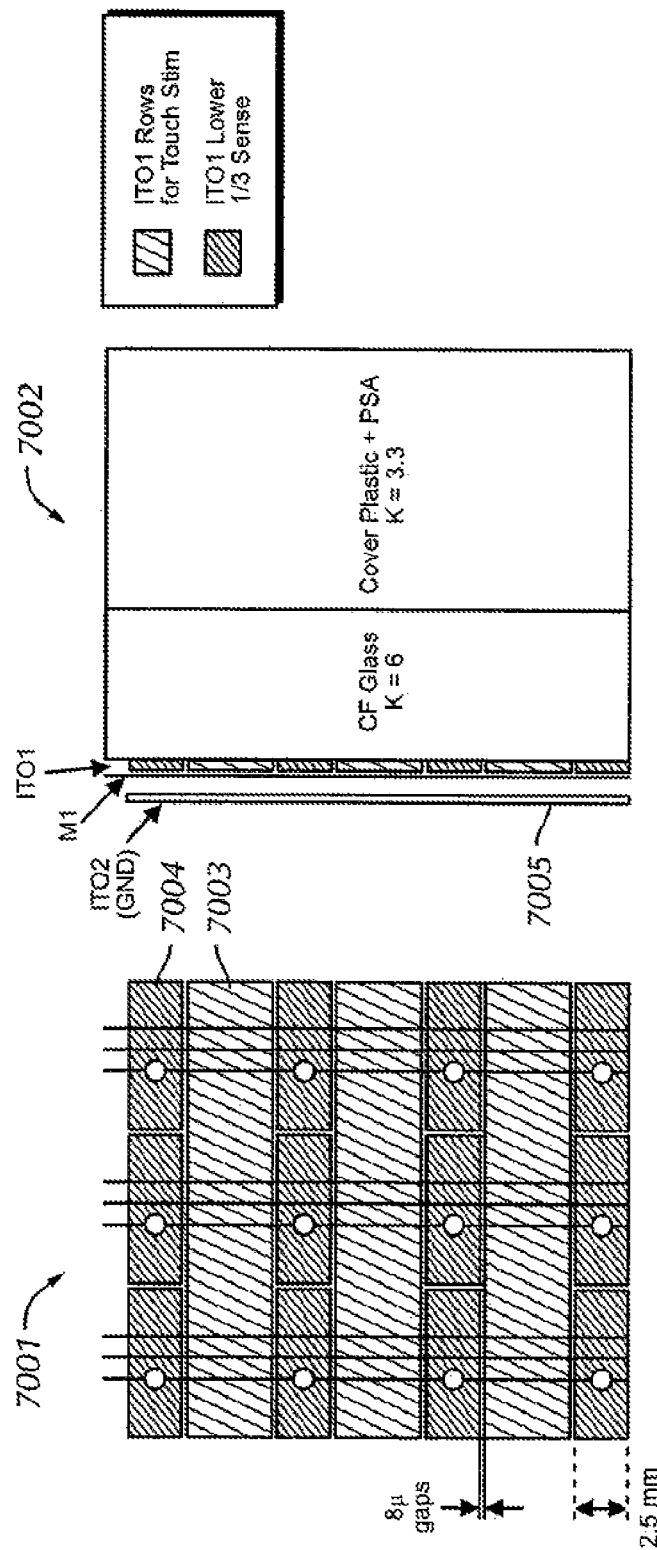
FIG. 70 illustrates a top view and cross-section of a region of a touch-screen LCD that does not include guard traces.

As illustrated in FIG. 69, guard traces 6903 can be used to block field lines between the touch and sense electrodes that do not pass up through the glass where they would be affected by a finger or other touch object. This can reduce noise and enhance the measured effect of touches to the display. FIG. 70 shows a top-view 7001 and a cross-section 7002 of a display without guard traces, in which a narrow gap separates the rows of touch-sensing elements, e.g., drive electrodes 7003 and sense electrodes 7004. Grounding the ITO2 layer 7005 ($V_{COM}$) when touch sensing is active can shield touch sensing and display functions from one another. FIG. 69 shows a top-view 11101 and a cross-section 6902 of a display that includes grounded guard traces 6903 between rows of touch-sensing elements on ITO1, e.g., drive electrodes 6904 and sense electrodes 6905.

1.8.1.8 Concepts P1 and P2

Figure 71:
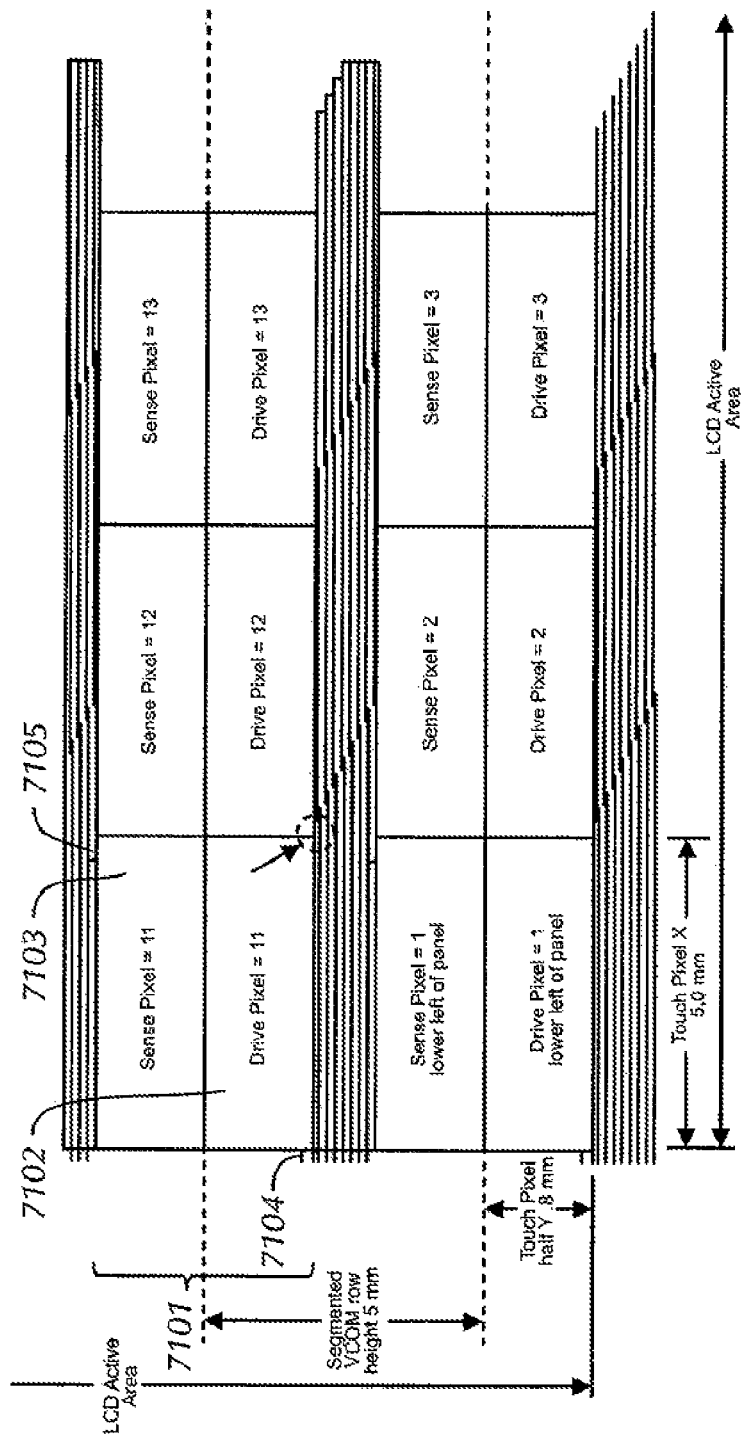
FIG. 71 illustrates a region of an exemplary display that contains six touch pixels and their signal wiring.

Concepts P1 and P2, like Concept M3, can provide touch drive and touch sense electrodes in the same plane. However, Concepts P1 and P2 can provide an additional benefit of individually-addressable touch-pixels, as shown in FIG. 71. Each touch pixel can include a drive electrode 7102, a sense electrode 7103, and corresponding drive lines 7104 and sense lines 7105 that can be individually routed and connected to a bus on the border of the display. These lines may be formed using conductive black mask, thereby allowing black mask areas already present in the display to provide additional service for touch sensing. Alternatively, the lines may be metal lines disposed behind a black matrix, which can be a polymer black matrix.

Figure 72:
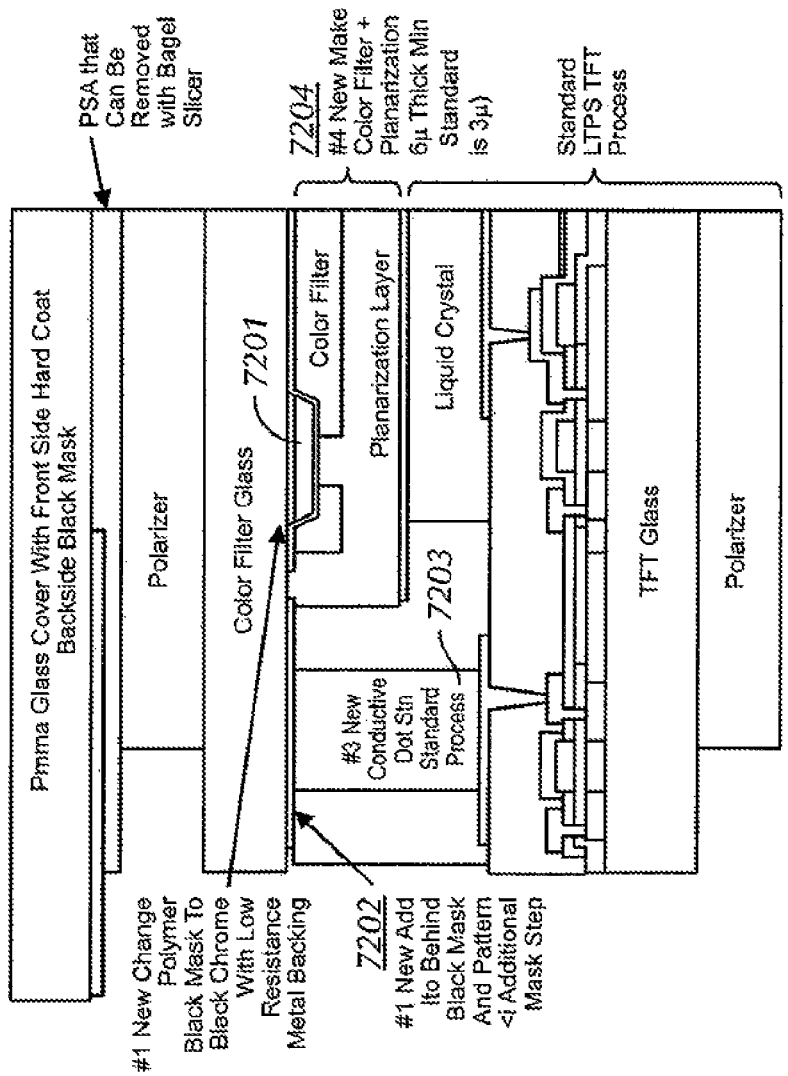
FIG. 72 illustrates a stackup diagram for another embodiment of a touch-screen LCD.

FIG. 72 shows a stackup diagram for Concept P1. Concept P1 can differ from a standard LCD process in various respects. For example, a portion of the standard polymer black mask can be changed to black chrome with low-resistance metal backing. These conductive lines can then be used to route signals to and from the touch pixels. A layer of patterned ITO 7202 can be added behind the black mask in an additional mask step. STN-style conductive dots 7203 can be added to route the drive and sense signals for each touch pixel to the LTPS TFT plate (e.g., using 2 dots per touch pixel). The color filter layer and the bordering planarization layer 7204 can also be thickened to decrease the capacitance between the touch drive and $V_{COM}$.

Figure 73:
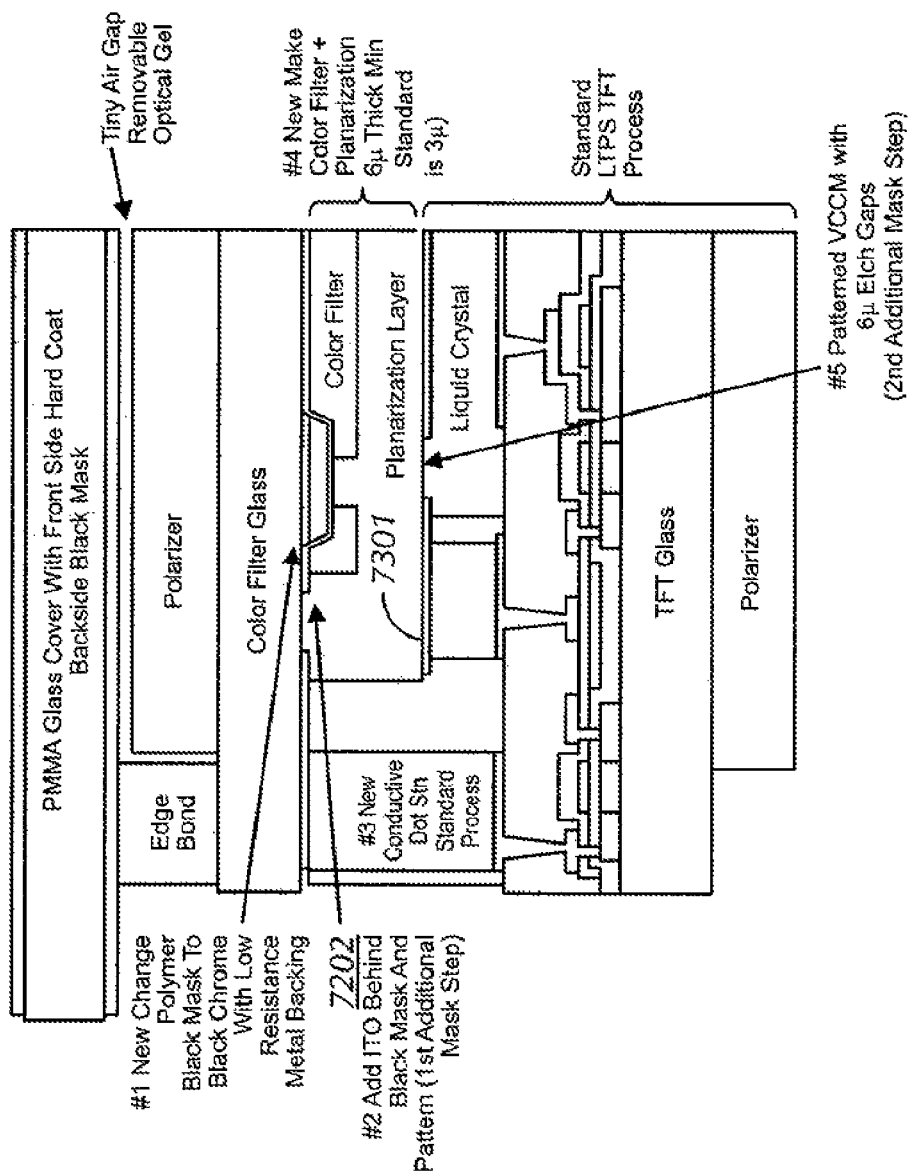
FIG. 73 illustrates a stackup diagram for another embodiment of a touch-screen LCD.
Figure 74:
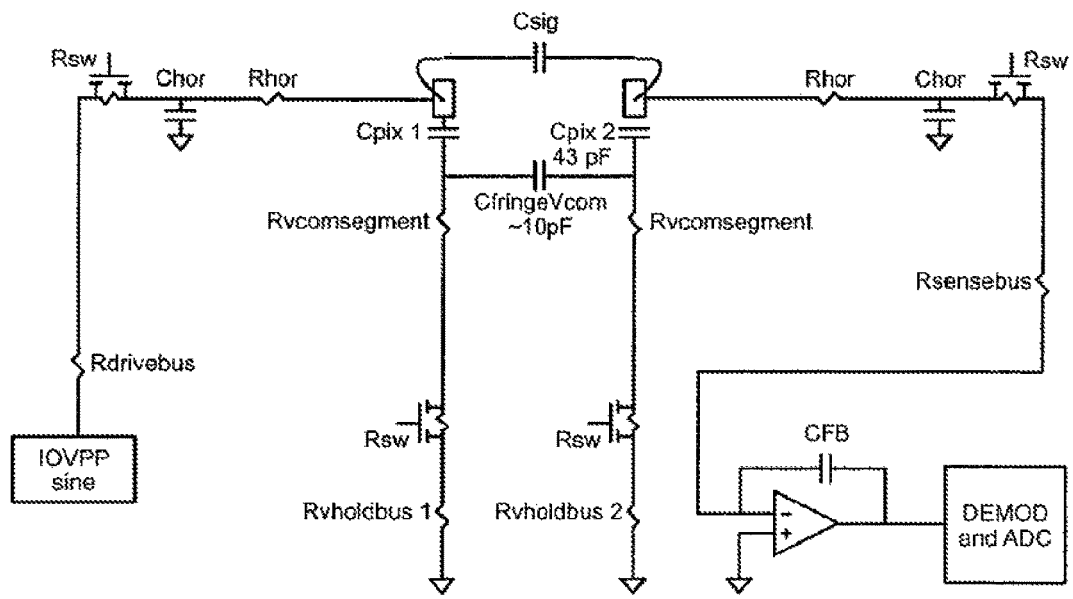
FIG. 74 illustrates a circuit diagram highlighting $V_{COM}$ signal coupling for a touch screen LCD.

FIG. 73 shows a stackup diagram for Concept P2. In addition to incorporating the four changes described above with respect to Concept P1, Concept P2 can also include a patterned ITO layer 7301 that can be used to create a segmented $V_{COM}$. Segmenting $V_{COM}$ can isolate touch drive and display operation, thereby potentially improving the signal-to-noise ratio. FIG. 74 shows a circuit diagram highlighting the $V_{COM}$ signal coupling for Concept P2. Keeping independent buses (Vholdbus1 and Vholdbus2) for return current can reduce the coupling charge. Also, using complementary drive for half of the touch pixels can reduce the return current in Vholdbus1.

Figure 75:
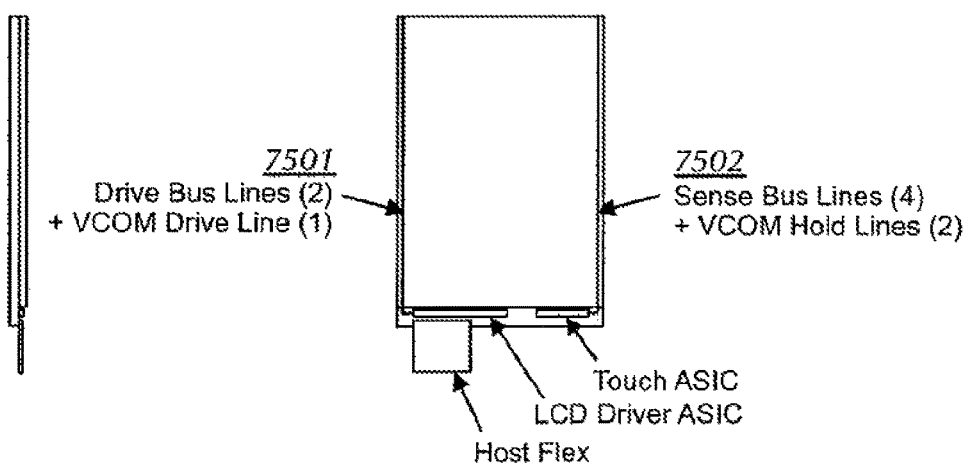
FIG. 75 illustrates an exemplary display.

FIGS. 71 and 75 illustrate an exemplary routing of touch sense and touch drive lines to and from the sense and drive pixels. A set of drive and sense lines can be routed horizontally from bus lines 7501, 7502 at the sides of the display to each individual touch pixel 7101. These lines can be hidden behind a black mask layer, or can be incorporated into a conductive black mask layer. This routing can also be on a single layer. Signals for individual touch pixels can be addressed and multiplexed through the bus lines using LTPS TFTs.

Figure 76:
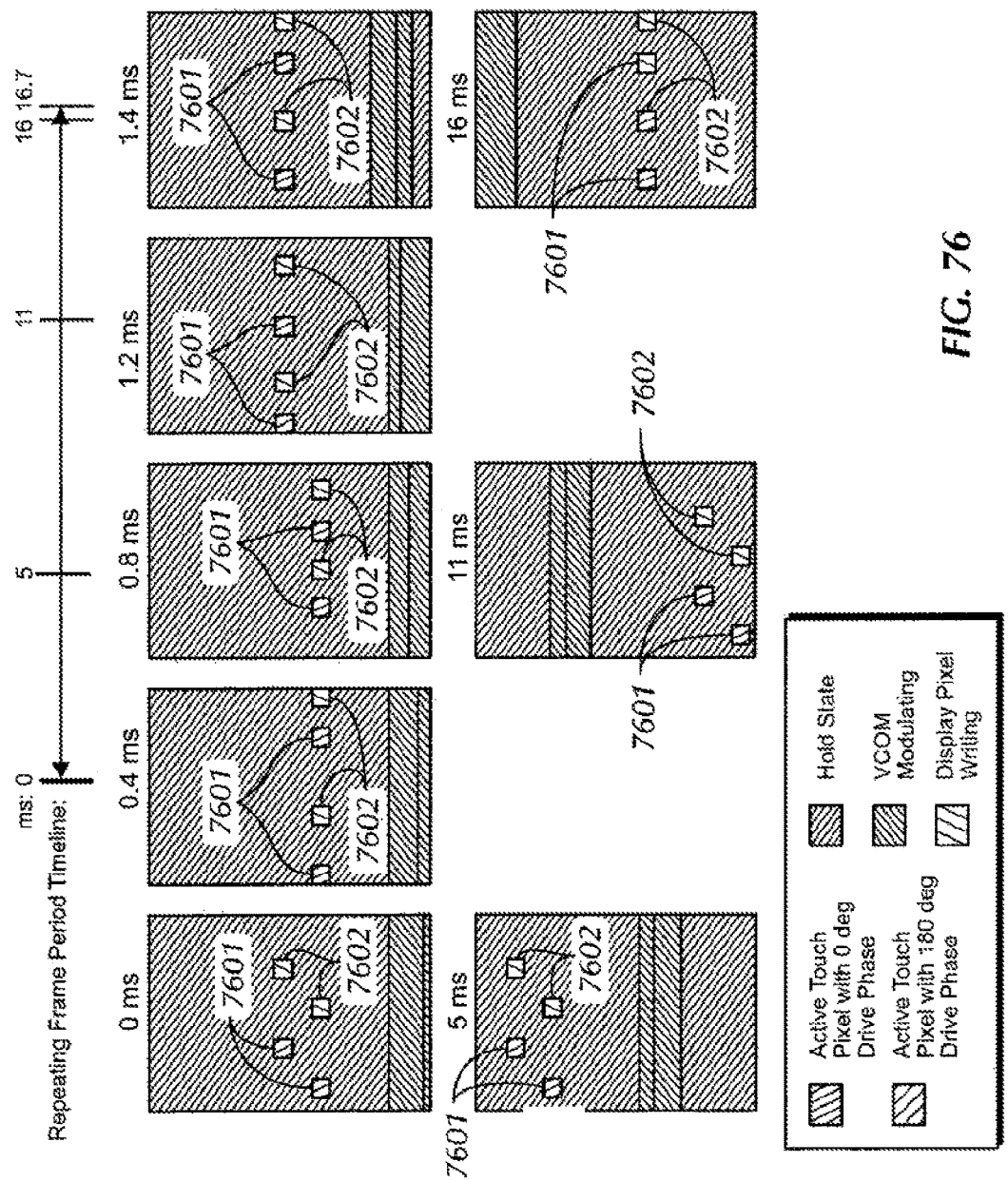
FIG. 76 illustrates a possible scan pattern for a touch-screen LCD.

The ability to drive individual pixels, rather than whole rows, can be used to reduce parasitic capacitance. Individually-addressable touch pixels can also allow the touch array to be scanned in "random access" mode, rather than just row-by-row. This can increase flexibility in interlacing touch sensing and display updating. For example FIG. 76 illustrates a possible scan pattern. Because the system can scan the touch pixels in any desired pattern, a scan pattern can be designed that ensures that adjacent rows and adjacent pixels are never driven at the same time, thereby avoiding fringe field interaction that can result in signal loss or a lower signal-to-noise ratio. In FIG. 76, the squares 7601 and 7602 each comprise one drive electrode and one sense electrode. Squares 7601 correspond to in phase drive while squares 7602 correspond to 180 degree out-of-phase drive signal. In the figure, two rows (totaling twenty pixels) can be covered in five sequences, with four pixels scanned at a time.

1.8.1.9 Concept D

Figure 77:
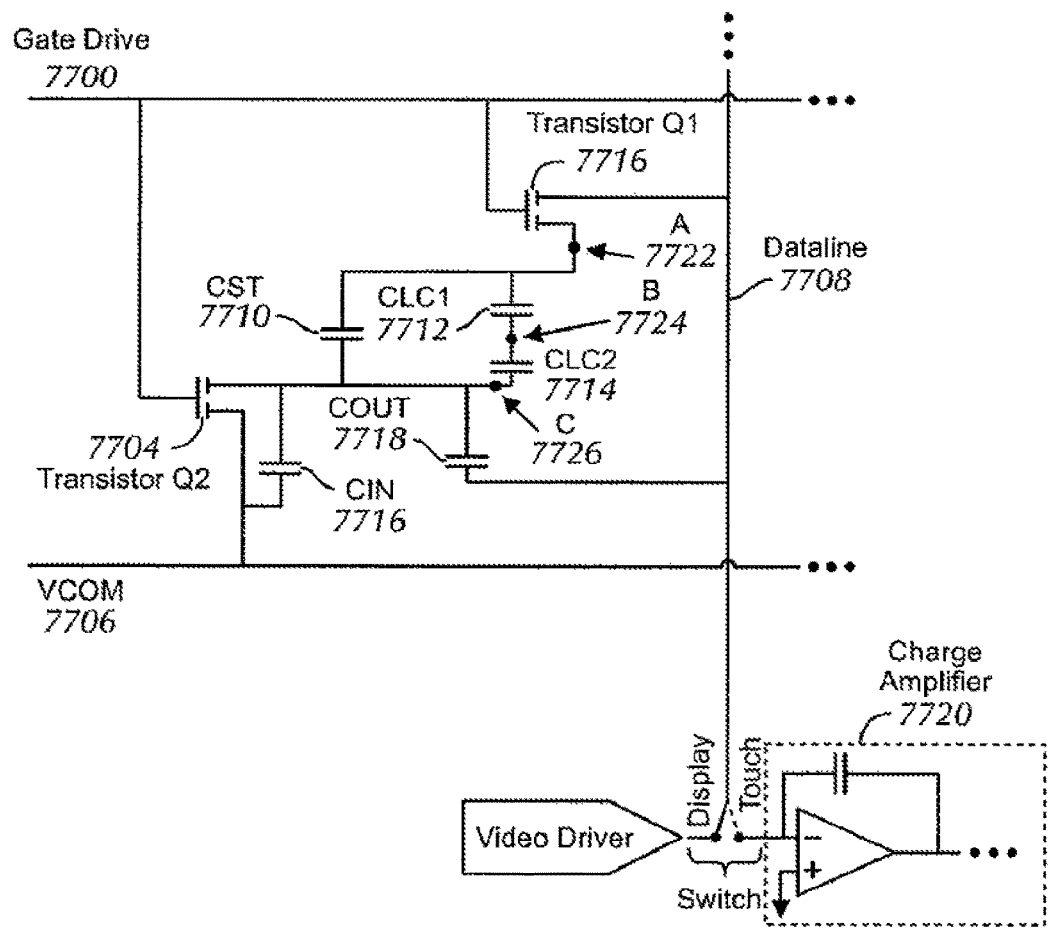
FIG. 77 illustrates a circuit diagram for the embodiment of FIG. 79.

Another embodiment, Concept D, can support multi-touch sensing using two segmented ITO layers and an additional transistor for each touch pixel. FIG. 77 shows a circuit diagram for Concept D. During display updates, the circuit can function as in a standard LCD display. Gate drive 7700 can drive two transistors (Q1 7702 and Q2 7704), thereby allowing signals from $V_{COM}$ bus 7706 and data lines 7708 to transfer charge to a set of capacitors controlling the LC (CST 7710, $C_{LC_1}$ 7712, and $C_{LC_2}$ 7714). When transistor Q2 7704 is turned off $V_{COM}$ 7706 is disconnected from CST 7710, allowing $V_{COM}$ line 7706 to be used for touch sensing. Specifically, $V_{COM}$ line 7706 can be used to send charge through $C_{IN}$ 7716 and $C_{OUT}$ 7718, through the data line 7708 (which acts as a touch sense line) into charge amplifier 7720. A conductive object (such as a user's finger, stylus, etc.) approaching the display can perturb the capacitances of the system in a manner that can be measured by the charge amplifier 7720.

Figure 78:
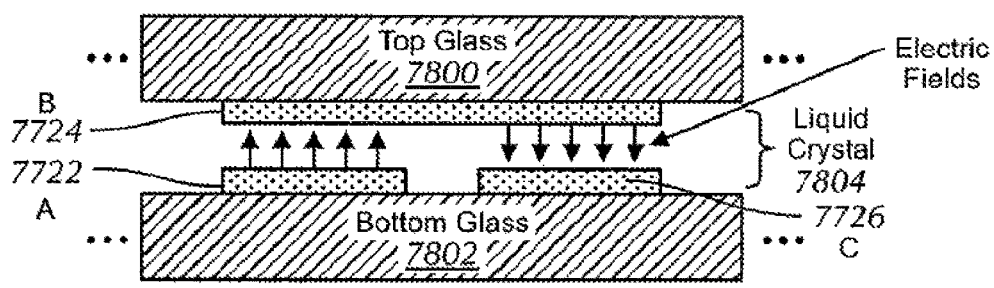
FIG. 78 illustrates segment ITO layers.
Figure 79:
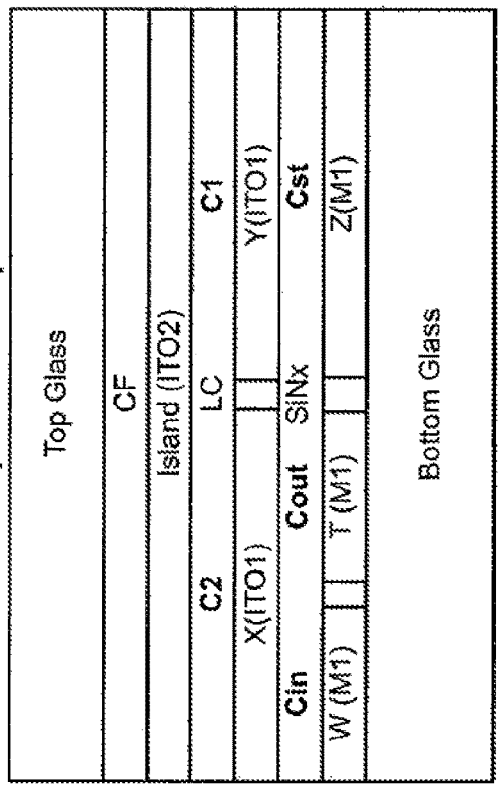
FIG. 79 illustrates a stackup diagram for another embodiment of a touch-screen LCD.

FIGS. 78 and 79 show stackup diagrams for a sub-pixel in a Concept D-based display. In FIG. 78, the ITO1 layer can be segmented into two plates, A 7722 and C 7726. The ITO2 layer can be segmented into islands (e.g., B 7724) that can be located over sub-pixels and serve as the counter-electrodes to the plates in the ITO1 layer. During display update, voltage differences between island 7724 and the plates (A 7722, C 7726) can be used to control liquid crystal 7804. During touch sensing, perturbations to the capacitances throughout the subpixel (e.g., $C_{LC}1$, $C_{LC}2$, Cin, Cout, and Cst in FIG. 77) can be measured to determine the proximity of a conductive object.

Figure 80:
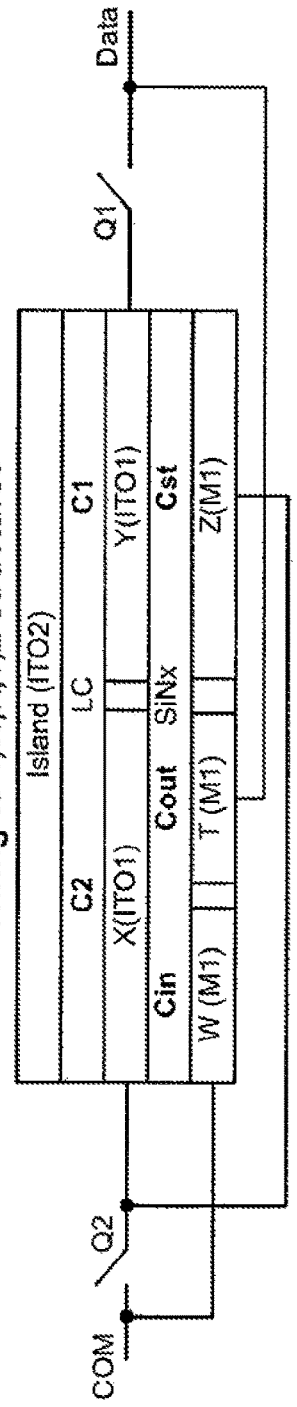
FIG. 80 illustrates a combined wiring and stackup diagram for the embodiment of FIG. 79.
Figure 81:
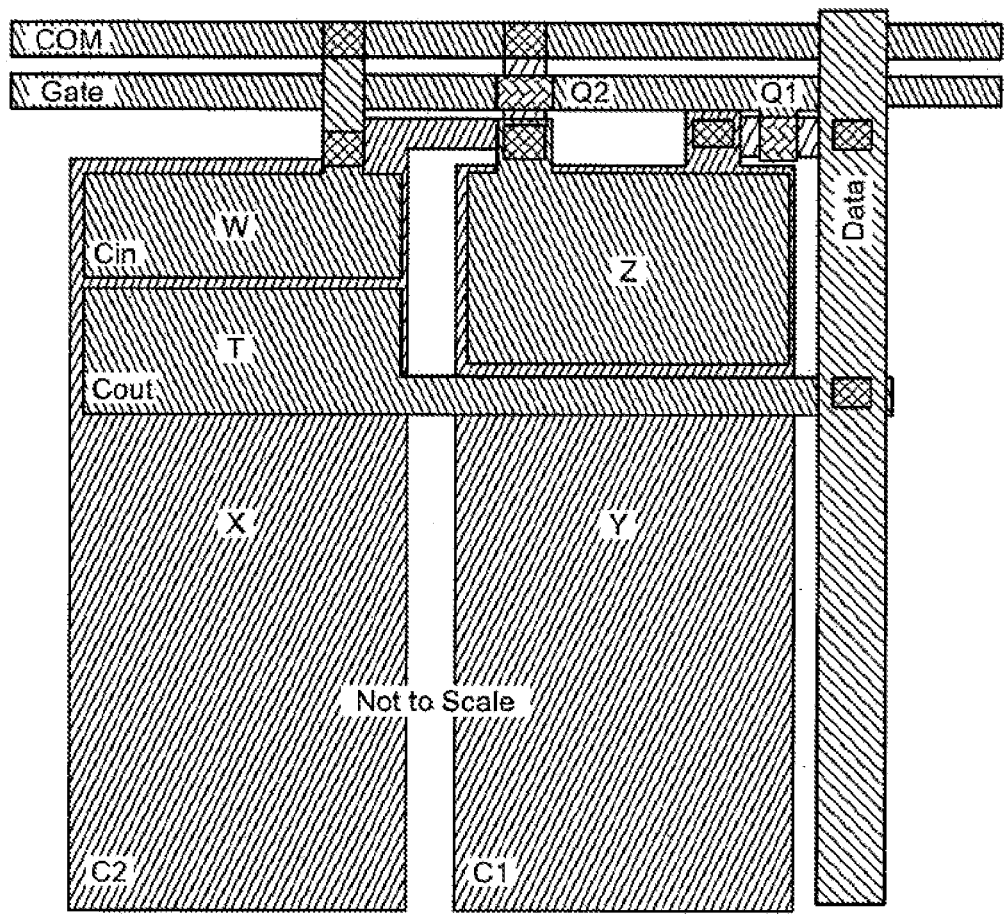
FIG. 81 illustrates a physical realization of the embodiment of FIG. 79.
Figure 81:

FIG. 80 shows a combined wiring and stackup diagram for Concept D. FIG. 81 shows a physical realization for one embodiment of Concept D.

1.8.2 Fully-Integrated IPS-based LCDs

Figure 82:
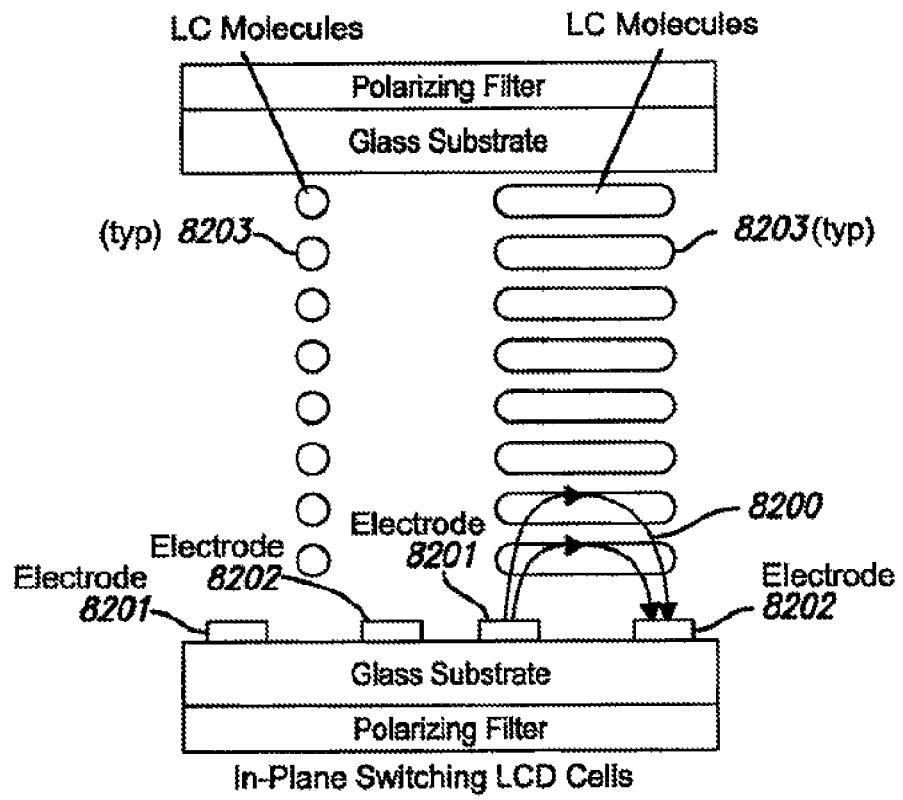
FIG. 82 illustrates in-plane switching LCD cells.
Figure 83:
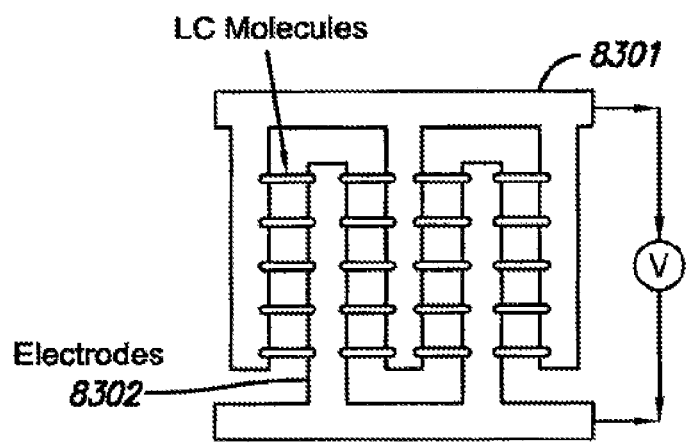
FIG. 83 illustrates an organization of electrodes for in-plane switching LCD cells.

In-plane switching (IPS), as illustrated schematically in FIG. 82, can be used to create LCD displays with wider viewing angles. While some LCDs (such as twisted nematic LCDs) use vertically-arranged electrode pairs (e.g., as shown in FIG. 20), in IPS LCDs both electrodes 8201, 8202 used to control orientation of the liquid crystals 8203 can be parallel to one another in the same layer (e.g., in a single plane). Orienting the electrodes in this way can generate a horizontal electric field 8200 through the liquid crystal, which can keep the liquid crystals parallel to the front of the panel, thereby increasing the viewing angle. Liquid crystal molecules in an IPS display are not anchored to layers above or below (as shown in FIG. 82, for example), but instead can rotate freely to align themselves with electric field 8200 while remaining parallel to one another and the plane of the display electrodes. FIG. 83 shows a more realistic arrangement of an interdigitated pair of electrodes 8301, 8302 in a display that can use in-plane switching.

Because IPS displays lack a $V_{COM}$ layer that can also be used for touch drive or touch sense, some embodiments of the present invention can provide touch-sensing capabilities by allowing the same electrodes used for display updating to also be used for touch sensing. These electrodes can be complemented by additional circuitry. In some embodiments discussed above, touch pixels can overlap a large number of display pixels. In contrast, because the IPS embodiments discussed below can use the same electrodes used for display control and touch sensing, higher touch resolution can be obtained with little to no additional cost. Alternatively, a number of touch pixels can be grouped to produce a combined touch signal with a lower resolution.

1.8.2.1 Concept E

Figure 84:
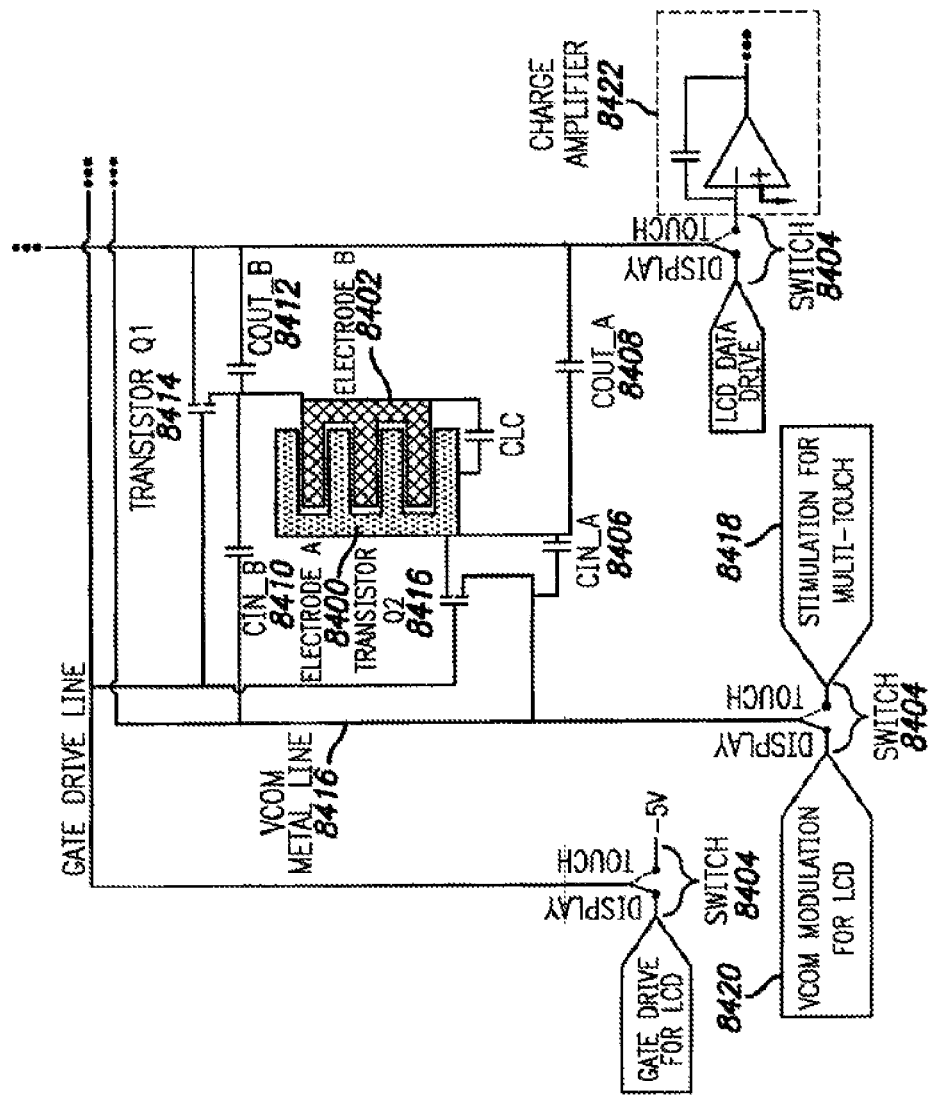
FIG. 84 illustrates a circuit diagram for an embodiment of an IPS-based touch-screen LCD.

One IPS embodiment, Concept E, is illustrated in FIG. 84. As mentioned above, the electrodes in IPS-based touch sensing displays can be in the same plane and can have an interdigitated structure (as shown in FIG. 84). While electrode A 8400 and electrode B 8402 can be used to orient the liquid crystal layer during display updating, these same electrodes can also be used (in combination with additional elements) to achieve touch sensing. For example, Concept E can use additional switches 8404 to change the drives for a set of signal lines based on whether the pixel is undergoing display updating or touch-sensing. Concept E can also include capacitances (CIN_A 8406, COUT_A 8408, CIN_B 8410, and COUT_B 8412) and two transistors (transistor Q1 8414 and transistor Q2 8416) to control when the electrodes will be used for display updating or touch sensing.

During touch sensing, transistors Q1 8414 and Q2 8418 are turned off, disconnecting the electrodes from display signals and allowing the electrodes to be used to measure capacitance. The $V_{COM}$ metal line 8416 can then be connected to touch stimulation signal 8418. This stimulation signal can be sent through CIN_A 8406 and CIN_B 8410 to COUT_A 8408 and COUT_B 8412, which can connect to charge amplifier 8422. A capacitance $C_{SIG}$ (not shown) between CIN and COUT can be used to detect touch. When the sense pixel is not being touched, charge delivered to the charge amplifier 8422 can depend mainly on the capacitance between the two pairs of CIN and COUT capacitors. When an object (such as a finger) approaches the electrodes, the $C_{SIG}$ capacitance can be perturbed (e.g., lowered) and can be measured by charge amplifier 8422 as a change in the amount of charge transferred. The values for CIN and COUT can be selected to fit a desired input range for charge amplifier 8422 to optimize touch signal strength.

The electrodes can be used to perform touch sensing without negatively affecting the display state by using a high-frequency signal during touch sensing. Because LC molecules are large and non-polar, touches can be detected without changing the display state by using a high-frequency field that does not change or impose a DC component on the RMS voltage across the LC.

Figure 85:
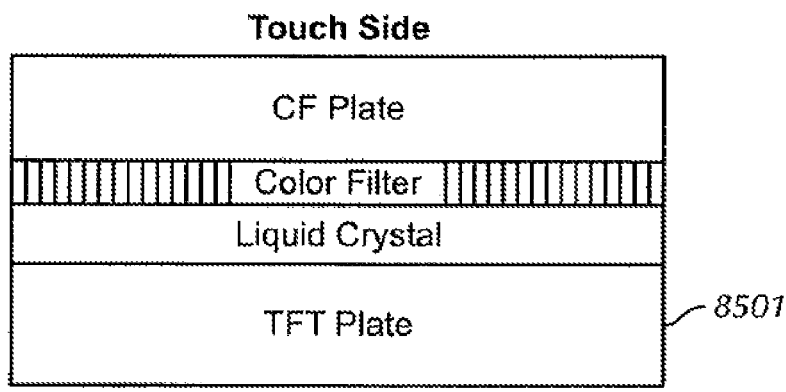
FIG. 85 illustrates a stackup diagram corresponding to FIG. 84.

FIG. 85 shows a stackup diagram for Concept E. As described, all touch elements can be formed on TFT plate 8501.

1.8.2.2 Concept Q

Another embodiment of an IPS-based touch-sensing display, Concept Q, also permits the TFT glass elements of an LCD (such as metal routing lines, electrodes, etc.) to be used for both display and touch sensing functions. A potential advantage of such an embodiment is that no changes to display factory equipment are required. The only addition to conventional LCD fabrication includes adding the touch-sensing electronics.

Figure 105:
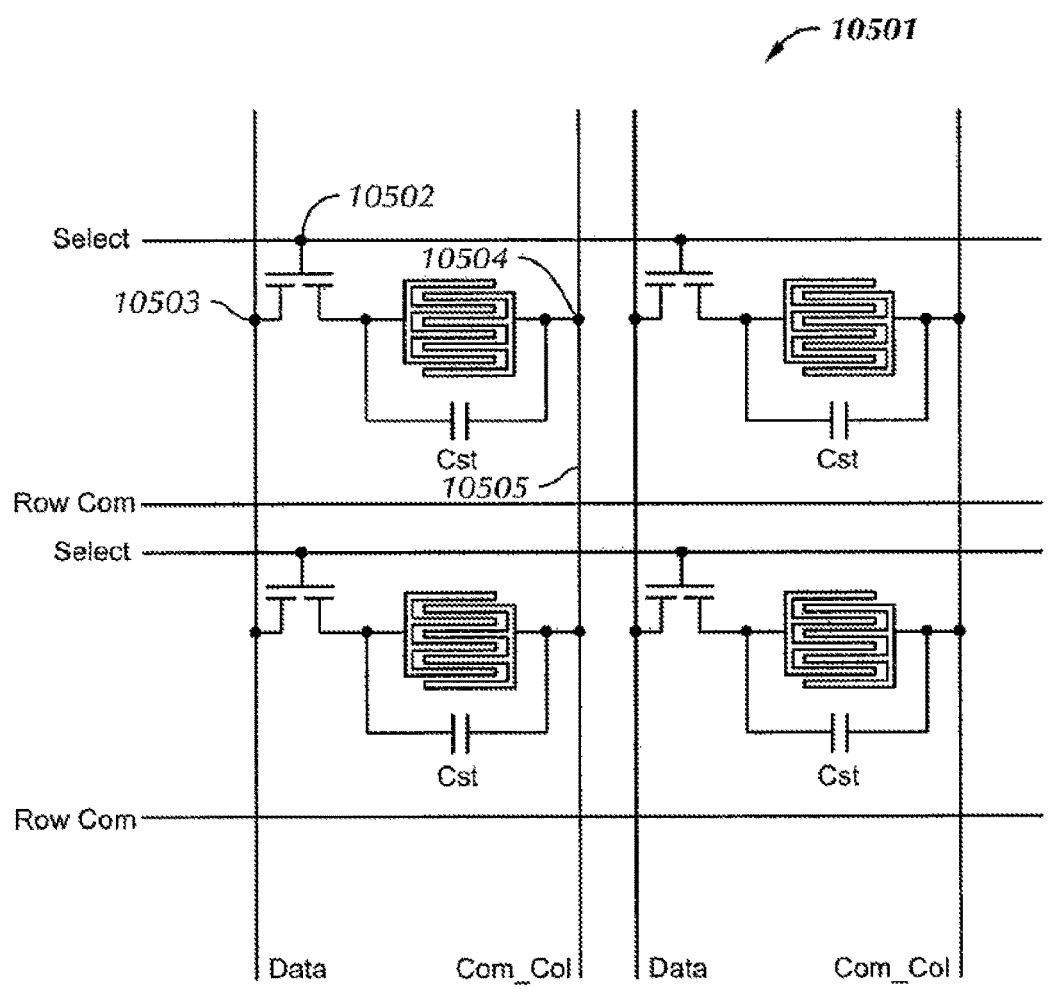
FIG. 105 illustrates a plurality of IPS LCD sub-pixels connected to form a plurality of touch sense columns.
Figure 106:
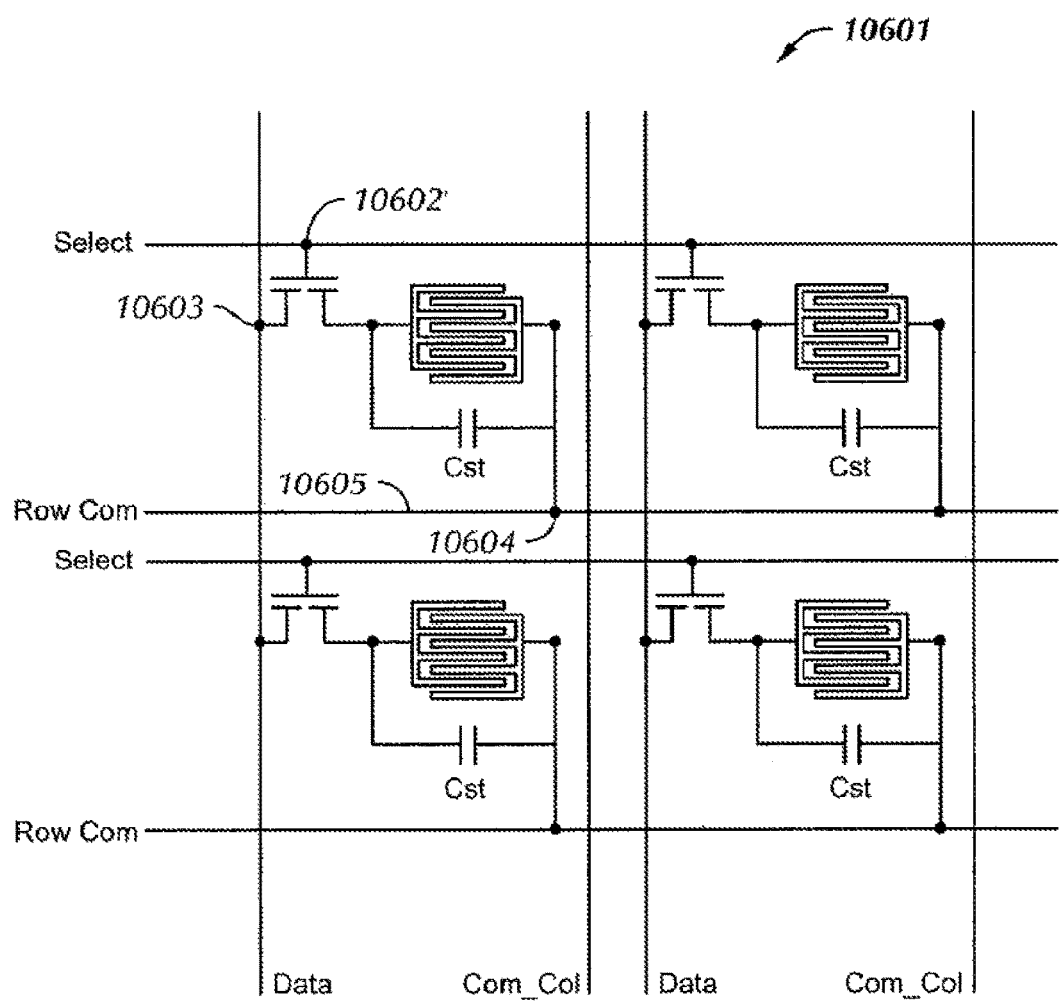
FIG. 106 illustrates a plurality of IPS LCD sub-pixels connected to form a plurality of touch sense rows.
Figure 107:
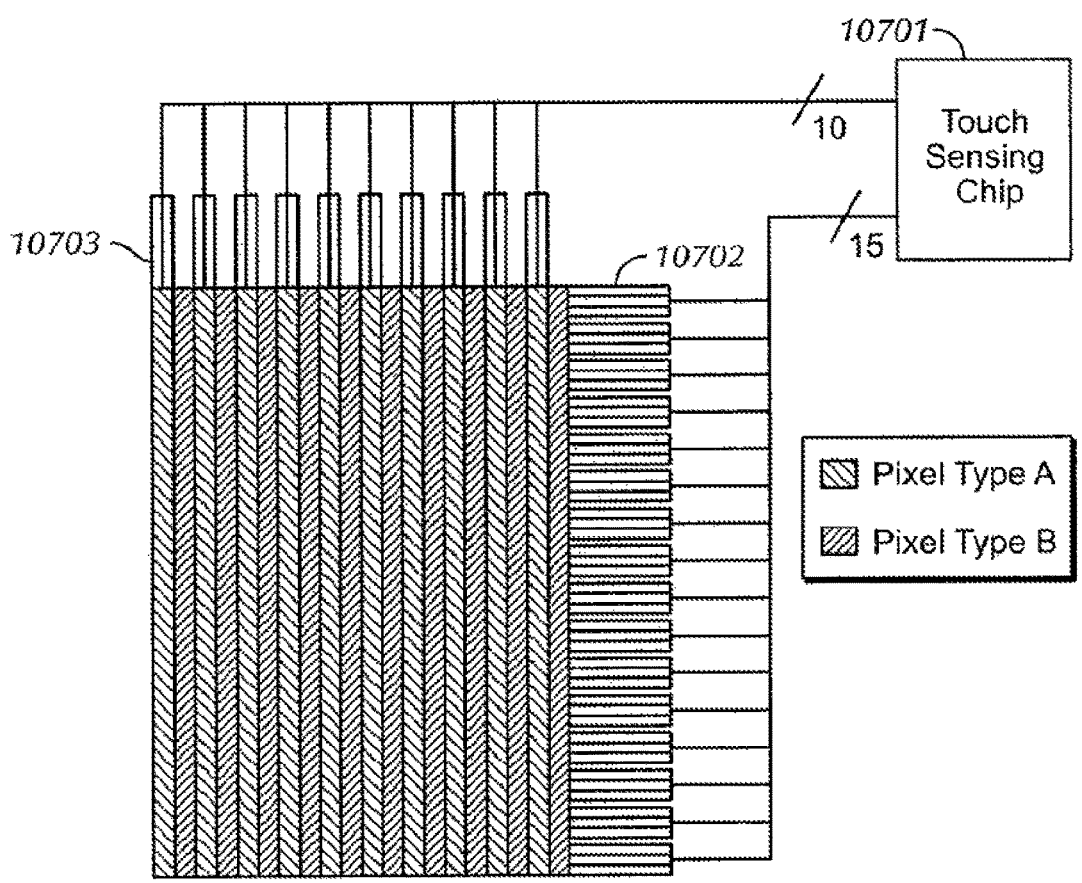
FIG. 107 illustrates an IPS LCD with integrated touch sensing.

Concept Q includes two types of pixels, illustrated in FIGS. 105 and 106. Pixel type A is illustrated in FIG. 105. Each pixel 10501 includes three terminals, a select terminal 10502, a data terminal 10503, and a common terminal 10504. Each of the A type pixels have their common terminal connected along columns 10505 to form touch-sensing columns. Pixel type B is illustrated in FIG. 106. Each pixel 10601 also includes three terminals, select 10602, data 10603, and common 10604. Each of the B type pixels have their common terminal connected along rows 10605 to form touch sensing rows. The pixels can be arranged as shown in FIG. 107 with a plurality of touch sense rows 10702 and a plurality of touch sense columns 10703. A touch sensing chip 10701, which can include the drive stimulation and sensing circuitry can be connected to the rows and columns.

The touch sensing chip can operate as follows. During a first time period, all of the rows and columns can be held at ground while the LCD is updated. In some embodiments, this may be a period of about 12 ms. During a next time period the A type pixels, i.e., touch columns, can be driven with a stimulus waveform while the capacitance at each of the B type pixels, i.e., touch rows, can be sensed. During a next time period, the B type pixels, i.e., touch rows, can be driven with a stimulus waveform while the capacitance at each of the A type pixels, i.e., touch columns, can be sensed. This process can then repeat. The two touch-sense periods can be about 2 ms. The stimulus waveform can take a variety of forms. In some embodiments it may be a sine wave of about 5V peak-to-peak with zero DC offset. Other time periods and waveforms may also be used.

1.8.2.3 Concept G

One issue that can arise in an IPS-based touch-sensing display is that a lack of shielding between the touch and the LC means a finger (or other touch object) can affect the display output. For instance, a finger touching the screen can affect the fields used to control the LC, causing the display to distort. One solution to this issue can be to put a shield (e.g., a transparent ITO layer) between the user and the display sub-pixels. However, such a shield can also block the electric fields used for touch sensing, thereby hindering touch sensing.

Figure 86:
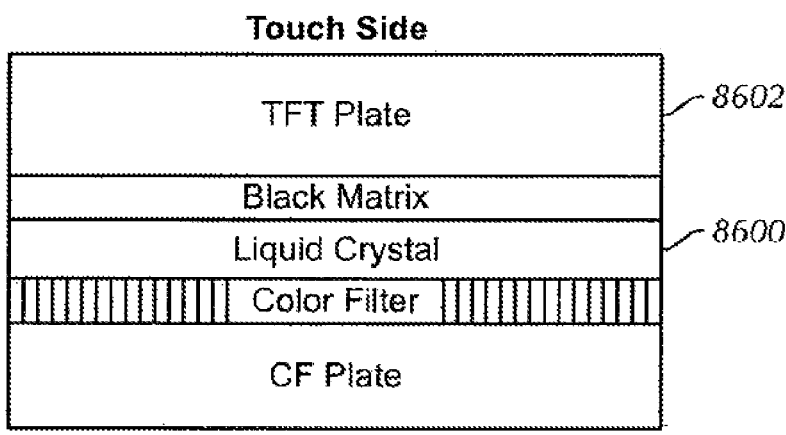
FIG. 86 illustrates a stackup diagram for another embodiment of an IPS-based touch-screen LCD.

One embodiment, Concept G, overcomes this issue by flipping the layers of the display as shown in the stackup diagram in FIG. 86. This can place LC 8600 on the opposite side of the TFT plate 8602 from the user. As a result, the field lines used to control the LC 8600 can be generally oriented away from the touch side of the LCD. This can allow metal areas, such as the data lines, gate lines, and electrodes, that are now between the touching object and the LC 8600 to provide partial or full shielding for the LC.

1.8.2.4 Concept F

Figure 87:
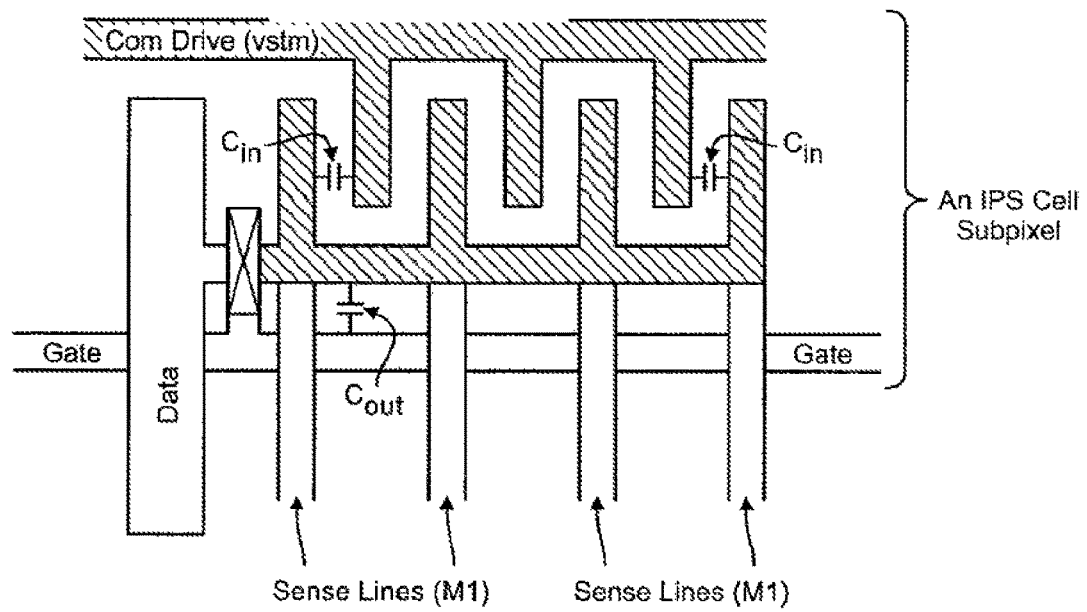
FIG. 87 illustrates a physical model for Concept F, an embodiment of an IPS-based touch-screen LCD.
Figure 88:
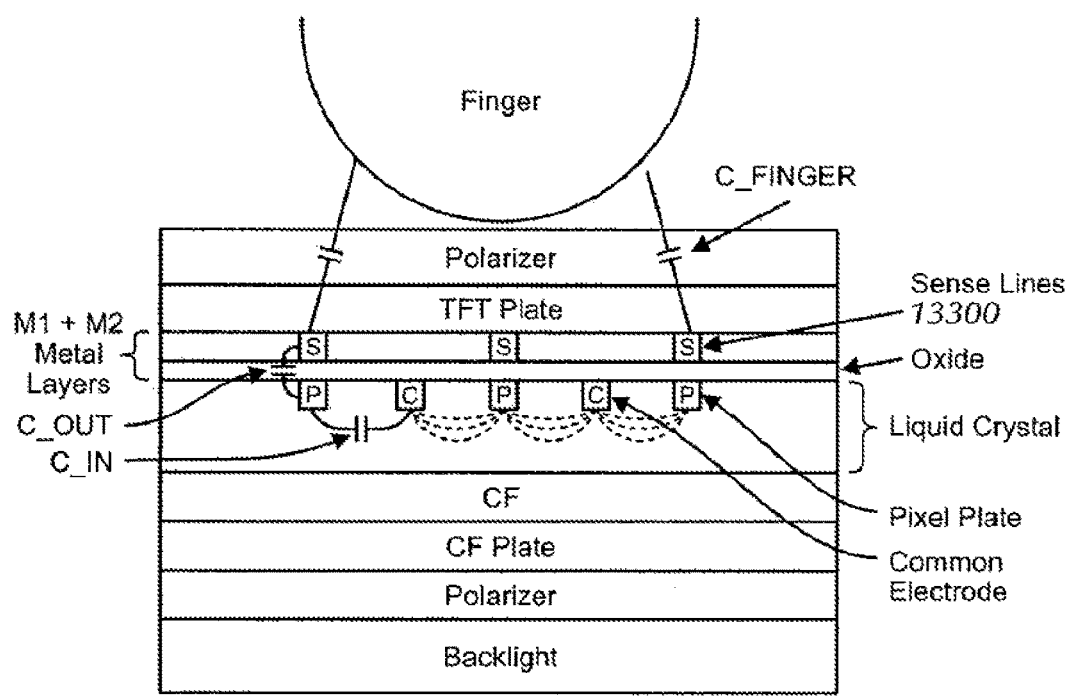
FIG. 88 illustrates a stackup diagram corresponding to the embodiment of FIG. 87.

Another embodiment, Concept F (illustrated in FIG. 87), can reduce display perturbation while leaving the LCD data bus unchanged (in relation to non-touch IPS displays) and without requiring additional ITO layers or making the alignment of layers more difficult. Instead of using a shared data line (as in Concepts E and G), Concept F can reduce potential display perturbation by adding a set of routed metal lines in a metal layer (M1) that can serve as output sense lines 8700. These output sense lines 8700 can run vertically underneath the display circuitry across the full area of the display, as shown in FIG. 87 and in the stackup diagram for a Concept F sub-pixel shown in FIG. 88. By using a separate metal layer for output sense, Concept F can allow one of the transistors shown for Concept E (FIG. 84) to be removed. Note also that Concept F flips the layers of the display to further reduce potential display perturbation, as described above with respect to Concept G.

2. Enabling Technologies

A variety of aspects can apply to many of the embodiments described above. Examples of these are described below.

2.1 DITO

In many embodiments, ITO may be deposited and patterned on two sides of a substrate. Various techniques and processes for doing so are described in U.S. patent application Ser. No. 11/650,049, titled "Double-Sided Touch Sensitive Panel With ITO Metal Electrodes," filed Jan. 3, 2007, which is hereby incorporated by reference in its entirety.

2.2 Replacing Patterned ITO with Metal

Various embodiments can eliminate the patterned ITO layer that forms touch sense electrodes and replace this layer with very thin metal lines deposited on one of the layers, for example, on the top glass. This can have a number of advantages, including eliminating an ITO processing step. Additionally, the sense line electrodes may be made quite thin (e.g., on the order of 10 microns), so that they do not interfere with visual perception of the display. This reduction in line thickness can also reduce the parasitic capacitance which can enhance various aspects of touch screen operation, as described above. Finally, because the light from the display does not pass through a layer substantially covered with ITO, color and transmissivity can be improved.

2.3 Use of Plastic for Touch Sense Substrate

Figure 89:
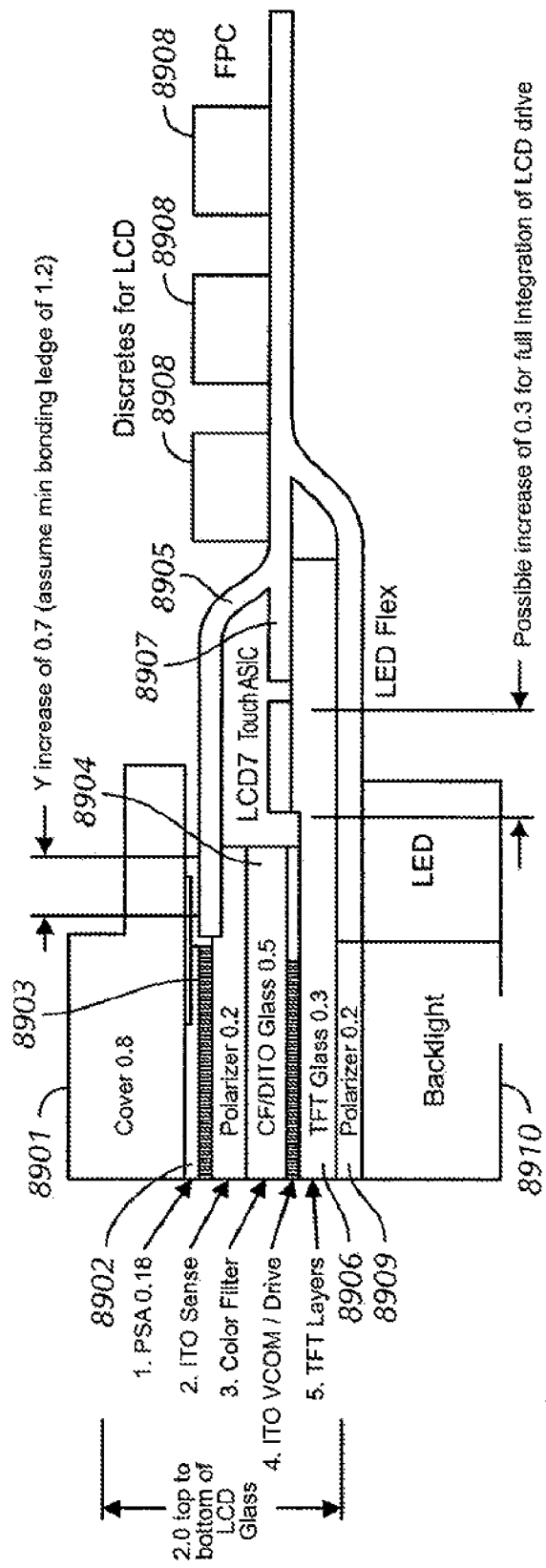
FIG. 89 illustrates a side view of an all glass touch screen LCD.
Figure 90:
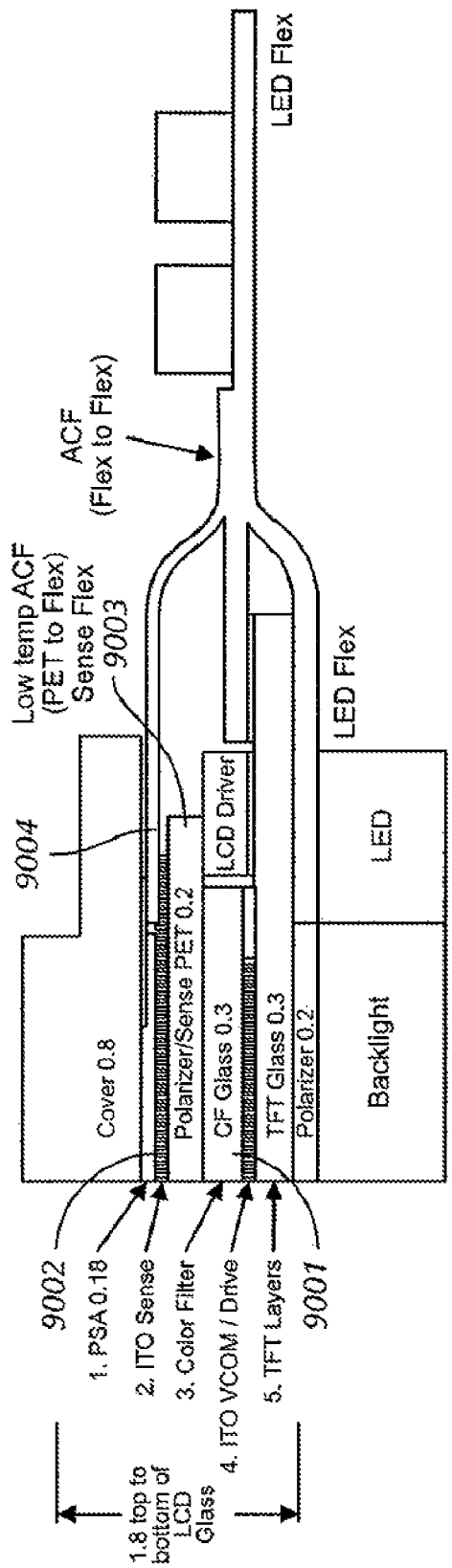
FIG. 90 illustrates a side view of a touch screen LCD including a plastic layer.

Various embodiments described above have been described in the context of glass substrates. However, in some embodiments, cost savings and reduced thickness can be achieved by replacing one or more of these substrates with plastic. FIGS. 89 and 90 illustrate some differences between glass-based systems, illustrated in FIG. 89, and plastic-based systems, illustrated in FIG. 90. Although illustrated in the context of one particular embodiment, the principle of substituting a plastic substrate may be applied to any of the concepts.

FIG. 89 illustrates a stack up of a glass based system. Dimensions illustrated are exemplary using current technology, but those skilled in the art will understand that other thickness may be used, particularly as the various fabrication technologies advance. Starting from the top, a cover 8901, having an exemplary thickness of about 0.8 mm, can be above an index matching layer 8902 (e.g., approximately 0.18 mm thick). Below the index matching layer can be top polarizer 8903. The top polarizer 8903 can have a thickness of approximately 0.2 mm. The next layer can be glass layer 8904 (e.g., about 0.5 mm thick) having ITO patterned on each side. Sense electrodes can be patterned on the top side, for example, which can also be bonded to FPC 8905. The drive electrodes and $V_{COM}$ layer for the LCD can be patterned on the bottom of glass layer 8905. Below this can be another glass layer 8906, having an exemplary thickness of about 0.3 mm, on which the TFT layers for the display can be formed. The top of this glass layer can also be bonded to FPC 8907 connecting to both the display and touch sensing circuitry 8908. Below this can be the bottom polarizer, below which can be the display backlight 8910.

The overall thickness from top to bottom can be approximately 2.0 mm. Various ASICs and discrete circuit components may be located on the glass or connected via the FPCs. Patterned ITO can be placed on another plastic layer, for example, the bottom side of the top cover, etc.

FIG. 90 illustrates a similar arrangement in which middle glass layer 9001 can be reduced in thickness by moving touch sense layer 9002 to plastic polarizer 9003. Patterning touch sense layer 9002 on plastic polarizer 9003 can be accomplished by various known methods. Reduction in thickness can be accomplished because the glass need not be patterned on both sides. Because of handling issues, glass used in LCD processes may be processed at a thickness of about 0.5 mm, for example, and then ground down to about, 0.3 mm, for example, after processing. Having circuit elements on both sides precludes grinding down the glass. However, because in the embodiment of FIG. 90 middle glass 9001 has electrodes patterned on only one side, it may be ground down, giving an overall thickness reduction of about 0.2 mm. This arrangement may include additional FPC connection 9004 to the polarizer, which can be bonded using a low temperature bonding process. An additional advantage of using a plastic substrate can arise in that materials with different dielectric constants can be used, which can provide flexibility and enhance operation of capacitive sensing circuits.

Figure 91:
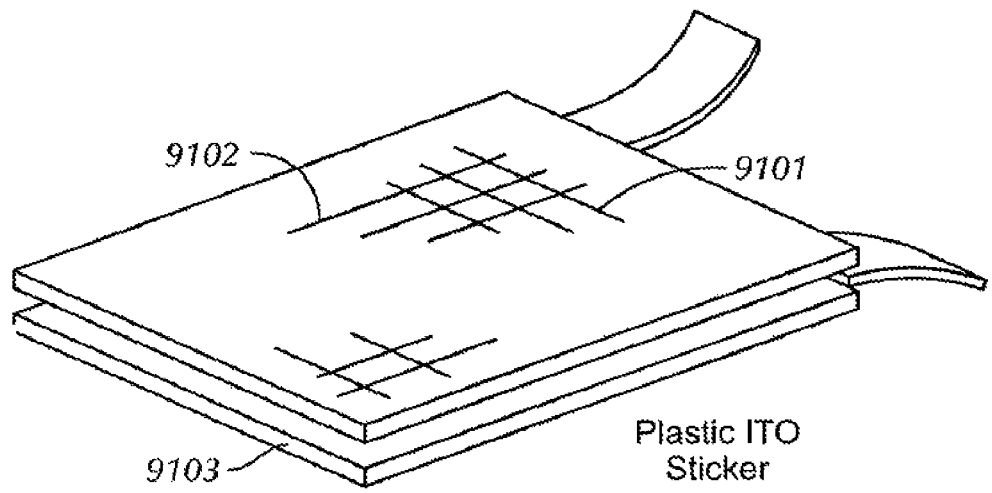
FIG. 91 illustrates a touch screen having multiple plastic layers.

A variation on the plastic substrate embodiment is illustrated in FIG. 91. Electrodes 9101 (e.g., drive or sense lines) can be patterned on multiple plastic substrates 9102, 9103 that can then be adhered together. Because the plastic substrates can be thinner (e.g., approximately half the thickness of a glass substrate) such techniques can allow even thinner touch screens.

Figure 92:
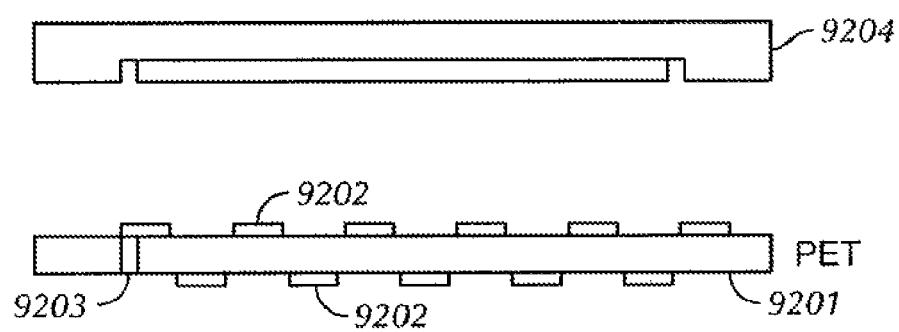
FIG. 92 illustrates a touch screen having a PET layer patterned on two sides with a connection through the PET layer.
Figure 93:
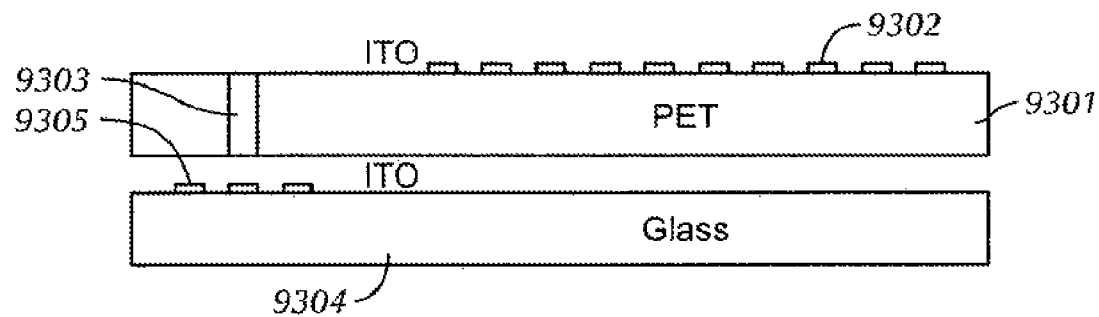
FIG. 93 illustrates a combination PET/glass touch screen.

In another variation, illustrated in FIG. 92, polyester substrate 9201 can have electrodes 9202 patterned on either side. This embodiment can include an access hole 9203 through substrate 9201 for connection between the two sides. Polyester substrate 9201 can be disposed in cover 9204 of a device, such as a handheld computer. Still another variation is illustrated in FIG. 93, which illustrates a polyester layer 9301 having ITO electrodes 9302 patterned on a top surface, with access hole 9303 through substrate 9301 to a second glass substrate 9304, also with ITO electrode 9305 patterned on the top surface.

Figure 94:
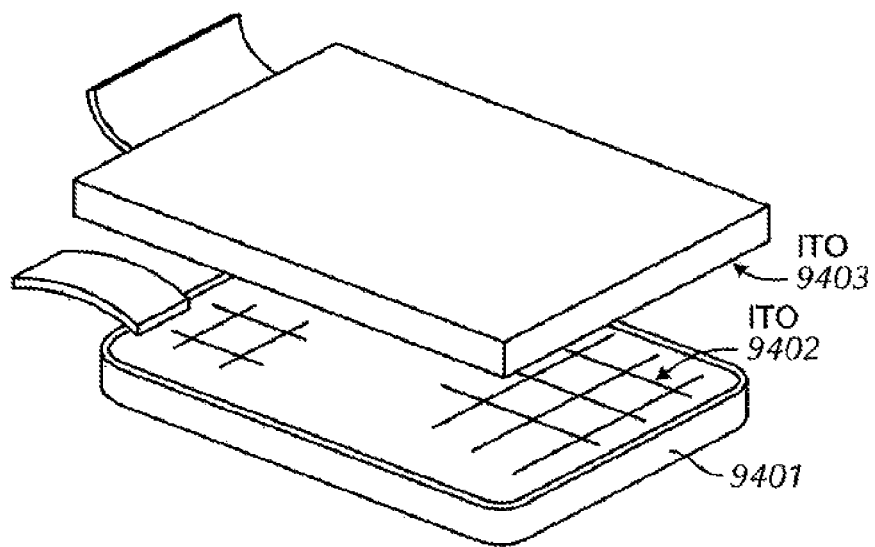
FIG. 94 illustrates a touch screen LCD device assembly.
Figure 95:
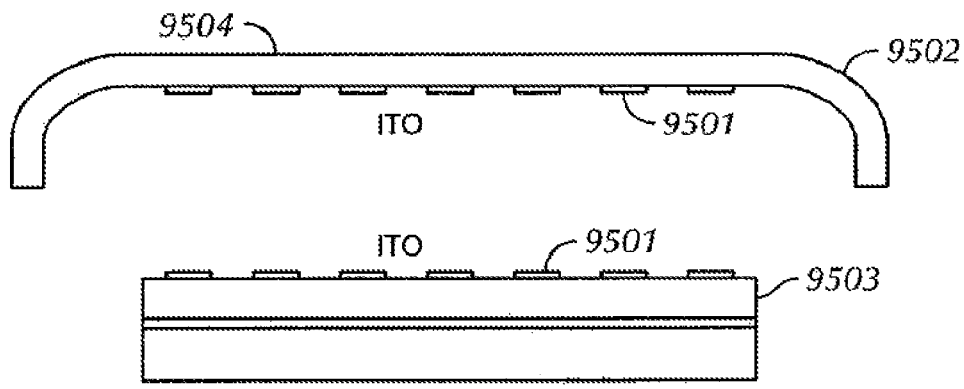
FIG. 95 illustrates a touch screen LCD having a touch layer patterned on the inside of a transparent plastic housing.

FIG. 94 illustrates an upside down view of a device, for example a handheld computer 9401. By upside down, it is meant that the user surface of the device is the bottom surface (not shown). ITO touch sensing electrodes 9402 can be patterned on the back of the user surface, with a stack up 9403 having ITO disposed on the facing surface being disposed therein during device assembly. A further variation of this concept is illustrated in FIG. 95, which shows ITO electrodes 9501 patterned on the inside of molded plastic cover 6702 and on the top of a stack up of layers 9503 according to one of the various embodiments discussed herein. In the diagram of FIG. 95, the user face of the device can be top surface 9504.

Figure 96:
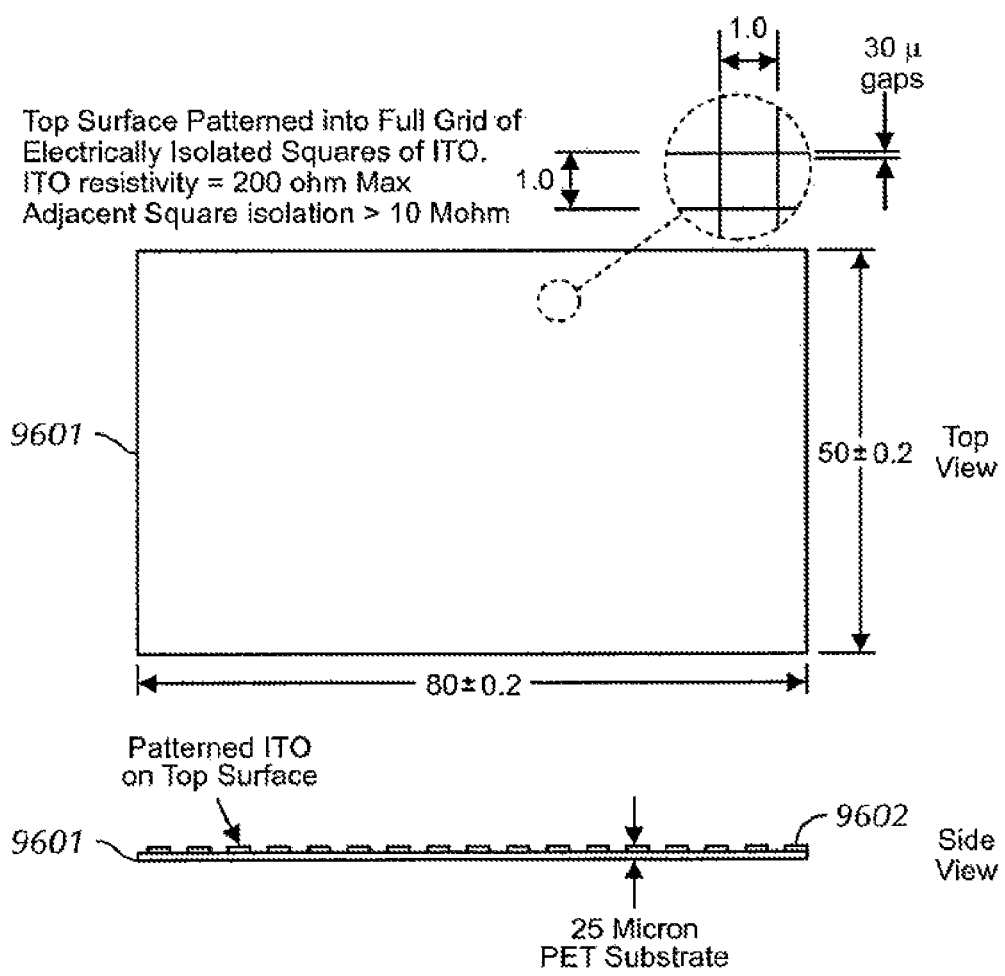
FIG. 96 illustrates a patterned PET substrate that may be used with a touch screen LCD.
Figure 97:
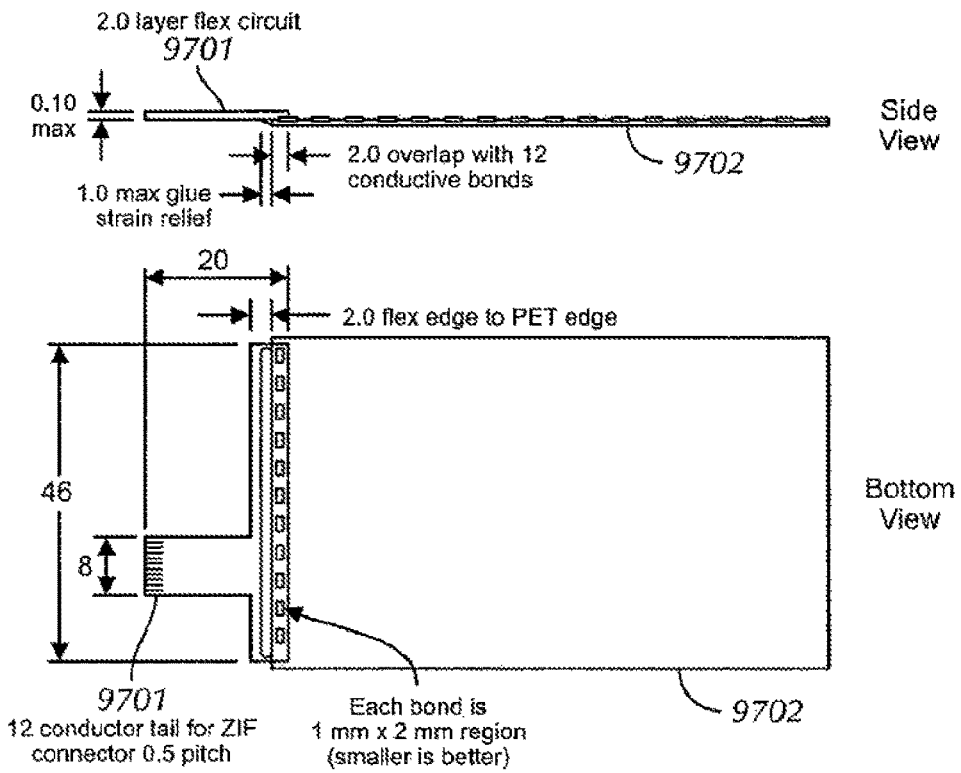
FIG. 97 illustrates flexible printed circuits bonded to the PET substrate of FIG. 96.
Figure 98:
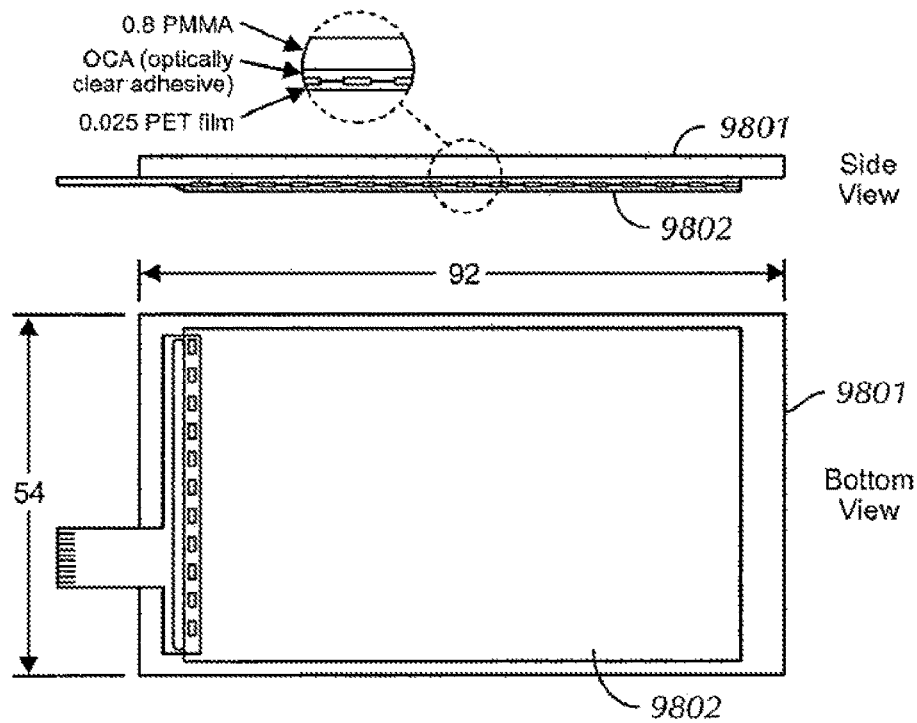
FIG. 98 illustrates a cover affixed to the assembly of FIG. 97.

FIGS. 96, 97, and 98 illustrate a sequence of steps in manufacturing a polyester substrate having a pattern of ITO electrodes disposed thereon that may be suitable for touch sensing as described herein. FIG. 96 illustrates a patterned polyester sheet 9601 patterned into a grid of isolated squares of ITO 9602. The ITO resistivity can be about 200 ohms or less. The individual electrodes can be approximately 1 mm by 1 mm, with 30 micron gaps between. In the illustrated embodiment, sheet 9601 can be approximately 50 mm by 80 mm, which can be a suitable size for a handheld computer, multimedia player, mobile telephone, or similar device, although a variety of other sizes and/or applications will occur to those skilled in the art. As illustrated in the sectional view, the sheet may be as little as 25 microns thick, although dimensions of 25 to 200 microns may also be used. Obviously, this can provide significant advantages in terms of device thickness.

In FIG. 97, FPCs 9701 can be bonded to the patterned substrate 9702. In FIG. 98 cover 9801, which can be, for example, an approximately 0.8 mm thick layer of PMMA, can be adhered to the PET substrate 9802 using an optically clear adhesive.

2.4 Level Shifter/Decoder Integration with LCD Controller

In some embodiments, additional circuitry (active, passive, or both) can be placed in the peripheral area of the LCD (see FIG. 6) to support delivery of $V_{STM}$ signals to the touch drive segments. Details of the peripheral area circuitry and its design rules can depend on the particular manufacturing process details and on which TFT technology (i.e., PMOS, NMOS or CMOS) is used. The following four sub-sections discuss approaches for realizing peripheral touch drive circuits in view of different drive circuit integration arrangements.

2.4.1 Discrete Level Shifter/Decoder Chip

In one approach, a discrete level shifter/decoder COG can be attached to the bottom glass (see FIG. 22). In this arrangement metal traces may be needed in the peripheral area. The number of traces can depend on the number of touch drive segments, which may be less than 20 for small displays. Design objectives of this approach can include reducing capacitive coupling, which can be affected by the spacing between touch drive traces, and the space between the touch drive traces and other LCD circuits in the peripheral area. Low trace impedance can also help reduce capacitive coupling between adjacent touch drive traces.

For example, the combined resistance of the longest trace, the level shifter/decoder output resistance, the conductive dot, and the ITO drive segment may be limited to about 450 ohms. The resistance of the touch drive ITO may be around 330 ohms (assuming ITO sheet resistance of 30 ohms/sq and 11 squares), which can leave 120 ohms for other components. The following table shows one allocation of this resistance for each component in the touch drive circuit.

| Level shifter/<br>decoder Output | Metal Trace | Conductive Dot | ITO Segment |
|---|---|---|---|
| 10 ohms | 100 ohms | 10 ohms | 330 ohms |

Wider traces and/or lower sheet resistances may be used to obtain the desired trace resistance. For example, for a trace resistance of 100 ohms, a trace width of 0.18 mm or more may be desirable if the sheet resistance is 200 mohms/sq.

Of course, only the longest touch drive traces need the greatest width. Other touch drive traces, being correspondingly shorter, may have correspondingly smaller widths. For example, if the shortest trace is 5 mm, then its width could be around 0.01 mm.

Figure 99:
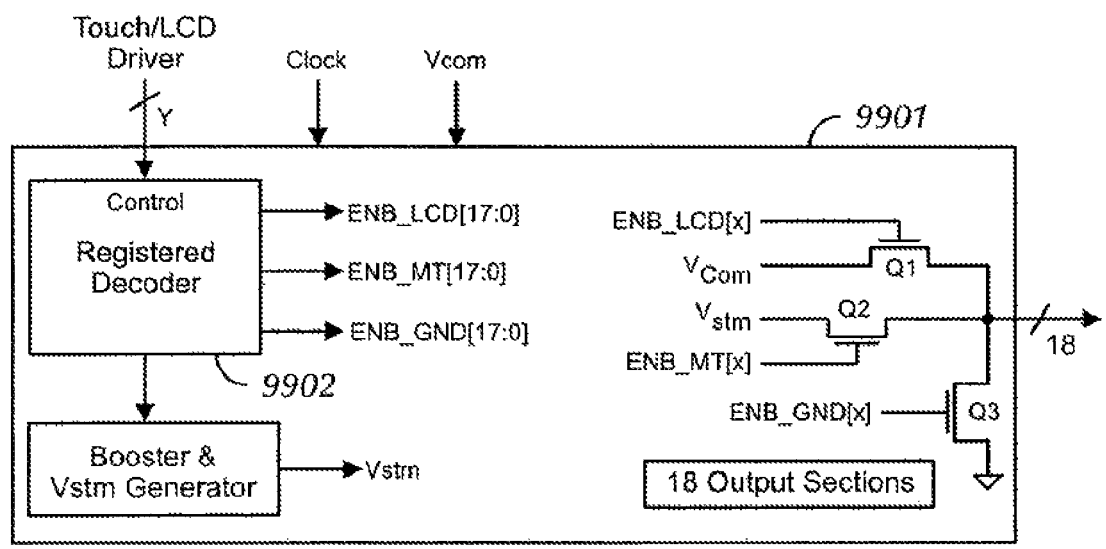
FIG. 99 illustrates a simplified diagram of a level shifter/decoder chip on glass.

FIG. 99 shows a simplified diagram of the level shifter/decoder COG 9901 for Concept A. (For Concept B, transistor Q1 and ENB_LCD[x] decoder can be eliminated.) Registered decoder block 9902 can be comprised of three separate registered decoders, which can be loaded one at a time. One of the three decoders can be selected by two signals from the Touch/LCD Driver and can be programmed using 5-bit data. The decoder outputs can control the three transistors Q1, Q2, Q3 associated with each output section of the level shifter/decoder. Each output section can be in one of three states: 1) LCD (Q1 on, Q2 and Q3 off), 2) touch (Q2 on, Q1 and Q3 off), or 3) GND (Q3 on, Q1 and Q2 off). As mentioned above, Q2's output resistance can be approximately 10 ohms or less to reduce $V_{STM}$ phase delay. For Concept B, the LCD decoder and Q1 can be eliminated.

2.4.2 Level Shifter/Decoder Fully-Integrated in Peripheral Area

The level shifter/decoder function (FIG. 99) can also be fully integrated in the peripheral area of the bottom glass. With this approach, the type of TFT technology becomes relevant to power consumption. While CMOS TFT technology may give lower power consumption, it may be more expensive than NMOS or PMOS. However, any technology may be used depending on particular design constants.

To further reduce touch drive resistance, the transistor width may be enlarged to compensate for relatively low LTPS TFT mobility (e.g., ~50 cm$^2$/V*sec).

2.4.3 Level Shifter/Decoder Partially Integrated in Touch/LCD Driver

Figure 100:
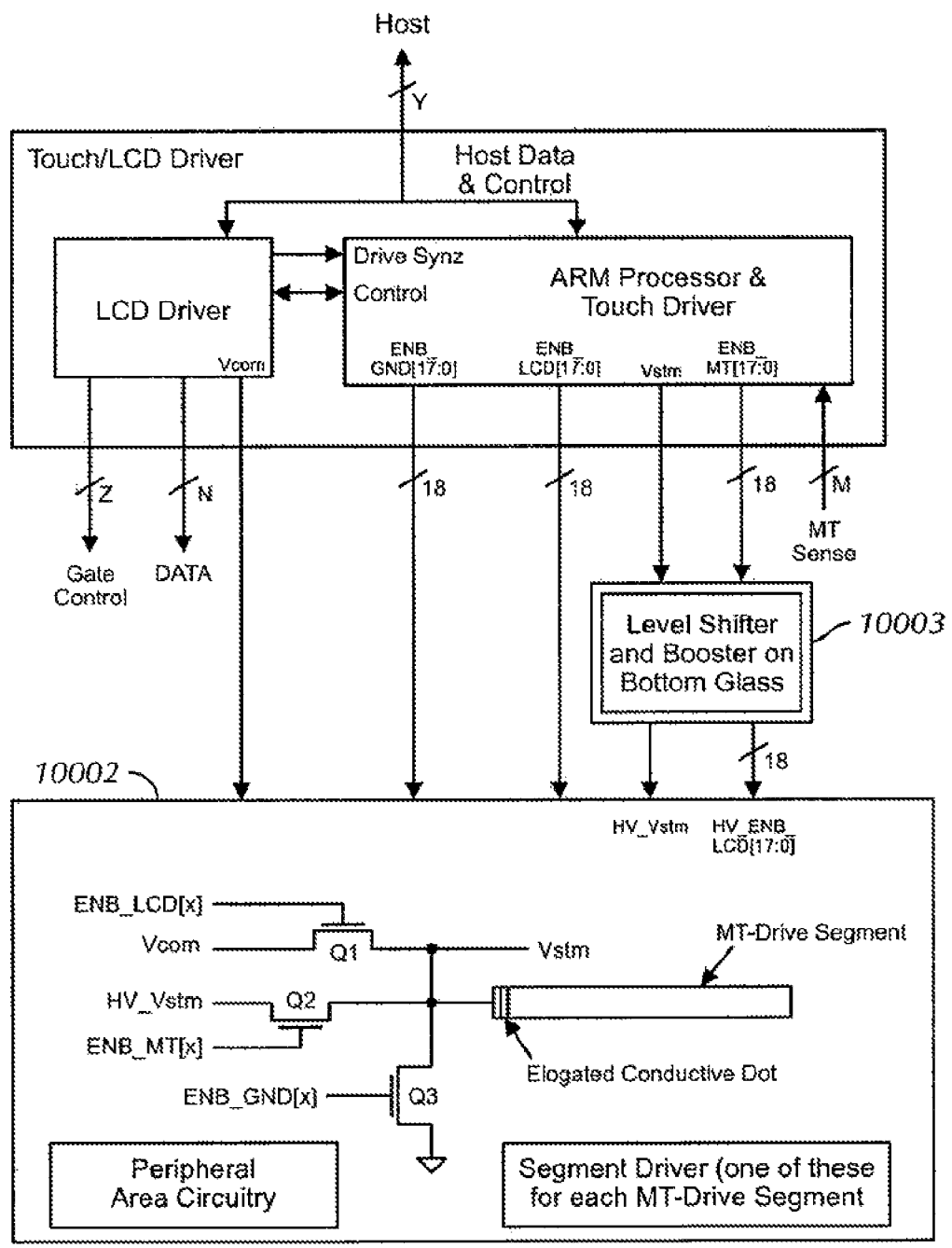
FIG. 100 illustrates a modified Touch/LCD Driver and peripheral transistor circuit.

In some embodiments, the level shifter/decoder function can be partially integrated in the Touch/LCD Driver and partially integrated in the peripheral area. This approach can have several benefits including, for example, eliminating CMOS in the peripheral area, which can reduce cost, and eliminating logic in the peripheral area, which can reduce power consumption. FIG. 100 shows a modified Touch/LCD Driver 10001 and peripheral transistor circuit 10002 that can be used in this approach. The level shifter and boost circuit 10003 can be integrated on the bottom glass and positioned between the segment drivers and the Touch/LCD chip. There can be one segment driver for each touch drive segment. Each touch drive segment can be in one of three states: GND, modulated by $V_{STM}$, or modulated by $V_{COM}$. In this arrangement level shifter circuits may be needed on the bottom glass to enable the low voltage Touch/LCD chip to control the transistor switches.

2.4.4 Level Shifter/Decoder Fully Integrated in Touch/LCD Driver

In some embodiments, the level shifter/decoder function can be completely integrated in the Touch/LCD Driver. By moving the Level shifter/decoder function to the Touch/LCD Driver, the separate level shifter/decoder COG can be eliminated. Furthermore, eliminating CMOS and logic from the peripheral area can be achieved.

Figure 101:
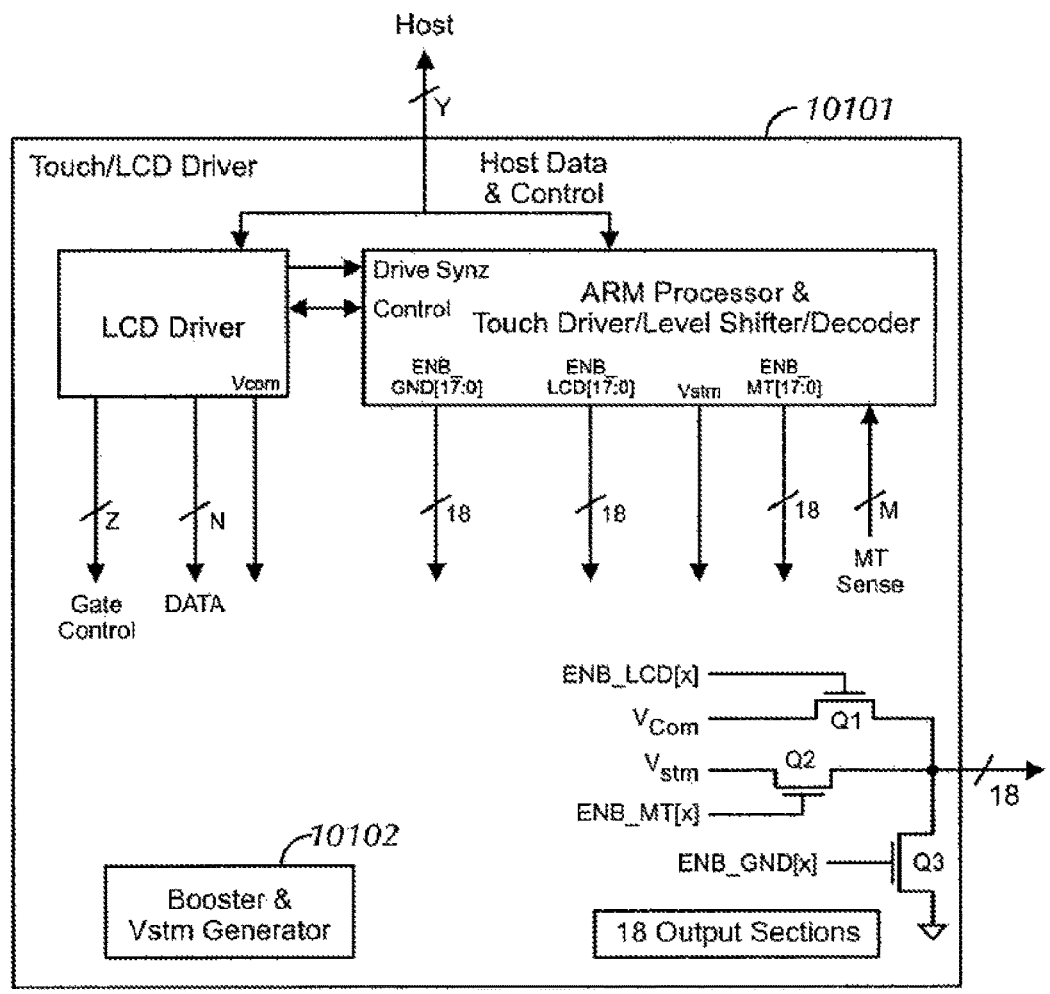
FIG. 101 illustrates a simplified block diagram of a fully-integrated Touch/LCD Driver.

FIG. 101 shows a simplified block diagram of the fully integrated Touch/LCD driver 10101, which can include the boost circuitry 10102 to generate VsTm. Passive components (such as capacitors, diodes, and inductors) may also needed, but, as with all the other approaches, have not been shown for simplicity.

3. Uses, Form Factors, etc.

Exemplary applications of the integral touch screen LCD described herein will now be described. Handheld computers can be one advantageous application, including devices such as PDAs, multimedia players, mobile telephones, GPS devices, etc. Additionally, the touch screen may find application in tablet computers, notebook computers, desktop computers, information kiosks, and the like.

Figure 102:
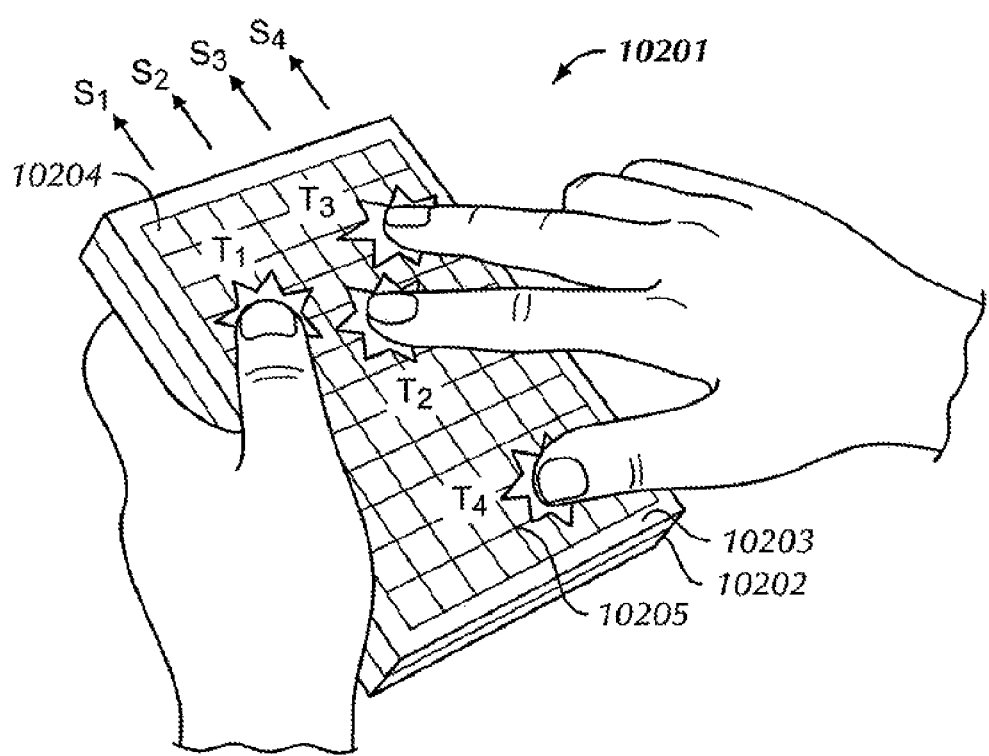
FIG. 102 illustrates an application of a touch screen LCD.

FIG. 102 is a perspective view of an application of a touch screen 10201, in accordance with one embodiment of the present invention. Touch screen 10201 can be configured to display a graphical user interface (GUI) including perhaps a pointer or cursor as well as other information to the user. By way of example, the touch screen may allow a user to move an input pointer or make selections on the graphical user interface by simply pointing at the GUI on the display 10202.

In general, touch screens can recognize a touch event on the surface 10204 of the touch screen and thereafter output this information to a host device. The host device may, for example, correspond to a computer such as a desktop, laptop, handheld or tablet computer. The host device can interpret the touch event and can perform an action based on the touch event. The touch screen shown in FIG. 102 can be configured to recognize multiple touch events that occur at different locations on the touch sensitive surface 10204 of the touch screen at the same time. As shown, the touch screen can, for example, generate separate tracking signals S1-S4 for each touch point T1-T4 that occurs on the surface of the touch screen at a given time.

The multiple touch events can be used separately or together to perform singular or multiple actions in the host device. When used separately, a first touch event may be used to perform a first action while a second touch event may be used to perform a second action that can be different than the first action. The actions may, for example, include moving an object such as a cursor or pointer, scrolling or panning, adjusting control settings, opening a file or document, viewing a menu, making a selection, executing instructions, operating a peripheral device connected to the host device etc. When used together, first and second touch events may be used for performing one particular action. The particular action may for example include logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Referring back to FIG. 102, touch screen 10201 may be a stand alone unit or may integrate with other devices. When stand alone, touch screen 10201 can act like a peripheral device (e.g., a monitor) that can include its own housing. A stand alone display arrangement can be coupled to a host device through wired or wireless connections. When integrated, touch screen 10201 can share a housing and can be hard wired into the host device, thereby forming a single unit. By way of example, the touch screen 10201 may be disposed inside a variety of host devices including but not limited to general purpose computers such as a desktop, laptop or tablet computers, handhelds such as PDAs and media players such as music players, or peripheral devices such as cameras, printers, mobile telephones, and/or the like.

Figure 103:
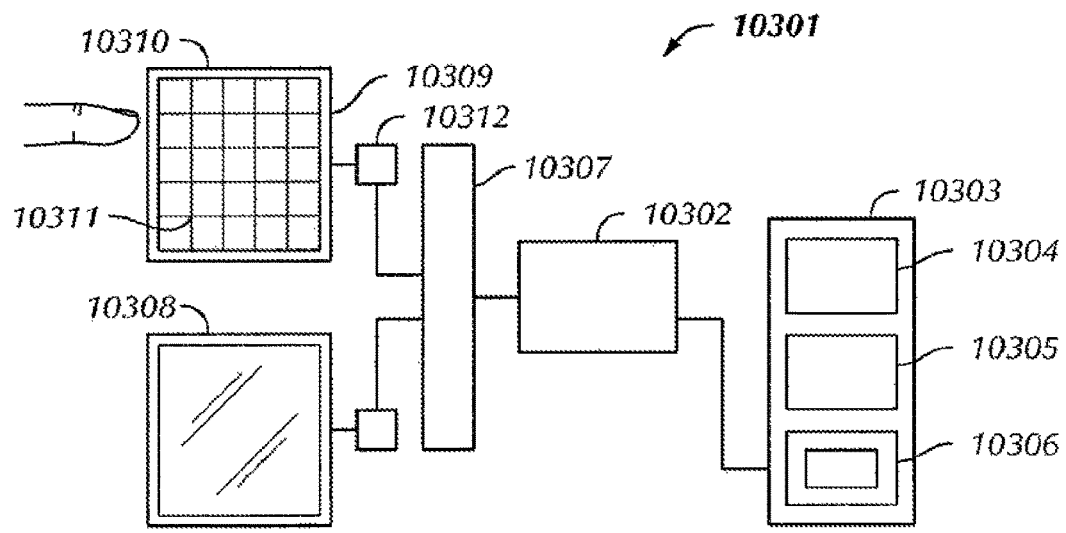
FIG. 103 illustrates a block diagram of a computer system incorporating a touch screen.

FIG. 103 is a block diagram of a computer system 10301, in accordance with one embodiment of the present invention. Computer system 10301 may correspond to personal computer systems such as desktops, laptops, tablets or handhelds. By way of example, the computer system may correspond to any Apple or PC-based computer system. The computer system may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

As shown, computer system 10301 can include processor 56 configured to execute instructions and to carry out operations associated 10302 computer system 10301. For example, using instructions retrieved for example from memory, processor 10302 may control the reception and manipulation of input and output data between components of computing system 10301. Processor 10302 can be a single-chip processor or can be implemented with multiple components.

In most cases, processor 10302 together with an operating system operates to execute computer code and produce and use data. The computer code and data may reside within program storage block 10303 that can be operatively coupled to processor 10302. Program storage block 10303 can provide a place to hold data being used by computer system 10301. By way of example, the program storage block may include read-only memory (ROM) 10304, random-access memory (RAM) 10305, hard disk drive 10306, and/or the like. The computer code and data could also reside on a removable storage medium and loaded or installed onto the computer system when needed. Removable storage media can include, for example, CD-ROM, PC-CARD, floppy disk, magnetic tape, and a network component.

Computer system 10301 can also include an input/output (I/O) controller 10307 that can be operatively coupled to processor 10302. I/O controller 10307 may be integrated with processor 56 or it may be a separate component as shown. I/O controller 10307 can be configured to control interactions with one or more I/O devices. I/O controller 66 can operate by exchanging data between the processor and the I/O devices that desire to communicate with the processor. The I/O devices and the I/O controller can communicate through data link 10312. Data link 10312 may be a one way link or two way link. In some cases, I/O devices may be connected to I/O controller 10307 through wired connections. In other cases, I/O devices may be connected to I/O controller 10307 through wireless connections. By way of example, data link 10312 may correspond to PS/2, USB, Firewire, IR, RF, Bluetooth, or the like.

Computer system 10301 can also include display device 10308, e.g., an integral touch screen LCD as described herein, that can be operatively coupled to processor 10302. Display device 10308 may be a separate component (peripheral device) or may be integrated with the processor and program storage to form a desktop computer (all in one machine), a laptop, handheld or tablet or the like. Display device 10308 can be configured to display a graphical user interface (GUI) including, for example, a pointer or cursor as well as other information displayed to the user.

Display device 10308 can also include an integral touch screen 10309 (shown separately for clarity, but actually integral with the display) that can be operatively coupled to the processor 10302. Touch screen 10309 can be configured to receive input from a user's touch and to send this information to processor 10302. Touch screen 10309 can recognize touches and the position, shape, size, etc., of touches on its surface. Touch screen 10309 can report the touches to processor 10302, and processor 10302 can interpret the touches in accordance with its programming. For example, processor 10302 may initiate a task in accordance with a particular touch.

The touch screen LCDs described herein may find particularly advantageous application in multi-functional handheld devices such as those disclosed in U.S. patent application Ser. No. 11/367,749, entitled "Multi-functional Handheld Device", filed Mar. 3, 2006, which is hereby incorporated by reference.

Figure 104:
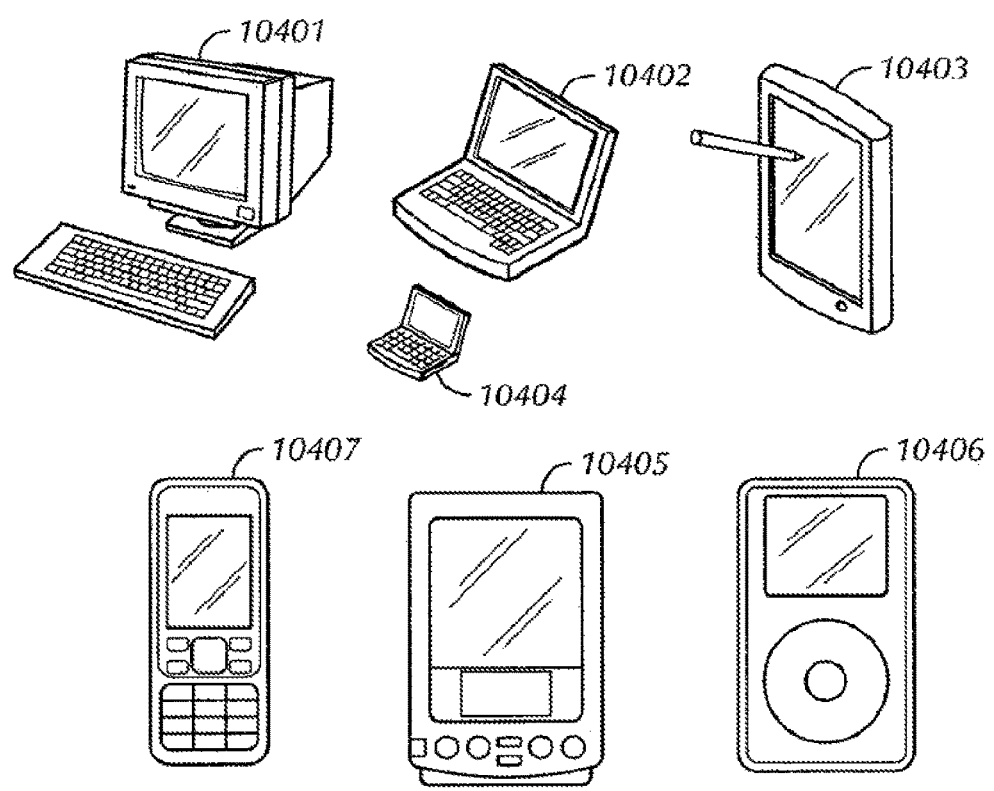
FIG. 104 illustrates a variety of electronic device and computer system form factors that may be used with a touch-screen LCD according to the present invention.

For example, principles described herein may be used to devise input devices for a variety of electronic devices and computer systems. These electronic devices and computer system may be any of a variety of types illustrated in FIG. 104, including desktop computers 10401, notebook computers 10402, tablet computers 10403, handheld computers 10404, personal digital assistants 10405, media players 10406, mobile telephones 10407, and the like. Additionally, the electronic devices and computer systems may be combinations of these types, for example, a device that is a combination of personal digital assistant, media player and mobile telephone. Other alternations, permutations, and combinations of the aforementioned embodiments are also possible.

Moreover, the principles herein, though described with reference to capacitive multi-touch systems, may also apply to systems in which touch or proximity sensing depends on other technologies. It is therefore intended that the following claims be interpreted as including all alterations, permutations, combinations and equivalents of the foregoing.

What is claimed is:

1. A touch screen comprising a display with integral touch sensing, the touch screen comprising:
   a first plurality of pixels, each having first and second electrodes and a common terminal, the common terminal of the first plurality of pixels electrically connected together along a first direction and configurable for providing a common voltage in a display mode of operation and for providing a stimulation signal in a touch sensing mode of operation;
   a second plurality of pixels each having first and second electrodes and a common terminal, the common terminal of the second plurality of pixels electrically connected together along a second direction and configurable for providing a common voltage in the display mode of operation and for providing a touch sensing signal in the touch sensing mode of operation;

a plurality of data lines for transmitting display data; and a plurality of switches, operative in the display mode of operation, for connecting the plurality of data lines to the first electrodes of the first plurality of pixels and the first electrodes of the second plurality of pixels;

a first group of the first plurality of pixels;

a first group of the second plurality of pixels disposed adjacent the first group of the first plurality of pixels;

a second group of first plurality of pixels adjacent the first group of the second plurality of pixels; and a second group of the second plurality of pixels adjacent the second group of the first plurality of pixels.

2. The touch screen of claim 1, wherein at least one of the first and second electrodes of the first plurality of pixels and at least one of the first and second electrodes of the second plurality of pixels are used both for display of data from the plurality of data lines during the display mode of operation and for touch sensing during the touch sensing mode of operation.

3. The touch screen of claim 2, wherein the first and second electrodes of the first and second plurality of pixels are disposed in an in-plane-switching configuration.

4. The touch screen of claim 3, wherein the common terminals of the first plurality of pixels are connected to the second electrodes of the first plurality of pixels, and the common terminals of the second plurality of pixels are connected to the second electrodes of the second plurality of pixels.

5. The touch screen of claim 1, further comprising:

a first polarizer;

a second polarizer;

a first substrate disposed between the first polarizer and the second polarizer;

a second substrate disposed between the first polarizer and the second polarizer;

the first and second electrodes of the first plurality of pixels and the first and second electrodes of the second plurality of pixels disposed on the first substrate on a side thereof facing the second substrate.

6. The touch screen of claim 1, wherein the first direction is one of a row or a column and the second direction is the other of the row or column, and wherein the conductors are disposed along one of a row or column.

7. The touch screen of claim 1, wherein the first and second electrodes of the first and second plurality of pixels are disposed in an in-plane-switching configuration.

8. The touch screen of claim 7, wherein during the touch sensing mode of operation, the second electrodes of the first plurality of pixels are adapted for receiving the stimulation signal and the second electrodes of the second plurality of pixels are adapted for connection to touch sensing circuitry.

9. The touch screen of claim 1, wherein during the touch sensing mode of operation, the second electrodes of the first plurality of pixels are adapted for receiving the stimulation signal and the second electrodes of the second plurality of pixels are adapted for connection to touch sensing circuitry.

10. The touch screen of claim 1, wherein the display comprises a liquid crystal display.

11. The touch screen of claim 5, wherein the display comprises a liquid crystal display.

12. The touch screen of claim 1, wherein the first and second electrodes of the first and second plurality of pixels comprise interdigitated pairs of electrodes.

13. The touch screen of claim 5, wherein the first and second electrodes of the first and second plurality of pixels comprise interdigitated pairs of electrodes.

14. The touch screen of claim 1, wherein the first group of the first plurality of pixels and the second group of the first plurality of pixels comprises pixels disposed along the first and second directions.

15. The touch screen of claim 5, wherein the first group of the first plurality of pixels and the second group of the first plurality of pixels comprises pixels disposed along the first and second directions.

16. The touch screen of claim 1, wherein the first group of the first plurality of pixels and the second group of the first plurality of pixels and the second group of the second plurality of pixels and the second group of the second plurality of pixels first comprises pixels disposed along the first and second directions.

17. The touch screen of claim 16, wherein the display comprises a liquid crystal display.

18. The touch screen of claim 5, wherein the first group of the first plurality of pixels and the second group of the first plurality of pixels and the second group of the second plurality of pixels and the second group of the second plurality of pixels first comprises pixels disposed along the first and second directions.

19. A method of operating the touch screen of claim 1, comprising:

alternately applying a stimulation signal to the second electrodes of the first and second plurality of pixels; and alternately coupling a capacitance sensing circuitry to the second electrodes of the second and first plurality of pixels.

20. A method of operating the touch screen of claim 5, comprising:

alternately applying a stimulation signal to the second electrodes of the first and second plurality of pixels; and alternately coupling a capacitance sensing circuitry to the second electrodes of the second and first plurality of pixels.

* * * * *